United States Patent
Mateer

(10) Patent No.: US 12,131,588 B2
(45) Date of Patent: Oct. 29, 2024

(54) SYSTEM AND METHOD FOR CREATING LUGGAGE MANIFEST USING TERMINATING B-TYPE MESSAGE

(71) Applicant: Craig Mateer, Orlando, FL (US)

(72) Inventor: Craig Mateer, Orlando, FL (US)

( * ) Notice: Subject to any disclaimer, the term of this patent is extended or adjusted under 35 U.S.C. 154(b) by 0 days.

(21) Appl. No.: 18/515,060

(22) Filed: Nov. 20, 2023

(65) Prior Publication Data

US 2024/0265745 A1     Aug. 8, 2024

Related U.S. Application Data

(63) Continuation-in-part of application No. 18/197,840, filed on May 16, 2023, and a continuation-in-part of
(Continued)

(51) Int. Cl.
*G06Q 10/02*     (2012.01)
*B42D 15/00*     (2006.01)
(Continued)

(52) U.S. Cl.
CPC .......... *G07B 11/00* (2013.01); *B42D 15/0053* (2013.01); *G06Q 10/025* (2013.01);
(Continued)

(58) Field of Classification Search
CPC ....... G06Q 10/025; B64F 1/366; B64F 1/368; G09F 2003/0254; G06K 19/025; G06K 7/10445
(Continued)

(56) References Cited

U.S. PATENT DOCUMENTS 5,010,240 A    4/1991   Sheldon
5,401,944 A    3/1995   Bravman et al.
(Continued)

FOREIGN PATENT DOCUMENTS

CN    111461614 A    7/2020
CN    111882263 A    11/2020
(Continued)

OTHER PUBLICATIONS

A. Schwaninger et al. "Single-View, Multi-View and 3D Imaging for Baggage Screening: What should be considered for effective training?" Aviation Security International, 2019, pp. 32-35 (4 pages total).

(Continued)

*Primary Examiner* — Paultep Savusdiphol
(74) *Attorney, Agent, or Firm* — Sughrue Mion, PLLC

(57) ABSTRACT

Provided is a system and method for creating a luggage manifest using a terminating b-type message, the method including: a) identifying, by at least one of at least one processor, a terminating baggage source message (BSM) associated with an arrival of a luggage item of a passenger, wherein the terminating BSM comprises an airport code associated with an airport and travel data of a first mode of travel carrier of the luggage item, and wherein the travel data comprises at least one of flight information, airline information, a name of the passenger, a passenger name record (PNR) number, and an International Air Transport Association (IATA) license plate number; b) matching, by at least one of the at least one processor, any of the travel data in the terminating BSM with travel data in a manifest for a second mode of travel different from the first mode of travel, wherein the second mode of travel is local to the airport code; c) based on matching any of the travel data in the terminating BSM with the travel data in the manifest for the (Continued)

second mode of travel, extracting, by at least one of the at least one processor, the IATA license plate number from the terminating BSM; and d) creating, by at least one of the at least one processor, a luggage item manifest record for the luggage item, wherein the luggage item manifest record comprises the IATA license plate number, and wherein the luggage item manifest record is accessible by predetermined electronic acquiring devices configured to scan an originating hardcopy bag tag identifier (OH-BTI) associated with or printed on an originating hardcopy bag tag from the first mode of travel carrier that is attached to the luggage item.

21 Claims, 61 Drawing Sheets

Related U.S. Application Data application No. 18/337,288, filed on Jun. 19, 2023, now Pat. No. 11,893,832, which is a continuation-in-part of application No. 18/332,377, filed on Jun. 9, 2023, now Pat. No. 11,900,732, which is a continuation of application No. 18/201,908, filed on May 25, 2023, now Pat. No. 11,881,057, which is a continuation of application No. 18/311,566, filed on May 3, 2023, which is a continuation of application No. 18/104,359, filed on Feb. 1, 2023, now Pat. No. 11,682,241.

(60) Provisional application No. 63/543,667, filed on Oct. 11, 2023.

(51) Int. Cl.
  *G06Q 10/08* (2023.01)
  *G06Q 50/26* (2012.01)
  *G07B 11/00* (2006.01)
  *G07C 9/21* (2020.01)
  *G07C 9/22* (2020.01)
  *G07C 9/28* (2020.01)
  *G09F 3/20* (2006.01)

(52) U.S. Cl.
  CPC ........... *G06Q 10/08* (2013.01); *G06Q 50/265* (2013.01); *G07C 9/21* (2020.01); *G07C 9/22* (2020.01); *G07C 9/28* (2020.01); *G09F 3/207* (2013.01)

(58) Field of Classification Search
  USPC ......................................... 235/384, 375, 492
  See application file for complete search history.

(56) References Cited

U.S. PATENT DOCUMENTS

| | | |
|---|---|---|
| 5,854,477 A | 12/1998 | Kawaji et al. |
| 6,158,658 A * | 12/2000 | Barclay .................. G07B 15/00 235/375 |
| 6,624,752 B2 | 9/2003 | Klitsgaard et al. |
| 7,512,458 B2 | 3/2009 | Mateer |
| 7,830,254 B2 | 11/2010 | Huey et al. |
| 8,052,061 B2 | 11/2011 | Warther |
| 8,600,149 B2 | 12/2013 | Song et al. |
| 9,129,167 B2 | 9/2015 | Motley, III et al. |
| 9,317,728 B2 | 4/2016 | Motley, III et al. |
| 9,659,336 B2 | 5/2017 | Mateer |
| 10,042,078 B2 | 8/2018 | Sarraiocco |
| 10,186,329 B1 | 1/2019 | Laborde |
| 10,217,078 B1 | 2/2019 | Klein |
| 10,366,293 B1 | 7/2019 | Faviero et al. |
| 10,504,261 B2 | 12/2019 | Cinnamon et al. |
| 10,856,116 B1 | 12/2020 | Klein |
| 10,904,722 B2 | 1/2021 | Klein |
| 10,932,101 B2 | 2/2021 | Klein |
| 10,979,872 B2 | 4/2021 | Klein |
| 11,057,689 B1 | 7/2021 | Klein |
| 11,189,155 B2 | 11/2021 | Malinofsky |
| 11,348,040 B2 | 5/2022 | Mateer |
| D966,243 S | 10/2022 | Klein |
| 11,663,574 B2 | 5/2023 | Martinez de Velasco Cortina et al. |
| 11,881,057 B1 | 1/2024 | Mateer |
| 2003/0093305 A1 | 5/2003 | Davis et al. |
| 2003/0120510 A1 | 6/2003 | Panek |
| 2003/0189094 A1 | 10/2003 | Trabitz |
| 2003/0233244 A1* | 12/2003 | Kumhyr .................. G06Q 10/02 705/5 |
| 2005/0051622 A1 | 3/2005 | Mak |
| 2005/0248450 A1 | 11/2005 | Zanovitch |
| 2005/0251397 A1 | 11/2005 | Zanovitch et al. |
| 2005/0258231 A1 | 11/2005 | Wiater |
| 2007/0203765 A1 | 8/2007 | Schoen et al. |
| 2009/0276689 A1 | 11/2009 | Bartholomew |
| 2010/0078475 A1 | 4/2010 | Lin et al. |
| 2010/0207780 A1 | 8/2010 | Newton |
| 2010/0211418 A1 | 8/2010 | Mateer |
| 2011/0054952 A1 | 3/2011 | Mateer |
| 2011/0231212 A1* | 9/2011 | Hurley .................... B64F 1/366 705/5 |
| 2013/0046711 A1 | 2/2013 | Reiz |
| 2013/0101172 A1 | 4/2013 | Parikh et al. |
| 2013/0268449 A1 | 10/2013 | Mateer |
| 2013/0284800 A1 | 10/2013 | Gillen et al. |
| 2013/0341389 A1 | 12/2013 | Roderique et al. |
| 2014/0219501 A1 | 8/2014 | Zhang et al. |
| 2014/0278590 A1 | 9/2014 | Abbassi et al. |
| 2014/0291405 A1 | 10/2014 | Harkes |
| 2015/0088781 A1 | 3/2015 | Gillen et al. |
| 2015/0122893 A1 | 5/2015 | Warther |
| 2015/0199804 A1 | 7/2015 | Chen et al. |
| 2015/0205989 A1 | 7/2015 | Motley, III et al. |
| 2015/0371453 A1 | 12/2015 | Gallo et al. |
| 2016/0227897 A1 | 8/2016 | Jobling et al. |
| 2016/0314429 A1 | 10/2016 | Gillen et al. |
| 2017/0004444 A1 | 1/2017 | Krasko et al. |
| 2017/0132565 A1* | 5/2017 | Beadles ............... G06K 7/1417 |
| 2017/0268891 A1 | 9/2017 | Dyrnaes et al. |
| 2017/0372105 A1 | 12/2017 | Coxall et al. |
| 2018/0121804 A1 | 5/2018 | Mohamadi |
| 2019/0026851 A1 | 1/2019 | Mateer |
| 2019/0147558 A1 | 5/2019 | Cheikh et al. |
| 2020/0045547 A1 | 2/2020 | Singh Atwal et al. |
| 2020/0387861 A1* | 12/2020 | Sanglier ............. G06Q 10/0833 |
| 2021/0133678 A1 | 5/2021 | Bates et al. |
| 2021/0201218 A1 | 7/2021 | Guiol et al. |
| 2021/0264445 A1 | 8/2021 | Axelrod et al. |
| 2021/0342428 A1 | 11/2021 | Hiramoto et al. |
| 2022/0058762 A1* | 2/2022 | Goddard ............... G06K 7/1404 |
| 2022/0082721 A1 | 3/2022 | Holifield et al. |
| 2022/0292273 A1* | 9/2022 | Kusy ....................... B64F 1/32 |
| 2022/0292412 A1 | 9/2022 | Mateer |
| 2022/0350872 A1 | 11/2022 | McManus et al. |
| 2022/0381941 A1 | 12/2022 | Fortune et al. |
| 2023/0186509 A1 | 6/2023 | Ryan |

FOREIGN PATENT DOCUMENTS

| | | |
|---|---|---|
| EP | 2 369 554 A2 | 9/2011 |
| EP | 3 002 714 A1 | 4/2016 |
| EP | 3 113 090 A1 | 1/2017 |
| EP | 3 373 252 A1 | 9/2018 |
| EP | 3 709 239 A1 | 9/2020 |
| JP | 7009743 B2 | 1/2022 |
| KR | 10-2009-0110642 A | 10/2009 |
| KR | 10-2013-0007125 A | 1/2013 |
| KR | 10-1884575 B1 | 8/2018 |
| KR | 10-2022-0030724 A | 3/2022 |
| KR | 10-2451322 B1 | 10/2022 |
| NL | 2008761 A | 11/2012 |
| WO | 2006/082521 A2 | 8/2006 |
| WO | 2010/067132 A2 | 6/2010 |

(56) References Cited

FOREIGN PATENT DOCUMENTS

| | | |
|---|---|---|
| WO | 2011/093780 A1 | 8/2011 |
| WO | 2013/155068 A2 | 10/2013 |
| WO | 2017/082468 A1 | 5/2017 |
| WO | 2020/128468 A1 | 6/2020 |
| WO | 2021/090448 A1 | 5/2021 |

OTHER PUBLICATIONS

Paul Evans, "Three-dimensional X-ray Imaging for Security Screening" Security Journal, vol. 18, Issue 1, 2005, pp. 19-28 (11 Pages total).
"Type B Service Reference Manual," SITA, Jan. 2000, 113A-0100-bis, pp. 1-192 (192 pages total).
"Planning Guidelines and Design Standards for Checked Baggage Inspection Systems: Appendices," Transportation Security Administration, Version 8.0, Dec. 30, 2022, File 2600.3, pp. 1-287 (287 pages total).
"Planning Guidelines and Design Standards (PGDS) Version 8.0 for Checked Baggage Inspection Systems," Department of Homeland Security, Sep. 29, 2017, TSA25-04-03026 (2 pages total).
"Bar Coded Boarding Pass (BCBP) Implementation Guide," International Air Transport Association, Jun. 1, 2018, Seven Edition, pp. 1-57 (56 pages total).
"Guidelines on Passenger Name Record (PNR) Data," International Civil Aviation Organization, First Edition, 2010, Doc 9944 (28 pages total).
"DHS/CBP Procedures for Access, Correction or Rectification, and Redress for Passenger Name Records (PNR)," U.S. Department of Homeland Security, CBP Publication No. 1011-1219 (4 pages total).
"What is PNR: Passenger Name Record Explained in Details," AltexSoft (15 pages total).
Michael Strauss, "Travel Technology for Dummies: What Is a Booking Reference or PNR?," Travel Industry Blog, Apr. 11, 2017 (5 pages total).
"Management Summary on Passenger-related Information," International Civil Aviation Organization, (ICAO), the World Customs Organization (WCO), International Air Transport Association (IATA), Jul. 2017, Umbrella Document Version 2.0, pp. 1-10 (10 pages total).
United States Office Action issued Jan. 29, 2024 in U.S. Appl. No. 18/514,877.
"Planning Guidelines and Design Standards for Checked Baggage Inspection Systems," Transportation Security Administration, Version 8.0, Dec. 30, 2022, File 2600.3, pp. 1-323 (323 pages total).
United States Office Action issued Oct. 12, 2023 in U.S. Appl. No. 17/619,114.
Indian Office Action issued Aug. 11, 2023 in Application No. 202217002242.
United States Office Action issued Feb. 26, 2024 in U.S. Appl. No. 18/515,004.
United States Office Action issued Feb. 23, 2024 in U.S. Appl. No. 18/514,826.
United States Office Action issued Mar. 14, 2024 in U.S. Appl. No. 18/514,914.
United States Office Action issued Mar. 14, 2024 in U.S. Appl. No. 18/514,924.
United States Office Action issued Mar. 8, 2024 in U.S. Appl. No. 18/514,937.
United States Office Action issued Mar. 11, 2024 in U.S. Appl. No. 18/529,705.
International Search Report for PCT/US2024/013257, mailed May 21, 2024.
Notification of Transmittal of the International Search Report and the Written Opinion of the International Searching Authority, or the Declaration, mailed May 21, 2024.
Written Opinion of the International Searching Authority for PCT/US2024/013257, mailed May 21, 2024.
Written Opinion of the International Searching Authority for PCT/US2024/013262, mailed May 22, 2024.
Notification of Transmittal of the International Search Report and Written Opinion of the International Searching Authority, or the Declaration for PCT/US2024/013262, mailed May 22, 2024.
International Search Report for PCT/US2024/013262 mailed May 22, 2024.
International Search report dated May 27, 2024 in Application No. PCT/US2024/013800.
Notification of Transmittal of the International Search Report and Written Opinion of the International Searching Authority, dated May 27, 2024 or the Declaration for . PCT/US2024/013800.
Written Opinion of the International Searching Authority dated May 27, 2024 in Application No. PCT/US2024/013800.
International Search Report dated May 31, 2024 in Application No. PCT/US2024/013261.
Notification of Transmittal of the International Search Report and Written Opinion of the International Searching Authority, dated May 31, 2024 in Application No. PCT/US2024/013261.
Written Opinion of the International Searching Authority dated May 31, 2024, in Application No. PCT/US2024/013261.
International Search Report dated May 27, 2024 in Application No. PCT/US2024/013258.
Notification of Transmittal of the Internatioinal Search Report and Written Opinion of the International Searching Authority, dated May 27, 2024 in Application No. PCT/US2024/013258.
Written Opinion of the International Searching Authority dated May 27, 2024 in Application No. PCT/US2024/013258.
International Search Report dated May 27, 2024 in Application No. PCT/US2024/013597.
Written Opinion of the International Search Report dated May 27, 2024 in Application No. PCT/US2024/013597.
International Search Report dated May 27, 2024 in Application No. PCT/US2024/013599.
Notification of Transmittal of the International Search Report and Written Opinion of the International Searching Authority, or the Declaration for PCT/US2024/013599, mailed May 27, 2024.
Written Opinion of the International Searching Authority dated May 27, 2024 in Application No. PCT/US2024-013599.
International Search Report for PCT/US2024/013795 mailed Jun. 3, 2024.
Notification of Transmittal of the International Search Report and Written Opinion of the International Searching Authority, or the Declaration for PCT/US2024/013795, mailed Jun. 3, 2024.
Written Opinion of the International Searching Authority for PCT/US2024/013795, mailed Jun. 3, 2024.
International Search Report for PCT/US2024/013919 mailed Jun. 3, 2024.
Written Opinion of the International Searching Authority for PCT/US2024/013919 mailed Jun. 3, 2024.
Notification of Transmittal of the International Search Report and Written Opinion of the International Searching Authority, or the Declaration for PCT/US2024/013919, mailed Jun. 3, 2024.
International Search Report for PCT/US2024/012226 mailed Jun. 7, 2024.
Written Opinion of the International Searching Authority for PCT/US2024/012226 mailed Jun. 7, 2024.
International Search Report for PCT/US2024/013259 mailed Jun. 31, 2024.
Written Opinion of the International Searching Authority for PCT/US2024/013259 mailed Jun. 21, 2024.
Notification of Transmittal of the International Search Report and Written Opinion of the International Searching Authority, or the Declaration for PCT/US2024/013259 mailed Jun. 21, 2024.
International Search Report for PCT/US2024/013263 mailed Jun. 21, 2024.
Written Opinion of the International Searching Authority for PCT/US2024/013263 mailed Jun. 21, 2024.
Notification of Transmittal of the International Search Report and Written Opinion of the International Searching Authority, or the Declaration for PCT/US2024/013263 mailed Jun. 21, 2024.
International Search Report for PCT/US2024/013083 mailed Jun. 13, 2024.

(56) References Cited

OTHER PUBLICATIONS

Written Opinion of the International Searching Authority for PCT/US2024/013083 mailed Jun. 13, 2024.
International Search Report for PCT/US2024/012231 mailed May 16, 2024.
Written Opinion of the International Searching Authority for PCT/US2024/012231 mailed May 16, 2024.
International Search Report for PCT/US2024/013085 mailed Jun. 21, 2024.
Written Opinion of the International Searching Authority for PCT/US2024/013085 mailed Jun. 21, 2024.
International Search Report for PCT/US2024/013788 mailed Jul. 22, 2024.
Written Opinion of the International Searching Authority for PCT/US2024/013788 mailed Jul. 22, 2024.
International Search Report for PCT/US2024/013807 mailed Jul. 19, 2024.
Written Opinion of the International Searching Authority for PCT/US2024/013807 mailed Jul. 19, 2024.
Office Action issued Jul. 1, 2024 in U.S. Appl. No. 18/515,004.
Notice of Allowance issued Jul. 3, 2024 in U.S. Appl. No. 18/514,826.
Notice of Allowance issued Jul. 17, 2024 in U.S. Appl. No. 18/514,877.
Notice of Allowance issued Jun. 28, 2024 in U.S. Appl. No. 18/514,937.

* cited by examiner

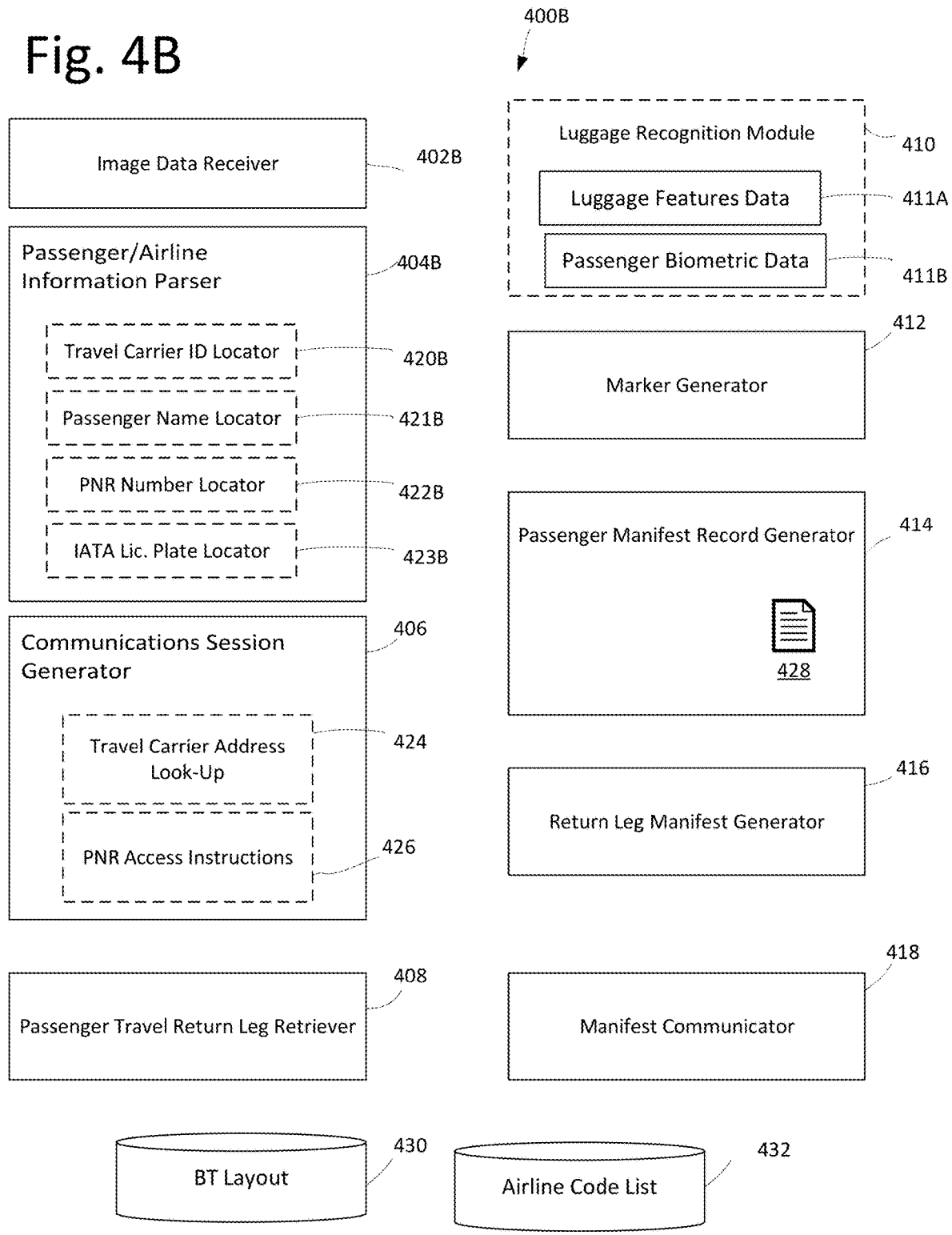

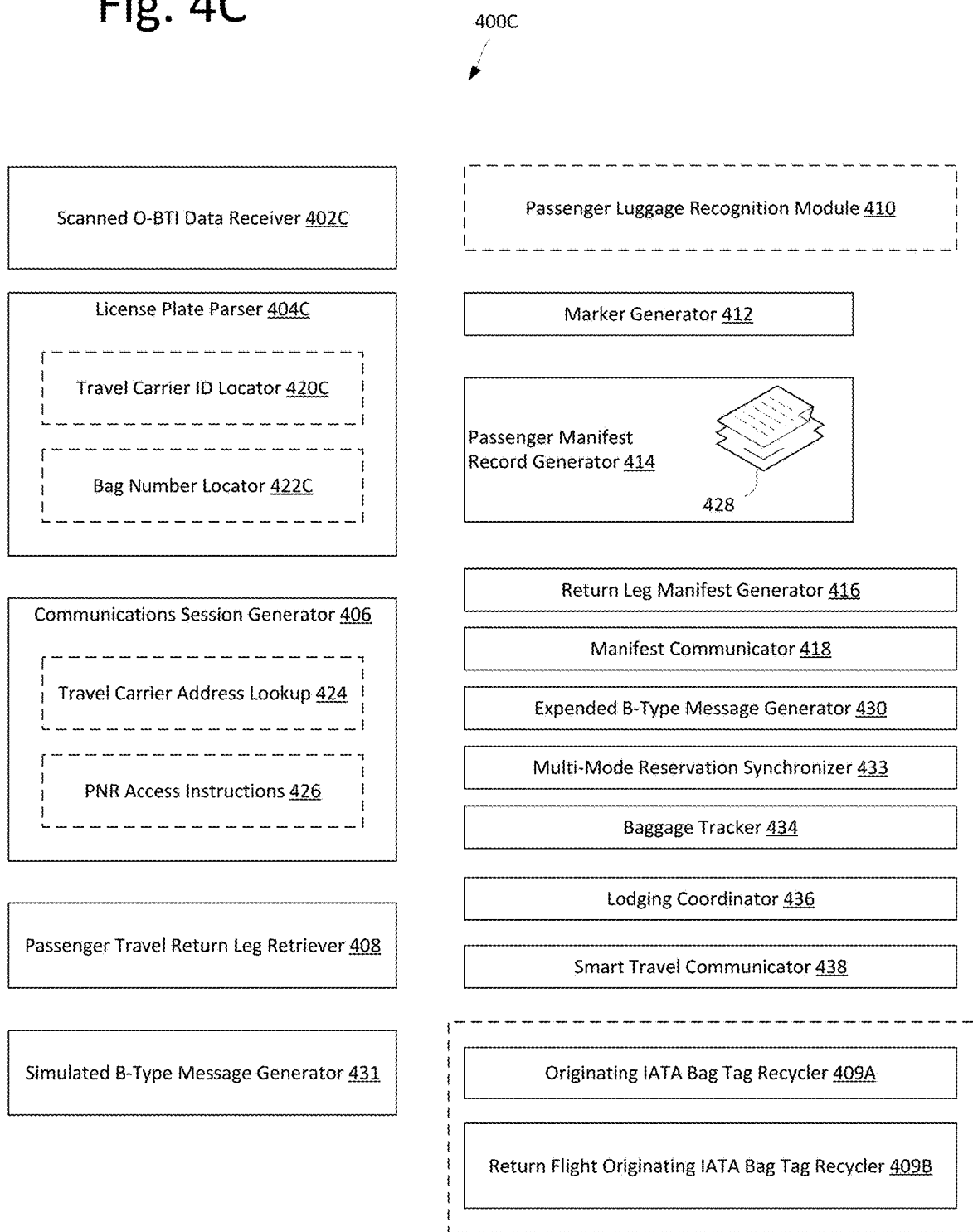

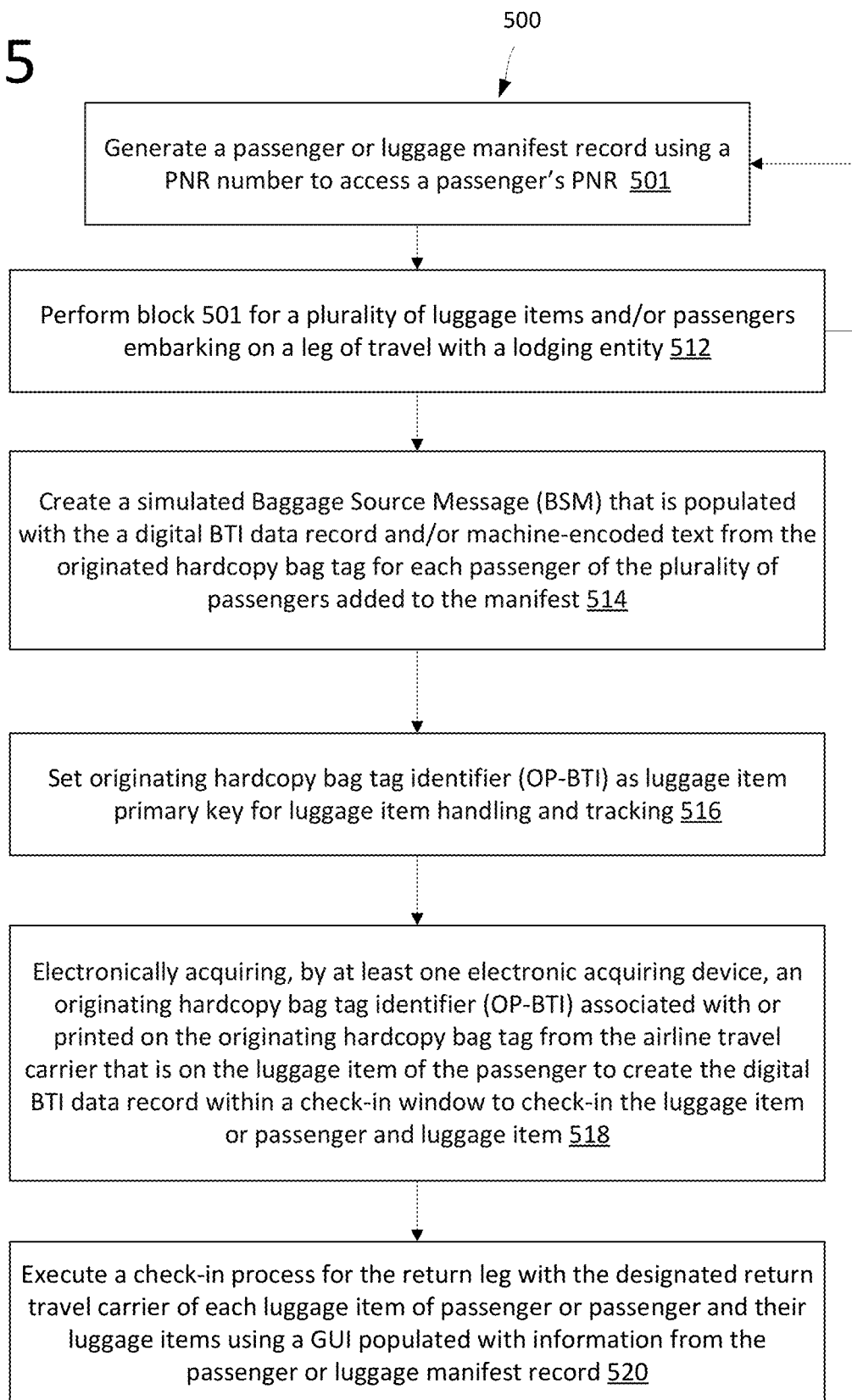

Fig. 7
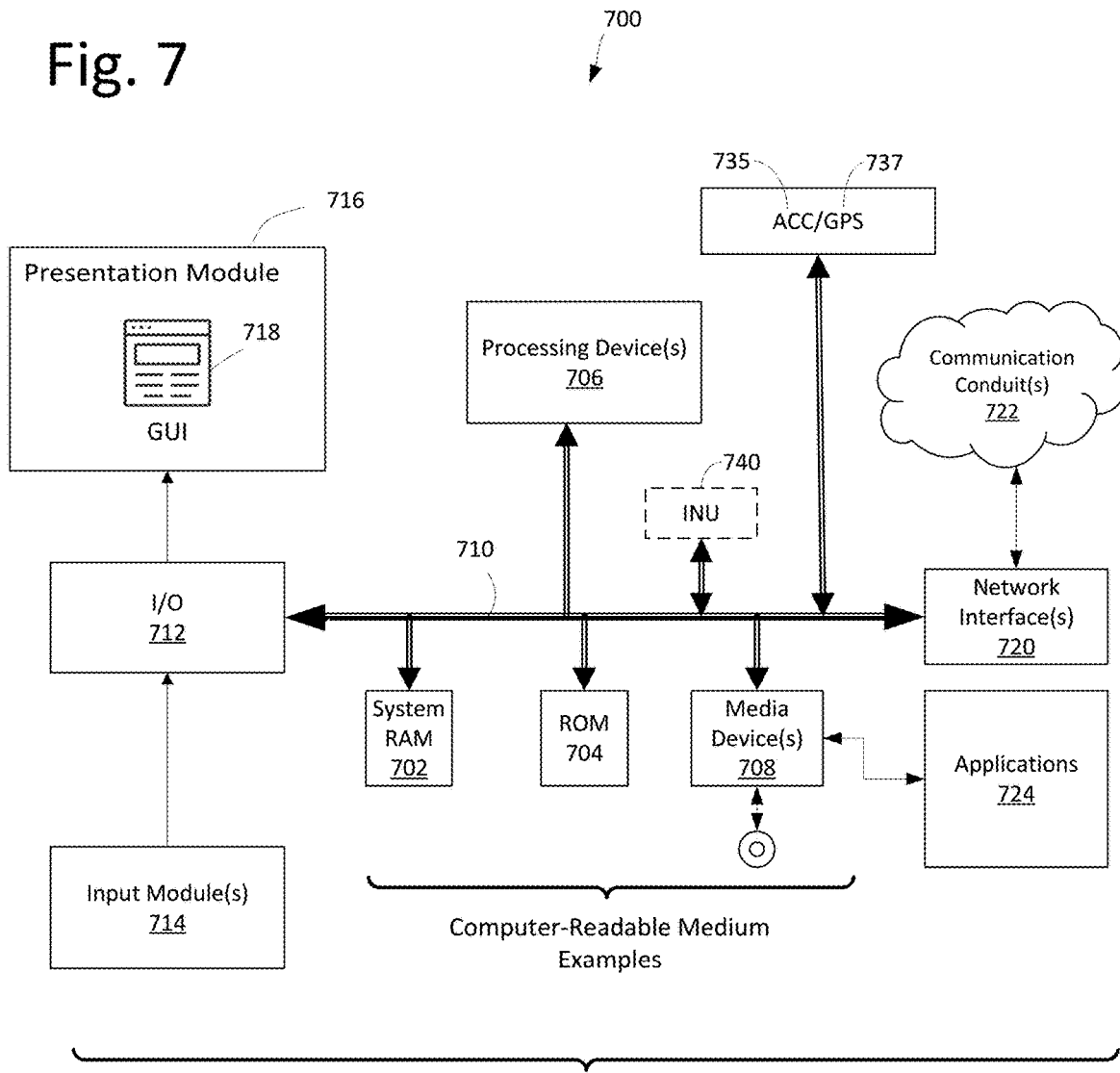
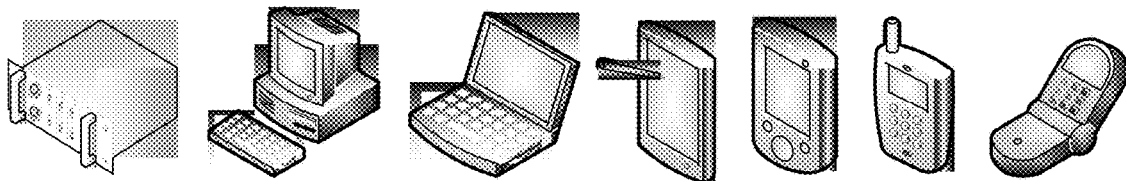
For Example:

Performing image processing on the image to optically recognize printed text of the printed passenger information associated with the airline travel carrier on the originating hardcopy bag tag and convert the printed text to searchable machine-encoded text sequences 1102

Create the DPI data record linked to the airline travel carrier from machine-encoded text sequences of the passenger information for accessing the return flight with the designated return travel carrier 1104

| | |
|---|---|
| SBSM | 1422 |
| .V/NULL | 1424 |
| .F/B60072/31MAY/SLC | 1426 |
| .I/TK0004/30MAY/IST/Y | 1428 |
| .N/NULL | 1430 |
| .S/NULL | 1432 |
| .W/NULL | 1434 |
| .P/JOHN/SMITH | 1436 |
| .D/Location Info/Date/Time | 1438 |
| .C/Company Name | 1440 |
| .L/MLK90B | 1442 |
| ENDSBSM | 1444 |

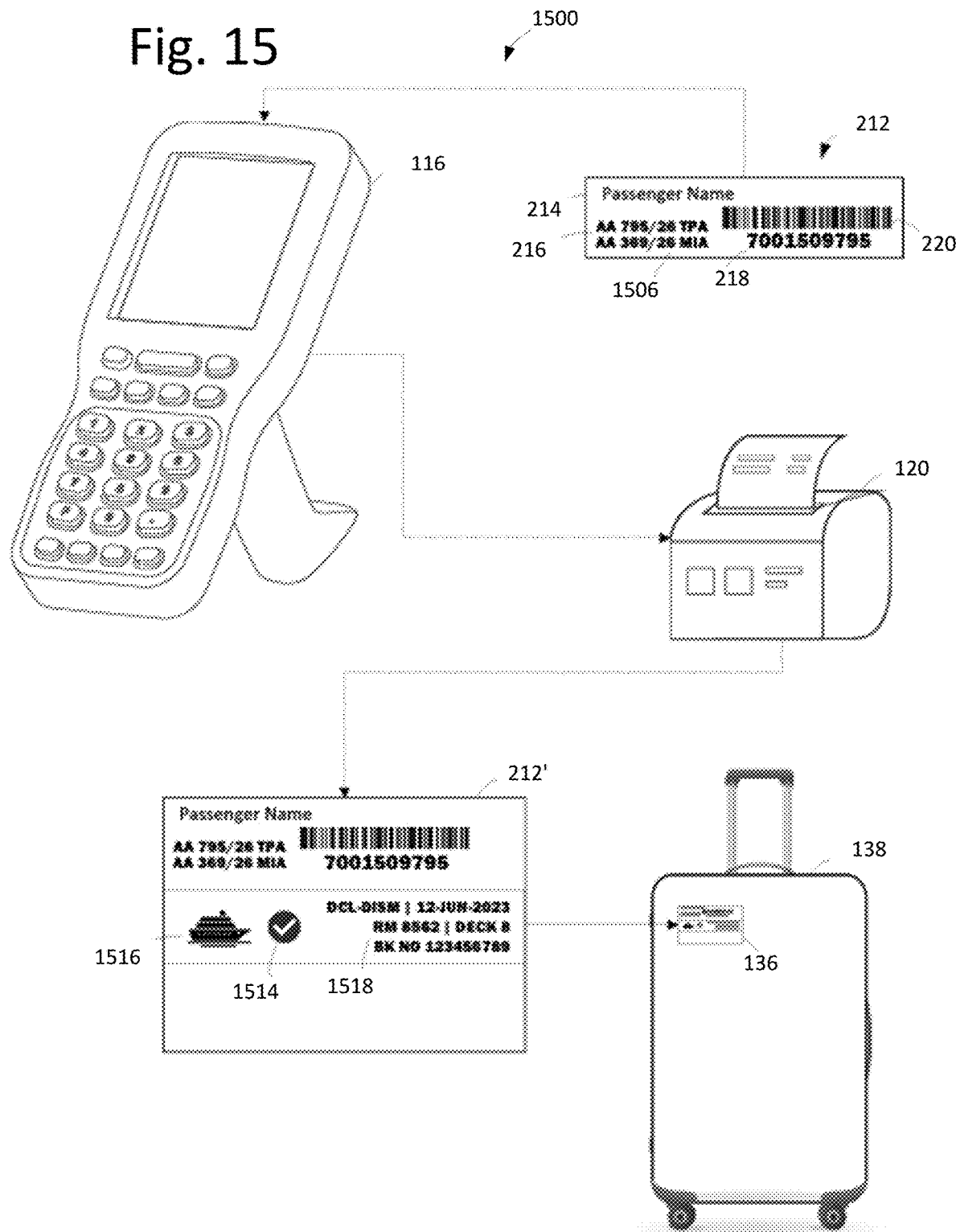

Fig. 18B

From FIG. 18A, Block 1806

Displaying in the GUI, by the computer system, at least one of the stored screening images of the luggage item of the passenger on at least one display device to analyze the accessed at least one stored screening image according to rules and regulations associated with the second mode of transportation or lodging
1808

Receiving via the GUI, by the computer system, a mark in the manifest of an analysis result representative of one of a security compliance of the luggage item for travel on the second mode of transportation and a non-security compliance of the luggage item for travel on the second mode of transportation 1810

Registration Module 2002

Manifest Generator Module 2004

Unique Identifier Retriever Module 2006

GUI Module 2008

Image Selector Module 2010

Analysis Module 2012

Object Detector Module 2014

Annotation Module 2016

3D Generator Module 2018

Mass and Density Calculator Module 2020

Pass/Fail Mark Module 2020

Analysis Results Communication Module 2022

ABC AIR CARRIER

3130

Your Trip Confirmation #  MLK908

Passenger Info

Name: John Smith

| FLIGHT | SEAT |
|--------|------|
| 652    | 01C  |

| Sun May 21 | Depart | Arrive |
|------------|--------|--------|
| AIR ABC 652<br>First Class (O) | Salt Lake City<br>4:00 PM | Istanbul Airport |

MANAGE MY TRIP

Ticket #:         00890098723467
Place of Issue:
Issue Date:       MAY23
Expiration Date:  MAY24

SYSTEM AND METHOD FOR CREATING LUGGAGE MANIFEST USING TERMINATING B-TYPE MESSAGE

CROSS-REFERENCE TO RELATED APPLICATIONS

This application claims the priority benefit of U.S. Provisional Patent Application No. 63/543,667, filed Oct. 11, 2023, and entitled "System and Method for Creating a Luggage Manifest." This application is also a continuation-in-part of, and claims the priority benefit of, U.S. patent application Ser. No. 18/197,840, filed May 16, 2023 and entitled "Multi-Modal Transportation Baggage Screening and Image Sharing System". This application is also a continuation-in-part of, and claims the priority benefit of, each of: U.S. patent application Ser. No. 18/337,288, filed Jun. 19, 2023 and entitled "Method and System for Baggage Check-in", which is a continuation-in-part of U.S. patent application Ser. No. 18/332,377, filed Jun. 9, 2023 and entitled "Digital Recreation of Original Bag Tag Identifier", which is a continuation of U.S. patent application Ser. No. 18/201,908 filed May 25, 2023 and entitled "Return Leg Remote Passenger Check-In from Bag Tag Identifiers", which is a continuation of U.S. patent application Ser. No. 18/311,566, filed May 3, 2023 and entitled "Multi-Leg Travel Baggage Tracking". Wherein each of application Ser. Nos. 18/337,288, 18/332,377, 18/201,908, and 18/311,566 directly claim the priority benefit of U.S. patent application Ser. No. 18/104,359 (now U.S. Pat. No. 11,682,241), filed Feb. 1, 2023 and entitled "Return Leg Remote Passenger Check-In"; and, wherein for the avoidance of doubt and without limiting the generality of the foregoing, application Ser. No. 18/311,566 is a continuation of application Ser. No. 18/104,359. All of the foregoing are incorporated herein by reference in full.

BACKGROUND

1. Field

The disclosure relates generally to asset management. Specifically, the disclosure relates to systems and methods for extracting otherwise discarded data and repurpose it to reduce data entry.

2. Description of Related Art

Travel carriers generally provide a passenger with the ability to check in luggage packed with a passenger's personal items, with or without a luggage fee. The luggage is often weighed to determine whether additional luggage fees are required. Then, the luggage is tagged by the airline with a printed bag tag. Each travel carrier may have its own format for printing a bag tag at the travel carrier counter. This process consumes human resources of personnel working behind the counter to finalize a check-in of the passenger, print boarding passes, process luggage, and print and attach bag tags. Airline travel carriers have also invested in kiosk machines that allow passengers to print bag tags themselves to free up some time for the counter personnel. This can allow a passenger to print and attach the printed bag tag without using the human resources of the counter personnel.

According to the Federal Aviation Administration, the average number of daily passengers in Fiscal Year 2021 was approximately 1.6 million. In Fiscal Year 2019, the average of daily passengers was approximately 2.9 million. Some of these passengers are traveling on a return leg of a trip. Still further, some of the passengers traveling on a return leg are returning from a cruise or high-volume resort.

There have been many attempts to reduce the cost of baggage handling, and especially the baggage handling, traveler departure, and return flight check-in from high-volume lodging entities. To simplify baggage handling during transport, a passenger is provided the option to select services from a third-party vendor to pick-up the passenger and/or baggage and transport the baggage to the airport when needed. The baggage may be picked-up from any location, such as home, office, hotel, etc. and/or delivered to any location identified by the passenger, without the passenger needing to be present.

Another attempt at baggage handling includes cross-use of employees at lodging entities, such as a hotel. One of the biggest drawbacks of cross-use of employees is that these employees are otherwise unavailable for other tasks that may arise for passengers still enjoying the amenities of the lodging entity. Hiring more employees has become a challenge in recent years due to COVID-19. Moreover, employee costs have risen. In some venues, such as cruise ships, extra employees to handle additional tasks is not just cost prohibitive but reduces the revenue of the cruise by trading paying passengers for the cost of a hired employee. The ability to print bag tags and boarding passes takes up area in the cruise ship that can be used for passenger lodging or additional revenue opportunities.

Some baggage handling services issue a valet receipt or tag that is placed on the luggage. This process still requires the baggage to receive a printed IATA bag tag with a bag tag identifier to replace the valet receipt or tag. This process can be cost prohibitive in a competitive lodging enterprise competing for clientele. Overall, the baggage handling services require a passenger to order the service using a website or mobile application, enter various passenger information that may be entered incorrectly, and pay a fee. Passengers can be remotely checked in to their flights by providing in advance all the necessary flight information of a travel itinerary using the website or mobile application. While the process seems benign, data entry errors can occur which can be very costly coupled with the additional cost of baggage handling and temporary valet tickets.

Most times after a passenger arrives at their destination, the bag tag is removed and discarded to make room for the bag tag on their return leg of travel.

An average ocean liner cruise ship has a capacity of approximately 3,000 passengers. Some larger cruise ships have a capacity of 5,400 passengers. Each passenger that will return home using an airline travel carrier must be checked in for their return flight. The cruise ship personnel will handle the precheck-in process for a return flight and/or check-in of luggage bags as well as the number of luggage bags. However, the process consumes valuable limited human resources available on the cruise ship for disembarkation. There is a need for a system and process to address these challenges that are cost and time efficient, and easy to use by any passenger.

SUMMARY

According to an aspect of the disclosure, a method includes: a) identifying, by at least one of at least one processor, a terminating baggage source message (BSM) associated with an arrival of a luggage item of a passenger, wherein the terminating BSM comprises an airport code associated with an airport and travel data of a first mode of travel carrier of the luggage item, and wherein the travel data comprises at least one of flight information, airline information, a name of the passenger, a passenger name record (PNR) number, and an International Air Transport Association (IATA) license plate number; b) matching, by at least one of the at least one processor, any of the travel data in the terminating BSM with travel data in a manifest for a second mode of travel different from the first mode of travel, wherein the second mode of travel is local to the airport code; c) based on matching any of the travel data in the terminating BSM with the travel data in the manifest for the second mode of travel, extracting, by at least one of the at least one processor, the IATA license plate number from the terminating BSM; and d) creating, by at least one of the at least one processor, a luggage item manifest record for the luggage item, wherein the luggage item manifest record comprises the IATA license plate number, and wherein the luggage item manifest record is accessible by predetermined electronic acquiring devices configured to scan an originating hardcopy bag tag identifier (OH-BTI) associated with or printed on an originating hardcopy bag tag from the first mode of travel carrier that is attached to the luggage item.

The travel data may include the flight information and airline information, the flight information may include a flight number and an airline, and the method may further include: before b), sorting, by at least one of the at least one processor, a plurality of BSMs based on a baggage source indicator that indicates the BSM is the terminating BSM; wherein b) may further include matching, by at least one of the at least one processor, the flight number and the airline in the terminating BSM with the travel data in the manifest for the second mode of travel; wherein c) may further include, based on matching the flight number and the airline in the terminating BSM with the travel data in the manifest for the second mode of travel, extracting, by at least one of the at least one processor, the flight number and the airline from the terminating BSM, and wherein d) may further include including the flight number and the airline in the luggage item manifest record.

The travel data may include the name of the passenger, and the method may further include: before b), sorting, by at least one of the at least one processor, a plurality of BSMs based on a baggage source indicator that indicates the BSM is the terminating BSM; wherein c) may further include, based on matching the name of the passenger in the terminating BSM with the travel data in the manifest for the second mode of travel, extracting, by at least one of the at least one processor, the name of the passenger from the terminating BSM; and wherein d) may further include including the name of the passenger in the luggage item manifest record.

The travel data may include the PNR number, and the method may further include: before b), sorting, by at least one of the at least one processor, a plurality of BSMs based on a baggage source indicator that indicates the BSM is the terminating BSM, wherein c) may further include, based on matching the PNR number in the terminating BSM with the travel data in the manifest for the second mode of travel, extracting, by at least one of the at least one processor, the PNR number from the terminating BSM, and wherein d) may further include including the PNR number in the luggage item manifest record.

The second mode of travel may include one of: a cruise ship, a train, a bus, a ferry, an air carrier, or a lodging entity.

The method may further include: after d), receiving, by at least one of the at least one processor, a trigger to activate an electronic luggage item brain associated with the luggage item manifest record, wherein the trigger is representative of a scan of the originating hardcopy bag tag having an IATA license plate barcode or a scan of a printed instrument with a portion of printed text of the originating hardcopy bag tag.

The method may further include electronically linking the electronic luggage item brain to a passenger manifest associated with the manifest for the second mode of travel.

The travel data may include the PNR number, the method may further include: e) extracting, by at least one of the at least one processor, the (PNR) number from the terminating BSM, and d) may further include: including, by at least one of the at least one processor, the PNR number in the luggage item manifest record.

The method may further include: f) acquiring, by an electronic acquiring device from among the predetermined electronic acquiring devices, the OH-BTI to create a digital bag tag identifier (BTI) data record linked to the first mode of travel carrier; g) extracting, by at least one of the at least one processor, the IATA license plate number from the digital BTI data record; h) accessing, by at least one of the at least one processor, a passenger name record (PNR) from a computer system of the first mode of travel carrier, based on the PNR number; i) autonomously updating, by at least one of the at least one processor, the luggage item manifest record with data for check-in of a return leg of travel of the passenger with a designated return travel carrier; and j) repeating a)-i) for a plurality of passengers beginning a stay associated with a lodging entity to autonomously form a luggage manifest file, wherein the luggage manifest file comprises a conduit for check-in of the plurality of luggage items with the designated return travel carrier.

The acquiring, by the electronic acquiring device from among the predetermined electronic acquiring devices, may include one of: scanning, by a barcode scanner, the OH-BTI on the originating hardcopy bag tag from the first mode of travel carrier; scanning, by the barcode scanner, the OH-BTI on a printed marker from the first mode of travel carrier that is attached to the luggage item; or reading, by a radio frequency identifier (RFID) reader, RFID information associated with the OH-BTI.

The method may further include: performing, by at least one of the at least one processor, a remote check-in process for the luggage item for the return leg of travel; during the remote check-in process, obtaining, by at least one of the at least one processor, airline bag tag information for the return leg of travel for checked in luggage items for the passenger; and printing, by a printer, a new bag tag for the return leg of travel that is compatible with an International Air Transport Association (IATA) license plate for each checked in luggage item of the passenger.

The method may further include: replacing the originating hardcopy bag tag from the first mode of travel carrier with the new bag tag for the return leg of travel; and updating, by at least one of the at least one processor, an electronic luggage item brain of the luggage item manifest record with the IATA license plate number for the return leg of travel.

The method may further include, prior to a): e) obtaining, by at least one of the at least one processor, a plurality of BSMs associated with an arrival of luggage items; and f) matching, by at least one of the at least one processor, the name of the passenger in the terminating BSM with a name in a flight manifest.

The method may further include: based on matching the name of the passenger in the terminating BSM with the name in the flight manifest: triggering, by at least one of the at least one processor, a security screening integration assistant (SSIA) process comprising assembling security screening image and related data related to the IATA license plate number captured during the first mode of travel security screen; communicating, by at least one of the at least one processor, the security screening image and related data to an integrated security screening station, while preserving confidentiality of personal identifiable information of the passenger linked to the security screening image and related data; and receiving, by at least one processor of the at least one processor, a response of a security analysis from the integrated security screening station.

The method may further include: causing, by at least one of the at least one processor, a printer device to print a marker configured to bypass security screening of at least one of the airport or the second mode of travel, wherein the marker comprises the results of the security analysis.

The security screening images and related data may include a three-dimensional dimensional representations of an object within the luggage item.

The security screening images and related data may include tomogram data of the luggage item including contents of the luggage item.

The method may further include: based on matching any of the travel data in the terminating BSM with the travel data in the manifest for a second mode of travel: triggering, by at least one of the at least one processor, a security screening integration assistant (SSIA) process comprising assembling security screening image and related data related to the IATA license plate number captured during the first mode of travel security screen, in response to the triggering; communicating, by at least one of the at least one processor, the security screening image and related data to an integrated security screening station while preserving confidentiality of personal identifiable information of the passenger linked to the security screening image and related data; and receiving, by at least one of the at least one processor, a response of a security analysis from the integrated security screening station.

The security analysis may include screening associated with the second mode of travel for a possible prohibited object, wherein the possible prohibited object comprises one or more of weapons, bottles alcohol, irons, and electrical power strips.

BRIEF DESCRIPTION OF THE DRAWINGS

For a fuller understanding of the disclosure, reference should be made to the following detailed description, taken in connection with the accompanying drawings, in which:

FIG. 4B illustrates a block diagram of programming modules for checking in a luggage item or a luggage item and passenger using digitized originating passenger information associated with a first-mode travel carrier on an originating hardcopy printed bag tag and generating a manifest for embarking on a leg of travel in accordance with an embodiment;

FIG. 4C illustrates a block diagram of programming modules for checking in baggage of a passenger, generating a manifest for embarking on a leg of travel and generating an expanded B-Type message in accordance with an embodiment;

FIG. 5 illustrates a flowchart of a method for checking in a luggage item, a passenger, or a passenger and a luggage item in accordance with an embodiment;

FIG. 7 illustrates a computing system in accordance with an embodiment;

FIG. 11 illustrates a flowchart of a method for creating the digital personal information (DPI) data record in accordance with an embodiment;

FIG. 14B illustrates a simulated BSM in accordance with an embodiment;

FIG. 15 is a diagrammatic view of a process for generation of baggage authorization indicia for bypassing additional baggage screening or indication of screening completion in accordance with an embodiment;

FIGS. 18A-18B illustrate a flowchart of a method for a second mode of travel screening in accordance with an embodiment;

FIG. 20 illustrates a block diagram of programming modules for analyzing security screening images in accordance with an embodiment;

FIG. 32 illustrates an example confirmed itinerary for an air flight in accordance with an embodiment;

DETAILED DESCRIPTION

Figure 1A:
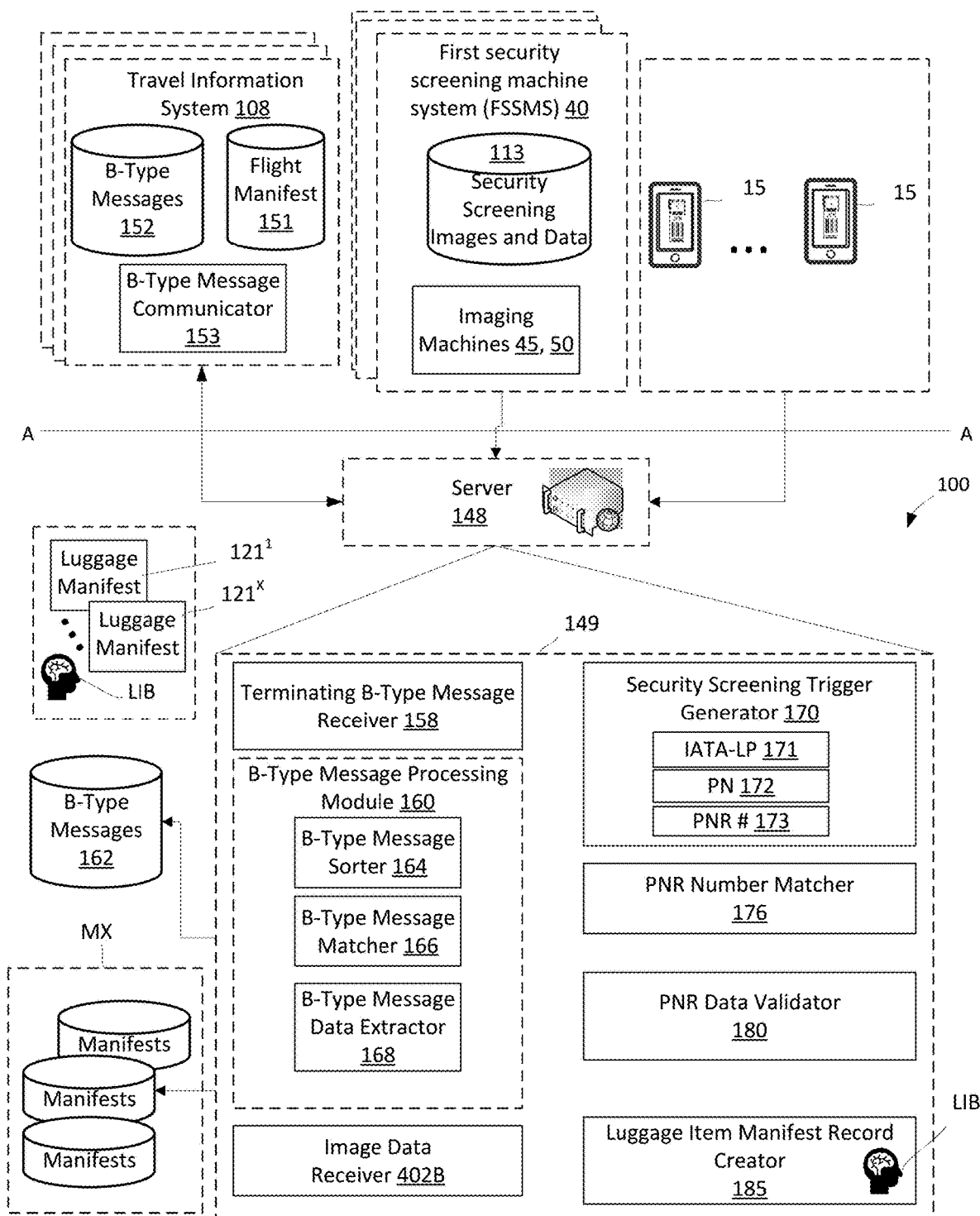
FIG. 1A illustrates a block diagram of a system for creating at least one luggage manifest triggered by a terminating B-Type message in accordance with an embodiment.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Baggage Handling and Delivery

Providing a seamless and near error-free experience for the handling and transfer of luggage items while the passenger travels along a journey, allows the passenger to have an enjoyable and pleasant travel experience. While the passenger knows where they are going, the luggage item does not. The luggage item is physically handled and handed off from a passenger to an airline agent with a 10-digit license plate attached. Moreover, the originating 10-digit IATA license plate may be expired or deleted in the airport infrastructure before a passenger and their luggage need to be checked in for a return flight.

Beyond the Airport

The airline infrastructure may generate a B-Type message that is a terminating B-Type message or a terminating Baggage Source Message (BSM) that may designate the terminating airport and city where the travel of the luggage item's handling and travel will terminate, as described in A BSM "Recommended Practice 1745 Baggage Information Messages" by IATA, in the Passenger Services Resolution Manual, June 2010, 30th Edition, pgs. 1110-1205, incorporated herein by reference in full, or another IATA compatible message that designates a terminating airport and city from which a luggage item's handling and travel will terminate. The IATA B-Type messages may include the 10-digit IATA license plate digits and other information linking the luggage item to the passenger.

A Departure Control System (DCS) controls various airlines operations including airport checking in baggage (i.e., luggage items), generating a passenger bag tag identifier (BTID), and data formats for printing of bag tags. The bag tags are formatted based on rules published by the International Air Transport Association (IATA) and include a 10-digit license plate, for example. Typically, one or more IATA Type-B messages are created that include the 10-digit license plate and flight information.

What has been considered garbage (i.e., discarded airline bag tag) is actually a missing link to cost-and-time-efficient handling of baggage by high-volume lodging entities, such as resorts and cruise lines, by way of a non-limiting example.

As used herein, "positive passenger baggage match" refers to an international regulation used to determine whether a passenger has boarded an airplane of a flight on which their checked-in baggage is loaded. If a passenger is determined not to have boarded a flight, their baggage is removed from the airplane. In the United States, 49 United States Code (U.S.C.) § 44901 includes similar requirements. As can be seen, the "garbage" at the end of the travel journey when the passenger has arrived at their destination location, holds valuable security information for lodging entities, such as resorts and cruise ships, as well as other modes or vehicles of travel to follow an airline flight.

Typically, the passenger is encouraged to remove the printed bag tag, after picking up the baggage from the carousel at a destination location. However, the originally printed bag tags have useful information and instead of discarding the original printed bag tag, it can be used 1) as a substitute for printing and/or attaching temporary valet tags; and 2) for autonomous data entry and retrieval to relieve the passenger or other employee from acquiring a passenger's personal information and return flight information.

A passenger's baggage may be tagged with an adhesive marker or bingo marker from an airline carrier which can also include an IATA license plate bar code. This marker may be placed anywhere on the baggage and can be used as a substitute for printing and/or attaching temporary valet tags or a missing IATA bag tag. For example, an airline IATA bag tag may become damaged or removed as a result of transport though the airline baggage handling system. Thus, the airline baggage marker can be used in the processes described herein.

In some examples, the airline IATA bag tag or other special use bag tags may include a printed IATA license plate and/or a radio frequency identifier (RFID) that can be read by an RFID-reader. However, RFID technology may be used about 10% of the time and is not widely available today. The system and method described herein may use the RFID that is part of the bag tag, for example, and especially if the originally printed bag tag is damaged or otherwise not capable of being scanned by a barcode scanner, by way of a non-limiting example. The RFID is used because sometimes scanning the 10-digit license plate can be a challenge for the scanners throughout the airline baggage handling system. This is because the printed text may become damaged, or the attached bag tag may be in a position that prevents the barcode from being captured. The system herein may use an RFID reader to acquire the 10-digit license plate in parallel with a barcode scanner or if needed.

In addition to using the non-discarded original IATA bag tag as a substitute for a valet tag, the IATA bag tag may be used to automate processes so that the processes are less prone to data entry errors, less burdensome on the passenger, save time and are cost efficient.

Additionally, the once considered garbage may be converted to a non-airline infrastructure smart bag tag that holds passenger information for transfer of their luggage to their room or cabin of their lodging entity and return flight information, including a mechanism for remote-check-in of the luggage item without the need for the passenger to be present at the printing of the return flight bag tag. The smart bag tag links the IATA license plate to stored data for the return flight and a conduit for checking in the luggage item.

The system described herein employs parallel methodologies to acquire luggage identifiable information to accommodate scenarios of damaged or missing IATA bag tags so that the 10-digit license plate can be acquired without a passenger input or input by other employees. For example, all of the passenger information and especially return flight information may be obtained by a process that scans or images the non-discarded original airline IATA bag tag (sometimes herein referred to as an "originating hardcopy bag tag") and autonomously retrieves a passenger record and return flight information for remote check-in of, for example, a luggage item and/or a passenger to return home via a return flight. However, personal identifiable information (PII) may remain confidential and secure. The non-discarded originating printed IATA bag tag may be used as a machine-readable instrument for locating and tracking a luggage item by a smart baggage travel system independent of an airline infrastructure for a portion of a return path home for multi-modes of travel prior to a return flight.

The scanning of non-discarded bag tags may include scanning dockside of a lodging entity such as a cruise line, scanning at a destination airport or intermediate travel carrier upon arrival, scanning at any lodging entity, such as a hotel resort, and/or scanning at a location anywhere between a destination airport or intermediate travel carrier and the lodging entity.

In one or more embodiments, the scanning of all non-discarded bag tags may include scanning the non-discarded bag tags at any mode of travel station prior to the luggage item being loaded on a transport vehicle (i.e., van, train, bus, plane, or ferry).

The imaging of non-discarded bag tags may include imaging after the originating hardcopy bag tag is printed, imaging dockside of a lodging entity such as a cruise line, imaging at a destination airport or intermediate travel carrier upon arrival, imaging at any lodging entity, such as a hotel resort, and/or imaging at a location anywhere between a destination airport or intermediate travel carrier and the lodging entity. Imaging may include imaging printed instruments having at least a portion of information printed on the originating hardcopy bag tag. The information may include BSM data or B-Type message data, where the B-Type message contains a PNR number.

In one or more embodiments, an image may be acquired of a printed originating hardcopy bag tag with printed originating passenger information associated with a first-mode travel carrier on the originating hardcopy bag tag. The image may be acquired any time after the originating hardcopy bag tag has been printed and an image may be acquired or captured by an imaging device such as a smart communication device. The originating hardcopy bag tag may be printed using IATA guidelines for the barcode and 10-digit license plate, and other flight information. However, airlines may add other passenger information/airline information on the bag tag template at the airline's discretion.

The original printed/paper bag tag by a first-mode of travel carrier (for example, an airline) has valuable information that can be used to automate processes for checking in a passenger and/or baggage for a return leg of travel with the first-mode of travel carrier and/or develop passenger records for a manifest used by a lodging entity. Instead of removing the original printed bag tag after arrival at a destination point associated with a lodging entity, the code embedded in the license plate on the original printed bag tag can be electronically acquired, digitized, and used to match personal information, such as a passenger's name associated with a passenger from the first-mode of travel carrier with the passenger's name used by or registered with the lodging entity or other next vehicle of travel.

Using the passenger name record (PNR) number, the passenger's name and/or the IATA 10-digit license plate to build a luggage manifest or a passenger manifest preserves the PII in secure locations without the need to transfer or access such information between entities, other than what is visible to the naked eye. This can preserve the security of the PII.

In one or more embodiments, after the original bag tag is printed, text of the passenger information associated with a first-mode travel carrier printed on the bag tag may be acquired by an imaging device to obtain the passenger's name without additional personal information or PII associated with a passenger from the first-mode of travel carrier directly from the printed bag tag. The printed text can be optically recognized and converted to machine-encoded text that is searchable to identify an airline code or airline name, a passenger name record (PNR) number, the passenger's name and/or the IATA 10-digit license plate.

Moreover, the license plate on the original printed bag tag (sometimes herein referred to as an "originating hardcopy bag tag") can be used to obtain return flight information for the passenger autonomously without the need for the passenger or employees of a lodging entity to manually enter return flight itinerary information for a luggage item or both the luggage item and the passenger. For example, this may be accomplished by using the original printed bag tag from an airline carrier without the passenger being present.

Moreover, certain passenger/airline information on the originating hardcopy bag tag can be used to obtain return flight information for the luggage item or both the passenger and luggage item autonomously without the need for the passenger or employees of a lodging entity to manually enter return flight itinerary information.

Security Screening Integration

Other modes of travel (i.e., vehicles of travel) can use less stringent, different, or the same quality screening technology to screen luggage items boarding a train, bus carrier, or cruise ship or entering a lodging entity than screening required by Transportation Security Administration (TSA) to travel on an air carrier. The high-tech security screening images regulated by TSA for travel by an air carrier can be used to reduce the number of screenings of luggage items by the other modes of travel when there is a direct connection from a passenger departing an air carrier (a first mode of travel) and starting their next leg of travel with a second mode of travel (i.e., second vehicle of travel) or screening such as by bus, train, cruise ship, another air carrier, lodging entity/resort or a government agency. These security screening images required by the TSA may be shared for analysis according to regulations associated with any of the other modes of travel or screening without diminishing the effectiveness of the screening process. To maintain the integrity of the travel mode analysis by way of imagery, the correspondingly tagged luggage items remain in trusted custody until custody is transferred to the next vehicle of travel (i.e., bus, train, cruise ship, a second air carrier, or lodging entity/resort) and/or next government agency for border entry. The problems of the past can be solved by the current methods and systems by using the IATA license plate and/or a linked PNR number and/or a passenger's name to obtain security images and data of the contents of the luggage item without the need for transferring or accessing other PII associated with a passenger to expedite the processing of luggage items through Customs or a border crossing security screening check point. The same IATA license plate and/or the linked PNR number and/or the passenger's name can be used to build manifests for other vehicles of travel and luggage manifests for the handling and delivery of luggage items independently of its owner.

As used herein the expressions "modes of travel" and "modes of transportation" may be used interchangeably. As used herein the expressions "modes of travel" and "vehicles of travel" may be used interchangeably. However, "modes of travel" and "vehicles of travel" may also include lodging and resorts.

While the description herein describes the governmental regulating agencies in the United States, other countries, or groups of countries joined by treaties, may also provide regulations to be followed for transportation security that requires security screening of luggage items boarding a vehicle of travel, other destinations, or countries.

The processes and systems described herein for one way of travel also apply to the reverse direction of travel to bring a passenger home.

Figure 1B:
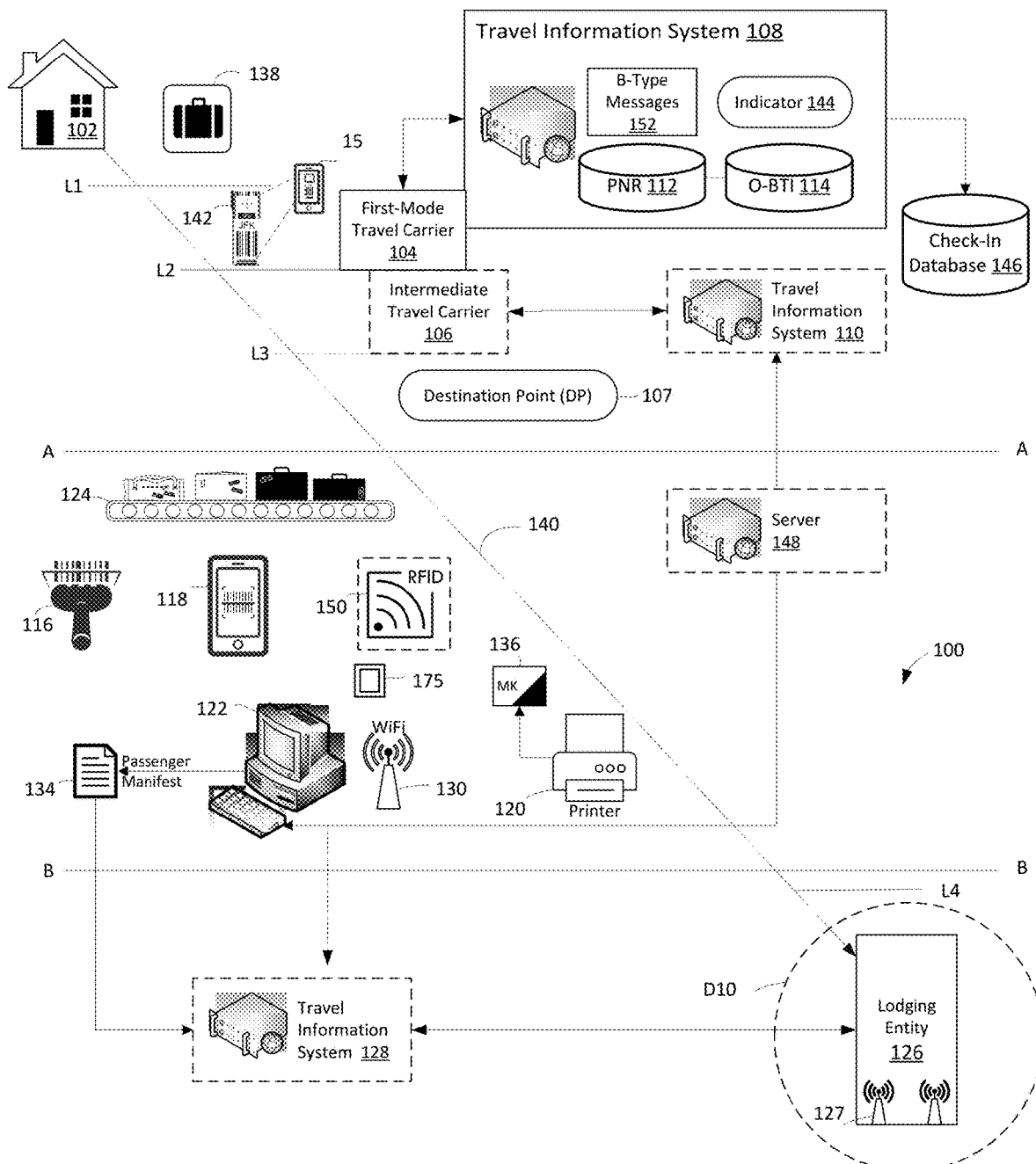
FIG. 1B illustrates a block diagram of a system for checking in a passenger for return legs of travel in accordance with an embodiment.

FIG. 1A illustrates a block diagram of a system 100 for creating at least one luggage manifest 121$^1$ . . . 121$^x$ may be triggered by a terminating B-Type message in accordance with one or more embodiments. The system 100 may facilitate the baggage handling of a luggage item with or without the presence of a passenger from a travel carrier facility, such as an airport, to a lodging entity 126 (FIG. 1B)

or a next vehicle of travel. The terminating B-Type message is a B-Type message the includes an IATA license plate and/or passenger name record (PNR) number.

In one or more embodiments, the system 100 may include a server 148. The system 100 may use parallel streams of data for creating luggage manifests $121^1 \ldots 121^x$ for a plurality of lodging entities local to a destination point (DP) 107, as shown and describe below in relation to FIG. 1B, delivering them to or from a travel carrier such as a cruise ship, hotel, resort, a train carrier, a bus carrier or rental car company. In one or more embodiments, the luggage items may be delivered to another designated address such as a home address, office address or a designated address.

Each luggage item record file in a luggage manifest is an electronic luggage item brain (LIB) 2450 that is accessible by scanning an originating hardcopy bag tag, especially after leaving the airline or airport infrastructure or accessing the luggage item manifest using a computing device. The luggage manifest may be stored on server 148 or memory devices coupled to the server or a computing device. The luggage item manifest record in a luggage item manifest $121^1 \ldots 121^x$ may include luggage item brain programming modules 2400 (FIG. 24), which when executed generates an electronic luggage item brain to identify locations the luggage item needs to be delivered to or cleared from without the need for its owner to be present. The LIB programming modules 2400 will be described in more detail in relation to FIG. 24. The LIB programming modules 2400 may be an example of making the paper IATA bag a smart bag tag. However, if the originating IATA bag tag is missing or damaged the LIB programming modules 2400 or LIB 2450 may make the bingo marker or other marker smart by linking the barcode or quick-response (QR) code to stored luggage item data. Still further, any marker generated or affixed to the luggage item with a unique identifier tied to the originating hardcopy bag tag may be made smart by linking the unique identifier to the stored luggage data, outside of the airport infrastructure.

In one or more embodiments, the 10-digit IATA license plate may become as a primary key or linking index key to determine routing data and delivery data for the luggage item without the need for the passenger to be present and checking in the luggage item for its return flight home or another leg of travel with the passenger. Each luggage item record may marry the travel itinerary of the passenger to the luggage item so that the luggage item may periodically travel seamlessly independently and parallel along a travel journey of its owner.

The server 148 may include programming modules 149. The one or more programming modules 149 may include software, hardware, firmware, or a combination of software, hardware, and firmware.

In one or more embodiments, the server 148 may communicate with a mobile communication device(s) 15 of a passenger and travel information systems 108. The travel information system 108 will be described in more detail in relation to FIG. 1B. In one or more embodiments, the server 148 may communicate with the mobile communication device(s) 15 to receive an originating hardcopy bag tag or a printed instrument having at least a portion of the information printed on the originating hardcopy bag tag, as will be described in more detail in relation to FIG. 1B.

In one or more embodiments, an image may be taken of data printed on e-paper using e-ink displayed on display devices of RFID devices or RFID bag tags. The format of the layout of the bag tag or BSM data arranged on the RFID display may vary from one air carrier to another. In this arrangement, the image data may be converted to machine-encoded text.

BSM Generation

The DCS may initiate the process to create the data used for the printing of the originating hardcopy bag tag at the time the passenger checks in for a flight. This may occur in a check-in window. In some instances, the check-in window is 24 hours prior to the flight time. However, not all passengers check in early. Consequently, the arrival of the BSM at system 100 may vary.

For airlines travel carriers, the IATA bag tag includes a bag tag with a standardized sequence of numbers or barcode to both identify the luggage item and match the luggage item to a passenger. If a passenger does not board a flight, their luggage item although checked in may not be loaded on the aircraft. In some instances, the luggage item may be missing. In such an instance, the baggage handling system produces a corresponding B-Type message.

As should be understood, the BSM data may change as the results of ordinary operation of a travel carrier, changes by a passenger, and/or inclement weather, for example, after the BSM data is created. Thus, the original BSM created at the time of check-in may not be the same as the terminating BSM sent to the system 100. The BSM data changes as the luggage item moves through the airport infrastructure.

Airport Terminating B-Type Message Data

A travel information system 108 may generate B-Type messages 152 when a luggage item (i.e., passenger luggage 138 FIG. 1B) is checked in for a passenger. The travel information system 108 may include a flight manifest 151 stored in a database associated with a computer system of an airline carrier, for example. The flight manifest will be described in more detail in relation to FIG. 23. The passenger may have more than one luggage item to be checked in. The process is essentially duplicated for all luggage items being checked for the passenger. The data from the B-Type message from the airport may be continuously used outside of the airport infrastructure and to build a manifest for one or more of second modes of travel, security integration assistance and/or baggage handling and delivery. The continuous use may be in the form of a unified B-Type message format through universal B-Type messaging communicated using the Internet Protocols over the Internet or web-based networks.

By way of a non-limiting example, a B-Type message may be a Baggage Source Message (BSM) as will be described in more detail in relation to FIG. 14A. The originating hardcopy bag tag, for example, as printed includes various information contained in the BSM, as will be described in relation to FIG. 2A. A travel information system 108 or other computer system associated with an airline carrier may communicate a terminating BSM to or through a destination/terminating airport. The baggage handling systems may generate other B-Type messages according to standard operating procedures for airport handling of baggage. While the disclosure herein describes terminating BSMs, any other terminating B-Type message now or in the future with terminating codes, IATA license plate, passenger's name, and PNR number may be used.

The travel information system 108 may include a B-Type message communicator 153 configured to communicate the terminating BSM to server 148. In one or more embodiments, the B-Type message 152 and the B-Type message communicator 153 may be associated with a computer system or server system that is associated with an airline travel carrier. In one or more embodiments, the B-Type messages may include other B-Type messages including a BSM created for a luggage item checked-in for an imminent return flight. The B-Type messages may include other messages that indicate the status of a luggage item. The B-Type messages may be retrieved by server 148 by upload or download operations.

The server 148 may include programming instructions, which when executed cause the reception of the B-Type messages, such as terminating BSMs, by a terminating B-Type message receiver 158 of the programming modules 149. The terminating B-Type message receiver 158 may be a terminating BSM receiver. The terminating BSM may be for the air carrier and/or baggage handling system of an airport where the flight carrying the checked-in luggage item terminates at a final airport destination, as an example. At the final airport destination, the luggage item will leave the airport infrastructure. The terminating airport coding in a terminating BSM is described in relation to FIG. 14A.

Printed BSM Image Data

The programming modules 149 may include programming instructions, which when executed cause an image data receiver 402B, as described in more detail in relation to FIG. 4B, to receive image data. The image data is from the mobile communication device 15 of the passenger. In lieu of the mobile communication device, another computing device associated with the passenger may be used. For example, the passenger may email the image data to themselves. Log into a public computing device and send the image data to the server 148, for example.

Prior to traveling, the passenger may sign-up for a luggage handling service using a personal computing device or a mobile communication device 15. The system 100 may provide a registration graphical user interface to allow the passenger to register for the service. The registration may include providing biometric information to validate or verify the identity of the user/passenger. The biometric information may be used to unlock passenger identifiable information, such as driver's license data and passport information, stored by system 100.

The receiver 402B may include a network interface and can extract passenger information so that the luggage item image can be correlated with the passenger record and/or luggage item record linked to the appropriate passenger.

The text on the originating hardcopy bag tag and/or printed instrument includes at least a portion of the BSM data. The passenger that has checked in and transferred custody to the airline or airport infrastructure may take an image of the printed BSM data and send the printed BSM data as evidence that the passenger and the luggage item are checked in and boarding the flight for the first leg or first mode of travel. In one or more embodiments, the passenger may print an originating hardcopy bag tag at a kiosk. The passenger may take an image of the printed originating bag tag from the kiosk and/or the marker or receipt included at the end of the originating hardcopy bag tag or included in the boarding pass jacket or folder. In one or more embodiments, the marker or receipt may be texted or emailed to the passenger. The passenger may provide such information (i.e., text, email, or image data) to system 100 for capturing or recognizing the printed BSM data such as the IATA license plate number. As used herein, the terms "IATA license plate number" and "IATA license plate" may be used interchangeably.

In one or more embodiments, the image may initiate creation of a luggage manifest record in a luggage manifest for a particular passenger.

For example, the passenger may send a picture of the IATA bag tag that may include a 10-digit license plate, which is also in the BSM. This provides a link between the passenger and luggage item via the 10-digit license plate. The BSM also includes a PNR number which provides access to a passenger's return flight information. The PNR number may be a Super PNR number and provide information regarding a lodging entity, rental car, and other travel information.

The BSM may be used to obtain a PNR number. The PNR number may then be used to obtain and verify passenger itinerary information for routing the luggage item to the correct lodging entity from a destination location. Moreover, the merged data from the passenger and the BSM from the airline travel carrier may be used to validate the luggage item and the delivery instructions without the presence of the passenger by using an electronic BSM and the originating hardcopy bag tag.

As will be described in more detail in relation to FIGS. 2A and 3B-3C, the originating hardcopy bag tag may also include a PNR number and the passenger's name. The printed text in the image may be converted to machine-encoded text that is searchable. The information in the image from the passenger and the information from the BSM, for example, may be correlated and validated and create a key fob from the originating hardcopy bag tag that may follow the luggage item around outside of the airport infrastructure until the luggage item is checked in for a return flight. When the luggage item is checked in for the return flight, a new IATA license plate is assigned to the luggage item. The LIB 2450 is then updated to link the IATA license plate to the delivery locations and pickup location and/or government security locations to the new printed IATA license plate.

Each manifest MX may have some pre-populated information associated with a passenger (arriving client) expected to arrive on a particular day to continue a journey with a lodging entity. Each manifest MX may be associated with a particular lodging entity, resort, or vehicle of travel. The manifest MX may include entries of arriving clients for delivering luggage to home addresses or other designated addresses.

Security Screening Assistant Trigger—Next Vehicle of Travel

The terminating B-Type message with a passenger name match may be used to trigger a security screening integration assistant system 190 (FIG. 16) to expedite or bypass security screening for the next vehicle of travel.

The inventor has determined that the IATA license plate captured for use as a linking key to airline information for a passenger's return home and to build a luggage item manifest record may also be used to access security images and data previously captured by a security screening device used to clear a luggage item for boarding an air carrier.

After check-in and custody transfer, the luggage item, before being loaded into the cargo hold of an airplane, is sent through an automated conveyor system of a first security screening machine system (FSSMS) 40 of the baggage handling area. The initial screening process may be performed by large X-ray machines, as will be described in more detail in FIG. 16. These machines are designed to detect a range of materials, including explosives and other contraband. Baggage is screened using dual-energy X-ray systems that allow security personnel to differentiate between organic and inorganic materials based on their atomic number. This helps in identifying potentially dangerous substances. If the X-ray scan shows something suspicious, the bag is diverted for further inspection. This usually involves a physical inspection by a trained security officer and may also involve the use of more advanced scanning technologies like CT (Computed Tomography) scanners (i.e., CT imaging machine 45, 50), which can provide a more detailed, 3D images of the bag's contents. In some cases, explosive trace detection (ETD) machines may also be used. These machines can detect traces of explosives on the outside of the bag or on the items inside the bag. In one or more embodiments, screening may swab the bag or item and then analyze the swab for any explosive residue.

The security images such as 3D images are stored in a non-transitory, tangible memory 113 for security screening images and data. The FSSMS 40 may be performed by or for the Transportation Security Administration (TSA) or another approved contractor. However, the items allow for checked in luggage items may be different for luggage items brought onboard a cruise ship, allowed in a resort, or in some countries.

The government agency that governs security screening of airlines is the Transportation Security Administration (TSA) of the U.S. Department of Homeland Security (DHS). On the other hand, the screening process for cruise ships may be regulated by the Coast Guard or the Customs and Border Protection (CBP) of DHS. DHS may allow a cruise ship company to have additional rules provided the company meets minimum governmental regulations. The TSA may also regulate the screening of baggage on trains of the railway systems and bus carriers.

Figure 16:
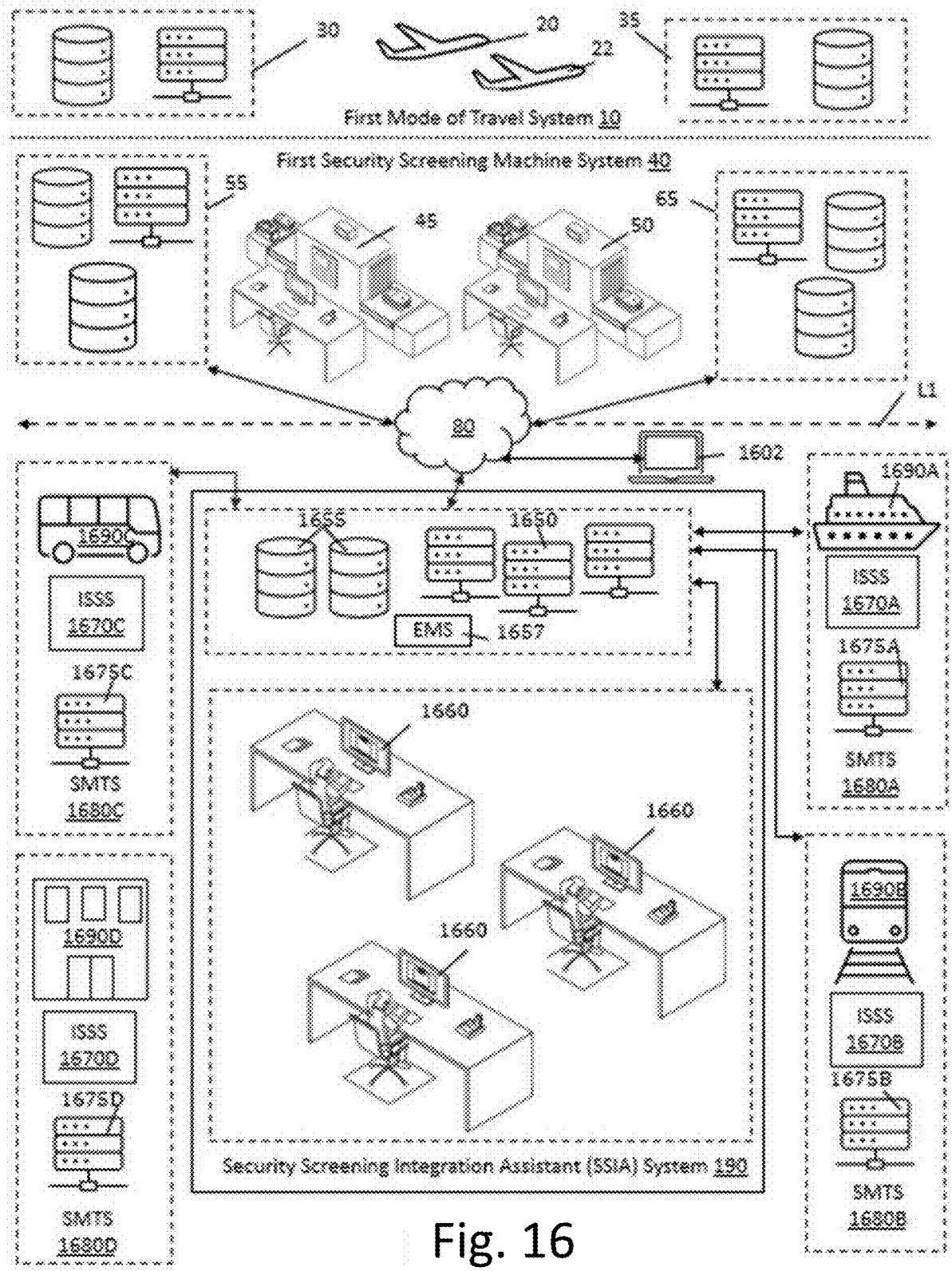
FIG. 16 illustrates a security screening integration assistant (SSIA) system in accordance with an embodiment.

By way of a non-limiting example, the security screening integration assistant (SSIA) system 190 is described in relation to FIG. 16 and may be used to assist in the bypass of the security screening performed independently by the cruise ship, train station, bus station, resort, or lodging entity, where the secure custody of a luggage item from a cargo hold of an air carrier may be transferred to a trusted custody handler to maintain security integrity of the luggage item for its next mode of travel. This may reduce the processing by the security screening lines at the cruise ship, train station, bus station, resort, or lodging entity. More importantly, reducing the processing of previously screened luggage item that have remained in trusted custody can limit the need to alter the algorithms for security screening to speed up processing lines or reduce the effectiveness of the security screening because of long lines that cause passengers to miss their connective flight or other travel journey arrangements to get through Customs.

The security screening trigger generator 170 may identify those luggage items that need to go through security screening for the next vehicle of travel based on matches between a passenger in the manifest and a terminating BSM, for example. The security screening trigger generator 170 may generate a trigger to expedite the processing of image and data file from the FSSMS 40 of the originating air carrier, for example, before the luggage item is off-loaded from the air carrier cargo hold. This may save valuable machine resources by eliminating the need to unnecessarily reimage luggage items that have TSA quality images already with useful information for the next vehicle of travel.

The system 100 may be configured to build a luggage manifest $121^1 \ldots 121^x$ for each lodging entity based on information from a passenger correlated with a received terminating BSM associated with a travel information system 108. The luggage manifest $121^1 \ldots 121^x$ may identify handling and delivery instructions for luggage items arriving at a travel carrier, such as an airline travel carrier, or destination point is to be picked up and delivered to a lodging entity 126 (FIG. 1B), such as a cruise ship, hotel, or resort. The luggage manifest $121^1 \ldots 121^x$ may identify handling and delivery instructions for a round trip experience of a luggage item including any security clearance locations mandated by Government agencies (i.e., Customs and Border Protection or Coast Guard) or business entities. The luggage manifest record may indicate a baggage fee, or a baggage fee waiver associated with the air carrier for the designated return flight. The luggage item manifest may include the LIB 2450 of each luggage item for a particular vehicle of travel or a general manifest for home addresses or designated address deliveries.

Airport Terminating B-Type Message Processing

The system 100 may include non-transitory, tangible memory device 162 for storing the received B-Type messages (i.e., terminating BSM). The programming modules 149 may include a B-Type message receiver 158 and a B-Type message processing module 160. Each received B-Type message may be processed by a B-Type message processing module 160. The B-Type message processing module 160 may include programming instructions, which when executed cause a B-Type message sorter 164 to sort the B-Type messages to isolate the terminating BSM. The sorting may include sorting by one or more of terminating location or airport location code, day, time of arrival, or travel carrier. This may set a resource schedule for handling the luggage volume so that the luggage item's travel journey experience is on schedule and accurate according to the luggage item's electronic brain.

The B-Type message processing module 160 may include one or more message sorters 164. The message sorter 164 may sort the B-Type message to find those B-Type messages with matching IATA license plates set to terminate a terminating airport, on any given day or hour, to build luggage manifests of luggage items of passenger's terminating at the terminating airport and using the system 100 for luggage handling and delivery and/or security clearance handling.

In one or more embodiments, the luggage item that is terminating at an airport may be required to undergo a security screening such as for border control. In another example, the luggage item that is terminating at an airport may be required to undergo a security screening for one of a lodging entity or another vehicle of travel.

Figure 14A:
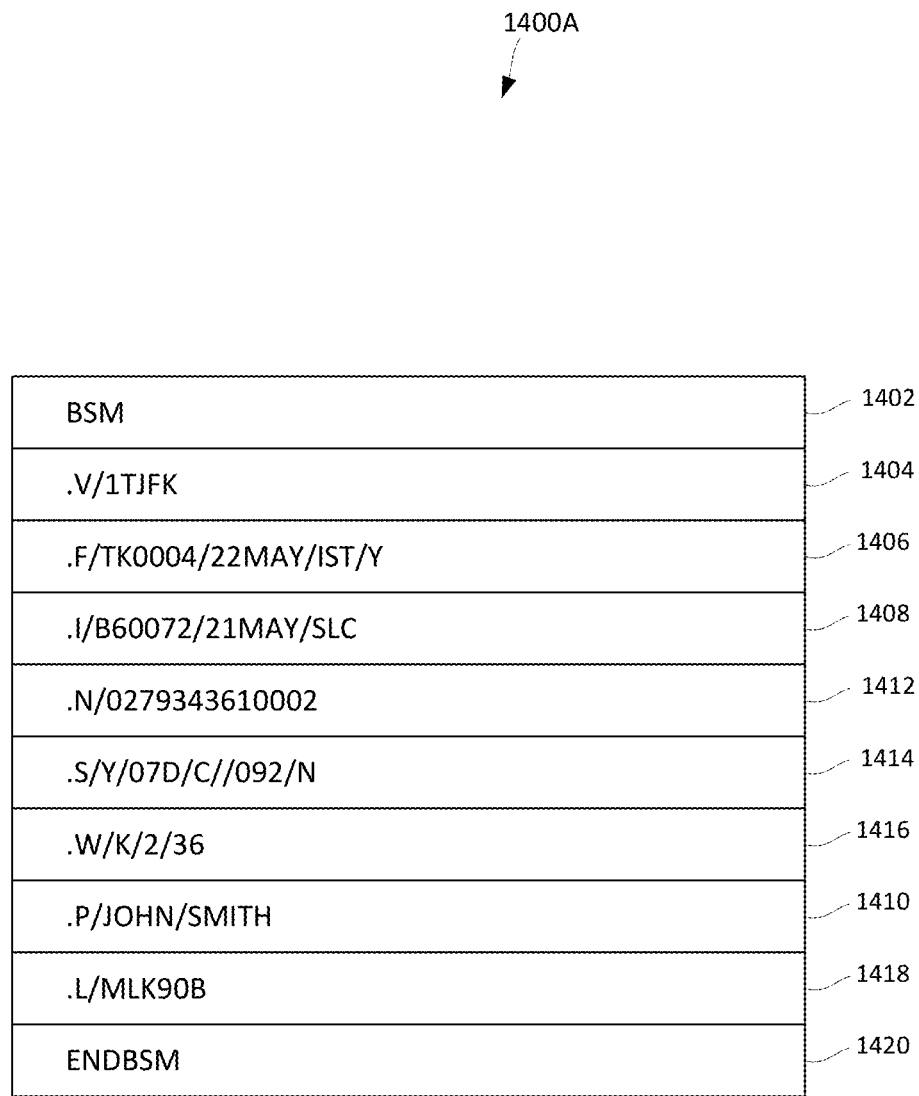
FIG. 14A illustrates a conventional baggage source message (BSM) for an airline carrier.

The processing of the terminating BSMs or B-Type messages is described in more detail in relation to FIG. 14A. B-Type messages, such as BSMs, may include a baggage source indicator that indicates a terminating BSM and non-terminating BSM. Non-terminating BSMs or B-Type messages may be one of local, transfer and remote, as described in relation to FIG. 14A.

The system 100 may filter B-Type messages related to passengers expected to arrive on a particular day, for example. However, if a passenger made reservation changes to arrive earlier than originally intended, the image of the originating hardcopy bag tag may alert the system 100 of such a change when processing terminating B-Type messages by the B-Type message processing module 160. The manifest MX may not have been updated with the new arrival information in time for processing. The system 100 may be configured to generate luggage item manifest records and update manifests even with stale or incomplete information in manifests MX from a lodging entity, going home, or other vehicle of travel.

By way on a non-limiting example, system 100 may include the programming modules 149 that may include programming instructions, which when executed may be configured to receive B-Type messages from each airport and start the sorting and matching from the received B-Type messages according to the schedule of the airport and operating times.

The B-Type message processing module 160 may include programming instructions, which when executed cause a B-Type message matcher 166 to match the passenger's name (PN) in a terminating BSM to the name of the arriving client in the manifest file. The passenger information in the B-Type message may be matched to pre-loaded information in a respective one manifest MX for a lodging entity, going home, or a vehicle of travel. For example, some luggage items may need to be delivered to a train station, bus station, or home.

The terminating BSM includes various travel data of a first mode of travel carrier of a checked-in luggage item on an air carrier. The manifest MX may have partial data. Therefore, in one or more embodiments, the matching by the B-Type message matcher 166 may include programming instructions, which when executed may cause matching a passenger's name of the passenger in the received BSM with the passenger's name in a manifest for a second mode of travel different from the first mode of travel. The second mode of travel may be local to the airport associated with the airport code. The manifest can be any manifest including a home delivery manifest, security manifest, a lodging entity manifest, or a different mode of transportation manifest.

In one or more embodiments, the matching by the B-Type message matcher 166 may include programming instructions, which when executed may cause matching, by the at least one processor, a passenger name record (PNR) number of the passenger in the received BSM with the PNR number in a manifest for a second mode of travel different from the first mode of travel. The second mode of travel may be local to the airport associated with the airport code.

In one or more embodiments, the matching by the B-Type message matcher 166 may include programming instructions, which when executed may cause matching, by the at least one processor, airline information and a flight number of the passenger in the received BSM with the airline information and the flight number in a manifest for a second mode of travel different from the first mode of travel. The second mode of travel may be local to the airport associated with the airport code.

The system 100 may build a luggage manifest $121^1$ ... $121^x$ to handle the luggage item of the arriving client (i.e., passenger) so that the luggage item can travel independently and/or parallel with the passenger. The system may also build a master manifest, as will be described in relation to FIG. 6, for the passenger, so that they are made aware of when their accommodation is ready or a reservation change.

The data in the luggage manifest $121^1$ ... $121^x$ may be based on converted text from the text captured by the passenger on the originating hardcopy bag tag or a printed instrument (i.e., marker or bingo marker) having at least a portion of the information on the originating hardcopy bag tag.

The B-Type message processing module 160 may include programming instructions, which when executed cause a B-Type message data extractor 168 to extract luggage identifiable information (LII) from the B-Type message and merge the data into the luggage manifest $121^1$ ... $121^x$. By way of a non-limiting example, the manifest MX may indicate the next mode of travel or next vehicle of travel. For example, the manifest MX may be for ABC cruise lines. The extracted data may include any missing luggage item data required by the luggage manifest. For example, extracted information may include the IATA license plate number, the passenger's name, the airline, the flight number, and/or a passenger name record number.

Therefore, once a match is detected, the IATA license plate and/or passenger's name may be extracted from the terminating B-Type message. Furthermore, a trigger may be sent, using wired or wireless communication protocols, to a security screening integration assistant (SSIA) system 190 (FIG. 16) via a security screening trigger generator 170, if a match is found. The trigger generator 170 may include programming instructions which when executed sends the IATA license plate (IATA-LP) 171 associated with the luggage item to be screened and/or the passenger's name (PN) 172 and/or PNR number 173, for example, to the SSIA system 190 (FIG. 16). This may be based on sorting of terminating B-Type messages.

In one or more embodiments, based on matching the passenger name or other travel data in the airline's B-Type message with the passenger name in the flight manifest, triggers, within at least one of the at least one processor, a security screening integration assistant (SSIA) process. This process may be performed within system 100 or by a remote system 190. The SSIA process may include accessing and assembling security screening image and related data captured during a first mode of travel security screen using the IATA license plate number and communicating the assembled security screening image and related data to an integrated security screening station.

In one or more embodiments, based on matching travel data in the airline's B-Type message with available passenger information in the manifest MX of a second mode of travel, triggers, within at least one of the at least one processor, a security screening integration assistant (SSIA) process. This process may be performed within system 100 or by a remote system 190. The SSIA process may include accessing and assembling security screening image and related data captured during a first mode of travel security screen using the IATA license plate number and communicating the assembled security screening image and related data to an integrated security screening station.

The analysis by ISSS 2670 (FIG. 26A) may use shared image files and security data from memory 113 of the first security screening machine system (FSSMS) 40. However, the system 100 may use the data from terminating BSM that includes the IATA license plate, PNR number and/or a passenger's name to access the security images and data files in memory 113, for example, without the need to access any additional PII. The system 100 may use the data in at least one image of the origination hardcopy bag tag or printed instrument having a portion of information from the BSM to acquire the PNR number and the passenger's name and/or the IATA license plate to access the shared security image files without the need to access any additional PII.

Figure 26A:
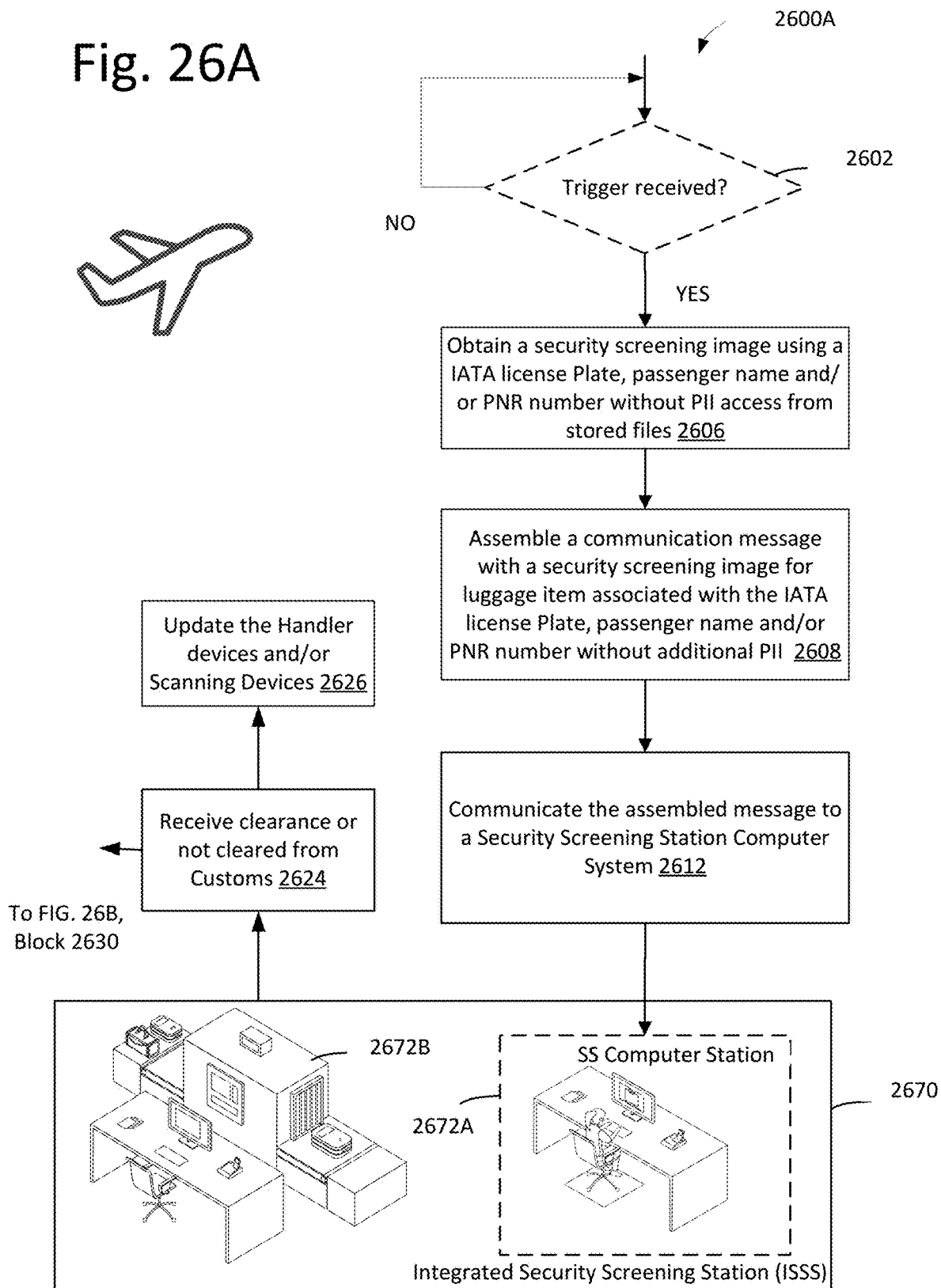
FIG. 26A illustrates a method for file handling for an integrated security screening process of luggage items that need to be processed through a security screening station in accordance with an embodiment.
Figure 26B:
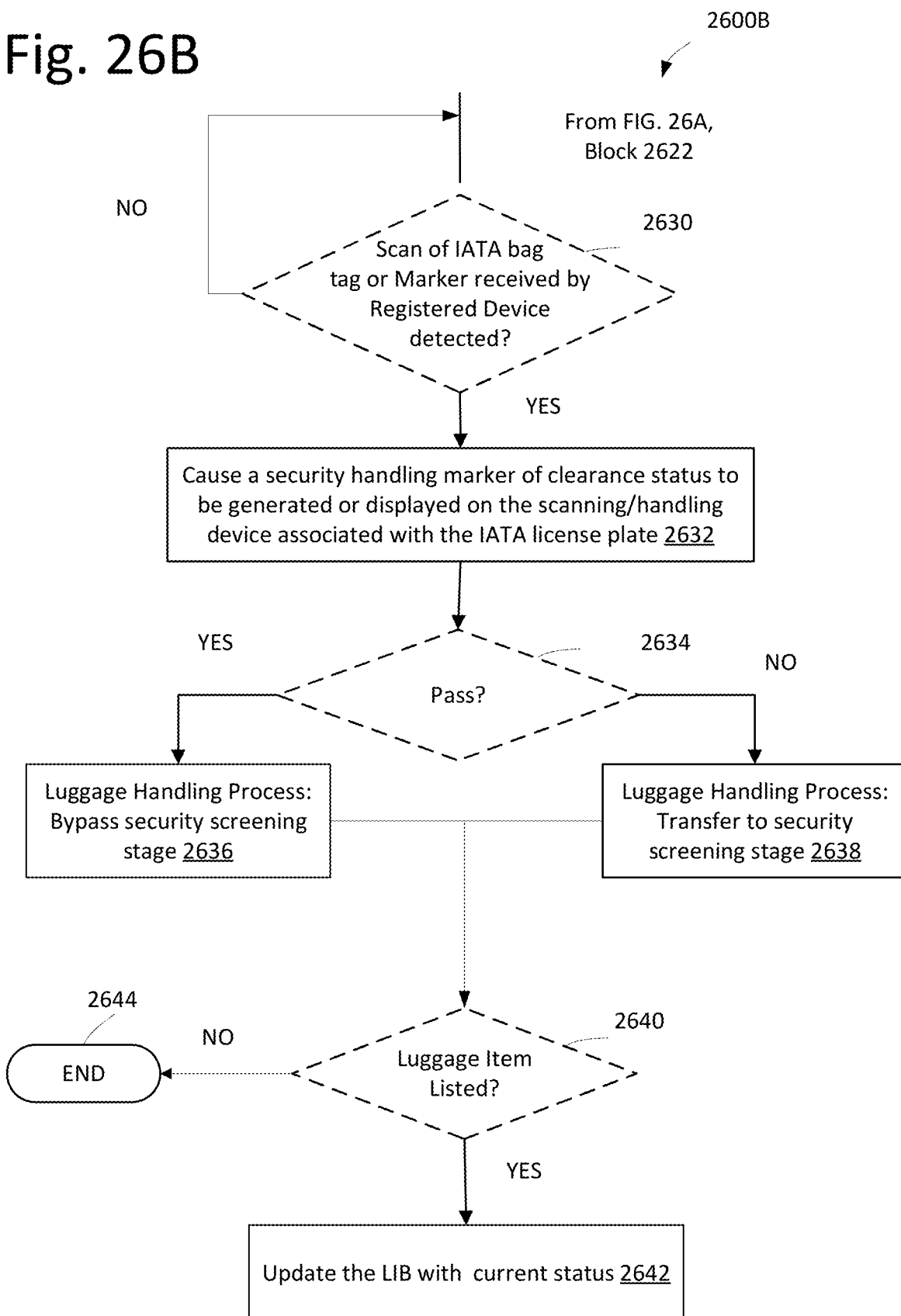
FIG. 26B illustrates a method for luggage item status reporting and handling for the integrated security screening process of luggage items, after being processed through a security screening station, in accordance with an embodiment.

The data for the marker may be updated with information associated with pass or fail indicators of the security screening analysis described in FIGS. 26A-26B. The marker may include the room number or cabin number, a floor or level number, etc., for delivery of the luggage item inside of the lodging entity. The marker is described in relation to FIG. 15. The marker may be generated by marker generator 412 in FIG. 4A, 4B, or 4C. As described herein, markers MK may be printed for luggage handling, sorting, and transport. For example, printing of a marker may be triggered based on a security clearance status, reservation data updates, and more.

The programming modules 149 may include programming instructions, which when executed cause a PNR number matcher 176 to match a PNR number and PNR data validator 180 to validate the accessed PNR data. Based on the PNR number in the B-Type message and the PNR number in the image data, the PNR numbers may be matched by the PNR number matcher 176. Once there is a match, the PNR number may be added to a luggage item record. However, the PNR data may be needed to determine travel information for the next leg of travel for the luggage item. For example, the data in the PNR 112 (FIG. 1B) may include data related to a lodging entity, a car rental, air travel carrier, etc. In one or more embodiments, the programming modules may obtain the PNR data from PNR 112 (FIG. 1B). The PNR data validator 180 may validate the PNR data from PNR 112 (FIG. 1B) for the next leg of travel and creating the digital luggage item record for a luggage item manifest.

In general, airlines update the PNR 112 every time there is a change. Accordingly, the PNR data may update while the passenger is on a cruise or engaging in a travel experience. The passenger may obtain such a change (i.e., updates) in travel. However, the luggage manifest may need to periodically validate any stored PNR data for a luggage item record, so the luggage item arrives on time and to the location needed with little interaction from the luggage item's owner. The term validate may include obtaining updates to the PNR data.

In one or more embodiments, the system 100 may include a manifest MX from a lodging entity with passenger information for an expected arrival of a passenger. In real time operation, because of the thousands of passengers traveling globally on any one day, itineraries change. As mentioned previously, the passenger knows where they are going but the luggage item does not. Changes or delays can cause misplaced, delayed arrival, or lost luggage items, which can diminish the overall experience of the travel experience of the luggage item. The travel experience of the luggage item can directly impact the travel experience of its owner.

The programming modules 149 may include programming instructions, which when executed cause a luggage item manifest record creator 185 to create a luggage item manifest record for entry in a corresponding luggage manifest $121^1 \ldots 121^x$. The digital luggage item record and/or simulated B-Type message may be entered into the luggage item record and loaded in a luggage item manifest $121^1 \ldots 121^x$ for a particular lodging entity or travel carrier for a next leg of travel. In one or more embodiments, the digital luggage item manifest record may be "PENDING" until the luggage item is offloaded from an airplane of an airline travel carrier and a barcode of the IATA bag tag on the originating hardcopy bag tag is scanned by an acquiring device of the system 100. This may register the arrival of the luggage item with system 100. The system 100 may be used outside of the airport computing infrastructure in one or more embodiments. In one or more embodiments, system 100 may overlap with the airport computing infrastructure but may expand access to of the luggage data to offsite computing systems for use by lodging entities and other modes of transportation using the IATA license plate numbers, for example.

In one or more embodiments, there may be a need to match passenger names from any number of manifests based on terminating B-Type message to build a luggage item manifest record, such as for home delivery, security screening, security screening with transfer mode of travel. A home delivery manifest may have a list of registered passengers that scheduled a delivery of their luggage item(s) to a home address or other designated address, for example.

Figure 1C:
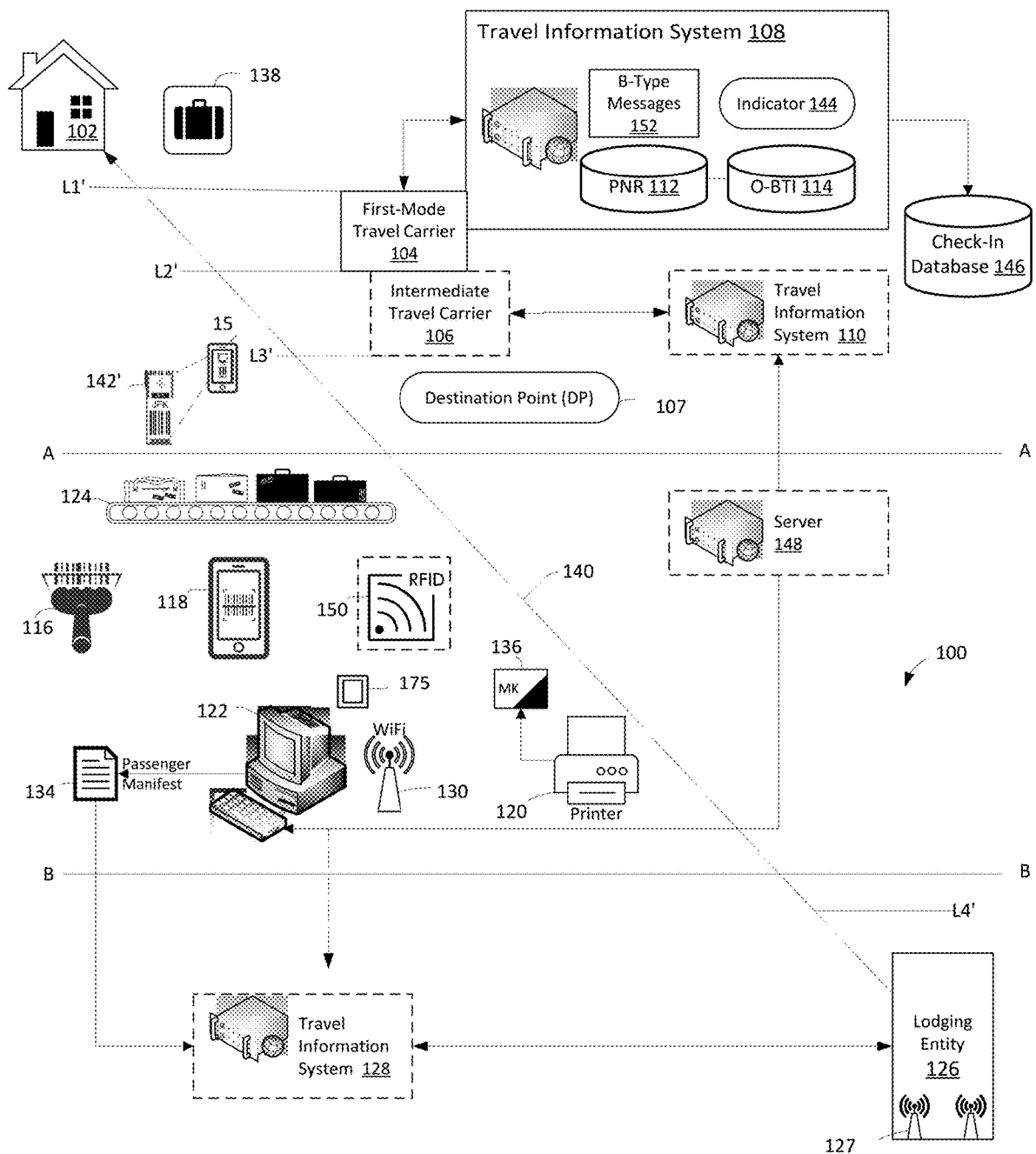
FIG. 1C illustrates a block diagram of the system for checking in baggage of a passenger for return legs of travel after disembarking from a lodging entity in accordance with an embodiment.
Figure 1D:
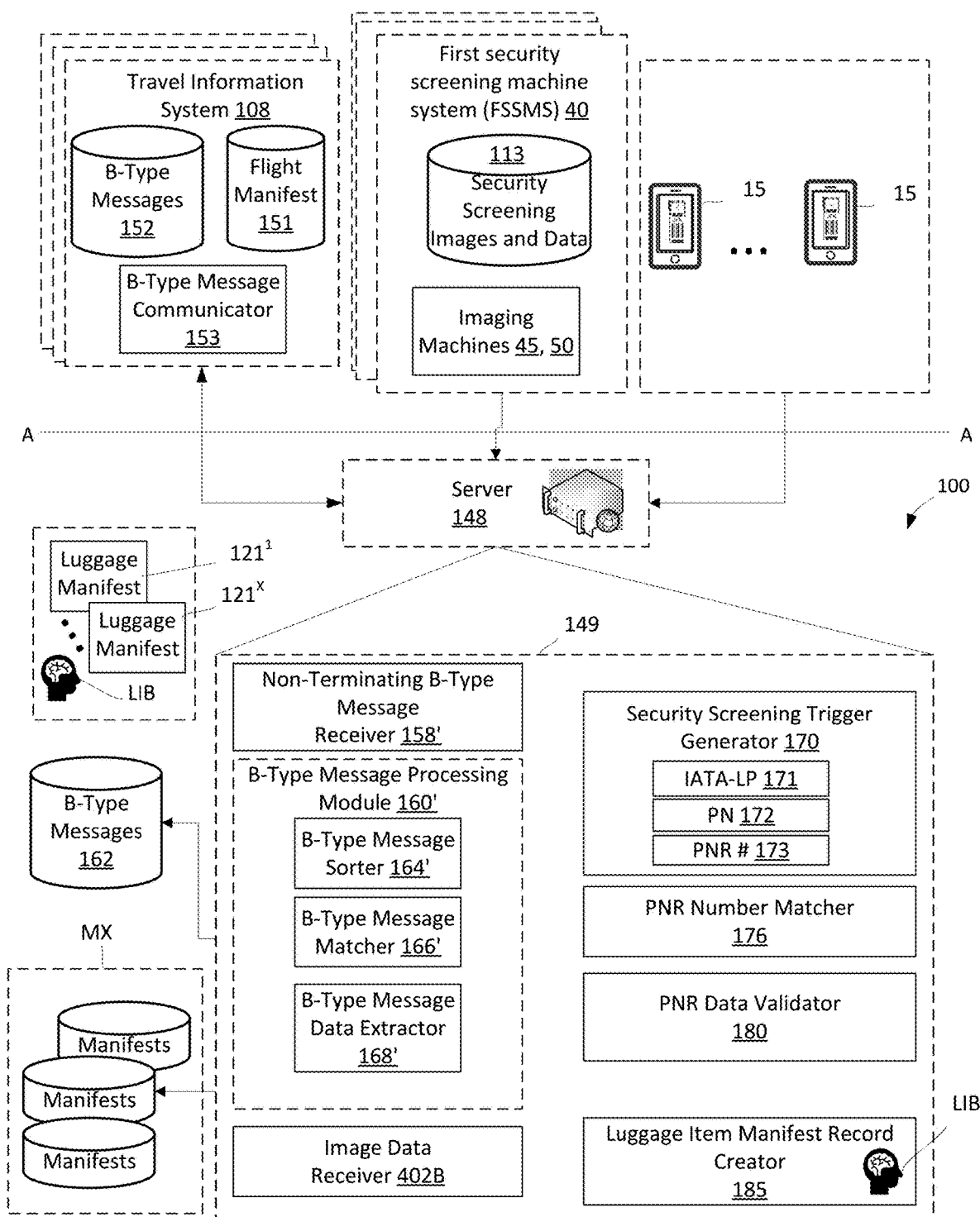
FIG. 1D illustrates a block diagram of a system for creating at least one luggage manifest triggered by a non-terminating B-Type message in accordance with an embodiment.

FIG. 1D illustrates a block diagram of the system 100 for creating at least one luggage manifest triggered by a non-terminating B-Type message in accordance with an embodiment. The non-terminating B-Type message is a B-Type message that includes an IATA license plate number, passenger's name and/or passenger name record (PNR) number. The non-terminating B-type message may be sorted by a baggage source indicator, multiple baggage source indicators or all baggage source indicators. FIG. 1D is similar to FIG. 1A, so only the differences will be described in detail.

Non-Terminating B-Type Message Processing

In FIG. 1D, a non-terminating B-Type message receiver 158' is provided. By way of a non-limiting example, system 100 may include the programming modules 149 that may be configured to receive B-Type messages from an airport and start the sorting and matching from the non-terminating B-Type messages according to the schedule of the airport and operating times. As described in relation to FIG. 26B, the first-mode travel carrier 104 may be an air travel carrier for a flight that originates in another country.

Although the description applies to "non-terminating B-Type messages" as it applies to an airline or airport infrastructure, in one or more embodiments, the non-terminating message receiver 158' may be overridden or controlled to be an all B-Type message receiver. In this manner, the B-Type message receiver 158' may receive all B-Type messages to sort all passengers against a flight manifest, for example, for security screening processing.

In one or more embodiments, there may be a need to match passenger names from any number of manifests based on any type of B-Type message to build a luggage item manifest record.

For those air carriers originating outside of a country, and landing at an airport, matched by an airport code, that is a first border crossing, for example, the system 100 may receive the entire flight manifest 151 and non-terminating B-Type messages. The terminating B-Type messages are received and processed in FIG. 1A. Those messages arriving at an airport that also require a Customs security clearance, for example, are matched by comparing the passenger's names in the flight manifest and sorted B-Type messages. Therefore, once there is a match detected and the IATA license plate and the passenger's name and/or PNR number are extracted from the non-terminating B-Type message, a trigger may be sent to a security screening integration assistant (SSIA) system 190 (FIG. 16) via a security screening trigger generator 170. The trigger generator 170 may include programming instructions, which when executed, send the IATA license plate associated with the luggage item to be screened and/or the passenger's name and/or PNR number, for example, to the SSIA system 190.

The B-Type message processing module 160' may include programming instructions, which when executed may cause a message sorter 164' to sort for a non-terminating airport to build luggage manifests for luggage items that will be processed through Customs at the non-terminating airport. In one or more embodiments, the manifest may be a security assistant processing manifest. In other words, some of the luggage items are not handled by system 100 outside of the airport infrastructure.

In other embodiments, a passenger name matching in a manifest MX may be added to another manifest as well. For example, depending on the origination of the flight, a luggage item may need to be processed through a first security station using a non-terminating B-Type message at a first airport location and then through a second security station using a terminating B-Type message at a second airport location.

The B-Type message processing module 160' may include programming instructions, which when executed cause a B-Type message matcher 166' to match the passenger's name in a non-terminating B-Type to the name of the arriving client (i.e., registered passenger) in a general manifest file. The passenger information in the B-Type message may be matched to pre-loaded information in a respective one manifest MX for a lodging entity or a mode of travel. The non-terminating B-Type message, such as a non-terminating BSM, is described in relation to FIG. 14A.

The B-Type message processing module 160' may include programming instructions, which when executed cause a B-Type message data extractor 168' to extract information from the non-terminating B-Type message and merge the data into the luggage manifest $121^1 \ldots 121^x$ and/or the luggage item manifest record.

As will be described in relation to FIG. 26B, the non-terminating B-Type message may start the LIB item manifest record creator 185 before the terminating B-Type message. However, because of delays or changes that occur in the air travel industry, the LIB 2450 (FIG. 24) may be updated with new LIB data based on the information in the terminating B-Type message, such as a terminating BSM.

For example, each change may produce a new PNR number with new flight or travel information.

As described in FIG. 1B, the first leg of travel may have been on an airplane. However, the luggage item may have been picked up by employees of system 100 or other baggage handlers from a train station, bus station, hotel, etc. before being scanned to register the luggage item as arrived at a lodging entity according to the luggage manifest. At the lodging entity, the luggage item begins its next leg of travel. It may be a cruise ship or a resort.

Return Leg Bag Tag Information

In one or more embodiments, using the originating flight airline bag tag for check in, for a return leg of travel, allows for the ability to address the major flaws in the current remote check-in process. Focus on cruise line check-in has revolved around valet tags which allow the cruise line to check the passenger in for a flight retrieving the boarding pass and valet tags on the ship while at sea with all the work for the check in process running through overburdened staff on the ship under serious time constraints. The check in process is difficult and unreliable because you have to create hybrid airline check-in functions to allow this process to happen on the ship. Other issues include the airline check in window that was expanded to 48-hours to try to help the struggle on cruise ships to allow for more time to handle the work and other attempts to address the workload on the ship. This was addressed in the patent for a one-page document to allow for a faster process for the printing of documents for all passengers checking in from the ship and delivering valet tags and boarding documents to each room for each passenger using the service. All these obstacles limit the volume and the financial success of the product. The current systems and methods disclosed herein remove the work from the ship staff and any delivery of documents to the rooms for each passenger. Using the technology lite or B-Type message check in process with the originating bag tag (previously garbage) allows for a seamless check in process off the ship because the bag has already been marked with important retrievable data allowing the user to access the airline check-in process. This seamless baggage process will allow the already tagged bag to flow through the process with an identifier that allows for an information flow for airline check in. The original IATA bag tag scanning also allows for other remote operations at hotels, resorts etc. to have limited technology, workstations printers and space, as well as allowing for a seamless and cost-effective system throughout the remote check in network and allowing for a financially sustainable process.

Originating Path Travel Experience

FIG. 1B illustrates a block diagram of a system 100 for checking in a passenger for return legs of travel in accordance with an embodiment. In one or more embodiments, the system 100 may be used to check in the passenger for the return leg and or to activate a LIB 2450 of an arriving luggage item.

FIG. 1B provides an example travel journey of a luggage item along multiple legs of travel to a lodging entity or next mode of travel.

The system 100 is denoted between lines A-A and B-B. The system 100 may communicate with the travel information system 108 of a first-mode travel carrier 104, the travel information system 110 of an optional intermediate travel carrier 106 and/or the travel information system 128 of a lodging entity 126. In the embodiments described herein, the lodging entity 126 is a cruise ship. The travel information systems 108, 110 and 128 may include web-based servers connected to the Internet, for example. One or more components of the system 100 are located local to a DP 107 where the destination point is also local to a lodging entity. In one or more embodiments, the lodging entity 126 may be a resort destination or hotel.

The first-mode travel carrier 104 may be one of an airline carrier, bus carrier, and a train carrier. However, for the purposes of discussion, the examples will be described in relation to the first-mode travel carrier being an airline carrier. The optional intermediate travel carrier 106 may be one of an airline carrier, bus carrier, and a train carrier.

The travel journey 140, represented as a dashed line, denotes a path of travel legs L1, L2, and L3 of the passenger and passenger luggage 138 from the point of origin (i.e., home 102) to the point of lodging with or embarkation at the lodging entity 126 via leg L4. Leg L1 is a travel path journeyed from home 102 to a first-mode travel carrier 104. Leg L2 is a travel path journeyed using the first-mode travel carrier 104 to the DP 107 or to optional leg L3 associated with an intermediate travel carrier 106. Optional leg L3 is a travel path journeyed using the intermediate travel carrier 106 to the DP 107. For example, a passenger may end its travel path at the end of leg L2 and board vehicle of a different travel carrier or flight to begin travel along leg L3 to the DP 107. Still further, it should be recognized that the travel path of leg L3 may include one or more intermediate travel carriers. In some instances, the passenger's journey may have zero (0) intermediate travel carriers, such as in the case of a direct flight or direct travel journey to the destination point DP along the path of the travel journey 140.

Return Path Travel Experience

FIG. 1C illustrates a block diagram of the system 100 for checking in baggage of a passenger for return legs of travel after disembarking from a lodging entity in accordance with an embodiment. The system of FIG. 1C is the same system 100 of FIG. 1B. However, components of system 100 may be distributed at different off-airport locations for acquiring the OP-BTI.

According to one or more embodiments, the return path may include travel leg L2' and L1', after leaving the lodging entity on L4'. The return path may include L3', L2' and L1', for example. In one or more embodiments, the passenger itinerary may include temporary lodging reservation after L2' and before starting the journey L1'. As can be seen, there are many possible modes of travel and lodging stays for a passenger travel experience.

For the return path, the originating printed bag tag 142' may be used for at least one of tracking, locating and information gathering in other modes of travel prior to baggage check-in for a return flight. In one or more embodiments, the luggage item may be untethered from the passenger for some modes of travel. The passenger may travel bagless using other modes of travel, in some instances.

According to one or more embodiments, the system 100 may be integrated or connected to system 2700 (FIG. 27) and/or 3100 (FIG. 31) to untether a luggage item from the passenger for other modes of travel to be checked in for a return flight within the regulated check-in window, print a return flight bag tag for placement on the luggage item, and transfer the luggage item into the custody of the airline carrier. In one or more embodiments, the system 100 may be integrated or connected to system 2700 and/or 3100.

According to one or more embodiments, the system 100, 2700 and/or 3100 may cause a printer associated with the airline carrier or a kiosk of the airline carrier to print a return flight IATA compatible bag tag for the return flight with an airline travel carrier. In one or more embodiments, system 100, 2700 and/or 3100 may include a printing device to print an IATA bag tag for a return flight to replace the originating hardcopy bag tag with the return flight IATA bag tag.

In one or more embodiments, the printed IATA bag tag number on the return flight IATA bag tag may be recycled for use at off-airport locations and temporary lodging entities as a recycled unique identifier during those portions of the return path after the luggage items have been off-loaded from an airline carrier and picked up from the airline or airport infrastructure. The return flight IATA bag tag on the return path is a non-discarded machine-readable bag tag for any other modes of travel and lodging entities, including temporary lodging entities after the luggage has completed its return path on an airline travel carrier.

The destination point DP 107 is local to the port of embarkation of the lodging entity 126. The system 100 or one or more components of the system may be controlled and manned by a third-party service provider independent from any travel carriers. The system 100 may be controlled and manned by a travel carrier local to the destination point DP 107. The travel carrier local to the destination point DP 107 may be an airline carrier, a train carrier, a bus carrier, a cruise ship carrier, or combination thereof. The acquiring devices described herein may be distributed at off-airport locations to locate and track luggage items such as at alternate modes of travel.

In some instances, the traveled paths by the first-mode travel carrier and the travel path of the optional intermediate travel carrier 106 may be reversed, such that the travel path journeyed by the passenger on leg L2 may be by an intermediate travel carrier 106 and the travel path journeyed by the passenger on leg L3 to the DP 107 may be using the first-mode travel carrier.

A component of system 100 may include a scanner 116 for scanning a bag tag (BT) 142. An example BT 142 from an airline carrier will be described in more detail in relation to FIG. 2A. The BT 142 is an original paper bag tag (OP-BT) with an original bag tag identifier (O-BTI) 114, such as from a first-mode travel carrier 104 of a first leg of travel. The O-BTI 114 may be stored in a database by first-mode travel carrier 104.

In one or more embodiments, a passenger with a mobile communication device 15 may capture an image of the BT 142. According to one example, the BT 142 may have been printed by a kiosk at the airport and placed on the luggage item by the passenger.

In one or more embodiments, a passenger with a mobile communication device 15 may capture an image of a printed instrument having at least a portion of the passenger information on the originating hardcopy bag tag. By way of a non-limiting example, a printed instrument may be an at-home printed bag tag. In other examples, the printed instrument may be a conventional airline tag marker 212 as described in relation to FIG. 2B. By way of a non-limiting example, a printed instrument may be other printed documents with passenger/airline information that can be used to extract a passenger name record (PNR) number directly from the instrument or access the PNR number from memory operably accessible by a computer system that is associated with the airline carrier, the airline carrier being the source of the printed text and layout of the originating hardcopy bag tag to be printed and/or the printed instrument having at least a portion of the printed text on the originating hardcopy bag tag.

In one or more embodiments, the components of the system 100 may also include a radio-frequency identification (RFID) reader or a near field communication (NFC) identification reader, both of which are referenced to herein as an RFID-R 150, denoted in a dashed box to denote that it is optional. The RFID reader receives electromagnetic fields to automatically identify and track tags. In some instances, the passenger luggage 138 may use an RFID tag or near field communication (NFC) compatible tags that produce a 10-digit license plate or equivalent identifier. However, currently most luggage still uses the printed or paper bag tag as the primary means of identifying a passenger's piece of luggage 138.

In one or more embodiments, the passenger luggage 138 may include a radio-frequency communication device such as a Global Positioning System (GPS) tracker, a Global System for Mobile Communications (GSM) tracker, a GSM-5G tracker, a WIFI-enabled communication device, a BLUETOOTH Low Energy (BLE) device, a BLUETOOTH-enabled communication device, a short-range RF communication device and a long-range communication device using compatible wireless communication protocols.

The term passenger luggage 138 may include one or more luggage items. The one or more luggage items may include a first luggage item. In some instances, only the BT 142 of the first luggage item may need to be scanned to digitally recreate a passenger's bag number.

The stored digital O-BTI 114 may be converted to a format compatible with the International Air Transport Association (IATA) bag tags code and other standardized formatting of the carrier. For example, an airline bag tag may include an IATA code that includes a three-character alpha numerical geocode designating airports and metropolitan areas. The IATA code is also known as an IATA location identifier. The IATA also publishes industry standard rules for creation of bag tags for the airline industry. The printed BT 142 may include a 10-digit license plate and corresponding bar code shown in FIG. 2A. The O-BTI 114 may include information to create the IATA geocode, the original airline flight information, the 10-digit license plate, and other BT information printed on a BT 142, as will be described in FIG. 2A. The BT 142 may use a license plate used for other travel carriers.

A component of the system 100 may include an imaging device 118 for capturing an image of the passenger luggage 138. The components of the system 100 may include an optional printing device 120 that is configured to print on a substrate a marker (MK) 136. An example MK 136 is described in relation to FIG. 15.

The components of the system 100 may include a computing device 122, as will be described in more detail in relation to FIG. 7. The computing device 122 may be in communication with the scanner 116, the imaging device 118, and the printing device 120 via wireless communication, denoted by reference numeral 130. In one or more embodiments, the computing device 122 may communicate with the scanner 116, the imaging device 118, and/or the printing device 120 using wired communication protocols. The printing device 120 may be a laser printer, inkjet printer, or other printer device.

It should be understood from this disclosure that the system herein accommodates for many possible outcomes that can be experienced by various passengers. The need for a MK 136 is because some baggage that arrives at a destination may not include the originally printed bag tag or the airline's marker, both of which may include an IATA bar code. In such a situation, the system would need to prepare a marker to temporarily tag the baggage.

Additionally, the MK 136 may be used in one or more embodiments for those luggage items that are processed through an integrated security screening station, such as described in FIG. 26A.

In one or more embodiments, the luggage item may be provided a wireless tracking device 175. By way of a non-limiting example, the wireless tracking device 175 may be a tracking device that may include accelerometers (ACC), gyroscopes, Global Positioning System (GPS) and/or an Inertial Navigation Unit (INU) to determine its own location, such location may be sent in a computing device (i.e., server 148) of system 100. The wireless tracking device 175 may have a unique identifier such as a registered serial number, media access control (MAC) address, or another assigned unique identifier, which is stored in the LIB 2450, expanded B-Type message, another B-Type message, and/or a manifest for one of a lodging entity, a mode of transportation or other manifest. The wireless tracker device 175 may also be programmed with a unique identifier of the passenger and/or the luggage item, such as a passenger's name, a PNR number, a Super PNR number, IATA license plate number, portions of the data from a B-Type message or any combination thereof. In an embodiment, wireless tracker device 175 may be a temporary or removable tracker.

The wireless tracking device 175 may be a an AIRTAG by APPLE Inc., a Global Positioning System (GPS) tracker, a Global System for Mobile Communications (GSM) tracker, a GSM-5G tracker, a WIFI-enabled communication device, a BLUETOOTH Low Energy (BLE) device, a BLUETOOTH-enabled communication device, short-range RF communication device and a long-range communication device using compatible wireless communication protocols.

For short-range communication devices, such as without limitation, WIFI-enabled communication device, a BLUETOOTH Low Energy (BLE) device, and a BLUETOOTH-enabled communication device, the system 100 may include remote network devices 127 in lodging entity 126. In one or more embodiments, the remote network devices 127 may be those of the lodging entity 126 and used by system 100 to carry location data by the wireless tracking device 175. Alternately or in addition to, some of the remote network devices 127 may be owned by system 100 and others are owned by the lodging entity 126.

In one or more embodiments, the wireless tracking device 175 may be temporarily assigned to the luggage item. For example, the wireless tracking device 175 may be configured to communicate in a designated area D10 such as within a cruise ship and a nearby surrounding areas such as dockside. Once the luggage item is disembarking and checked in for the return flight, for example, or at some other time, the wireless tracking device 175 may be removed and re-assigned to another luggage item for the next cruise on the cruise ship.

For example, a cruise ship area (i.e., designated area D10) may include the cruise ship and a diameter of 100 feet surrounding the cruise ship. The cruise ship area (i.e., designated area D10) may have receivers or network communication devices to receive signals from the wireless tracking device 175. The diameter may be 10-50 feet, 10-75 feet, or 10-100 feet. The diameter may be up to 200 feet, up to 300 feet, up to 500 feet or up to 1000 feet surrounding the cruise ship.

For long-range communication devices, such as without limitation, an AIRTAG by APPLE Inc., a Global Positioning System (GPS) tracker, a Global System for Mobile Communications (GSM) tracker, and a GSM-5G tracker may communicate with cellular, satellite and GSM communications service providers. The location signals may be sent to the server 148 or other designated computing device for access by and/or storage in the LIB 2450. In one or more embodiments, the long-range communication devices may be configured to communicate using short-range communication protocols, as well. In this case, the wireless tracking device 175 may communicate in the designated area D10 using short-range communication protocols using the remote network devices 127 or long-range communication protocols.

The wireless tracking device 175 may be used to track its location while traveling on any mode of travel or next mode of travel using long-range or short-range communications depending on the wireless tracking device 175 configuration.

The system may obtain lite passenger information by scanning a barcode or quick-response (QR) code associated with a boarding pass of the original flight. In some instances, the passenger's ticket may include information associated with the 10-digit license plate which may be retrieved from the passenger and placed on the baggage without the need to print a MK 136. For example, the passenger may receive a marker with an adhesive backing from an airline attendant at the time of checking in their baggage at the airport.

This marker may include the 10-digit license plate or other information. This marker can be used to identify the baggage by the passenger in the event of lost baggage, for example.

The system may include creating, by a printing device in communication with the at least one processor, a MK 136 with a marker identifier linking the passenger manifest record to the first luggage item when the originating paper bag tag identifier (OP-BTI) associated with or on the printed bag tag of first luggage item is one of damaged or missing; and populating the passenger manifest record with the marker identifier. The marker identifier may be a barcode, readable by a barcode scanning device, where the marker identifier includes one of OP-BTI or a new passenger tracking identifier.

The computing device 122 may communicate with the scanner 116, imaging device 118 and/or printing device 120 using near-field communications (NFC) protocols such as without limitations, BLUETOOTH. The computing device 122 may communicate with the scanner 116, imaging device 118 and/or printing device 120 using wireless fidelity (WI- FI) communications based on Institute of Electrical and Electronic Engineers (IEEE) 802.11 standards. The computing device 122 may communicate with the scanner 116, imaging device 118 and/or printing device 120 using ZIG-BEE wireless technology compatible with IEEE 802.15, for example. The computing device 122 may communicate with the scanner 116, imaging device 118 and/or printing device 120 using long range communication protocols, short range communications protocols, cellular radio frequency protocols or other mobile radio frequency protocols.

In other embodiments, the scanner 116 may be a software application stored on the computing device 122 and programmed to interact with a video device or camera device incorporated into, integrated into, or connected via a cable to the computing device 122. In one or more embodiments, the computing device 122, imaging device 118 and scanner 116 may be a single device, such as a smart phone, tablet or other handheld computing device that is video-enabled, herein after referred to as a "smart communication device." In one or more embodiments, the system 100 may include a local computing device or a server 148 to communicate with the smart communication device(s) and travel information systems 108, 110 and/or 128. The local computing device (i.e., server 148) communicates using wired or wireless communications with at least one smart communication device and/or to the travel information systems 108, 110 or 128.

The computing device 122 and/or server 148 may communicate with mobile communications device 15 or other wired or wireless communication devices.

In one or more embodiments, the computing device 122, imaging device 118, scanner 116 and RFID-R 150 may be a single device, such as a smart phone, tablet or other handheld computing device that is video-enabled, also herein after referred to as a "smart communication device."

The imaging device 118, scanner 116, and RFID-R 150 may be electronic devices (i.e., acquiring devices) that acquire the barcode or other information associated with the IATA license plate, such as the 10-digit license plate. As should be understood from this disclosure, while the IATA standards use a 10-digit license plate, other license plate formats may be used with more or less digits. For example, the 10-digit license plate may be acquired by optical character recognition, computer vision machine learning algorithm, or other artificial intelligence algorithm that can recognize alphanumeric characters and convert the recognized characters to machine-encoded text, for example.

The acquiring devices may provide expanded B-Type messages outside of the airport infrastructure to server 148 of system 100, for example. However, to the extent some acquiring devices overlap the airport infrastructure, those acquiring devices may provide expanded B-Type messages from inside of the airport infrastructure to server 148, for example. By way of a non-limiting example, an expanded baggage processed message (BPM) may be generated by the acquiring devices, where the BPM includes at least a recycled IATA license plate and the passenger' name. The expanded BPM may include a unique identifier of the acquiring device and location data. The expanded BPM may be sent to server 148 associated with system 100 so that the location data is updated in the LIB 2450 and/or expanded B-Type message described in relation to FIGS. 14C-14E. While the expanded BPM is described, other expanded B-Type messages may be generated by system 100 and sent to server 148, those messages may be generated after the luggage item arrives at the DP 107 and uses a recycled IATA license plate of the corresponding luggage item. For example, the expanded B-Type may be used to update the location data from an acquiring device in the LIB 2450 and/or to trigger a process described herein for delivery and handling of the luggage item independently of the passenger. The expanded B-Type messages may use IATA compatible coding format structures, in one or more embodiments. Alternately the expanded B-Type messages may use a coding format structure that is different from the IATA coding format but conveys similar message constructs.

A component of the system 100 may include an optional luggage receiver 124 to transport received luggage, such as on a conveyor belt. While the passenger luggage 138 moves on the conveyor belt, at least one scanner 116 and at least one imaging device 118 may scan or image the information representative of the O-BTI 114. In one or more embodiments, the imaging device 118 may capture images of one or more passenger luggage 138. Additionally, the RFID-R 150 may also read an RFID tag or NFC tag placed on the luggage receiver 124. In one or more embodiments, the scanner 116 may scan a QR code-enabled bag tag. The RFID, NFC, and QR code-enabled bag tags may include certain personal information or PU. This personal information of the passenger and the information in the PNR 112 may be used to validate the personal information. The RFID tag or NFC tag should be compatible with IATA RP 1740c, for example. The PNR 112 represents a storage location where an airline carrier may store the PNR of their passengers. The PNR number 230 is also known as a PNR locator. The PNR data may be located using at least the PNR number 230. By way of a non-limiting example, the PNR data may be stored in a passenger service system (PSS) or an order management system (OMS). However, over time the location of the storage devices for the PNR data may change. Hence, the system may use and update PNR access instruction according to each airline carrier to determine how to navigate to the PNR 112. The communications exchange may include Internet Protocols (IP), Extended Markup Language (XML) standards and XML messaging.

In other embodiments, the luggage receiver 124 may include a designated pad or surface for the placement of a single passenger luggage 138 with a scanner, imaging device 118 and/or RFID-R 150 in proximity to the pad to scan the O-BTI 114 and/or capture images of a passenger luggage 138. The scanner 116 and imaging device 118 may be the same device but operated to look for and scan a barcode with the O-BTI 114 in one process and in a second optional process, find a portion or a side of the body of the passenger luggage 138 to capture identifying luggage features. In one or more embodiments, the scanned O-BTI data receiver 402A may be bypassed in the event a printed BT 142 is not readable. In this instance, a user may directly enter the 10-digit license plate 210 which is then entered into the license plate parser 404A to identify the travel carrier identification and the passenger's bag number. The scanner 116, imaging device 118 and RFID-R 150 may be integrated into the same device, where the RFID-R 150 will read the RFID tag or NFC tag if a printed bag tag is not present to develop personal information for a manifest.

In a process to capture identifying luggage features, such as using computer vision, a determination may be made that the passenger luggage 138 does not include an original paper bag tag. In this instance, received information from the RFID-R 150 may be used. In some instances, the passenger luggage 138 may have both an RFID tag or NFC tag and an original paper bag tag, as the original paper bag tag may include information associated with a travel carrier for a return leg local to home 102.

According to one or more embodiments, the computing device 122 and/or server 148 of the system 100 may generate a communication session with a travel information system 108 or 110 to access the PNR 112 based on the scanned BT 142 to obtain information representative of the original O-BTI 114 with an embedded code of a passenger's bag number, as will be described later.

According to one or more embodiments, the computing device 122 and/or server 148 of the system 100 may generate a communication session with a travel information system 108 or 110 to access the PNR 112 based on the image of the BT 142 to obtain passenger information that includes at least the PNR number captured from the BT 142, as will be described later.

The travel information system 108 or 110 may generate a communication with passenger file data 132 that includes the return leg information of the passenger while maintaining the PII in the PNR confidential. The received passenger file data 132 is assembled into a manifest file 134 or sent to the travel information system 128 where a manifest file 134 is created. In some instances, the server 148 may create a manifest file. One of the computing devices 122 and/or server 148 may communicate a manifest file to travel information system 128 of the lodging entity 126.

The computing device 122 and/or server 148 may merge all the passenger file data 132 into a single manifest file 134 of checked-in passenger baggage and/or passengers. The computing device 122 and/or server 148 will then communicate a manifest file 134 to a travel information system 128 for a lodging entity 126.

Departure Control System (DCS) may control the management of the check-in process for an airline travel carrier. The travel information system 108 or 110 may include a check-in indicator 144 that indicates that a passenger and/or their luggage item(s) is checked-in for travel within a particular window. In one or more embodiments, the travel carrier may include a check-in database 146 for those passengers and/or their luggage that have been checked in for travel.

Example 1

An example scenario will now be described in detail. A passenger ready for a travel journey begins at home 102 where the passenger luggage 138 originates, for example, and travels on leg L1 of travel journey 140. The passenger luggage 138 may travel with the passenger or via a luggage transport service to a first-mode travel carrier 104, which begins leg L2 of travel. Assume the first-mode travel carrier 104 is an airline. At the first-mode travel carrier 104, the passenger luggage 138 receives a BT 142, as shown in FIG. 2A. The BT 142 includes printed information representative of the O-BTI 114 compatible with the International Air Transport Association (IATA) bag tag format. A BT 142 may be printed on paper or paper composite at the airline counter via an airline agent, a luggage transport service or by the passenger at a kiosk. The BT 142 remains on the passenger luggage 138, as it travels on leg L3 of travel, if used, as described later. In one or more embodiments, once the BT 142 is printed a passenger may capture at least one image of the BT 142 and/or a printed instrument, as described later, and communicate the at least one image to the computing device 122 or server 148.

The passenger's travel journey will include a lodging entity 126. In this example, assume the lodging entity 126 is a cruise ship. In one or more embodiments, prior to the passenger embarking on a cruise (i.e., lodging entity 126), the BT 142 with the O-BTI 114 is scanned by scanner 116 to digitize the printed representation of O-BTI 114 or imaged by an imaging device to digitize the passenger's personal information printed on the BT 142. The passenger's personal information may include their unique PNR number. The passenger's personal information may include the passenger's name. The passenger's personal information may include O-BTI 114 created by optical character recognition into a format that is machine-encoded text, for example.

In various scenarios, the passenger's travel journey may include leg L2 of travel and leg L3 of travel. For example, if there is only a first-mode travel carrier then leg L3 of travel is omitted. In this instance, the first-mode travel carrier may provide a direct flight to a city or destination in proximity or local to the lodging entity 126. In other examples, a passenger's travel journey may include an intermediate travel carrier 106 to provide for a leg L3 of travel. For example, a passenger's travel journey may include at least one connecting flight or leg of travel to a city or destination in proximity to the lodging entity 126. The connecting leg of travel may be denoted as leg L3 of travel, which begins at the end of leg L2 and ends at a DP 107.

Figure 2A:
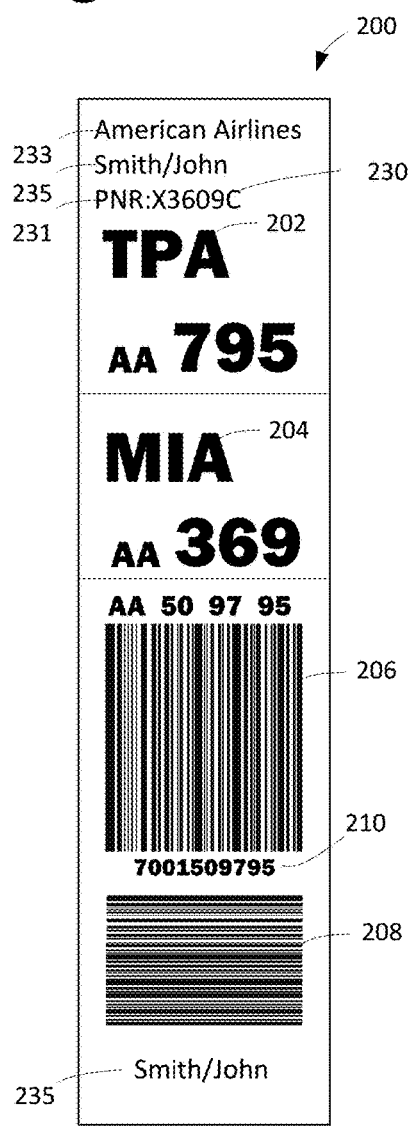
FIG. 2A illustrates a partial view of a conventional airline bag tag of the prior art.

FIG. 2A illustrates a partial view of a conventional airline IATA bag tag 200 (i.e., BT 142) of the prior art that is printed. The IATA bag tag 200 is half of a bag tag. The IATA bag tag 200 includes two sides, which may be mirror images of each other so that ends of the IATA bag tag 200 may be affixed together. In the example illustrated, the IATA bag tag 200 includes an origination airport flight identifier 202, represented as three digits and a destination airport flight identifier 204, represented as three digits. The IATA bag tag 200 includes at least one barcode flight identifier 206. In this illustration, the IATA bag tag 200 includes a first barcode flight identifier 206 having the bars of the barcode oriented in a first orientation and a second barcode flight identifier 208 having the bars of the barcode oriented in a second orientation, different from the first orientation. The format of the bag tag may have slight changes from country to country and travel carrier to travel carrier.

In one or more embodiments, the passenger's name may be on IATA bag tag 200.

The IATA bag tag 200 includes a 10-digit license plate 210 that is compatible with the IATA rules. The 10-digit license plate number includes a first integer in the range of 0-9 followed by a three-digit airline code followed by six digits of the license plate number. The last six digits of the license plate number correspond to a passenger bag number. The font of the digits can be hard to capture. The 10-digit license plate 210 is adjacent to a first barcode flight identifier 206 and/or a second barcode flight identifier 208.

The human-readable license plate will have either a two-character or a three-digit IATA carrier code. For example, it may be either "AA509795" or "001509795." "AA" would be the two-character IATA code for American Airlines®, and "001" would be the three-digit IATA carrier code. Nevertheless, the barcode will always be the full ten digits.

The first barcode flight identifier 206 is a label that hides personal information and flight information. For example, the first barcode flight identifier 206 is coded to include the passenger's name and information about where the luggage should go (i.e., destination), and other information. The name of the airport of arrival, departure time, an IATA airport code of airport of arrival, airline code and flight number and the name of the passenger identified with the baggage (last name, first name). The first barcode flight identifier 206 is a modified version of the license plate 210.

The bag tag number includes a two-letter airline code and six digits. The six digits represent the passenger's bag number. By using the passenger's bag number, a PNR 112 may be found by accessing a B-Type message that includes a PNR number, as will be described in more detail below. In one or more embodiments, the passenger's bag number also hides personal information of passenger.

The airline carriers generate and store one or more B-Type messages 152. The B-Type messages 152 may include one or more of a baggage transfer message (BTM), baggage source message (BSM), baggage processed message (BPM), baggage unload message (BUM), baggage not seen message (BNS), baggage control message (BCM), baggage manifest message (BMM) and baggage request (BRQ). The bag tag number is part of the baggage messages. In one or more embodiments, the B-Type messages may include the passenger's name and PNR number. This allows other information to be accessed based on the bag tag number.

The license plate 210 embedded in either first barcode flight identifier 206 or second barcode flight identifier 208 is known as an index number (IN) linking to a Baggage Source Message (BSM), sent by a carrier's departure control system (DCS), to the airport's baggage handling system where each digit in the license plate 210 has a specific meaning. For example, the BSM contains flight details and passenger information from the second leg L2.

The inventor has determined that the index number (IN) embedded in the license plate 210, first barcode flight identifier 206 or second barcode flight identifier 208 may be used to access the PNR 112 of a passenger.

The example in FIG. 2A is a self-tag airline bag tag printed by a passenger via a kiosk at an airport. All bag tags of an airline will include at least one IATA license plate format. However, each airline may arrange passenger/airline information on the printed bag tag differently, as will be seen in FIG. 2D.

In FIG. 2A, at the top of the bag tag 200, there may be a passenger name record (PNR) number 230. The presentation of the PNR number 230 may vary from airline carrier to airline carrier. In this example, the PNR number 230 is preceded by a code term "PNR" 231, hereinafter referred to as "PNR indicator." The PNR indicator is followed by a colon ":". However, not all airlines use a PNR indicator that is as explicit as "PNR." In such a case, the PNR number may need to be extracted based on expected information above, below and/or to the side of the PNR number for a particular airline carrier.

The bag tag 200 may also include the passenger's name 235. However, each airline may place the PNR number 230 and passenger's name 235 at different locations. Additionally, the PNR number 230 may be preceded by or succeeded by characters that may be alphabetical, numerical or an alphanumerical sequence. Therefore, in some instances, it may be difficult to locate the PNR number 230 unless the airline carrier is known to obtain a general layout template.

The passenger's name 235 may appear, for example, at the bottom of the paper of the bag tag 200. However, in some instances, just before the end of the bag tag 200, at least one conventional airline tag marker 212 is printed and can be removed before or after the bag tag is attached to the luggage item. The conventional airline tag marker 212 may be given to the passenger, as a receipt with at least the IATA bag tag license plate and barcode located thereon.

The layout may place the passenger's name 235 in proximity to the PNR number. The passenger's name 235 may appear above or below the PNR number. The name may appear in a format that includes last name/first name, where the names include only alphabetical characters.

Figure 2B:
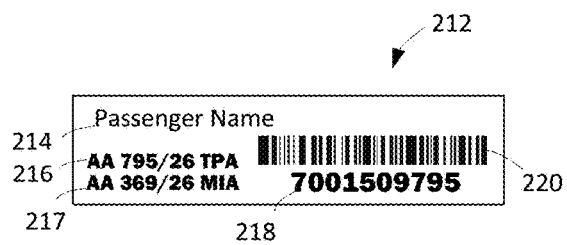
FIG. 2B illustrates a conventional airline bag tag marker of the prior art.

FIG. 2B illustrates a conventional airline tag marker 212. The airline tag marker 212 may include the passenger's name 214, origination airport flight identifier 216, destination airport flight identifier 217, a 10-digit license plate 218 and adjacent barcode flight identifier 220.

In one or more embodiments, the airline bag tag marker 212 is affixed to an end of the conventional airline bag tag 200 and can be detached for the passenger to keep. The airline tag marker 212 is also printed on paper or a paper composite.

The MK 136 printed by printing device 120 may include personal information for the PNR 112 to populate the passenger's name. In some instances, MK 136 may include a temporary bag tag with an embedded code for the lodging entity 126 or for a return leg.

The layout of the airline tag marker 212 (i.e., a printed instrument) may vary slightly.

Figure 2C:
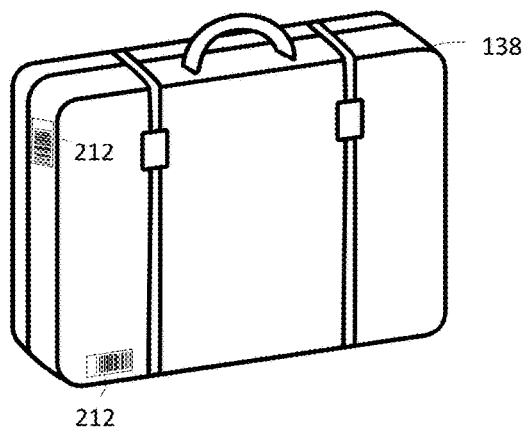
FIG. 2C illustrates an example of affixing bag tag markers to passenger baggage.
Figure 2D:
FIG. 2D illustrates a partial view of another conventional airline bag tag of the prior art.

FIG. 2D illustrates a partial view of another conventional airline bag tag 200' of the prior art. As can be seen from the illustration, the layout of the originating hardcopy bag tag 200' of Southwest Airlines® is different from American Airlines®. FIGS. 2A and 2D are but two examples of many differing layouts. The IATA two-digit character code for Southwest Airlines® is "WN." The IATA license plate number is "0526371073." The three-digit numerical IATA code for Southwest Airlines® is "526." Of particular note, the airline name, Southwest Airlines®, appears along an edge of the bag tag 200' in a vertical orientation.

The airline code "WN," the passenger's name, and the PNR number are set off in dashed boxes. The IATA license plate is also set off in dashed boxes, for illustrative purposes only. In this example, a PNR indicator is not provided before the PNR number "3UPQFT." However, the PNR number is on a line with a characters that are represented in a date format such as without limitation, XX/XX/XXXX. Additionally, below the PNR number, the digits of IATA license plate. Therefore, the layout can be used to locate the digits of the PNR number in the absence of an explicit PNR indicator.

Figure 3A:
FIG. 3A illustrates a scanner in accordance with an embodiment.

FIG. 3A illustrates a scanner 116 in accordance with an embodiment. The scanner 116 includes a software application (i.e., scanner application 310) loaded on a computing device 302, such as computing device 122. The user of the scanner 116 will direct the camera lens 308, in the direction of the printed bag tag 200. The camera lens 308 is on a rear-side of the device that is opposite the side of the display screen 304. The processor of the computing device causes an image (input) representative of the printed bag tag 200 captured by camera lens 308 to be displayed on the display screen 304.

The scanner application 310 may provide a barcode window 306, denoted in dashed lines, to highlight and identify in the image the printed barcode or for directing the user in the direction of the barcode so that the barcode window 306 is placed to capture all of the bars of the second barcode flight identifier 208, for example. The scanner application 310 may alternately, or in addition to, scan the first barcode flight identifier 206. The barcode window 306 may be automatically displayed with the initiation of the scanner application 310. The scanner application 310 may search for a linear or 1D barcode, for example, to convert the barcode of the first barcode flight identifier 206 or the second barcode flight identifier 208 and produce a series of digits representative of the license plate 210, for example. A person can see the license plate 210. However, entering each digit can be time consuming and susceptible to human error.

The first barcode flight identifier 206 or the second barcode flight identifier 208 associated with the license plate 210 can be used as an index number (IN) linking to the Baggage Source Message (BSM), for example, with passenger information, to locate and access the PNR 112 for the passenger and their return flight information.

In one or more embodiments, the scanner application may also be used to capture a QR code bag tag identifier on a QR code bag tag, affixed to the passenger luggage 138. This information may be used to validate the PNR 112 or to access personal information.

Example 2

Another example scenario will be described in relation to FIG. 3B to acquire one or more of the PNR number, passenger's name and/or IATA license plate using image data. This information may be used to start the process of building the LIB 2450, for example. This data can be used for a variety of tasks as described herein. Furthermore, as one leg of travel ends or one vehicle of travel ends, the LIB 2450 may be migrated to the next vehicle of travel leaving expired vehicle of travel data behind.

Figure 3B:
FIG. 3B illustrates an electronic acquiring device capturing an image of an originating hardcopy bag tag in accordance with an embodiment.

FIG. 3B illustrates an electronic acquiring device (i.e., imaging device 118) capturing an image 340 of the originating hardcopy bag tag 200 in accordance with an embodiment. The imaging device 118 may be integrated with a computing device (i.e., mobile communication device 15). The imaging device 118 may be part of system 100. The image 340, in this instance, has a grey background in the display screen 304. However, the background in the display screen 304 may include other items and colors therein as would occur when capturing an image in the ambient background. The imaging device 118 includes a software application (i.e., application 311) loaded on a computing device 302, such as computing device 122, or mobile communication device 15. In one or more embodiments, the application 311 running on computing device 122 may be configured to perform optical character recognition (OCR). In one or more embodiments, the application 311 running on mobile communication device 15 may be configured to perform optical character recognition (OCR) and send both the at least one image and the DPI data record, the DPI data record is stored in the LIB (FIG. 1A). The application 311 may be downloaded on mobile communication device 15 through system 100 such as by using server 148.

The image may include at least one image 340 of printed passenger information associated with an airline travel carrier of the originating hardcopy bag tag 200 from different positions. The bag tag is long, and some printed text may not be easily viewable. The printed passenger information associated with an airline travel carrier may include printed BSM data such as without limitation, the International Air Transport Association (IATA) license plate number. In one or more embodiments, the license plate number may include a two-digit airline alphabet character code or a three-digit numerical code. The printed passenger information associated with an airline travel carrier may include a passenger name record (PNR) number. The printed information associated with an airline travel carrier may include an airline code or an airline name. The printed passenger information associated with an airline travel carrier may include the name of the passenger.

The printed passenger information associated with an airline travel carrier may include a unique identifier that is associated with a passenger itinerary or can be used to navigate to stored return flight information for a passenger on a designated travel carrier.

The printed passenger information associated with an airline travel carrier may include a unique identifier that is a linking index to the passenger's itinerary, or the passenger return flight information from a computer system associated with the airline travel carrier. In one or more embodiments, the unique identifier is a Super PNR number. In multileg flights or multiple airline carriers, a Super PNR number may link all the PNRs of each leg together. Each carrier may have a different PNR for a leg of a flight.

The digital passenger information (DPI) data record linked to the airline travel carrier may include, for example, an International Air Transport Association (IATA) license plate number, a passenger name record (PNR) number, an airline code, an airline name, a name of the passenger, or any combination thereof. Examples of the printed passenger information in the image of the originating hardcopy bag tag 200 are set off in dashed boxes. In one or more embodiments, once the airline name or airline code is verified, the system may not be required to find any more of the airline codes. The airline code or the airline name may be used to determine the airline's bag tag (BT) layout of the originating hardcopy bag tag 200, such as to expedite the finding of certain printed passenger information in the image.

In one or more embodiments, the DPI data record may include the passenger name record (PNR) number and an airline code or an airline name. In some examples, the DPI data record may include the passenger name record (PNR) number, an airline code or an airline name, and the name of the passenger. This DPI data record allows system or server 148 to directly access the PNR 112.

The DPI data record may include a digital luggage item record.

Although certain embodiments may scan the barcode of the IATA bag tag to obtain certain information, the use of the image can be used to obtain the 10-digit license plate and use a portion of the 10-digit license plate to derive the airline code, if necessary. As previously mentioned, bag tags or portions thereof can become damaged. Therefore, alternate mechanisms of deriving passenger/airline information in a handsfree and accurate manner are being proposed herein. Furthermore, in one or more embodiments, the image can be used to create the 10-digit IATA license plate so that a B-Type message may be accessed to get the PNR information that leads to the PNR 112 of the passenger.

The originating hardcopy bag tag 200 may include space in the layout to print auxiliary information at the discretion of the airline carrier. The printed passenger information in the image and the resultant DPI data record may also include auxiliary information to navigate to a memory device that stores the passengers return flight information for the return flight.

The image may be captured in an application 311 that allows the passenger or other user to send, via send button 360, the image to the system 100 (i.e., server 148). In one or more embodiments, imaging device 118 may be part of system 100 or part of mobile communication device 15.

Figure 3C:
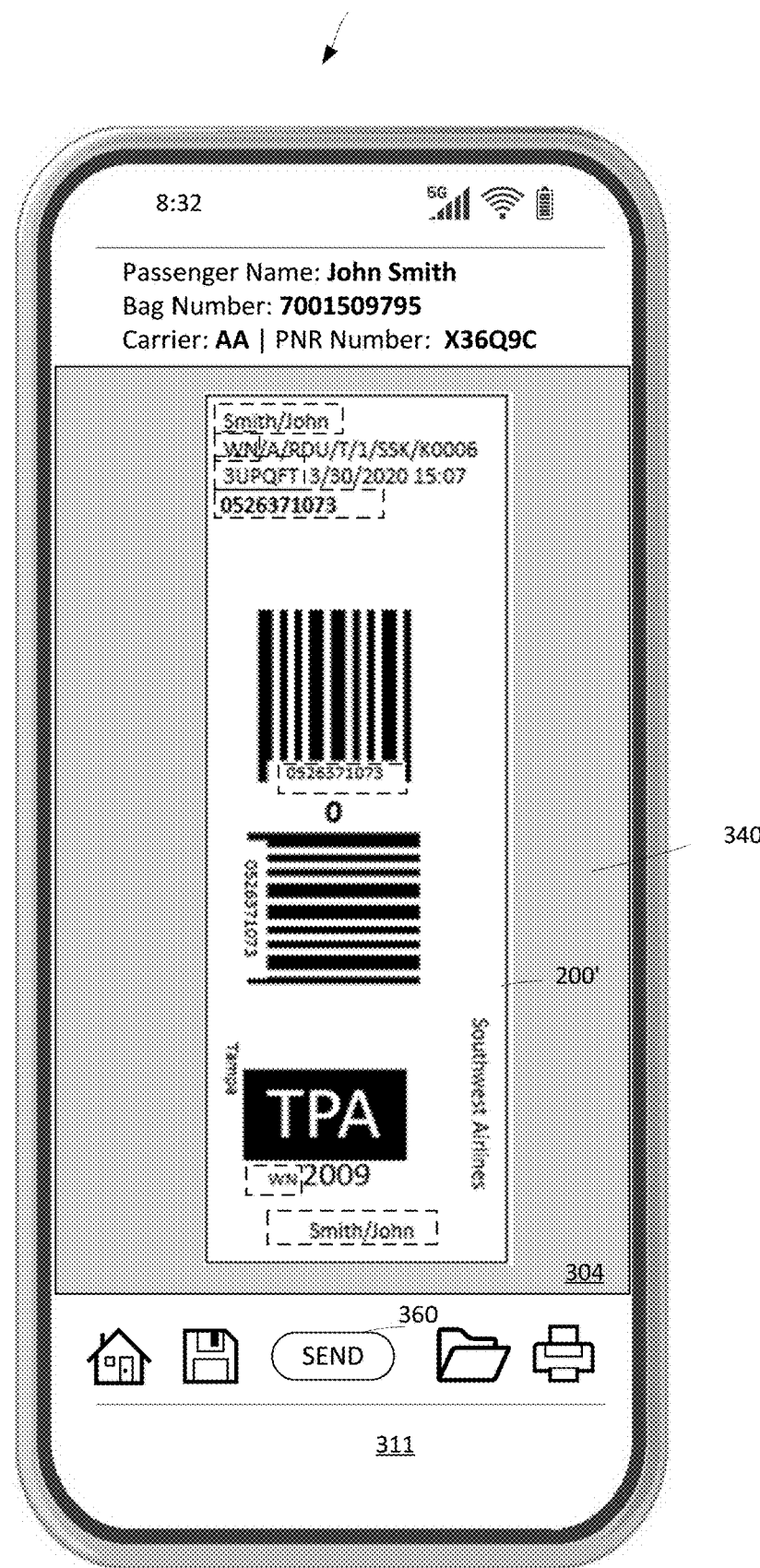
FIG. 3C illustrates an electronic acquiring device capturing an image of an originating hardcopy bag tag in accordance with an embodiment.

FIG. 3C illustrates an electronic acquiring device 118 capturing an image of an originating hardcopy bag tag 200' in accordance with an embodiment. The embodiment of FIG. 3C to capture by an electronic acquiring device an image of an originating hardcopy bag tag 200' is essentially the same as the embodiment described above in FIG. 3B. Therefore, only the differences will be described. An image may be captured by mobile communication device 15.

The originating hardcopy bag tag 200', shown in display screen 304, is an example originating hardcopy bag tag from another airline carrier with a different layout. The PNR number and the 10-digit IATA license plates may need to be located based on the layout for the particular airline, for example.

Example 3

Another example scenario will be described in relation to FIG. 3D to acquire one or more of the PNR number, the passenger's name and/or the IATA license plate using image data from a marker.

Figure 3D:
FIG. 3D illustrates an electronic acquiring device capturing an image of a printed instrument having at least a portion of the passenger information on the originating hardcopy bag tag in accordance with an embodiment.

FIG. 3D illustrates an electronic acquiring device (i.e., imaging device 118) capturing an image of a printed instrument having at least a portion of the passenger information on the originating hardcopy bag tag in accordance with an embodiment. In this example, the printed instrument is displayed in display screen 304 and includes the marker 212 described in relation to FIG. 2C. In one or more embodiments, other printed instruments may be used, such as those printed by the passenger at home. In this example, the application 311 may optically recognize some or all of the characters of text on the marker 212, denoted by the dashed boxes.

In this instance, at least the 10-digit license plate may include the DPI data record. The DPI data record may include the passenger's name for additional verification for locating the PNR number in the B-Type messages and subsequent navigation to the PNR 112, for example, and creating a digital luggage item record.

Example 4

Figure 3E:
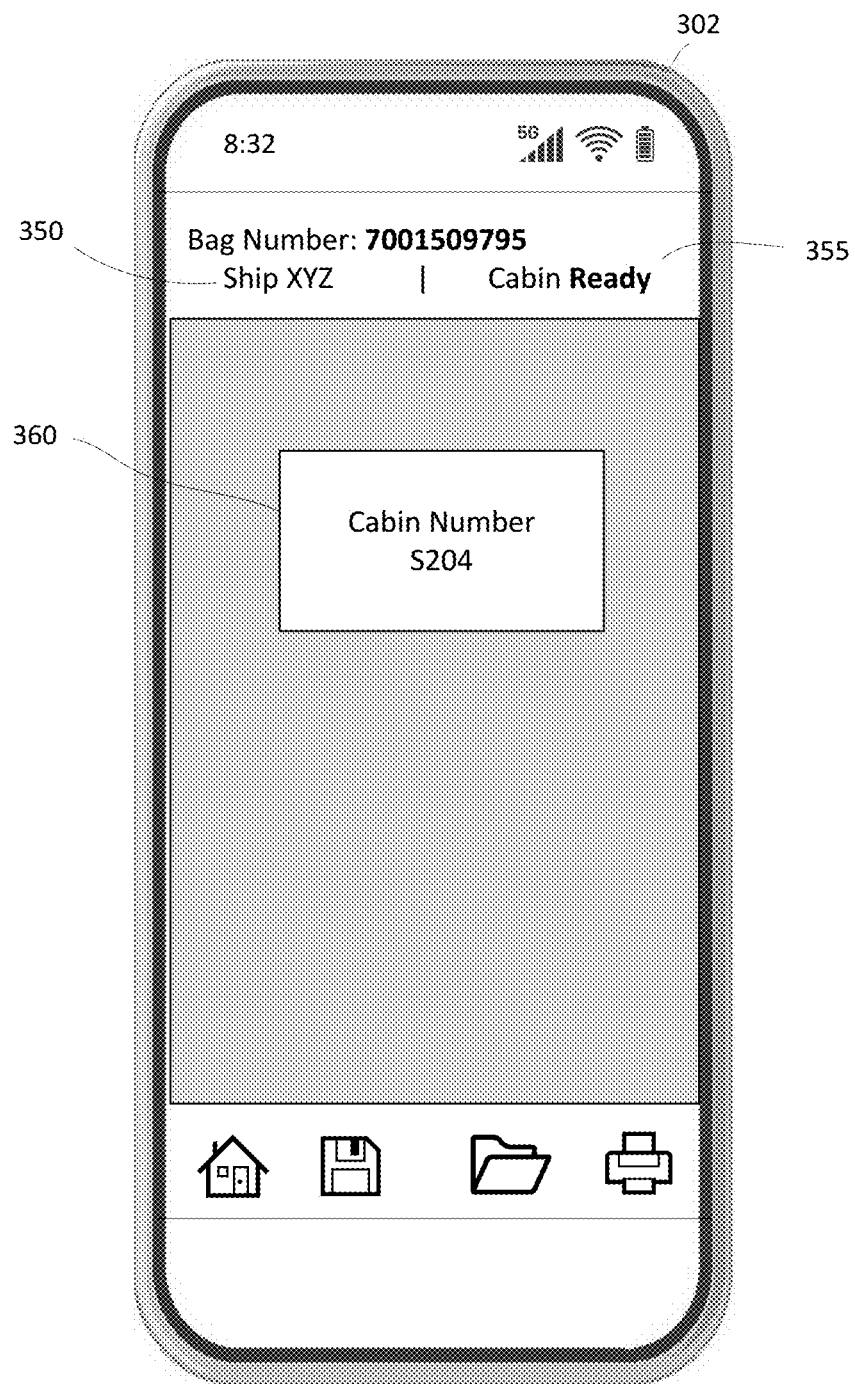
FIG. 3E illustrates an electronic acquiring device with a displayed message in accordance with an embodiment.

An example shown in FIG. 3E provides delivery location data, such as when the IATA license plate 200, marker 212, MK 136 or other barcoded identifier associated with the luggage item is scanned. The location data may be a current status of a room or cabin, for example.

In FIG. 3E, computing device 302 shows a displayed message 360 in accordance with an embodiment. The message 360 may include text representative of a cabin number to deliver the luggage items for which the printed bag tag was scanned in 3A. The displayed message also includes a message 355 that indicates that the cabin is ready. In one or more embodiments, the displayed message may include message 350, which represents the lodging entity's name. Still further, the displayed message may include the scanned bag number.

For other lodging entities, such as a hotel resort, the cabin number may be substituted with a room number, or building number, floor number and room number. In one or more embodiments, the messages 350, 355 and/or 360 may be generated and communicated by the messaging system 2790 via server 2710 of FIG. 27.

Digital BTI Data

Figure 4A:
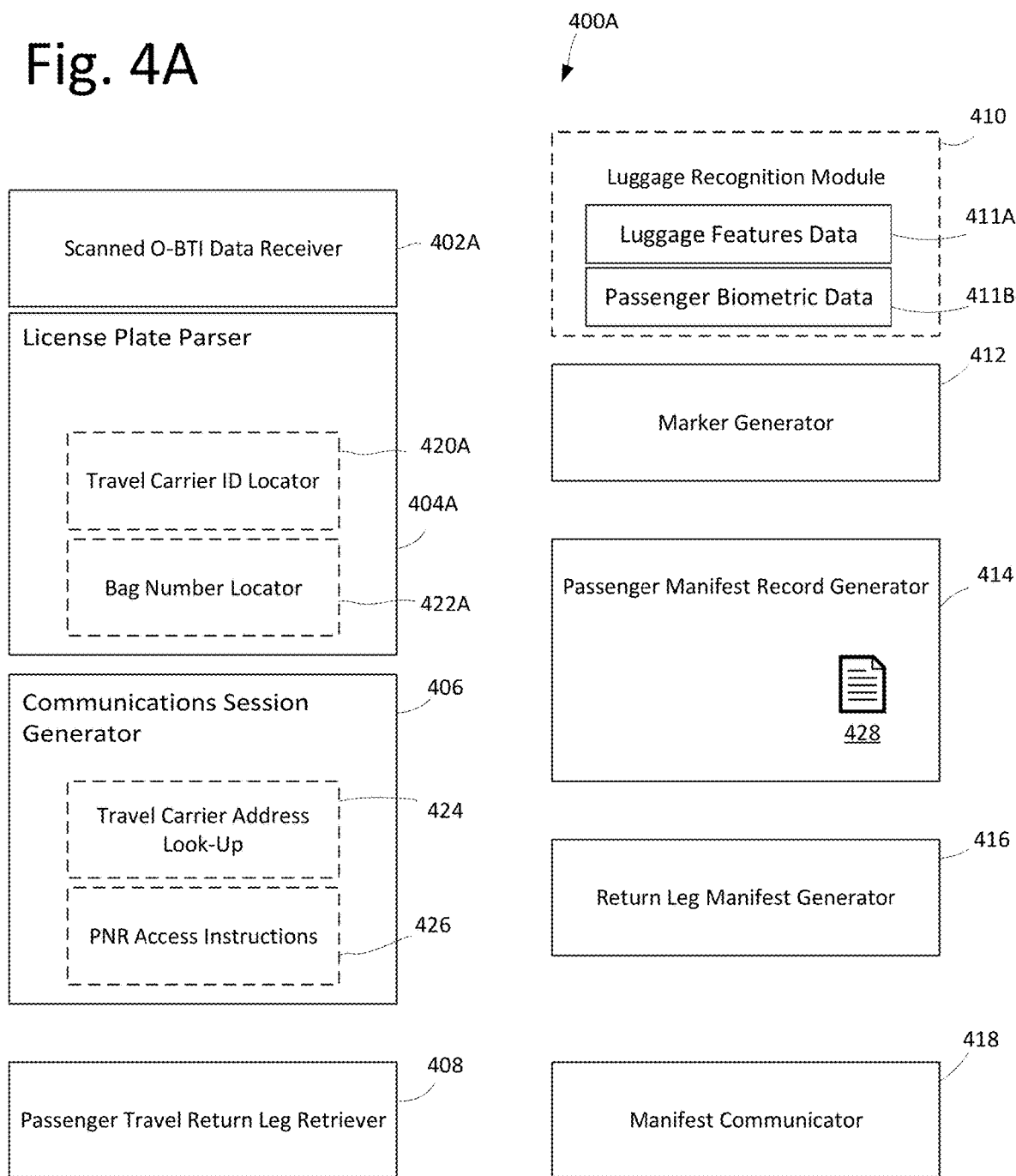
FIG. 4A illustrates a block diagram of programming modules for checking in a luggage item or a luggage item and passenger using an originating bag tag identifier for a return flight and generating a manifest for embarking on a leg of travel in accordance with an embodiment.

FIG. 4A illustrates a block diagram of programming modules 400A for checking in a luggage item or a luggage item and a passenger using an originating bag tag identifier for a return flight and generating a manifest for embarking on a leg of travel in accordance with an embodiment. The programming modules 400A may be on the computing device 122, the server 148 or a combination thereof.

The one or more programming modules 400A may include software, hardware, firmware, or a combination of software, hardware, and firmware. The computing device 122 and/or server 148 may include at least one processor and/or hardware to execute instructions of the programming modules 400A.

The programming modules 400A may include a scanned O-BTI data receiver 402A and a license plate parser 404A. The scanned O-BTI data receiver 402A may include program instructions, which when executed cause receipt of 10 digits embedded in the captured barcode of first barcode flight identifier 206 or second barcode flight identifier 208. The license plate parser 404A may include program instructions, which when executed, to parse the series of digits received from the scanner application 310. The license plate parser 404A may include program instructions, which when executed, track the digits to locate the travel carrier identification (ID) by the travel carrier ID locator 420A. The license plate parser 404A may include program instructions, which when executed, track the digits, such as the last six digits, to locate the bag number by the bag number locator 422A.

The license plate parser 404A may include program instructions, which when executed, to extract the first digit of the converted barcode. In this instance, it is the number 7. This digit may be discarded. Then, the license plate parser 404A may include program instructions, which when executed, extract the next three digits, by the travel carrier ID locator 420A. In this case the next three digits include "001," which correspond to the travel carrier ID. In this case, the travel carrier ID corresponds to American Airlines®. The license plate parser 404A may include program instructions, which when executed, to then extract the next six digits, which include "509795" using the bag number locator 422A. These six digits correspond to the bag number for the passenger.

In one or more embodiments, the scanned O-BTI data receiver 402A may be bypassed in the event a printed BT 142 is not readable. In this instance, a user may directly enter the 10-digit license plate 210 which is then received by the license plate parser 404A to identify the travel carrier identification and the passenger's bag number.

The programming modules 400A may include program instructions, which when executed, cause a communications session generator 406 to communicate with at least one of the first-mode travel carrier 104 and/or the intermediate travel carrier 106. The communications session generator 406 may include a travel carrier Internet Protocol (IP) address look-up database 424 and PNR access instructions 426. The travel carrier ID of the license plate 210 may be used to locate the predetermined instructions to generate an electronic communication packet to a server of the first-mode travel carrier 104 and/or the intermediate travel carrier 106 associated with the travel carrier ID. The communications session generator 406 may include program instructions, which when executed, configured to also extract stored instructions for accessing the return leg information from the stored PNR access instructions 426 using a digitally created passenger's bag number extracted from the first barcode flight identifier 206 or second barcode flight identifier 208 associated with the license plate 210. The communication instructions may identify the information associated with tools (i.e., programming instructions) compatible with transmission control protocol/internet protocol (TCP/IP), file transfer protocol (FTS), hypertext transfer protocol (HTTP), hypertext transfer protocol secure (HTTPS), secure socket layer (SSL), secure file transfer protocol (SFTP), and user datagram protocol (UDP).

In one or more embodiments, instructions may identify a link of the scanned license plate 210 to the Baggage Source Message (BSM) with passenger information, to locate and access the PNR 112 for the passenger and their return flight information. The link may be, without limitation, a HTTP compatible link, in one or more embodiments.

During the communications session, the computing device 122 may execute programming instructions of a passenger travel return leg retriever 408, where the return leg is a traveled path or portion of a journeyed path to return to home 102. For example, if the passenger is returning home using the same travel carrier as the original printed bag tag, the PNR 112 would include the return flight information. Otherwise, the return flight information may be marked as null by system 100.

The programming modules 400A may include program instructions, which when executed, cause a luggage recognition module 410 to recognize a luggage item for stored images. The image data of the imaging device 118 may be processed by machine learning software to generate an image of passenger luggage 138. This image may be stored in a database for a passenger luggage recognition process. In some instances, a passenger's luggage may need to be found or identified. The computing device 122 or server 148 may store an image of the passenger luggage 138 that can be later retrieved. Machine learning algorithms may then be used to recognize luggage and match a passenger with their luggage. The image data of the luggage item may be stored as luggage feature data 411A. The luggage feature data 411A may also include the barcode of the IATA license plate or features of the luggage item itself. The features may include color, texture, shape, brand, and other distinguishing features of the luggage item body. The luggage feature data 411A may be used to unlock access to certain information in the luggage item manifest record. For example, the luggage feature data 411A may be needed to access return flight information for check-in of the luggage item. The luggage recognition module 410 may include program instructions, which when executed, to store image data of the passenger as passenger biometric data 411B linked to the luggage item manifest record. The passenger biometric data 411B may be used to unlock access to certain information in the luggage item manifest record. For example, the passenger biometric data 411B may provide access to return flight information for check-in of the luggage item. In one or more embodiments, the passenger biometric data 411B may be validated when the originating hardcopy bag tag, the marker 212 and/or MK 136 are missing or damaged.

In a scenario, a luggage item may have only one of the originating hardcopy bag tag, marker 212 or MK 136. By way of a non-limiting example, the marker 212 may be the only tag on the luggage item and does not have the passenger's name printed thereon. For this example, although the marker 212 is on the luggage item, the passenger may need to be validated if the passenger's name is not present on the airline's originally issued printed instrument to unlock the luggage item manifest record and subsequent check-in of the luggage item.

For one or more embodiments, although the originating hardcopy bag tag is on the luggage item, the passenger may need to be validated if the passenger's name is not present on the airline's originating hardcopy bag tag to unlock the luggage item manifest record and subsequent check-in of the luggage item.

The computing device 122 or server 148 may use machine learning algorithms to identify whether a particular luggage item has been processed by one or more components of the system 100.

The captured image data of the luggage item may be used to unlock a luggage item manifest record such as for check-in, in some instances.

The programming modules 400A may include a marker generator 412. The marker generator 412 may include program instructions, which when executed, generate a barcode for use in the format of the MK 136 that can be printed by printing device 120 and affixed on the passenger luggage 138. As discussed previously, the MK 136 may be used when the original bag tag or airline marker are not available or unscannable, such as due to damage.

The programming modules 400A may include a passenger manifest record generator 414, a return leg manifest generator 416, and a manifest communicator 418. The passenger manifest created from the non-discarded originally printed bag tag may be used to reconcile passengers arriving at a lodging entity and determine room or cabin numbers. The non-discarded printed bag tag populated in the manifest is used to bring a passenger's baggage to their room and/or lodging entity, for example, without the need for generating a temporary valet tag. The non-discarded printed bag tag may be used also for departures of the passengers from the lodging entity to return home for example, without the need to print yet another temporary valet tag.

The passenger manifest record generator 414 may include program instructions, which when executed, store in one or more files passenger information 428 and related PNR 112 for those passengers with passenger luggage 138 scanned by system 100. The passenger information may include the first name, middle name or initial, last name and contact information of the passenger. For example, the contact information may also include the passenger's address. The passenger information may include private information (PII).

The components of system 100 may store a list of passengers for one or more lodging entities 126 local to the DP 107 so that passenger luggage 138 for passengers not intended to travel via the lodging entity 126 will not be commingled with the passenger luggage 138 for lodging entity 126. In one or more embodiments, the passenger information 428 may include passenger information associated with a pre-paid service with a third-party service provider, the first-mode travel carrier 104 or the lodging entity 126. In one or more embodiments, the files of passenger information 428 may include assigned cabin numbers for the passenger. Thus, the marker generator 412 may include program instructions, which when executed, to communicate with the passenger manifest record generator 414 to obtain information such as a cabin number and a passenger's name to format and populate fields of the marker printed by the marker generator 412.

The marker generator 412 may include program instructions, which when executed, cause printing of a passenger's name, a room number, a barcode of the IATA license plate of the originating hardcopy bag tag and/or the related 10-digit IATA license plate. The IATA license plate or the IATA barcode of the originating hardcopy bag tag may be used as a primary key to the luggage item's information for its own travel experience including its check-in for the return flight.

The return leg manifest generator 416 may include program instructions, which when executed, to extract the information of the PNR 112 that includes return leg travel information, including without limitation, the travel carrier of the return leg mode of travel, the departure time of the return leg mode of travel, a flight number, and/or an estimated number of luggage bags that need to be checked in for the return leg home. The return leg manifest generator 416 may include program instructions, which when executed, populate the return leg travel information into corresponding data fields of the manifest file.

DPI Data Record

FIG. 4B illustrates a block diagram of programming modules 400B for checking in a luggage item or a luggage item and passenger using digitized originating passenger information associated with a first-mode travel carrier on an originating hardcopy printed bag tag and generating a manifest for embarking on a leg of travel in accordance with an embodiment. The programming modules 400B may include program instructions, which when executed creates the DPI data record for the digital luggage item record.

FIGS. 4A and 4B are similar. Therefore, only the differences will be described in detail. The programming modules 400B may be on the computing device 122, the server 148 or a combination thereof.

The one or more programming modules 400B may include software, hardware, firmware, or a combination of software, hardware, and firmware. The computing device 122 and/or server 148 may include at least one processor and/or hardware to execute instructions of the programming modules 400B. One or more of the programming modules 400B related to the creation of the machine-encoded text from the image of the bag tag may be included in software, firmware, hardware or a combination thereof in the mobile communication device 15.

The programming modules 400B may include image data receiver 402A. The image data receiver 402A may include program instructions, which when executed cause receipt of an image of the originating hardcopy bag tag or a portion thereof or a printed instrument having at least a portion of the printed information from the originating hardcopy bag tag. The programming modules 400B may include a passenger/airline information parser 404B. In one or more embodiments, the passenger/airline information parser 404B may include program instructions, which when executed, optically recognize and convert the text characters in the image to searchable text sequences (i.e., machine-encoded text) to locate the travel carrier code and/or name by the travel carrier locator 420B. The travel carrier locator 420B may include program instructions, which when executed, access the airline code list database 432 to determine the available airline codes and the matched airline names. Alternately, if the airline name is found, the airline two-digit alphabetic code or the three-digit numerical code may be found as well to validate the airline carrier associated with the originating hardcopy bag tag. The travel carrier locator 420B may include program instructions, which when executed, find one airline code and validate with the finding of an airline name or another airline code at expected locations or in the license plate.

The passenger/airline information parser 404B may include program instructions, which when executed, cause the look-up of the BT layout in the BT layout database based on the located airline code and/or airline name. In one or more embodiments, the BT layout may indicate formats for the PNR number including whether a PNR indicator would be present. The BT layout may identify lines of text and the location of the lines and expected text on such lines. In one or more embodiments, the BT layout may identify text constraints, such as the presentation of the passenger's name with the last name followed by the first name and separated by a "/" (i.e., forward slash). These are just examples of layout possibilities as each airline can present certain information at their own discretion.

The passenger/airline information parser 404B may include program instructions, which when executed, optically recognize and convert the text characters in the image to searchable text sequences (i.e., machine-encoded text) to locate the passenger's name by the passenger name locator 421B.

The passenger/airline information parser 404B may include program instructions, which when executed, optically recognize and convert the text characters in the image to searchable text sequences (i.e., machine-encoded text) to locate the PNR number by the PNR number locator 422B.

The passenger/airline information parser 404B may include program instructions, which when executed, optically recognize and convert the text characters in the image to searchable text sequences (i.e., machine-encoded text) to locate the IATA license plate. Currently, the IATA license plate is 10-digits and may be expanded over time. From the IATA license plate, the travel carrier code may be determined, if necessary.

The programming modules 400B may include program instructions, which when executed cause a communications session generator 406 to communicate with at least one of the first-mode travel carrier 104 and/or the intermediate travel carrier 106. The communications session generator 406 may include a travel carrier Internet Protocol (IP) address look-up database 424 and PNR access instructions 426. The travel carrier ID of the license plate 210 may be used to locate the predetermined instructions to generate an electronic communication packet to a server of the first-mode travel carrier 104 and/or the intermediate travel carrier 106 associated with the travel carrier ID. The communications session generator 406 may include program instructions, which when executed, configured to also extract stored instructions for accessing the return leg information from the stored PNR access instructions 426 using a DPI data record. If the DPI data record does not include the PNR number from the originating hardcopy bag tag, then the license plate may be used to access the PNR number in a B-Type message, where the B-Type message includes the license plate as a linking index to a PNR number (locator). On the other hand, if the DPI data record includes the PNR number from the originating hardcopy bag tag and the airline name or airline code, the instruction for accessing the PNR 112 may be looked up without the need to use a B-Type message to obtain the PNR number.

The communication instructions may identify the information associated with tools (i.e., programming instructions) compatible with the transmission control protocol/internet protocol (TCP/IP), the file transfer protocol (FTS), the hypertext transfer protocol (HTTP), the hypertext transfer protocol secure (HTTPS), the secure socket layer (SSL), the secure file transfer protocol (SFTP), and the user datagram protocol (UDP).

In one or more embodiments, the programming modules of 400A and 400B overlap. This may occur in instances when certain data is no longer readable by scanning a barcode to access the luggage item data record in a luggage manifest but can be obtained by optical character recognition, for example. Programming modules 400A, 400B and 400C may be combined in one or more embodiments.

The manifest file includes a conduit for checking in the luggage items of the plurality of passengers with the designated return travel carriers. The conduit may include a graphical user interface to remotely check-in each passenger leaving the lodging entity within a designated window prior to a return flight. In one or more embodiments, the passenger manifest record may include the digital BTI data, the DPI data record and/or the data for check-in of luggage or a passenger for a return leg of travel with a designated return travel carrier for a return flight from the accessed PNR. The passenger manifest record may include other information such as the passenger's name and the airline code or airline name, for example. The passenger manifest record may include the DPI data record.

The manifest communicator 418 may include program instructions, which when executed, are configured to establish a communication session with the travel information system 128 associated with the lodging entity 126. The manifest communicator 418 may have different instructions for each travel information system 128 of a plurality of cruise ship carriers. The communication instructions may identify the information associated with tools (i.e., programming instructions) described herein.

As described in relation to FIG. 1A, certain data may be marked as "PENDING." However, once an IATA barcode is scanned associated with the license plate by an acquiring device or received by an RFID receiver/NFC receiver associated with or linked to system 100, the LIB 2450 may be activated for a registered luggage item.

Expanded B-Type Message (Off-Airport)

FIG. 4C illustrates a block diagram of programming modules 400C for checking in baggage of a passenger, generating a manifest for embarking on a leg of travel, and generating an expanded B-Type message in accordance with an embodiment. The programming modules 400C may be on the computing device 122, the server 148 or a combination thereof. Insofar as programming modules 400C are similar to programming modules 400A or 400B, some repeated discussion may be omitted.

The programming modules 400C may include a scanned O-BTI data receiver 402C and a license plate parser 404C. The scanned O-BTI data receiver 402C may include program instructions, which when executed cause receipt of 10 digits embedded in the captured barcode of first barcode flight identifier 206 or second barcode flight identifier 208. The license plate parser 404C may include program instructions, which when executed, parse the series of digits received from the scanner application 310. The license plate parser 404C may include program instructions, which when executed, track the digits to locate the travel carrier identification (ID) by the travel carrier ID locator 420C. The license plate parser 404C may include program instructions, which when executed, track the digits, such as the last six digits, to locate the bag number by the bag number locator 422C.

The license plate parser 404C may include program instructions, which when executed, extract the first digit of the converted barcode. In this instance, it is the number 7. This digit may be discarded. Then, the license plate parser 404C may include program instructions, which when executed, extract the next three digits, by the travel carrier ID locator 420C. In this case the next three digits include "001," which corresponds to the travel carrier ID. In this case, the travel carrier ID corresponds to American Airline®. The license plate parser 404C may include program instructions, which when executed, to then extract the next six digits, which include "509795" using the bag number locator 422C. These six digits correspond to the bag number for the passenger.

In one or more embodiments, the scanned O-BTI data receiver 402C may be bypassed in the event a printed BT 142 is not readable. In this instance, a user may directly enter the 10-digit license plate 210 which is then received by the license plate parser 404C to identify the travel carrier identification and the passenger's bag number.

The programming modules 400C may include program instructions, which when executed, cause a communications session generator 406 to communicate with at least one of the first-mode travel carrier 104 and/or the intermediate travel carrier 106. The communications session generator 406 may include a travel carrier Internet Protocol (IP) address look-up database 424 and PNR access instructions 426. The travel carrier ID of the license plate 210 may be used to locate the predetermined instructions to generate an electronic communication packet to a server of the first-mode travel carrier 104 and/or the intermediate travel carrier 106 associated with the travel carrier ID. The communications session generator 406 may include program instructions, which when executed, configure to also extract stored instructions for accessing the return leg information from the stored PNR access instructions 426 using a digitally created passenger's bag number extracted from the first barcode flight identifier 206 or second barcode flight identifier 208 associated with the license plate 210. The communication instructions may identify the information associated with tools (i.e., programming instructions) described herein.

In one or more embodiments, instructions may identify a link of the scanned license plate 210 to the Baggage Source Message (BSM) with passenger information, to locate and access the PNR 112 for the passenger and their return flight information. The link may be, without limitation, a HTTP compatible link, in one or more embodiments. Each airline may format their BSM or other B-Type message with additional fields of data. However, the B-Type message is compatible with the IATA B-Type codes.

During the communications session, the computing device 122 may execute programming instructions of a passenger travel return leg retriever 408, where the return leg is a traveled path or portion of a journeyed path to return home 102. For example, if the passenger is returning home using the same travel carrier as the original printed bag tag, the PNR 112 would include the return flight information. Otherwise, the return flight information may be marked as null by system 100.

The programming modules 400C may include program instructions, which when executed cause a passenger luggage recognition module 410 to recognize luggage items from at least one image of the luggage. The image data of the imaging device 118 or other camera-enabled device may be processed by machine learning software to generate an image of passenger luggage 138. This image may be stored in a database for a passenger luggage recognition process. In some instances, a passenger's luggage may need to be found or identified. The computing device 122 or server 148 may store an image of the passenger luggage 138 that can be later retrieved. Machine learning algorithms may then be used to recognize luggage and match a passenger with their luggage. one or more embodiments.

The computing device 122 or server 148 may use machine learning algorithms to identify whether a particular luggage item has been processed by one or more components of the system 100.

The programming modules 400C may include a marker generator 412. The marker generator 412 may include program instructions, which when executed, generate a barcode for use in the format of the MK 136 that can be printed by printing device 120 and affixed on the passenger luggage 138. As discussed previously, the MK 136 may be used when the original bag tag or airline marker are not available or unscannable, such as due to damage.

The marker generator 412, which when executed includes instructions for associating a unique identifier of a marker instrument for association with a luggage item without a bag tag or marker or a luggage item with a bag tag or marker without a passenger's name. The marker instrument may be a paper tag or an electronic tag that may be used on a temporary basis to associate a unique identifier to a luggage item. The intended operation of system 100 is to maintain the originating bag tag, marker, or bingo marker on the luggage item. However, these items made of paper may become damaged or missing. In this instance, the scan used to capture an IATA bag tag may be overridden to scan a replacement unique identifier to replace an absent IATA bag tag.

The LIB 2450 may be generated using this replacement or temporary unique identifier. In some instances, the unique identifier may be used in a vehicle of travel to create a LIB 2450 for the luggage item when the luggage item does not have any other legs of travel. The system within a lodging entity may use the unique identifier as a primary key.

The programming modules 400C may include a passenger manifest record generator 414, a return leg manifest generator 416, and manifest communicator 418. The passenger manifest created from the non-discarded originally printed bag tag may be used to reconcile passengers arriving at a lodging entity and determine room or cabin numbers. The non-discarded printed bag tag populated in the manifest is used to bring a passenger's baggage to their room and/or lodging entity, for example, without the need for generating a temporary valet tag. The non-discarded printed bag tag may be used also for departures of the passengers from the lodging entity to return home for example, without the need to print yet another temporary valet tag.

The passenger manifest record generator 414 may include program instructions, which when executed, store in one or more files of passenger information 428 and related PNR 112 for those passengers with passenger luggage 138 scanned by system 100. The passenger information may include the first name, middle name or initial, last name and contact information of the passenger. For example, the contact information may also include the passenger's address. The passenger information may include private information such as PII. However, the PII in a designated manifest may be secured and not shared. The IATA license plate, the passenger's name (optional) and the PNR number may be used as links to maintain the PII private.

The components of system 100 may store a list of passengers for one or more lodging entity 126 local to the destination point DP 107 so that passenger luggage 138 for passengers not intended to travel via the lodging entity 126 will not be commingled with passenger luggage 138 for lodging entity 126. In one or more embodiments, passenger information 428 may include information associated with a pre-paid service with a third-party service provider, the first-mode travel carriers 104 or the lodging entity 126. In one or more embodiments, passenger information 428 may include assigned cabin numbers for the passenger. Thus, the marker generator 412 may communicate with the passenger manifest record generator 414 to obtain information such as a cabin number and a passenger's name to format and populate fields of the marker printed by the marker generator 412.

The marker generator 412 may include program instructions, which when executed, cause generation of a marker that indicates whether the luggage item can bypass security screening for the next mode of travel. The instructions may also produce information about the next mode of travel such as the room number or cabin number and/or other luggage item delivery information. In an alternate embodiment, if the luggage item does not pass security screening process by the ISSS 2670, the MK 136 would indicate the failure of the screening and the need to send the luggage item to the next mode of travel security screening.

The return leg manifest generator 416 may include program instructions, which when executed, extract information of the PNR 112 that includes return leg travel information, including without limitation, the travel carrier of the return leg mode of travel, the departure time of the return leg mode of travel, a flight number, and/or an estimated number of luggage bags that need to be checked in for the return leg home. The return leg manifest generator 416 may include program instructions, which when executed, populate return leg travel information into corresponding data fields of the manifest file.

The manifest file may include a conduit for check-in of the baggage of a plurality of passengers with the designated return travel carrier. The conduit may include a graphical user interface to remotely check-in each luggage item of a passenger leaving the lodging entity within a designated window prior to a return flight. In one or more embodiments, the passenger manifest record includes the digital BTI data, the PNR number and the data for check-in the passenger or their luggage item for a return leg of travel with a designated return travel carrier.

In one or more embodiments, server 148 and server 2710 may include conduits to check-in luggage of the passenger with at least an airline carrier for a return flight.

The manifest communicator 418 may include program instructions, which when executed, are configured to establish a communication session with travel information system 128 associated with the lodging entity 126. The manifest communicator 418 may have different instructions for each travel information system 128 of a plurality of cruise ship carriers. The communication instructions may identify the information associated with tools (i.e., programming instructions) described herein.

Figure 14C:
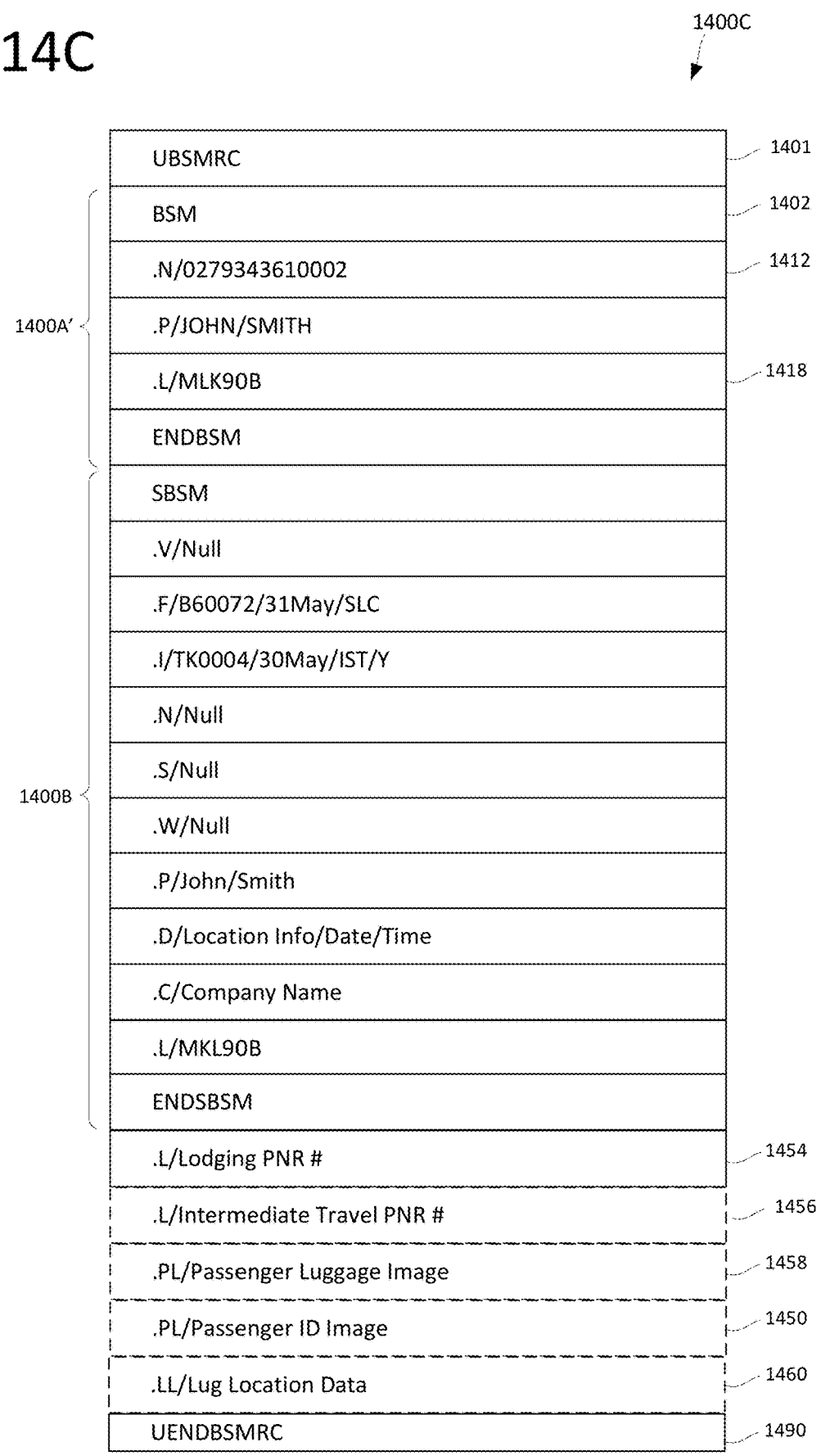
FIG. 14C illustrates an expanded (universal) B-Type message for multi-mode travel and lodging and recycling the originating bag tag in accordance with an embodiment.

The programming modules 400C may include an expanded B-Type message generator 430. An example expanded B-Type message is shown in FIG. 14C, as will be described in detail later. The programming modules 400C may include an originating IATA bag tag recycler 409A and return flight originating IATA bag tag recycler 409B. The return flight originating IATA bag tag recycler 409B may include program instructions, which when executed, are configured to initiate expansion of the B-Type message created for the return flight. The originating IATA bag tag recycler 409A may include program instructions, which when executed, are configured to initiate expansion of the B-Type message for the originating flight. Once the return flight check-in baggage process starts, for example, the recycling by the originating IATA bag recycler 409A needs to be terminated.

The programming modules 400 may include program instructions, which when executed, causes a simulated B-Type message generator 431 to generate a simulated B-Type message for a return flight as shown and described in relation to FIG. 14B or for an originating flight. According to one or more embodiments, the expanded B-Type message may include at least three data fields from the airline's B-Type message. The first field includes the field having the IATA bag tag number. The second field may include the passenger's name. The third field may include the PNR. These fields allow the return flight information to be obtained at any time using the originating IATA bag tag number including any updates. In one or more embodiments, if the IATA bag tag number is not available when the simulated B-Type message is generated, a temporary unique identifier is used in the field or line with the preface ".N/" used for the sequence of digits representative of the bag tag number. In the example of the originating flight, the field or line with the preface ".N/" may include a temporary unique identifier until an IATA bag tag number can be obtained from the DCS of the airline or the simulated DCS that creates an IATA bag tag number remote from the airline or airport infrastructure. In one or more embodiments, the simulated DCS may have its own IATA two character or digit code.

The simulated B-Type message or simulated BSM may be used as a placeholder to prepopulate the BSM or other B-Type message for checking in luggage item that assigns the IATA license plate number. The simulated BSM may be used to print a marker for a luggage item, as will be described in relation to FIG. 15. In one or more embodiments, a marker (i.e., MK) needs to be printed because the originating bag tag has been damaged or missing. A simulated BSM may be created to create a marker MK 136 (FIG. 1B) to be affixed to the luggage item in the event the luggage item has no bag tag associated with it, such as may be required for a new luggage item.

Programming modules 400A and 400B may also have program instructions, which when executed, cause a simulated B-Type message generator 431 to generate a simulated B-Type message for a return flight as shown and described in relation to FIG. 14B or for an originating flight.

The programming modules 400C may include program instructions, which when executed, cause a multi-mode reservation synchronizer 433 to synchronize reservations of a travel journey for a luggage item or the passenger and their luggage item. Each passenger's journey to a lodging entity such as a resort or cruise ship may include air travel and other modes of travel selected from bus travel carriers, train travel carriers, additional air travel carriers, and ferry travel carriers. Ferries may include lodging accommodations to travel from one port to another port. These ports may be in different countries. This type of travel is different from a cruise where the passenger leaves from and returns to the same port.

The passenger's journey may include multi-mode reservations with multiple lodging entity stays across multiple states or multiple countries. The original bag tag number from a printed airline license plate and/or associated RF unique code representative of the original bag tag number linked to the luggage item may be used as a primary key for logging and tracking all travel reservations and updates thereto accessible through a recycled non-discarded machine-readable bag tag.

System 2700 may include a universal travel passenger itinerary 2714. The stored data of the universal travel passenger itinerary 2714 may change before embarking on the first leg of travel, after embarking on the first leg of travel and arriving at the destination point, or before embarking on any leg of travel on a return path to journey home. The systems 100, 2700 and/or 3100 may synchronize travel modes by updating the reservation's information data with updates in the universal travel passenger itinerary 2714 and communicating the updates to the passenger.

In one or more embodiments, prior to the start of a leg of travel, the server 148 or 2710 may contact any of the reservation systems associated with the universal travel passenger itinerary 2714 to obtain any changes to flight information, bus information, train information or lodging information. The expanded B-Type message may be updated.

The programming modules 400C may include program instructions, which when executed, cause a baggage tracker 434 to track locations of a luggage item. The original IATA bag tag is used as a recycled machine-readable tag that stays on the luggage item without the need for any other tag on the luggage item unless the original IATA bag tag is damaged or missing until the passenger disembarks from a lodging entity and departs for a return path home, for example. When the recycled unique identifier of the non-discarded machine-readable bag tag is acquired such as by scanning or via a RF communication device, a location code or geotag may be appended to the generated communication stream of the image data and logged with the data. This allows the locations that the luggage item has moved through to be tracked by the acquiring devices.

Recycling of IATA Bag Tag for Off-Airport Use

The LIB 2450 and the expanded B-Type message described herein are examples of mechanisms to provide an electronic brain to a luggage item that is linked to a passenger. The expanded B-Type message provides an example coding scheme. Although airlines allow luggage items to be checked in for an air flight at off-airport locations (i.e., cruise ship and train station) using a remote check-in procedure, the inventor has determined that an originating printed bag tag, such as after a flight, can be used as a marker and conduit to allow luggage to be checked in for a return flight check-in. The remote check-in process at off-airport locations requires robust workstations and printers. These printers that are capable of printing IATA bag tags at off-airport locations are very costly and can be overloaded at times. The inventor has determined that recycling the originating IATA printed bag tag and related unique identifier to access return flight information such as within a regulated check-in window and printing the return flight bag tag at a designated printing location remote from a cruise ship, expedites the baggage check-in process and eliminates the need for a valet tag.

By way of a non-limiting example, the passenger's luggage leaving a cruise ship needs to be processed in 24 or 48 hours. This can require printing boarding passes, valet tags and bag tags or any combination thereof. However, the cruise ship can have thousands of passengers each with multiple luggage items. One attempt to solve this logistical challenge was a "Detachable, Single Page Printable Boarding Pass And Tag Identifier Document" shown in US Design Pat. No, D862590, issued Oct. 8, 2019. This document allowed the boarding pass and bag tags to be printed on a single document. The document had perforations to remove and an adhesive to affix the bag tags to the luggage item. However, such an advancement to save human resources, paper resources, and other processing infrastructure was still insufficient to process thousands of passengers disembarking a cruise ship or other high-volume resorts much less address delays due to equipment malfunctions or other computer technology glitches caused by wireless communication interruptions, inclement weather conditions, and more. Moreover, printing hag tags on cruise ships still required real estate on a ship, for example, which can otherwise be used for other revenue.

In one or more embodiments, a passenger may travel on a different path from their luggage item(s) during part of their journey. Current processes do not provide seamless baggage identification through your travel experience. This can lead to cumbersome and costly travel experiences for all concerned parties in the travel and destination network. For example, this can cause lost or delayed arrival of luggage or a reduction in seamless travel experience for the baggage due to changes in an itinerary. Delayed arrival to a departing cruise ship or loss of luggage on a trip can be devastating to the passenger.

The inventor has determined the originating printed bag tag affixed to the luggage item, should remain on the luggage item, and be recycled until the luggage item is checked in for the return flight. This preserves the originating IATA bag tag number on an already printed machine-readable instrument that is tied to a verified passenger's identity.

Before the passenger lands from their originating flight, system 100 or 2700 may initiate a recycling process to recycle the originating IATA bag tag number to a universal bag tag unique identifier for use outside of the airport infrastructure. The transition to the universal bag tag unique identifier is seamless and may be used at off-airport locations from the moment baggage of the passenger is off-loaded from an airplane of the first-mode travel carrier or the intermediate travel carrier and leaves the custody of the airport infrastructure without the need for the passenger to be present.

The (recycled) originating IATA bag tag number may be acquired at an off-airport location by an acquiring device to create a digital data record for use as a primary key or unique identifier and to log the location and time stamp of any mode of travel of the baggage or location along a journey. This may trigger an update in information to locate the luggage item without the need for the passenger to be present. The acquiring device (i.e., scanning device, mobile communication device, video-enabled computing device, RF communication device) may provide a geolocation code with a communication with the image data acquired by the acquiring device or a RF communication from a RF communication device.

The programming modules 400C may include program instructions, which when executed, cause a lodging coordinator 436 to determine whether any changes are made to a lodging reservation such as a room or cabin number and to notify the passenger or bag handler of any reservation changes prior to dropping off the luggage. In one or more embodiments, the room or cabin number may not be cleaned/ready. Once the room or cabin number is ready, the expanded B-Type message is updated with the current status. The lodging coordinator 436 may include program instructions, which when executed, are configured to communicate with or receive communications from the smart baggage travel system 2700. By way of a non-limiting example, the expanded B-Type message may be expanded by links to the reservation data of a passenger's itinerary.

The programming modules 400C may include a smart baggage travel communicator 438. When information associated with the expanded B-Type message changes, the smart baggage travel communicator 438 may include program instructions, which when executed, are configured to communicate any updated information to a computing device of one of a baggage handler and passenger. The computing device may be a mobile communication device or an acquiring device. The details of the communications will become more evident in the description below. The communication instructions may identify the information associated with tools (i.e., programming instructions) described herein. The smart baggage travel communicator 438 may communicate with the smart baggage travel system 2700 of FIG. 27, described later. The communication instructions may identify the information associated with tools (i.e., programming instructions) compatible with transmission control protocol/internet protocol (TCP/IP), file transfer protocol (FTS), hypertext transfer protocol (HTTP), hypertext transfer protocol secure (HTTPS), secure socket layer (SSL), secure file transfer protocol (SFTP), and user datagram protocol (UDP).

The methods described herein below depict a particular sequence of operations. The sequence may be altered without departing from the scope of the present disclosure. For example, some of the operations depicted may be performed in parallel or in a different sequence that does not materially affect the function of the methods. In other examples, different components of an example device or system that implements the methods may perform functions at substantially the same time or in a specific sequence.

FIG. 5 illustrates a method 500 for checking in a luggage item, a passenger or a passenger and a luggage item in accordance with an embodiment. In one or more embodiments, a passenger may be required to be checked in first followed by the luggage item. In one or more embodiments, the passenger can be required to be checked in first with a boarding pass printed or received at a personal computing device (i.e., mobile computing device) and then followed by checking in the luggage item. The DCS or other designated system may provide sequence numbers that are used to trigger each step of a check-in process.

The method 500 may include, at block 501, generating a passenger manifest record using a PNR number to access a passenger's PNR. An example process to perform this function is described in FIG. 10A. In one or more embodiments, FIG. 10B may be performed, at block 501.

The method 500 creates a digital license plate number from a printed BT for use in obtaining return flight information, for example. In one or more embodiments, method 500 begins after completion of a leg of travel of a passenger that has arrived at the DP 107.

Figure 10A:
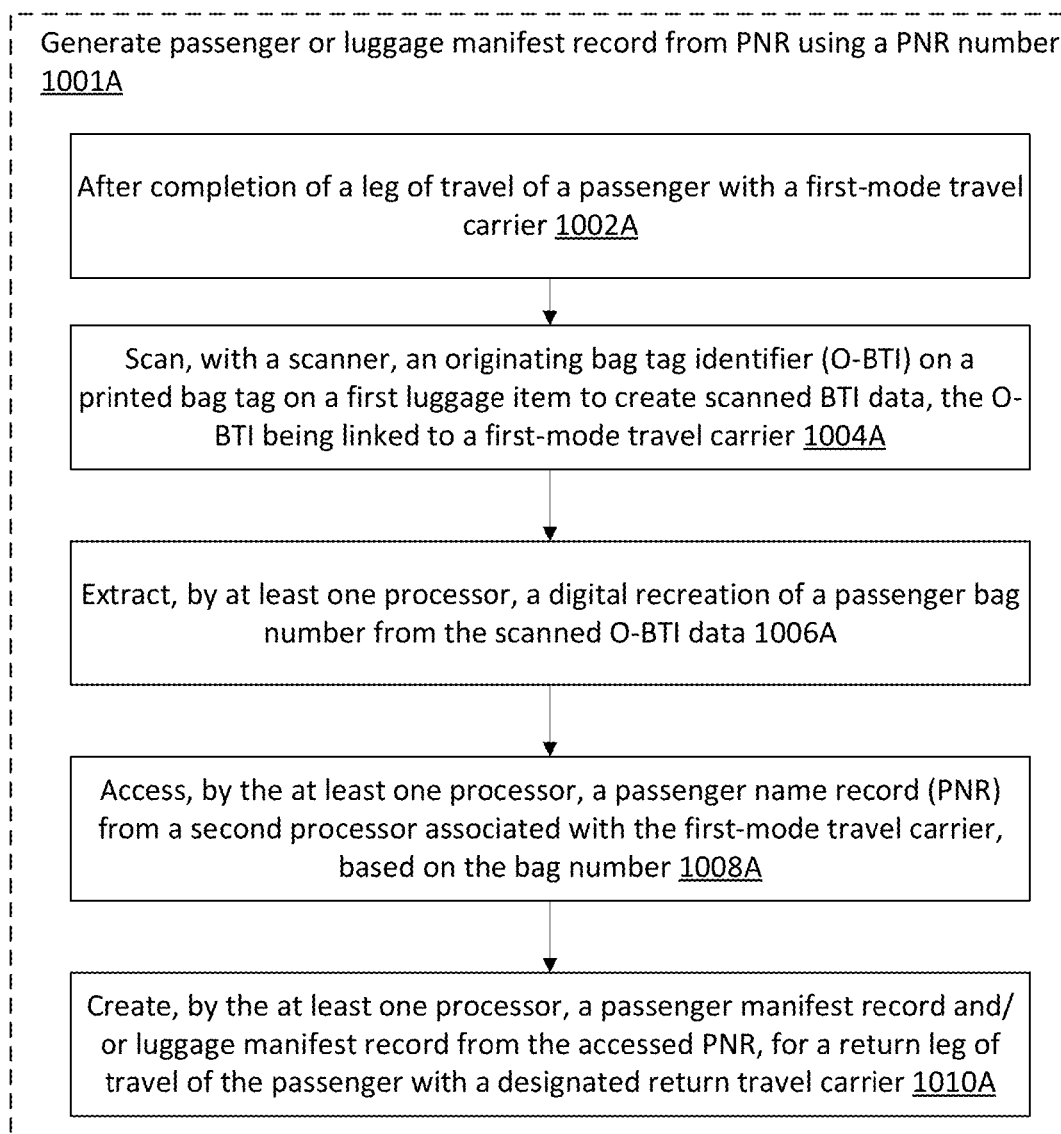
FIG. 10A illustrates a flowchart of a method for generating return flight information from a passenger name record (PNR) using a PNR number captured from scanned data in accordance with an embodiment.

FIG. 10A illustrates a flowchart of a method 1001A for generating return flight information from a PNR using a PNR number captured from scanned data in accordance with an embodiment, such as obtained in FIG. 1A. With reference to FIG. 10A, in block 1002A, method 1001A begins after completion of a leg of travel of a passenger with a first-mode travel carrier. In block 1004A, the method 1001A includes acquiring an originating bag tag identifier, such as the 10-digit license plate, for example. The process of acquiring the originating bag tag identifier may include scanning, with a scanner, an originating bag tag identifier (O-BTI) on a printed bag tag of a first luggage item to create scanned or digital BTI data, the printed O-BTI being linked to a first-mode travel carrier. By way of a non-limiting example, the scanner may be a barcode scanner.

In some instances, the acquiring of the originating bag tag identifier may include receiving an RFID signal including information representative of the originating bag tag identifier. In other embodiments, acquiring the 10-digit license plate may include scanning an airline marker with adhesive backing which may be on or attached to the baggage. In some cases, the airline marker with adhesive backing is part of the original boarding pass received from the airline attendant at the time of check-in for an original flight.

In summary, assume that the first-mode travel carrier is an airline carrier. Then the electronic acquiring, by at least one electronic acquiring device, may include at least one of: i) scanning, by a barcode scanner, the OP-BTI on a printed paper bag tag from the airline carrier that is attached to the first luggage item of the passenger; ii) scanning, by the barcode scanner, the OP-BTI on a printed marker from the airline that is attached to the first luggage item; iii) reading or acquiring, by a RFID reader, RFID information associated with the OP-BTI and iv) receiving, by a radio-frequency communication, radio communications that include the OP-BTI.

In block 1006A, the method 1001A may include extracting, by at least one processor, a luggage item's IATA license plate from the scanned O-BTI data. The block 1006A may include extracting a travel carrier code from the scanned or digital BTI data. In one or more embodiments, the block 1006A may include, extracting the printed text by optically recognizing the printed text and converting the text into a searchable text format to search for and locate the printed passenger information and create a DPI data record therefrom.

In block 1008A, the method 1001A may include accessing, by the at least one processor, a passenger name record (PNR) from a second processor associated with the first-mode travel carrier, based on the digitally created O-BTI or the digitally created 10-digit license plate of the passenger's luggage item.

In block 1010A, method 1001A may include autonomously creating, by the at least one processor, a luggage item manifest record or a passenger manifest record from the accessed PNR 112, for a return leg of travel of the luggage item or passenger and luggage item with a designated return airline travel carrier. The passenger manifest record may include the digital BTI data and the PNR, with the data to check-in the passenger or their luggage item for a return leg of travel with a designated return travel carrier. The passenger manifest record may be populated with travel carrier codes embedded in scanned O-BTI or the accessed PNR 112. The passenger manifest record may be associated with digital BTI data with the passenger for tracking and handling of the luggage items of the passenger before and after the passenger's stay with a high-volume lodging entity. For example, a high-volume lodging entity may be located on a Disney™ property or other resort destination with lodging accommodations.

The passenger manifest record may have different information than the luggage item manifest record. For example, in an embodiment, if a passenger is going on a cruise ship but arrives a day earlier and has a rental car. In this scenario, the passenger may arrive at a hotel for one night without the need for their checked in luggage item. The luggage item manifest may not require information about the rental car. Furthermore, the luggage item may travel independently from the passenger and skip travel to the hotel and go directly to the cruise ship.

In block 512, the method 500 may include repeating block 501 for a plurality of luggage items and/or passengers embarking on a leg of travel with a lodging entity.

The method 500 may include setting the originating hardcopy bag tag identifier (OP-BTI) as luggage item primary key (i.e., 10-digit license plate) for luggage item handling and tracking, at block 514.

The method 500 may include creating a simulated Baggage Source Message (BSM) that is populated with the a digital BTI data record and/or machine-encoded text from the originated hardcopy bag tag for each passenger of the plurality of passengers added to the manifest, at block 516. Block 516 may be performed when the luggage item and/or passenger cannot be checked in for the return flight. For example, a passenger may disembark a cruise ship and stay at a nearby lodging entity. The system 100 may create a simulated BSM as a place holder for checking in the luggage item and/or passenger for their return flight within the regulation check-in window.

The method 500 may include electronically acquiring, by at least one electronic acquiring device, an originating hardcopy bag tag identifier (OP-BTI) associated with or printed on the originating hardcopy bag tag from the airline travel carrier that is on the luggage item of the passenger to create the digital BTI data record within a check-in window to check-in the luggage item or passenger and luggage item, at block 518. In one or more embodiments, the simulated BSM may be accessed to retrieve information.

In other embodiments, a designated button in a GUI or a key on a keyboard may be used as a trigger. The OP-BTI acquired, at block 518, may be on the MK 136, as described in FIG. 15. The OP-BTI may be on a printed instrument, such as marker 212. The OP-BTI may be associated with an RFID or NFC device.

In block 520, the method 500 may include executing a check-in process for the return leg with the designated return travel carrier of each passenger using a graphical user interface (GUI) populated with information from the passenger manifest record and associated with the acquired OP-BTI.

The block 501 may be repeated for each luggage item of a passenger of a plurality of passengers beginning a stay associated with a lodging entity to autonomously form a luggage manifest file with a conduit for check-in the plurality of luggage items with the designated return travel carrier or passenger manifest file with a conduit for check-in the plurality of passengers with the designated return travel carrier.

In one or more embodiments, the method 1001A may include populating, by the at least one processor, a manifest file with each created passenger manifest record or luggage item manifest record for the lodging entity.

The block 1008A of the method 1001A may include identifying a travel carrier from the scanned O-BTI data and identifying stored communication session procedures to communicate with the travel carrier based on the scanned or digital O-BTI data. The stored communication session procedures may identify a communication protocol for accessing, by the at least one processor, a passenger name record (PNR) from a remote second processor (i.e., travel information system 108 or 110) associated with the travel carrier over a communication network, using communication formats described herein.

The process for executing the check-in process of block 520, for the return leg with the designated return travel carrier, may also use stored communication instructions to control a remote second processor to check in a passenger for the passenger's return leg of travel back home, for example, within a predetermined check-in window. The executed check-in process may be for the luggage item, the passenger or both the luggage item and the passenger. For example, a passenger may check themselves online using standard processes designated by the airline travel carrier and airline industry. Therefore, the system 100 may only need to check-in the luggage item for the return flight. However, if the passenger does not check themselves in before system 100 is ready to check in the luggage item for the return flight, then system 100 may check both the passenger and the luggage item in for the return flight.

For example, the passenger can check-in themselves in with an airline carrier or other entity for the return leg flight using a computing device or mobile communication device, such as, a smartphone, tablet, notebook, and laptop. The passenger check-in may be completely independent from the baggage check-in process. In one or more embodiments, the passenger may be checked in by a computing system of lodging entity that communicates with the return flight airline carrier, for example.

Figure 10B:
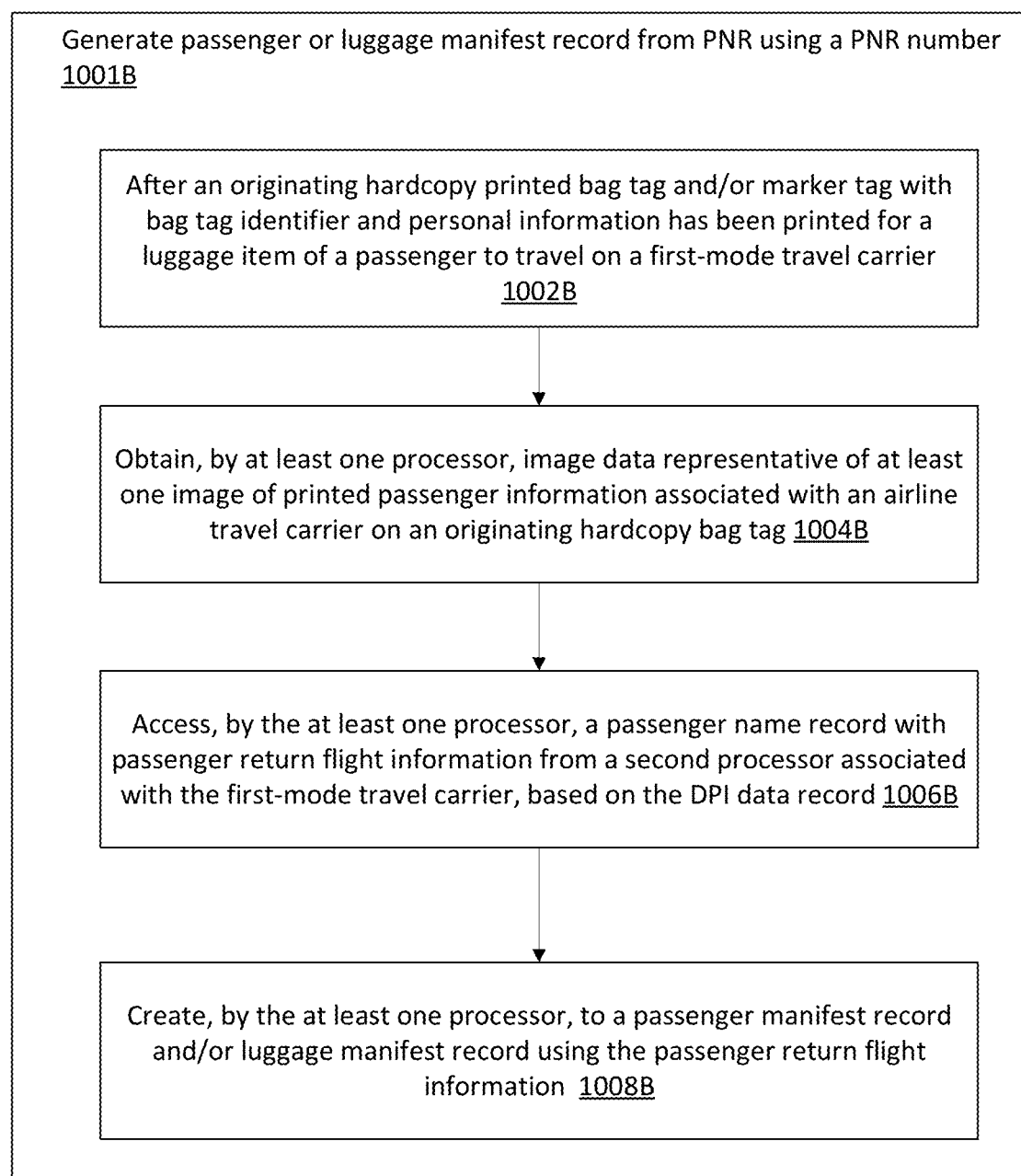
FIG. 10B illustrates a flowchart of a method for generating return flight information from a PNR using a PNR number captured from imaged data in accordance with an embodiment.

FIG. 10B illustrates a flowchart of a method 1001B for generating return flight information from a PNR using a PNR number captured from image data in accordance with an embodiment. According to an example, the method 1001B can be performed, at block 501, in method 500. At block 1002B, method 1001B can begin after printing of an originating hardcopy bag tag associated with a first-mode (originating) travel carrier, such as an airline carrier, for a checked in luggage item of a passenger. The image may be captured anytime. Alternately, the image may be of a printed instrument having at least a portion of the passenger/airline information on the originating hardcopy bag tag.

It should be understood that the methods described herein can be performed for any travel carrier that will produce a hardcopy bag tag and structured numerical sequencing for identification of the bag tag attached to a luggage item.

In block 1004B, the method 1001B may include electronically receiving, by at least one processor, image data representative of at least one image of printed passenger information associated with an airline travel carrier on an originating hardcopy bag tag or a printed instrument having at least a portion of the passenger information on the originating hardcopy bag tag to create digital passenger information (DPI) data record linked to the airline travel carrier. The originating hardcopy bag tag may be issued for a checked-in luggage item of a passenger by an originating airline travel carrier.

The method 1001B may include accessing, by the at least one processor, passenger return flight information from a computer system associated with the airline travel carrier, based on the DPI data record, at block 1006B.

Figure 6:
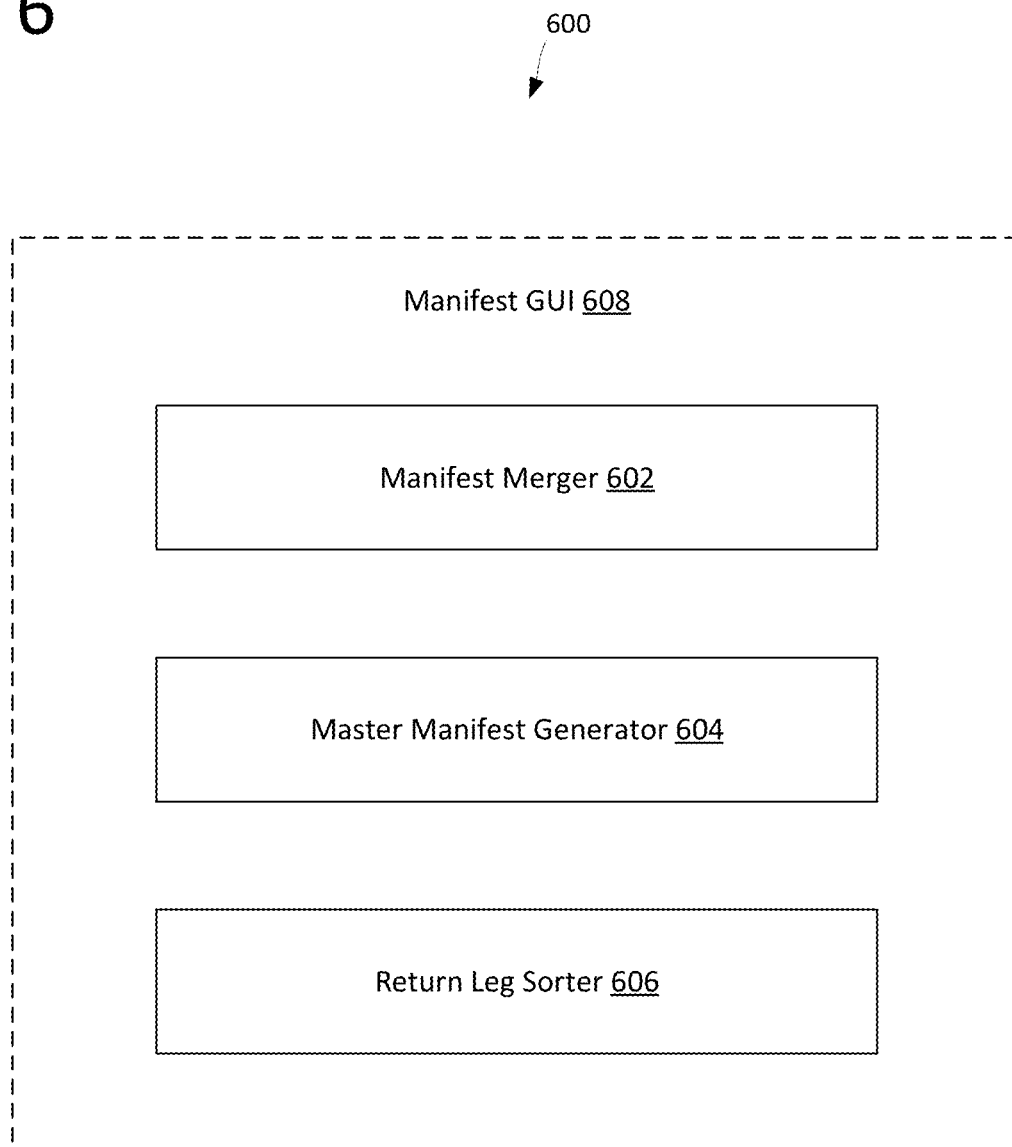
FIG. 6 illustrates a block diagram of programming modules for generating a master manifest in accordance with an embodiment.

FIG. 6 illustrates a block diagram of programming modules 600 for generating a master manifest in accordance with an embodiment. The programming modules 600 may communicate with a plurality of computing devices having programming modules 400A (or, alternatively, programming modules 400') being executed thereon. The programming modules 600 may be stored by a computing device associated with the travel information system 128 or other travel management system. In one or more embodiments, one or more of the programming modules 600 may be stored on server 148.

In one or more embodiments, the server 148 and travel information system 128 may be integrated into the same computing system. In other embodiments, the server 148 may be integrated into travel information system 108 or 110.

The programming modules 600 may include manifest merger 602, master manifest generator 604, and return leg sorter 606. The one or more programming modules 400A, 400B (or, alternatively, 400C) may include software, hardware, firmware, or a combination of software, hardware, and firmware. The computing device associated with the travel information system 128 may include at least one processor and/or hardware to execute instructions of the one or more programming modules 600.

The programming module 600 may include a manifest graphical user interface (GUI) 608 that may include program instructions, which when executed cause a manifest merger 602 to merge passenger manifest files from a plurality of computing devices 122, servers 148 or systems 100 for a current voyage. For example, the computing device associated with the travel information system 128 may be in communications with a plurality of systems 100 and each system 100 may have a plurality of computing devices 122. The passenger manifest files include a plurality of passenger manifest records created by the passenger manifest record generator 414 and return leg manifest generator 416 populated with information accessed from the PNR 112. The passenger manifest record generator 414 may be used to create the luggage manifest (FIG. 1A or 1D) that is linked to the passenger manifest. The luggage manifest may include the return leg information for the return flight with a designated return airline travel carrier or another mode of travel and any designated governmental screening locations for entering into a country or exiting a country before a next mode of travel.

It should be understood from the disclosure herein that there may be a plurality of local destination points, each serviced by a different system 100. For example, the DP 107 may be at a local train station that is local to the port of the lodging entity 126. The DP 107 may be at a local bus station that is local to the port of the lodging entity 126. The DP 107 may be at each local airport that is local to the port of the lodging entity 126. The term "local" means a travel distance of less than 5-20 miles, 20-50 miles, or 51-100 miles to the lodging entity 126, for example. For example, a lodging entity may be docked at a port in a state with multiple airports, multiple train stations, multiple bus stations, etc. any of which may be used by a passenger to arrive as close as possible to the port based on their own point of origination and travel costs.

The manifest GUI 608 may interface with a master manifest generator 604 and return leg sorter 606. The master manifest generator 604 may include program instructions, which when executed, merge those files received from the one or more systems 100 and a manifest of booked passengers stored by the travel information system 128 into a master manifest file populated with the information derived from a digitized O-BTI or the DPI data record. The master manifest file is populated with accessed information of the PNR 112 related to the return leg of travel for those passengers with their BT 142 scanned or imaged and processed by system 100.

For example, at a cruise ship port, some passengers arrive the same day as embarkation of the cruise ship. In other examples, passengers may arrive one or more days prior to embarkation. Still further, the passenger's PNR 112 embarking on the same cruise voyage may be merged into a master manifest file. By way of a non-limiting example, a third-party service provider may manage the luggage for a plurality of cruise ships at a port.

Each cruise ship will have its own master manifest file. The populated manifest passenger record based on information in the PNR 112 may be displayed on a display device using the manifest GUI 608. The manifest GUI 608 is a computer program that enables a user to see the passenger information records and their return leg flight information, for example. The passenger record may also include a passenger's cabin number on the current voyage. The return leg flight information may include without limitation, one or more of the travel carrier information, travel carrier geolocation, the flight number, flight departure time, and flight arrival time. The manifest GUI 608 may display information used to create the DPI data record.

The master manifest generator 604 may include program instructions, which when executed, cause display of the generated master manifest file using the manifest GUI 608 on a display device. The manifest GUI 608 may also include program instructions, which when executed, cause a return leg sorter 606 to enable personnel to sort the manifest by data associated a return flight or return leg mode of travel that meets a check-in window for a return leg of travel.

While not wishing to be bound by theory, accessing data of PNR 112 based on a digital recreation of a 10-digit license plate or the PNR number on the bag tag to automate a process to populate a manifest and/or check-in of a passenger (or their baggage) for their return leg of travel using the accessed data saves valuable human resources of the cruise ship and resources of a return travel carrier.

Passenger's itinerary for disembarking on a cruise ship (i.e., lodging entity) may vary. Some passengers may want to explore the state, city or town of the cruise ship dock, and arrive days early before disembarking.

In one or more embodiments, the system 100 via server 148, for example, may begin to receive or capture terminating B-Type messages indicative of the termination of a passenger's luggage item being handled for a current leg of travel, such as when the first-mode of travel with an airline travel carrier from a computer system associated with the airline travel carrier or a baggage handling system issuing the B-Type message. In other embodiments, the system 100 via server 148 may access these terminating B-Type messages stored in a computer system associated with the airline travel carrier or a baggage handling system issuing the B-Type message.

The server 148 may sort the terminating B-Type messages and match a passenger's name in the B-Type message with a passenger's name in the manifest file.

The processor(s) may sort a master manifest file with information associated with the passenger manifest record using a manifest GUI 608 by the return leg flight times or other indicated times. The processor(s) may perform a check-in process for the return leg with the designated return travel carrier of each passenger based on the sorted master manifest file. In one or more embodiments, the master manifest file is for a resort destination that can include at least one hotel.

In one or more embodiments, the data for baggage check-in of the return leg of travel may include at least return leg flight times, an airline carrier and a PNR number. The methods herein may include sorting, by the at least one processor, the master manifest file with information associated with the return leg flight times for the plurality of passengers; and executing, by the at least one processor, a remote check-in process for baggage for the return leg of travel with the designated return travel carrier for each passenger based on the sorted master manifest file.

Computer Hardware

Referring now to FIG. 7, in a basic configuration, a computing device 700 (i.e., computing device 122 or local computing device) may include any type of stationary computing device, server 148, personal computer (PC) or a mobile computing device.

The computing device 700 may include one or more processing devices 706 and system memory in a hard drive. Depending on the exact configuration and type of computing device 700, system memory may be volatile (such as RAM 702), non-volatile (such as read only memory (ROM 704), flash memory, and the like) or some combination of the two. A system memory may store an operating system, and one or more applications 724 and may include program data for performing at least one of the programming modules 149, described above in relation to FIGS. 1A and 1D, 400A-400B (and 400C), described above in relation to FIGS. 4A-4C, programming modules 600, described above in relation to FIG. 6, programming modules 2000, described above in relation to FIG. 20, and programming modules 2400, described in relation to FIG. 24.

Figure 8A:
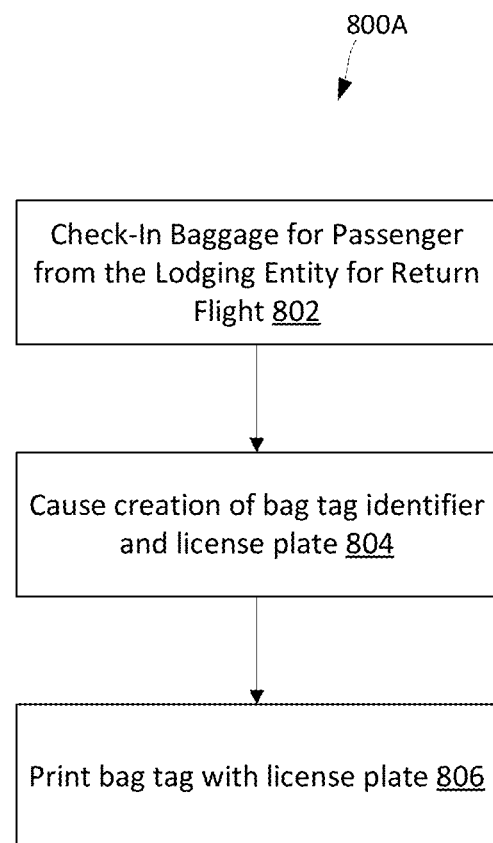
FIG. 8A illustrates a flowchart of a method for checking in baggage of a passenger leaving a lodging entity in accordance with an embodiment.
Figure 8B:
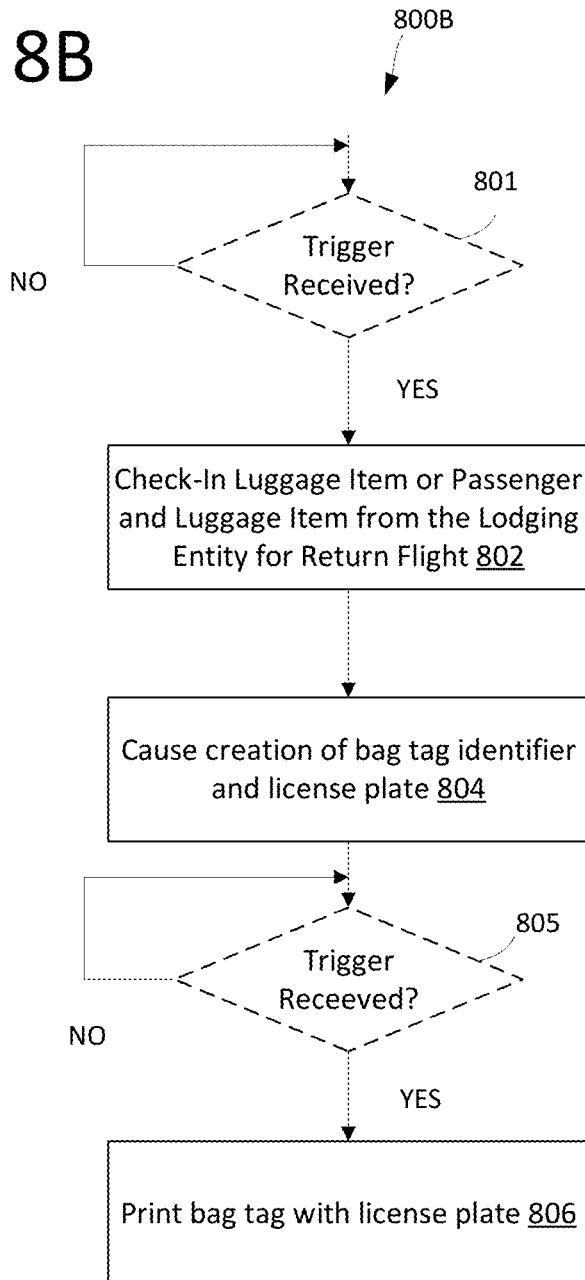
FIG. 8B illustrates a flowchart of a method for checking in a luggage item or a luggage item and passenger leaving a lodging entity in accordance with an embodiment.
Figure 12A:
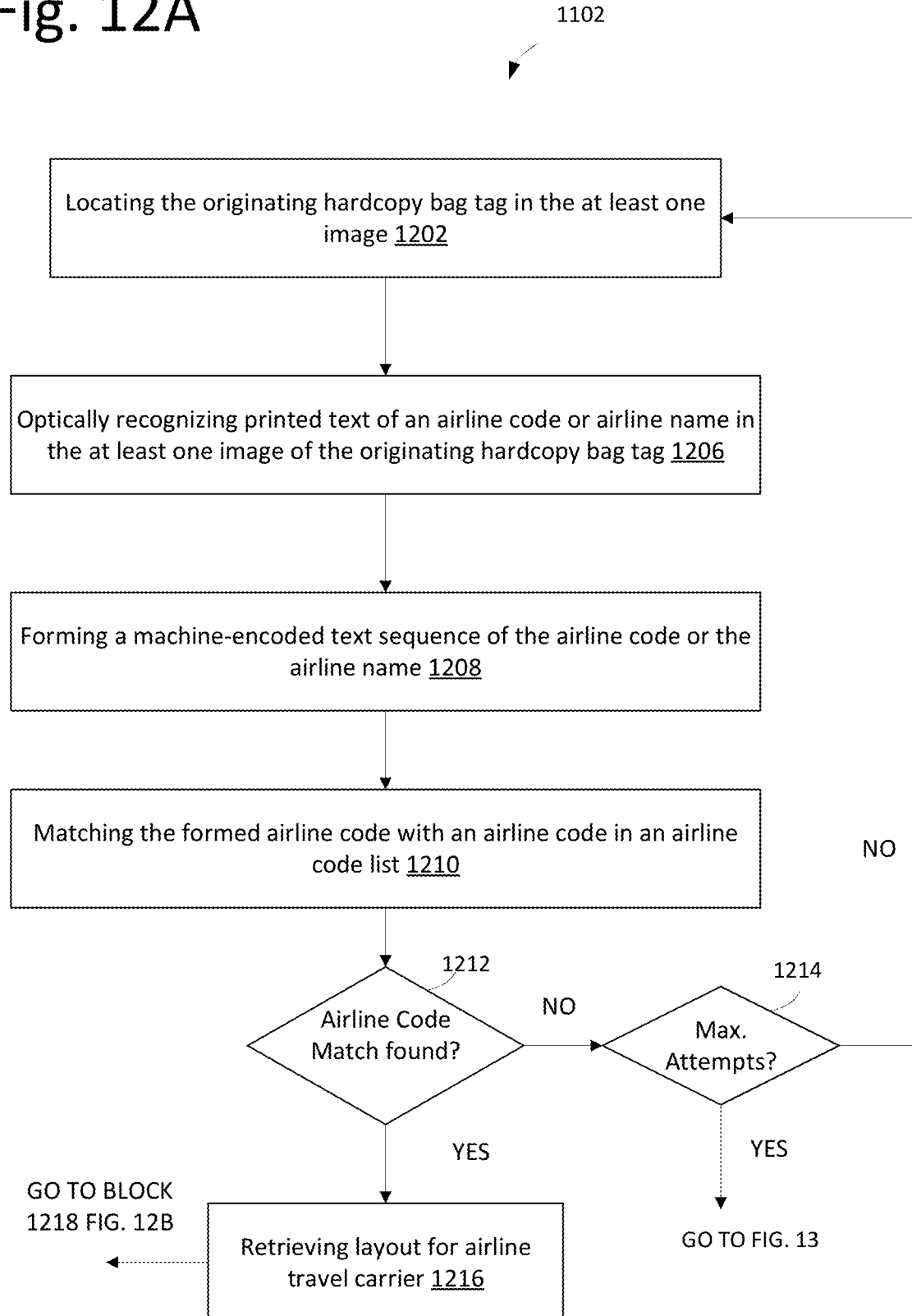
FIGS. 12A-12C illustrate a flowchart of a method of performing image processing of the image data associated with the originating hardcopy bag tag or printed instrument in accordance with an embodiment.
Figure 12B:
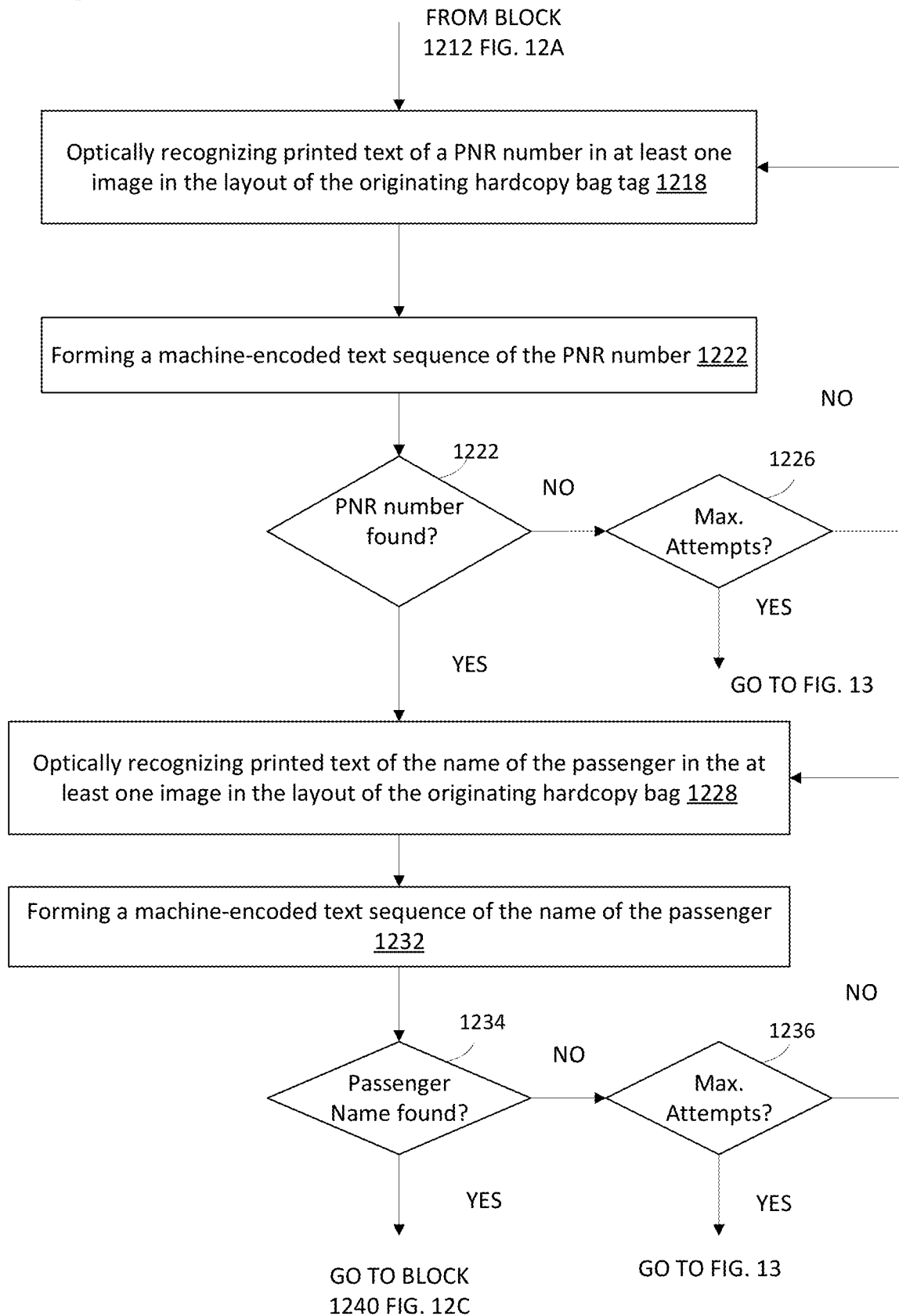
Figure 12C:
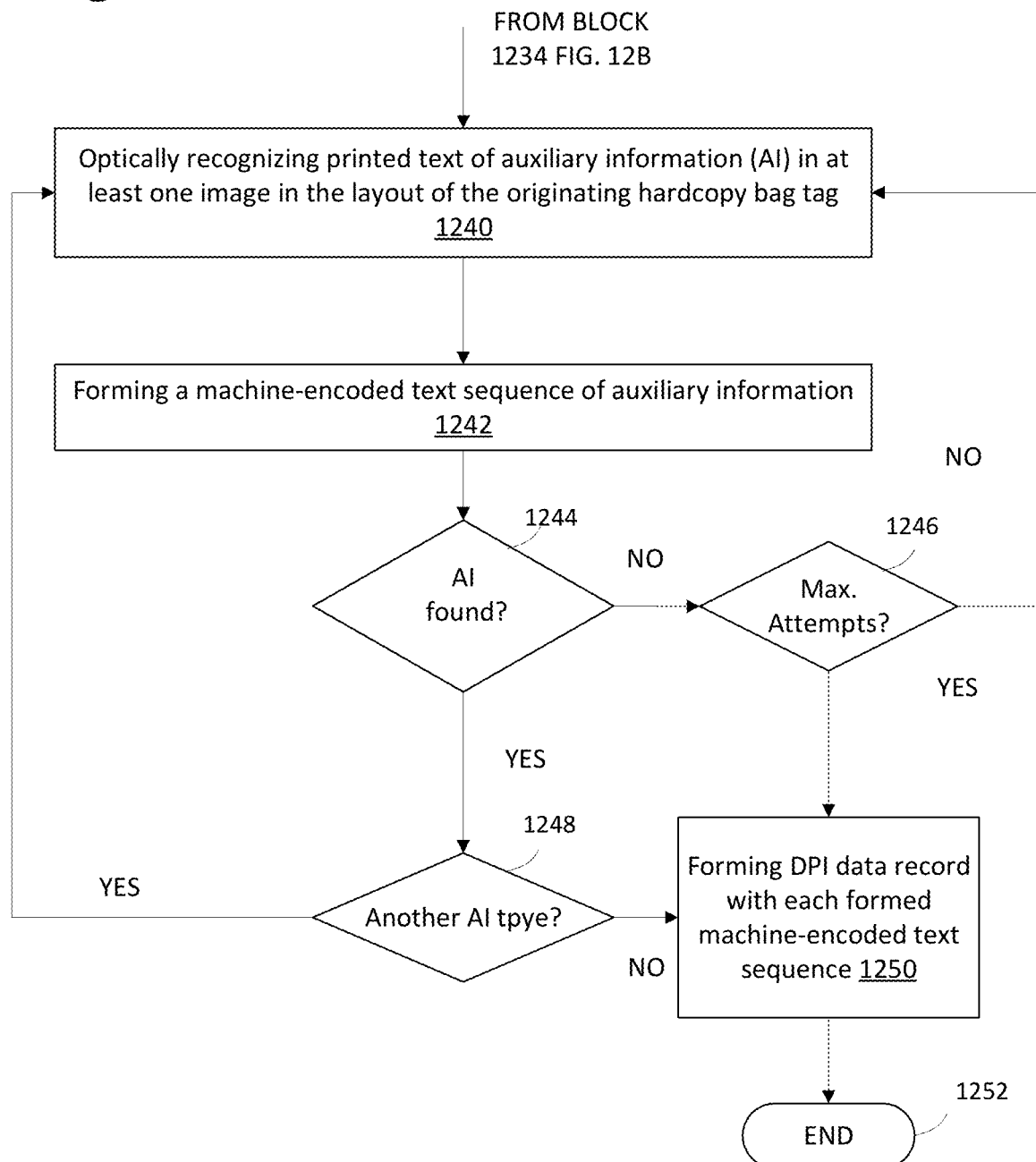
Figure 13:
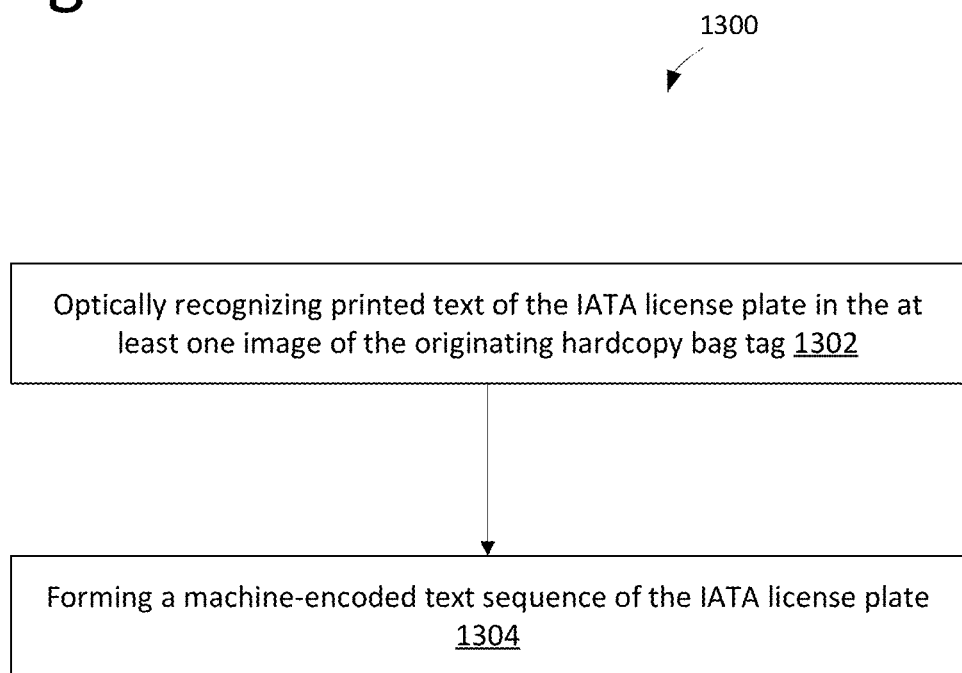
FIG. 13 illustrates a flowchart of a method for forming a machine-encoded text sequence of the IATA license plate in accordance with an embodiment.

The computing device 700 may carry out one or more blocks of a method 500 in FIG. 5, method, method 800A and 800B in FIGS. 8A-8B, methods 900A, 900B, 900C, and 900D in FIGS. 9A-9D, method 1001A or 1001B, in FIG. 10A or 10B, method 1100 in FIG. 11, method 1102 in FIGS. 12A-12C, and method 1300 in FIG. 13, described herein, via applications 724. The computing device 700 may carry out one or more blocks of a method 1800 in FIGS. 18A-18B, method 1900 in FIG. 19, method 2200 in FIG. 22, method 2300 in FIG. 23 and methods 2600A and 2600B in FIGS. 26A-26B, method 2800 in FIG. 28, method 3300 in FIG. 33, method 3302 in FIG. 34, and method 3500 in FIG. 35 via applications 724. The computing device 700 may also have additional features or functionality. As a non-limiting example, the computing device 700 may also include additional data storage media devices 708 (removable and/or non-removable) such as, for example, magnetic disks, optical disks, or tape. The computer storage media devices 708 may include volatile and non-volatile, non-transitory, removable, and non-removable media implemented in any method or technology for storage of data, such as computer readable instructions, data structures, program modules or other data. The system memory, removable storage and non-removable storage are all non-limiting examples of computer storage media. The computer storage media may include, but is not limited to, RAM 702, ROM 704, Electrically Erasable Programmable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device 700. Any such computer storage media may be part of the device.

The computing device 700 may also include or have input/output (I/O) interfaces 712 for input modules 714 such as a keyboard, mouse, pen, voice input device, touch input device, etc. Input modules 714 may include a video device, an imaging device 118, and/or a scanner 116 shown in FIG. 1B. The computing device may include or have I/O interfaces 712 for connection to output device(s) such as a display, a presentation module 716, speakers, etc. A graphical user interface (GUI) 718 may be displayed on the presentation module 716. The computing device 700 may include a peripheral bus 710 for connecting to peripherals. Computing device 700 may contain communication connection(s) that allow the device to communicate with other computing devices, such as over a network or a wireless network.

By way of example, and not limitation, communication connection(s) may include wired media such as a wired network or direct-wired connection, and wireless media such as acoustic, radio frequency (RF), infrared and other wireless media. The computing device 700 may include a network interface 720, such as a network interface card to connect (wired or wireless) to a network or other communication conduits 722.

In an embodiment, the computing device 700 may also include accelerometers (ACC) 735, gyroscopes, Global Positioning System (GPS) 737 and/or Inertial Navigation Unit (INU) 740 to determine a location of the computing device 700 such as a mobile communication device, a scanning device, computing device, or other RF communication devices. The location data of the computing device 700 used to acquire the OP-BTI includes location data of the luggage item and the time stamp associated with the location data.

Computer program code for carrying out operations described above may be written in a variety of programming languages, including but not limited to a high-level programming language, such as C or C++, Python, Java, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM, and a flash memory. Otherwise, the code can be stored in a tangible computer-readable storage medium such as a magnetic tape, a flexible disc, a hard disc, a compact disc, a photo-magnetic disc, and a digital versatile disc (DVD).

The embodiments may be configured for use in a computer or a data processing apparatus which includes a memory, such as a central processing unit (CPU), a RAM and a ROM as well as a storage medium such as a hard disc.

In one or more embodiments, where the computing device is a server, the server may be one or more servers and the servers may be a virtual server.

FIG. 8A illustrates a flowchart of a method 800A for checking in baggage (i.e., luggage item) of a passenger leaving or departing a lodging entity in accordance with an embodiment. Although the example method 800A depicts a particular sequence of operations, the sequence may be altered without departing from the scope of the present disclosure. For example, some of the operations depicted may be performed in parallel or in a different sequence that does not materially affect the function of the method 800A. In other examples, different components of an example device or system that implements the method 800A may perform functions at substantially the same time or in a specific sequence. In one or more embodiments, one or more blocks disclosed herein may be omitted or blocks may be added.

According to some examples, the method 800A includes checking in baggage of a passenger from the lodging entity for a return flight, at block 802. If the first-mode travel carrier is an airline, then the method 800A may determine if the check-in window for baggage is open. For example, a passenger and/or their luggage for a flight may be allowed to be checked in within 24 hours to 48 hours of departure of a return flight. Train carriers may have a different window.

According to some examples, the method 800A includes causing creation of bag tag identifier and IATA license plate, at block 804. In some examples, the return flight IATA license plate may be generated by the DCS, or other airline host computer system designated to create the IATA license plate for the airline carrier. The "creation" may vary from airline to airline, mode to mode and situation to situation. For example, the server 2710 or server 148 may include programming modules to assign a unique identifier that is compatible with an IATA license plate and related barcodes. The server 2710 or server 148 may include programming modules for formatting the bag tag in a format compatible with an IATA bag tag format, such as shown in FIG. 2A or 2D.

According to one or more embodiments, the method 800A includes printing, by a printing device, a bag tag with license plate, at block 806. When baggage of a passenger is checked in, such as for a flight, one or more IATA B-Type messages are generated that include inbound and outbound airport codes and date, baggage details such as the 10-digit bag tag identifier, a passenger's name and PNR information.

In one or more embodiments, the printing device may print a marker tag that can be adhesively attached to the luggage item.

In one or more embodiments, the method may include communicating information associated with the 10-digit bag tag identifier of the return flight to the passenger so that upon return of their final leg of travel, the passenger can find and track their baggage using an IATA 10-digit bag tag identifier or the like.

The method 800A may include during the remote/return baggage check-in process, obtaining, by the at least one processor, airline bag tag information for the return leg of travel for checked in luggage items for the passenger; and printing, by a printer, a new bag tag for the return leg of travel that is compatible with an IATA license plate for each checked in luggage item of the passenger. The system 100 may email or text the passenger the printed BSM data such as the IATA license plate number similar to a commonly known luggage item or bag tag receipt.

The method 800A may include replacing the originating printed bag tag with the new return flight bag tag for the return leg of travel.

In one or more embodiments, the new return flight bag tag may be used to track the luggage item of the passenger along other modes of travel and to deliver the luggage item to designated locations provided the originating printed bag tag has been removed and replaced. The new return flight bag tag may be used to track the location of the luggage item for delivery to a lodging entity, home address, other designated address, or another vehicle of travel on the return travel path.

FIG. 8B illustrates a flowchart of a method 800B for checking in a luggage item, a passenger or a combination of a luggage item and a passenger leaving a lodging entity in accordance with an embodiment. The processor for checking in the luggage item or the passenger and luggage item may be triggered based on the scanning of a barcode of the IATA license plate number on the originating hardcopy bag tag, the printed instrument having at least a portion of the passenger information on the originating hardcopy bag, or a created marker with the IATA license plate number associated with the originating hardcopy bag tag. In an embodiment, a trigger may be interaction by a user with a GUI. The trigger may require validation/verification of the identity of the passenger as described in FIG. 23.

The method 800B may, at block 801, determine if a trigger has been received. If, at block 801, the determination is "YES", the method proceeds to block 802.

If, at block 801, the determination is "NO", the method may loop back to the beginning of block 801 to wait for the trigger, as a luggage item may not be checked until a window is opened by an airline carrier. In some instances, the passenger may check themselves in as soon as a window is open, using an online portal with an airline carrier that is known in the art.

According to some examples, the method 800B includes checking in a luggage item or a passenger and luggage item from the lodging entity for return flight, at block 802, described in relation to FIG. 8A.

According to some examples, the method 800B may include causing creation of bag tag identifier and IATA license plate, at block 804.

In an embodiment, system 100 may be a non-flying airline carrier configured to create an IATA license plate internally. In an embodiment, the system 100 obtains the IATA bag tag information for the return flight with a DCS associated with the designated return flight airline travel carrier.

The method 800B may, at block 805, determine if a trigger has been received. If, at block 805, the determination is "YES", the method may proceed to block 806. If, at block 805, the determination is "NO", the method may loop back to the beginning of block 805. According to an example, the block 806 may be triggered in response to a subsequent scan or the acquiring of the OP-BTI and/or the creation of the digital BTI data record during the check-in window for the return flight. The trigger may require a keystroke on a computing device or scanning by a scanning device to trigger the printing of the stored new bag tag for the return home or return leg of travel.

According to some examples, the method 800B may include printing an IATA bag tag with license plate, at block 806. When a passenger is checked in, such as for a flight, one or more IATA B-Type messages are generated that include inbound and outbound flight numbers and date, baggage details such as the 10-digit bag tag identifier, the passenger's name and PNR information (i.e., PNR number). The PNR number is also known as a PNR locator.

The process for checking in a passenger and luggage item on a return flight may include communicating electronically to a passenger's mobile phone or computing device, a boarding pass to the passenger. The communication may include an email of the boarding pass for the return flight. The communication may include a text message of the boarding pass for the return flight.

In one or more embodiments, the communication may include information associated with the 10-digit bag tag identifier so that upon return of their final leg of travel, the passenger can find and track their baggage using an IATA 10-digit bag tag identifier or the like.

According to an example, the method 800B may be triggered, at block 805, by electronically acquiring, by at least one electronic acquiring device, an originating hardcopy bag tag identifier (OP-BTI) associated with or printed on the originating hardcopy bag tag from the airline travel carrier that is on the luggage item of the passenger to create a digital BTI data record within a check-in window to check-in the luggage item or passenger and luggage item.

Various remote check-in processes are known. For example, U.S. Pat. No. 11,348,040, titled "INTEGRATED END-TO-END TRAVEL INSTRUMENT (TI) DEVICE GENERATION SYSTEM AND INTEGRATED INSTRUMENT DEVICE" is incorporated herein by reference. US2010/0211418 titled "BAGGAGE TAGGING SYSTEM AND METHOD HAVING DATA FROM MULTIPLE SOURCES," is incorporated herein by reference.

The method 800A or 800B may include during the remote check-in process, obtaining, by the at least one processor, airline bag tag information for the return leg of travel for checked in luggage items for the passenger; and printing, by a printer, a new bag tag for the return leg of travel that is compatible with an International Air Transport Association (IATA) license plate for each checked in luggage item of the passenger.

The method 800A or 800B may include replacing the printed bag tag from the first-mode travel carrier with the new bag tag for the return leg of travel.

The method 800A or 800B may include during the remote check-in process, obtaining, by the at least one processor, boarding pass information for the return leg of travel of the passenger; and communicating, by the at least one processor, the boarding pass information to an electronic communication device of the passenger.

The boarding pass information may include bar coded boarding pass information. The boarding pass information may be in an e-ticketing format.

Passenger Manifest

Figure 9A:
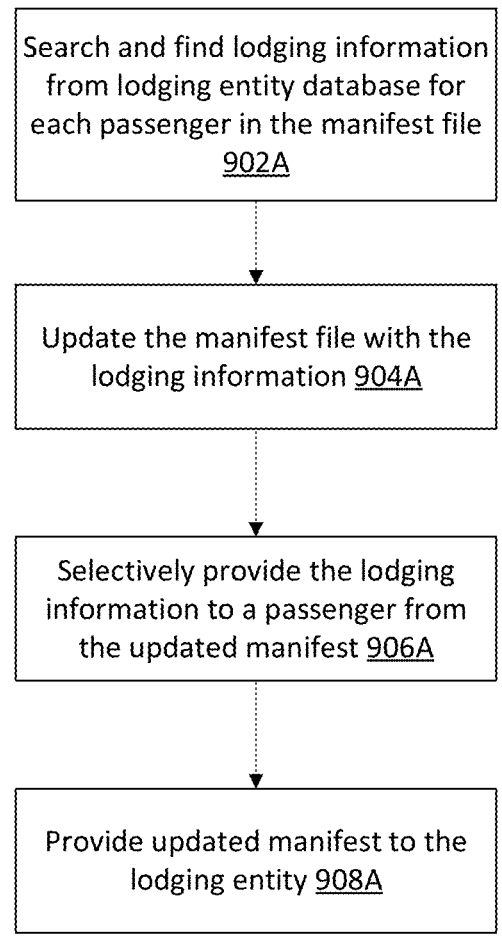
FIG. 9A illustrates a flowchart of a method for merging passenger manifest and lodging entity information in accordance with an embodiment.

FIG. 9A illustrates a flowchart of a method 900A for merging passenger manifest and lodging entity information in accordance with an embodiment. According to some examples, the method 900A may include searching and finding lodging information from a lodging entity database for each passenger in the manifest file, at block 902A. By way of a non-limiting example, the lodging entity database may include a passenger room, suite, or cabin number. The lodging information may include a lodging address, building numbers, floor numbers, level numbers, and other location delivery identifiers for delivering a luggage item. The information may also be communicated to the passenger.

According to one or more examples, the method 900A may include updating the manifest file with the lodging information, at block 904A. According to some examples, the method 900A may include selectively providing the lodging information to a passenger from the updated manifest, at block 906A. According to some examples, the method 900A may include providing an updated manifest to the lodging entity, at block 908A. The updated manifest includes the lodging information from the lodging entity and the passenger information, such as a passenger's name, return flight information for at least a first-mode travel carrier and original bag tag ID. The manifest may include a luggage manifest wherein the luggage manifest includes those luggage items to be delivered to the lodging entity. System 100 may prepare a general master luggage item manifest to track, deliver and pick up all luggage items in its care. In some instances, system 100 may assist the luggage item in bypassing or expediting its Customs or border crossing security screening stations.

The data for check-in of the return leg of travel may include at least return leg flight times and airline carrier (i.e., designated return flight carrier). The method may include sorting, by the at least one processor, the master manifest file with information associated the return leg flight times for the plurality of passengers; and executing, by the at least one processor, a remote check-in process for the return leg of travel with the designated return travel carrier of each passenger based on the sorted master manifest file.

Figure 9B:
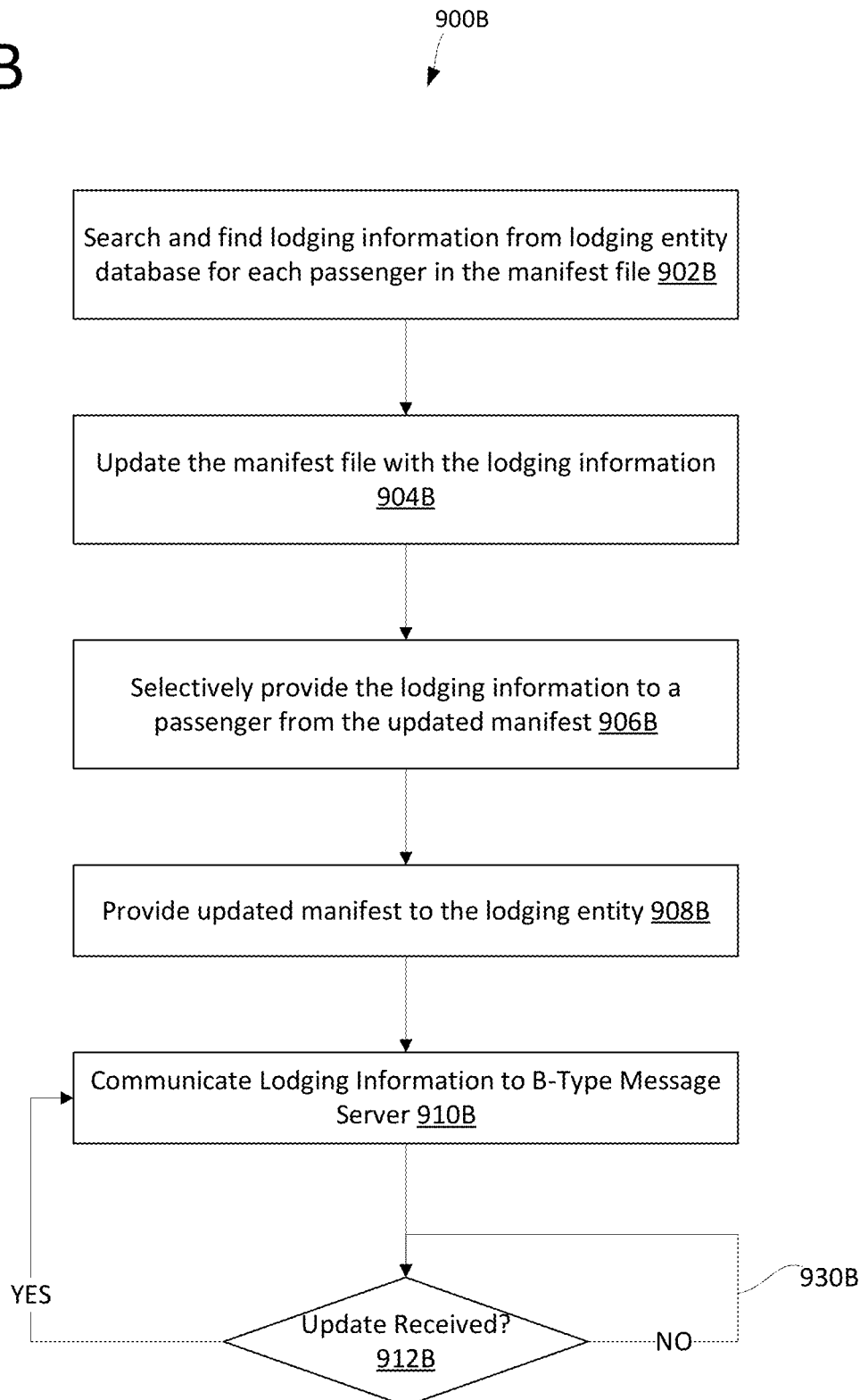
FIG. 9B illustrates a flowchart of a method for merging a passenger manifest and lodging entity information in accordance with an embodiment.

FIG. 9B illustrates a flowchart of a method 900B for merging passenger manifest and lodging entity information in accordance with an embodiment.

The lodging entity may include a cruise ship, a resort, a hotel, a short-term rental homestay, long-term rental homestay, residential dwelling, and building.

According to some examples, the method 900B may include searching and finding lodging information from lodging entity database for each passenger in the manifest file, at block 902B. By way of a non-limiting example, the lodging entity database may include a passenger room, suite, or cabin number.

The method 900B may be an inbound process for processing baggage of the passenger upon arrival of the passenger or their luggage at a lodging entity. In one or more embodiments, the passenger does not need to be present at the inbound registration of the baggage at or local to the destination point or at the lodging entity. The manifest file 2716 may be from an airport. Other reservation information may be from manifests of a railway (train) reservation system 2718, a bus reservation system 2720, a ferry reservation system, and a lodging entity reservation system 2722 of FIG. 27. The disclosure is not limited to these examples.

In one or more embodiments, travel reservations of multiple modes of travel and/or lodging entities can be merged to centralize delivery and check-in information for baggage of a passenger independent of the passenger. In some instances, the centralized manifest may be untethered to any travel mode or lodging entity.

According to some examples, the method 900B may include updating the manifest file with the lodging information, at block 904B. According to some examples, the method 900B may include selectively providing the lodging information to a passenger from the updated manifest, at block 906B. According to some examples, the method 900B may include providing an updated manifest to the lodging entity, at block 908B. The updated manifest includes the lodging information from the lodging entity and the passenger information, such as a passenger's name, return flight information for at least a first-mode travel carrier and original bag tag ID.

Figure 27:
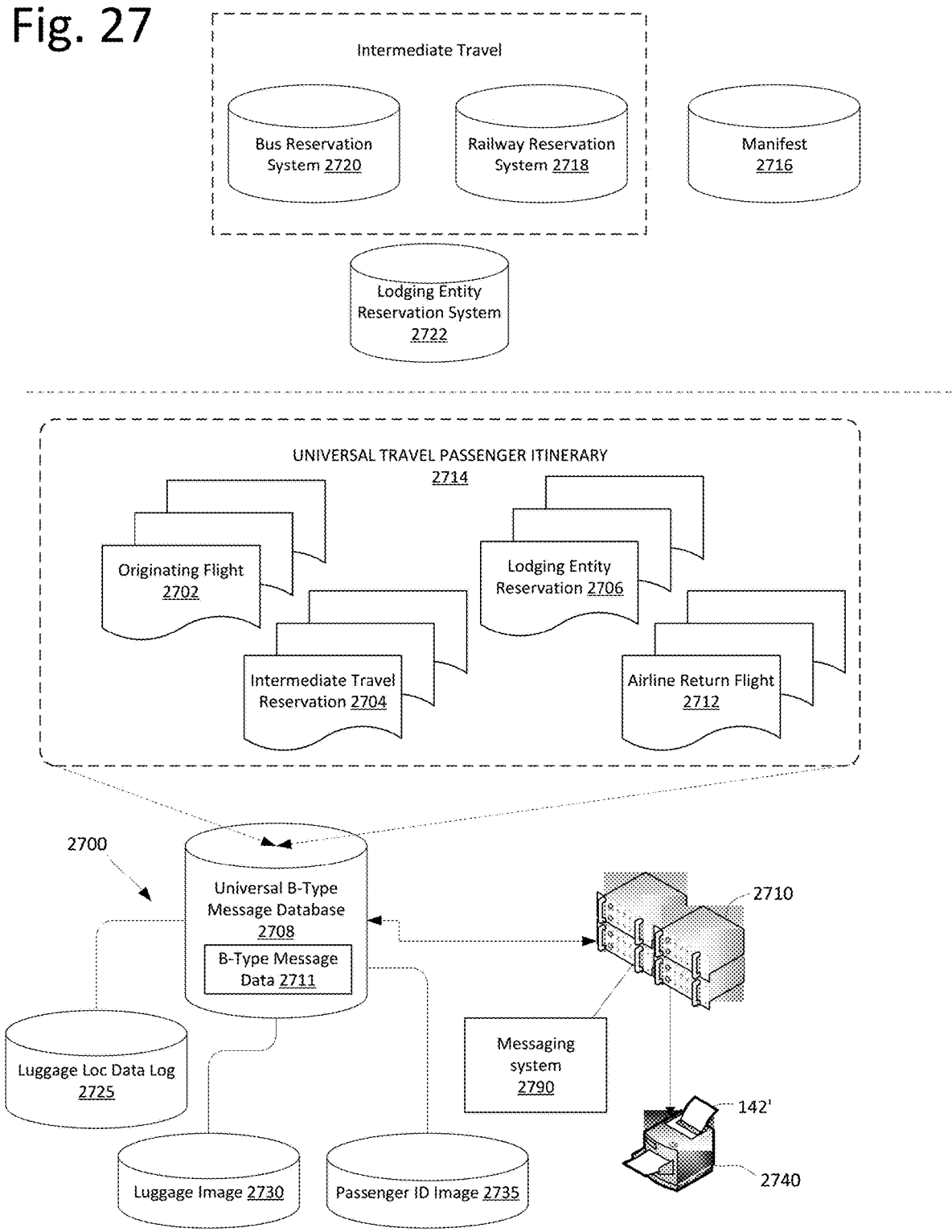
FIG. 27 illustrates a smart baggage travel system for multi-mode travel and lodging in accordance with an embodiment.

According to some examples, the method 900B may include communicating lodging information to B-Type message server 2710 (FIG. 27). According to some examples, the method 900B may include determining, at block 912B, whether an update to the lodging information is received. If the determination is "YES," the method loops back to block 910B where the updated lodging information is communicated to the B-Type message server 2710. If the determination, at block 912B, is "NO," the method on line 930B loops back to block 912B to wait for any updates.

FIG. 11 illustrates a flowchart of a method 1100 for creating the DPI data record in accordance with an embodiment.

The method 1100 may include performing image processing on the image to optically recognize printed text of the printed passenger information associated with the airline travel carrier on the originating hardcopy bag tag and convert the printed text to searchable machine-encoded text sequences, at block 1102. However, the image may be a printed instrument having at least a portion of the passenger information on the originating hardcopy bag tag.

The image processing algorithms for optical character recognition (OCR) may include computer vision machine learning algorithms, deep learning algorithms or traditional image processing for the recognition of printed text.

The method 1100 may include creating the DPI data record linked to the airline travel carrier from the machine-encoded text sequences of the passenger information for accessing the return flight with the designated return travel carrier, at block 1104.

Printed Text to Machine-Encoded Text

FIGS. 12A-12C illustrate a flowchart of a method 1102 of performing image processing of the image data associated with the originating hardcopy bag tag or printed instrument in accordance with an embodiment. The method 1102 may include locating the originating hardcopy bag tag in at least one image. This may include using background subtraction machine learning algorithms to isolate the pixels of the originating hardcopy bag tag from the background in the image, in some examples. In other examples, edge detection algorithms may be used to find the border of the originating hardcopy bag tag from which to isolate the pixels of the originating hardcopy bag tag, in some examples. Still further, the method 1102 may include locating the printed instrument in the at least one image.

The type of printed passenger information may indicate a location on the originating hardcopy bag tag to find the printed passenger information of interest. For example, the layout in FIG. 2A is a typical layout for some airlines. The layout may include the IATA barcode and license plate toward the bottom of the bag tag. The layout may include a destination airport field, which in this instance is Miami International Airport with the representative code "MIA" printed. The destination airport field may be above the IATA barcode(s). Furthermore, in the destination airport field, there may be an airline code "AA" printed to designate the airline travel carrier the luggage item and passenger are traveling on to the destination airport.

The layout may include an originating airport field, which in this instance is Tampa International Airport with the representative code "TPA" printed. The originating airport field may be above the destination airport field on the originating hardcopy bag tag. Furthermore, in the originating airport field, there may be an airline code "AA" printed to designate the airline travel carrier the luggage item and passenger are traveling from the originating airport.

The layout may include other space for printing a passenger's name on the originating hardcopy bag tag. For example, the passenger's name may be printed below the IATA barcode or IATA license plate.

The layout may include other space for printing a PNR number on the originating hardcopy bag tag. By way of a non-limiting example, the PNR number may be printed at a location on the originating hardcopy bag tag that is above the originating airport field.

The layout may include other space for printing an airline name on the originating hardcopy bag tag. By way of a non-limiting example, the airline name may be printed at a location on the originating hardcopy bag tag that is above the originating airport field.

The layout may include other space for printing other information at the discretion of the airline on the originating hardcopy bag tag. The other information may include auxiliary information that may be used to identify the passenger for accessing passenger travel information stored in a memory device associated with the airline travel carrier.

However, as shown in FIG. 2D, the layout of the originating hardcopy bag tag is different for another airline. Therefore, it may be useful to determine an airline code whether alphabetical or numerical on the originating hardcopy bag tag or other printed instrument.

The method 1102 may use optical character recognition (OCR) processes to convert an image of text into a machine-readable text format. The image of text may be searchable, as a whole, to locate standardized codes within the image of text to form the DPI data record. However, the originating hardcopy bag tag may become damaged. Therefore, some or all of the text may not be optically readable using the OCR processes. Depending on which passenger/airline information is not available, other printed instruments that may include portions of the originating hardcopy bag tag may be used. By way of an example, the bag tag marker 212 may be used to create the DPI data record by capturing an image of the bag tag marker. The method 1102 may be performed using the image of the bag tag marker. For example, the airline code is embedded in the digits of the IATA license plate.

The method 1102 may include optically recognizing text of an airline code or airline name in the at least one image of the originating hardcopy bag tag, at block 1206.

The method 1102 may include forming a machine-encoded text sequence of the airline code image or the airline name, at block 1208. As used herein, the term "forming" is also interchangeable with "converting."

The method 1102 may include matching the formed airline code with an airline code in an airline code list in the database 432, at block 1210. The database 432 includes both the memory device and information of the airline code to airline name.

The method 1102 may determine, at block 1212, whether an airline code match is found. If the determination, at block 1212, is "YES," the method 1102 may retrieve a layout for the airline travel carrier, at block 1216, and proceed to block 1218 of FIG. 12B. The BT layout may be looked up in the BT layout database 430. The database 430 may include both the memory device and information on the layout of the bag tag and presentation of certain passenger/airline information.

If the determination, at block 1212, is "NO," the method 1102 may loop back to block 1206 of FIG. 12A, where this is another attempt to find the airline code. The airline code may be used to find a layout of the printed airline information and the passenger information associated with the airline on the originating hardcopy bag tag. The loop back to block 1206 may include a decision block 1214 to determine if the maximum number of attempts have been made. By way of a non-limiting example, a first attempt to find an airline code may include looking for a two-character airline code in the originating airline field or the a two-character airline code in an image of an IATA compatible license plate. There may be other ways of obtaining the printed airline code or airline name based on the description herein.

If the determination, at block 1214, is "NO," the method 1102 may proceed to block 1206 of FIG. 12A to continue to locate a valid airline code or airline name. If the determination, at block 1214, is "YES," the method 1102 may loop to FIG. 13, where another method of finding the PNR number is used.

The method 1102 may include optically recognizing the printed text of the PNR number in the at least one image of the originating hardcopy bag tag, at block 1218.

The method 1102 may include forming a machine-encoded text sequence of the PNR number, at block 1222.

The method 1102 may determine, at block 1224, whether a PNR number is found. The PNR number may be a unique sequence of six alphanumerical characters. In one or more embodiments, the PNR number may be preceded by the phrase "PNR" with or without a space or other character, such as a hyphen or colon. However, this may be at the discretion of the airline carrier. If the determination, at block 1224, is "YES," the method 1102 may proceed to block 1228. If the determination, at block 1224, is "NO," the method 1102 may loop back to block 1218, where this is another attempt to find the PNR number. However, the attempts are limited, at block 1226, to a maximum number of attempts. If the determination, at block 1226, is "NO," the method 1102 may proceed to block 1218. If the determination, at block 1226, is "YES," the method 1102 may proceed to FIG. 13, to use the text of the IATA license plate as a linking index to the PNR information (i.e., PNR number) in the B-Type messages.

The method 1102 may include optically recognizing the printed text of the passenger's name in the at least one image of the originating hardcopy bag tag, at block 1228.

The method 1102 may include forming a machine-encoded text sequence of the passenger's name, at block 1232.

The method 1102 may determine, at block 1234, whether a passenger's name is found. If the determination, at block 1234, is "YES," the method 1102 may proceed to block 1240 of FIG. 12C. If the determination, at block 1234, is "NO," the method 1102 may loop back to block 1228, where this is another attempt to find the name of the passenger. However, the attempts are limited, at block 1236, to a maximum number of attempts. If the determination, at block 1236, is "NO," the method 1102 may proceed to block 1228. If the determination, at block 1236, is YES," the method 1102 may loop to FIG. 13 or alternately, use an image of a printed instrument, if available (now shown in method).

In some instances, the passenger's name may be captured by using the IATA license plate and accessing a B-Type message that includes the passenger's name. However, the passenger's name may also be extracted or obtained from the printed instrument if the originating hardcopy bag tag is damaged.

The method 1102 may include optically recognizing the printed text of auxiliary information (AI) in the layout of the originating hardcopy bag tag in the at least one image, at block 1240.

The method 1102 may include forming a machine-encoded text sequence of the auxiliary information, at block 1242.

The method 1102 may determine, at block 1244, whether an AI is found. If the determination, at block 1244, is "YES," the method 1102 may proceed to block 1248, where another determination is made to determine whether any more AI types are expected to have been printed on the bag tag or printed instrument. If the determination is "YES," the method 1102 loops back to block 1240 and looks for more sequences of text. If the determination, at block 1244, is "NO," the method 1102 forms the DPI data record, at block 1250 and ends, at block 1252.

The attempts to find AI are limited, at block 1246, to a maximum number of attempts. If the determination, at block 1246, is "NO," the method 1102 may proceed to block 1240. If the determination, at block 1246, is "YES," the method proceeds to block 1250 previously described and ends, at block 1252.

FIG. 13 illustrates a flowchart of a method 1300 for forming a machine-encoded text sequence of the IATA license plate in accordance with an embodiment. If the PNR number is not capable of being obtained from the image of the printed originating hardcopy bag tag, then the PNR number may be obtained from the B-Type messages. The method 1300 may include optically recognizing the printed text of the IATA license plate in the at least one image of the originating hardcopy bag tag, at block 1302. The method 1300 may include forming a machine-encoded text sequence of the IATA license plate, at block 1304. The method 1300 may also find the passenger's name.

FIG. 14A illustrates a conventional BSM 1400A for an airline carrier. The BSM is a B-Type message. The B-Type message may include a plurality of data fields that include coded characters. For example, the coded characters may include one of American Standard Code for Information Interchange (ASCII) code, Baudot, and Padded Baudot, for example. The Baggage Information Messages or the B-Type messages code and format is described for example in the "Recommended Practice 1745 Baggage Information Messages" by IATA, in the Passenger Services Resolution Manual, June 2010, 30th Edition, pgs. 1110-1205. The B-Type message may be communicated over the Internet and using message using Extended Markup Language (XML) messages.

The B-Type message may include field or line 1402 that includes a header. For example, the header may be labeled "BSM," which represents the heading of the beginning of an airline's BSM. The field or line 1404 may include a line preface ".V/" followed by a set of alphanumeric characters. By way of a non-limiting example, the line preface ".V/" may denote version and supplemental data. For example, supplement data may include a transfer station in an airline or airport infrastructure. The .V/ data field may indicate whether the B-Type message, such as a BSM, is a terminating BSM. The .V/ data field includes after the "/" a digit that indicates a data dictionary version number. The next character may be a baggage source indicator denoted by a "L" to denote Local, a "T" to denote Transfer, an "X" to denote Terminating, or a "R" to denote Remote. The baggage source indicator is followed by a three-digit airport code. In FIG. 14A, the BSM is a transfer BSM with a version number 1 and an airport code of JFK.

When sorting on the BSM, the BSMs from all air carrier are received and sorted. By way of a non-limiting example, the .V/ field may be searched for the baggage source indicator of "T." Additionally, the system 100 may have many site locations. Therefore, a cruise ship departing Tampa, the system would sort on a terminating BSM with an a "T" and "TPA" in the .V field in the baggage source indicator and the airport code corresponding digits.

Other B-Type messages may have or be modified to have similar in the baggage source indicators.

The field or line 1406 may include a line preface ".F/" followed by a set of alphanumeric characters that represent the outbound flight number and date. The alphanumeric characters may be separated by a symbol "/". For example, the data "22MAY" may represent the date of arrival. The code "IST" represents Istanbul Airport.

The field or line 1408 may include a line preface ".I/" followed by a set of alphanumeric characters that represent the Inbound flight number and date. The alphanumeric characters may be separated by a symbol "/". For example, the data "12MAY" may represent the date of departure. The code "SLC" represents Salt Lake City Airport.

The field or line 1412 may include a line preface ".N/" followed by a set of numbers, which represent the digital BTI data record of the OP-BTI. The field or line 1410 may include a line preface ".P/" followed by a set of characters, which represent the passenger's name. The first name may be separated by the last name by a symbol "/".

The field or line 1418 may include a line preface ".L/" followed by a set of alphanumeric characters, which represent the passenger name record number or PNR number. The field or line 1420 may include an end of message indicator, such as "ENDBSM."

Between lines 1402 and 1420, there may be other fields or lines, such as fields 1414 and 1416. The field or line 1414 has a preface ".S/" and is related to reconciliation data. The field or line 1416 has a preface of ".W/" and is related to the weight, pieces, dimension, and type data of the luggage item. Since, the airline's B-Type messages are known in the art, no further description of B-Type messages will be described. Some of the fields/lines are mandatory and others are optional depending on the B-Type message.

However, the system 100 may access other B-Type messages from a computer system associated with the airline carrier to determine whether a luggage item is missing or not found, for example. The system 100 may access other B-Type messages stored in a computer system associated with the airline carrier to determine the status of a luggage prior to the passenger starting their stay at a lodging entity, for example, or at other times to track the status of the luggage moving through the airport environment.

The example conventional BSM 1400A is provided for descriptive purposes and is not meant to be limiting in any way. Each airline may have changes to the airline's BSM.

Simulated BSM Template

FIG. 14B illustrates a simulated BSM 1400B for a return flight that may be generated inside or outside of the regulated check-in window in accordance with an embodiment. The simulated BSM 1400B may serve as a placeholder for generating large volumes of the BSM inside or outside of the regulated check-in window of airlines, for example, or other modes of travel. The simulated BSM 1400B is a template.

The B-Type message may include field or line 1422 that includes a header. For example, the header may be labeled "SBSM," which represents the heading of the beginning of an airline's BSM, for example, or may include another B-Type message header. For the sake of description and illustration, the simulated BSM in this example may have the same format the layout as the BSM in FIG. 14A. Therefore, only the differences will be described. For the sake of simplicity, the same code references may be used. However, slight differences may be used. For example, a simulated BSM header or another B-Type message may start with an "S" such that the header can be "SBSM," for example. In another example, the simulated BSM header or another B-Type message may end with a symbol, such as, an "*". These examples are not meant to be limiting. The start letter "S" may include two characters or an alphanumeric combination of two-digit codes.

The field or line 1424 may include a line preface ".V/" followed by a set of alphanumeric characters. By way of a non-limiting example, the line preface ".V/" may denote version and supplemental data. Since, this is a simulated BSM outside of the regulated check-in window, the ".V/" field is marked as "NULL."

The field or line 1426 may include a line preface ".F/" followed by a set of alphanumeric characters that represent the outbound flight number and date. The alphanumeric characters may be separated by a symbol "/". For example, the data "31MAY" may represent the date of arrival. The code "SLC" represents Salt Lake City Airport.

The field or line 1428 may include a line preface ".I/" followed by a set of alphanumeric characters that represent the Inbound flight number and date. The alphanumeric characters may be separated by a symbol "/". For example, the data "30MAY" may represent the date of departure. The code "IST" represents Istanbul Airport.

The field or line 1430 may include a line preface ".N/" followed by the set of characters "NULL." This is because the bag tag identifier has not been assigned yet. The field or line 1436 may include a line preface ".P/" followed by a set of characters, which represent the passenger's name. The first name may be separated by the last name by a symbol "/".

In one or more embodiments, the simulated B-Type message generator 431 may assign a bag tag identifier that is compatible with the 10-digit IATA bag tag number that is printed as a bag tag for airline carriers. In this instance, the ".N/" preface will be followed by the assigned bag tag identifier or 10-digit IATA bag tag number. The numerical digits in the field following the ".N/" preface may include the number of luggage items checked in.

The assignment of the bag tag identifier by server 148 or server 1310 outside of the airline travel information system may vary by airline or country.

The field or line 1438 and 1440 may include be used for remote check-in. For example, field line 1438 may include line preface ".D/" followed by a set of alphanumeric characters or alpha characters for bag check-in details. Each ".D/" code field varies based on the location data for the type of remote check-in. For example, the field 1438 may include at least location data, date, and time, for example. The field or line 1440 may include a preface ".C/" followed by characters, for example, which represent a company or group name.

The field or line 1442 may include a line preface ".L/" followed by a set of alphanumeric characters, which represent the passenger name record number or PNR number. The field or line 1444 may include an end of message indicator, such as "ENDBSM."

Between lines 1422 and 1440, there may be other fields or lines, such as fields 1432 and 1434. The field 1432 has a preface ".S/" and field 1434 has a preface of ".W/", both of which are marked "NULL." The fields or lines marked "NULL" cannot be populated with return flight data because the airline system, such as the DCS, does not allow the baggage to be checked in until a regulated check-in window is open.

The simulated B-Type message or simulated BSM may be used as a placeholder to prepopulate the BSM or other B-Type message for checking in baggage that assigns the IATA license plate number.

In one or more embodiments, a third-party provider or the company checking in the baggage may be configured to assign a unique identifier that is compatible with an IATA license plate number including barcode formatting for printing on an IATA bag tag.

FIG. 15 is a diagrammatic view of a process 1500 for generation of baggage authorization indicia for bypassing additional baggage screening or indication of screening completion in accordance with an embodiment. The process shown in FIG. 15 may create MK 136, for example.

In FIG. 15, a process 1500 may begin with scanning marker 212 (FIG. 2B) or an originating hardcopy bag tag 200 (FIG. 2A). The marker 212 is shown to prevent overcrowding in the figure. The marker 212 may include the passenger's name 214, origination airport flight identifier 216, destination airport flight identifier 1506, a 10-digit license plate 218 and adjacent barcoded license plate 220 and or BSM record indicium.

Bar code scanner 116 reads barcode 220. Scanner 116 is communicatively coupled to server 148 to receive the results of the security screening as described in FIGS. 26A-26B and information from the simulated BSM. The MK 136 in one or more embodiments may be similar to marker 212. However, in this instance, MK 136 is updated with the same or similar BSM data from 212, and the cruise inline mode of the travel or lodging entity is represented by marine mode indicium 1516 and the indication it has passed screening under the cruise line and government security rubric is presented by marine approval indicia 1514. Additional details 1518 on the destination on a cruise ship for the luggage item 138 are enumerated from a cruise ship (lodging entity) manifest which contains the cruise line, cruise ship, departure date, room number, deck number and booking number. The print file of MK 136 is sent to printer 120, for example, for printing. The MK 136 is affixed to the luggage item 138.

From the airport to the luggage item 138 is in trusted custody and only accessible by trusted custody handlers. In other words, the passenger or owner of baggage 138 does not have access to baggage 138 and therefore there is no opportunity to insert contraband or prohibited items since in the initial screening by TSA.

In the event, the originating hardcopy bag tag is missing and the marker 212 is missing, for example, the luggage item would need to be process independently. However, the system 100 would match the passenger with their luggage item and simulated BSM created for example, from the image data captured by the mobile communication device. The simulated BSM and/or security data can be printed by process 1500. The MK 136 may include information from the cruise ship (lodging entity) manifest which contains the cruise line, cruise ship, departure date, room number, deck number and booking number.

Security Screening Integration Assistant System

FIG. 16 illustrates a security screening integration assistant (SSIA) system 190 in accordance with an embodiment. The SSIA system 190 is shown in the black lined box below line L1. The SSIA system 190 may be communicatively coupled with a first mode of travel system (FMTS) 10 and a first security screening machine system (FSSMS) 40, both of which are shown above the line L1. By way of a non-limiting example, the FMTS 10 may include one or more computing systems 30, 35 or server systems with memory devices that are either directly or indirectly associated with the FMTS 10. It should be understood from the disclosure that each airline carrier company has many server systems and/or computing systems. The FMTS 10 may include a plurality of air carriers 20 and 22, for example, for a particular airline company.

The term "SVTS" is used to denote a second vehicle of travel system (SVTS) which may be a cruise ship, a bus, a train, or lodging entity. In one or more embodiments, a cruise ship is a lodging entity. In one or more embodiments, a train may be a lodging entity. The SVTS may be the next vehicle of travel system. The FMTS 10 is a first vehicle of travel system (FVTS) and is an airline travel carrier originating anywhere in the world.

To prevent overcrowding in the figure, the FMTS 10 may include a plurality of air carriers for a plurality of airline companies. Each airline company may have their own respective computer systems 30 and computer systems 35. The term "air carrier" may be used interchangeably with the airline company and the vehicle of travel.

The computer systems 30 may be a travel information system which stores passenger itinerary data, flight information, and checks in passengers, for example. The computer systems 35 may store B-Type messages that are generated by the baggage handling systems routing checked-in luggage items through the airport infrastructure. The computer systems 30 or 35 may provide for checking in luggage items. In one or more embodiments, a travel carrier such as an airline travel carrier may require the passenger to check-in and then print or generate their boarding pass. After the passenger checks in, the luggage item may be checked in.

The passenger's luggage items are checked-in with an air carrier, which is part of the FMTS 10. The checked-in luggage items are tagged with an originating hardcopy bag tag 200 as shown in FIG. 2A. After tagging, the luggage item is sent through an automated conveyor system of a baggage handling system to the FSSMS 40.

The FSSMS 40 is shown separately from the FMTS 10, but both may be housed in or be part of an airport infrastructure. The FSSMS 40 may include one or more security screening imaging machines 45 and 50. The FSSMS 40 may include one or more computing systems 55 or server systems with memory devices 113 to store security screening images from imaging machines 45. The FSSMS 40 may include one or more computing systems 65 or server systems with memory devices 113 to store security screening images from imaging machines 50.

The government agency that governs security screening of airlines may be denoted by TSA. Several vendors manufacture CT scanners used by TSA for baggage screening. Some of the prominent vendors include, for example:

SMITHS DETECTION: SMITHS DETECTION is a leading provider of advanced security solutions, including CT scanners. Their HI-SCAN XCT series scanners, like the HI-SCAN 6040 XCT and HI-SCAN 7555 XCT, are designed for screening checked and carry-on baggage at airports.

L3HARRIS Technologies: L3HARRIS Technologies is another major supplier of security equipment, including CT scanners for baggage screening. The company's CLEARSCAN brand family of CT scanners is used by TSA at various airports in the United States.

ANALOGIC Corporation: ANALOGIC Corporation develops advanced imaging technologies, including CT scanners for airport security. Their CONNECT brand series of scanners, such as the CONNECT 70 and CONNECT 100, are designed to enhance airport security screening.

LEIDOS (previously Lockheed Martin): LEIDOS is a global technology company that provides security solutions, including CT scanners for baggage screening. They have developed the VACIS M6500 system, a high-performance CT scanner for screening baggage at airports.

CT images generated during baggage screening are typically saved in a multi-image format. This format allows for the exchange, storage, and transmission of images across different systems and devices. CT scanners capture a series of 2D cross-sectional images, which can then be reconstructed into a 3D representation of the scanned object. The 3D visualization and analysis of CT images often involves specialized software designed for processing and rendering the multi-image files. These software solutions can reconstruct the 2D slices into 3D models, enabling security personnel to examine the scanned baggage in more detail.

The DICOS (Digital Imaging and Communications for Security) standard is an image format standard developed by NEMA (National Electrical Manufacturers Association) in collaboration with DHS. It aims to enhance the interoperability and effectiveness of security screening systems, such as those used in airports and other critical infrastructure facilities. DICOS is designed to meet the specific needs of security imaging, including the storage, transmission, and processing of security images. It addresses the limitations of the DICOM (Digital Imaging and Communications in Medicine) standard, which is primarily focused on medical imaging. The DICOS standard provides:

Interoperability: DICOS enables seamless communication between different security imaging systems and components from various manufacturers, allowing for more efficient and effective security screening processes.

Extensibility: The DICOS standard is designed to be easily extended and adapted to incorporate modern technologies and methods as they emerge in the field of security imaging.

Flexibility: DICOS supports a wide range of security imaging modalities, including X-ray, CT, MRI, and others, making it suitable for various security applications.

The size of TSA files can vary significantly depending on several factors such as the scanner's resolution, the number of slices captured, the level of compression applied, and the size of the baggage being scanned. In general, CT scans produce many high-resolution images, which can result in substantial file sizes. A single multi-image file for a CT scan can range from a few hundred kilobytes to several megabytes. When considering an entire baggage scan, which may include multiple files, the total size can easily reach several tens or even hundreds of megabytes.

The initial screening process by the FSSMS 40 may be performed by large X-ray machines (i.e., security screening imaging machines 45 and 50). These security screening imaging machines 45 and 50 are designed to detect a range of materials, including explosives and other contraband. Baggage is screened using dual-energy X-ray systems that allow security personnel to differentiate between organic and inorganic materials based on their atomic number. This helps in identifying potentially dangerous substances. If the X-ray scan shows something suspicious, the bag is diverted for further inspection. This usually involves a physical inspection by a trained security officer and may also involve the use of more advanced scanning technologies like CT (Computed Tomography) scanners, which can provide a more detailed, 3D images of the bag's contents. In some cases, explosive trace detection (ETD) machines may also be used. These machines can detect traces of explosives on the outside of the bag or on the items inside the bag. They work by swabbing the bag or item and then analyzing the swab for any explosive residue.

Those luggage items with detected explosives or certain hazardous items within the luggage item are prevented from boarding the air carrier.

The security screening imaging machine 45 and 50 may detect materials or chemicals that individually are not hazardous but if combined may be hazardous. Once on a second mode of travel, those materials or chemicals may be combined deliberately or accidentally. In one or more embodiments, the SSIA system 190 may request the FSSMS 40 to provide a list of all detected chemicals and the amounts associated with an object within a luggage item.

The objects allowed in checked-in luggage items stored in the cargo hold of an air carrier can be different from objects allowed in luggage items boarding a cruise ship (i.e., second mode of transportation system (SMTS) 1680A), for example. This may be in part because weapons are not accessible in checked-in luggage items during the flight of a passenger while the luggage item is in the cargo hold. On cruise ships, however, the luggage items are delivered to the cabin room of the passenger where the passenger has direct access to the weapon during the cruise, which can be a threat to other passengers.

Depending on the next vehicle of travel, the luggage item may be screened by ISSS 1670A, 1670B, 1670C and 1670D, for example. Each ISSA 1670A, 1670B, 1670C and 1670D may include an SS computer station 2672A and security screening device 2672B as described in relation to ISSS 2670 of FIG. 26A. The SSIA system 190 may be configured to interface with the ISSS 1670A, 1670B, 1670C and 1670D, as described in more detail in relation to the methods 2600A and 2600B of FIGS. 26A and 26B.

What a traveler is permitted to carry within checked-in luggage on a flight may be different than what is permitted on ship. For example, some weapons may be approved for a checked-in and travel in a luggage item placed in an airplanes cargo. However, once on a cruise ship, the owner of the luggage item would have access to the weapon during the cruise, which presents a hazard risk. The specific list of prohibited items may vary between cruise lines, but some common items that are allowed on airplanes but prohibited on cruise lines may include, for example:

Alcohol: Many cruise lines have strict policies on bringing personal alcohol on board. While you can carry a limited amount of alcohol in your checked luggage on an airplane, cruise lines often restrict or limit the amount you can bring onboard.

Power Strips: Power strips, surge protectors, and extension cords are typically allowed in airplane carry-on or checked luggage, but many cruise lines prohibit them due to potential fire hazards.

Clothing Irons: Clothing irons are usually allowed in checked luggage on airplanes but are often prohibited on cruise ships. Cruise ships typically provide laundry services or self-service laundry facilities with irons.

Pool Inflatables: While these items are allowed on airplanes, they may not be permitted on cruise ships due to limited pool space and safety concerns.

Drones: Some airlines allow drones as carry-on or checked luggage, but most cruise lines prohibit them for safety and privacy reasons.

Hoverboards and similar devices: These items are typically allowed on airplanes if they meet specific battery requirements. However, many cruise lines ban them due to fire hazards and safety concerns.

Sporting equipment: Some cruise lines may restrict or prohibit specific sporting equipment, such as baseball bats or golf clubs, which are allowed in checked luggage on airplanes.

Weapons: Some cruise lines may restrict guns, knives, large scissors, and pepper mace. Small grooming scissors may be allowed.

Similarly, certain items allowed on airplanes may be prohibited or restricted on trains (railways), such as:

Large luggage: While airlines typically allow checked luggage with size and weight limits, trains often have stricter size restrictions or limited storage space for large suitcases.

Bicycles: Many airlines allow bicycles as checked luggage, but not all trains permit bicycles, or they may require a reservation and additional fees.

Sporting equipment: Some trains may restrict or prohibit specific sporting equipment, such as surfboards, skis, or golf clubs, which are allowed in checked luggage on airplanes.

Camping gear: Camping gear like portable stoves, fuel canisters, and tents with stakes may be allowed in checked luggage on airplanes but could be restricted or prohibited on trains.

Musical instruments: While airlines often allow musical instruments as carry-on or checked luggage, some trains may have size or weight restrictions for these items.

Hazardous materials: Items such as flammable liquids, compressed gases, or corrosive substances may be allowed in limited quantities on airplanes, but trains may have stricter regulations.

Buses may prohibit one or more objects and substances described above or others.

Hotels and resorts may prohibit one or more of objects and substances described above or others.

The examples described herein are for illustrative and descriptive purposes and should not be limiting in any manner. As should be understood from the description herein, to describe each and every rule and regulation for all modes of transportation or travel around the world is prohibitive.

The rules and regulations may vary based on passing through different government agencies and in differing countries. Rules and regulations may limit or prohibit amounts of currency, agriculture, food, and other objects on prohibited lists for any mode of travel.

The baggage screening process in cruise ships (i.e., SMTS 1680A) is like that in airports, though with some differences owing to the unique nature of maritime travel. The SMTS 1680A may include one or more servers or computer system 1675A. When passengers arrive at the cruise terminal, their luggage item is checked-in and tagged. These passengers arrive by driving up and hand carrying their own luggage item(s).

The luggage item may then go through an Integrated Security Screening Station (ISSS) 1670A (i.e., ISSS 2670 FIG. 26A). As described in FIG. 26A, the security screening device 2672B may be the same as one or both of imaging machines 45 and 50, for example.

The process described herein is for those luggage items that were previously screened for security and have follow-along security image and data files available to share for a first-phase security screening analysis. Other luggage items without follow-along security image and data files may be processed by the security screening device 2672B to determine if the luggage item clears the security screening process.

In the integrated security screening process, the SSIA system 190 may be configured to assist the ISSS 1670A by obtaining the follow-along security image and data and interface with a trusted custody handler taking custody of the luggage items from the air carrier to the SMTS while preserving the security chain of custody by a trusted custody handler. In this manner, the follow-along security image and data obtained by SSIA system 190 may be assembled and sent to the ISSS 1670A so that the SS computer station 2672A can be used to perform a first-phase security screening analysis for the second vehicle of travel or next vehicle of travel for prohibited objects associated with regulation or rules for the government agency or security entity associated with cruise ships. If the luggage item screening by the first-phase security screening analysis for the second vehicle of travel clears the luggage item, the SSIA system may receive information associated with the pass or fail of the luggage item screening. The SSIA system 190 may update handler devices and/or scanning devices, for sorting and handling the luggage item, as described in relation to FIG. 26B. In the environment of a cruise ship, the luggage item, if failed the security screening, may be transferred to security screening device 2672B for the second-phase security analysis of the second vehicle of travel. Once the luggage item is cleared by the second-phase security screening, the SSIA system 190 may update the routing information for delivery of the luggage item to the room or cabin independently of or in parallel with the passenger.

The trigger for obtaining the follow-along security image and data may be from an air carrier flight manifest, a B-Type message, such as a terminating BSM, scanning of an IATA license plate, or access the travel data of the PNR 112. However, the process herein intends to transfer files without the need to send PII of the passenger. Optionally, the passenger's name may be sent because it is visible in the originating hardcopy bag tag, bingo tag or other markers that may be placed on a luggage item by an airline carrier.

If the analysis of the follow-along security image and data cannot clear the luggage item through the ISSS 1670A, then the security screening device 2672B of the ISSS 1670A may scan the luggage item for prohibited items, which can range from weapons and explosives to items that are not allowed on the ship, like alcohol or irons, by way of non-limiting examples. If a luggage item triggers an alarm during the X-ray scan, it is set aside for further inspection. This usually involves a hand-search by security personnel. In addition to the initial luggage item screening, passengers and their carry-on items are also screened before boarding the ship. This is usually done using walk-through metal detectors and X-ray machines like those used in airport security checkpoints.

The SSIA system 190 may interface with system 100 to update the LIB 2450 (FIG. 24) with the current security screening status. The SSIA 190 may trigger the government location delivery and pickup data generator 2410, so that when the IATA bag tag is scanned, the trusted custody handler may know to take the luggage item to the location of the security screening device 2672B if the luggage item failed to clear. Alternately, the SSIA 190 may trigger the government location delivery and pickup data generator 2410, so that when the IATA bag tag is scanned, the trusted custody handler may know to take the luggage item to load on the next flight or to terminate the airport if the luggage item cleared customs.

Figure 14D:
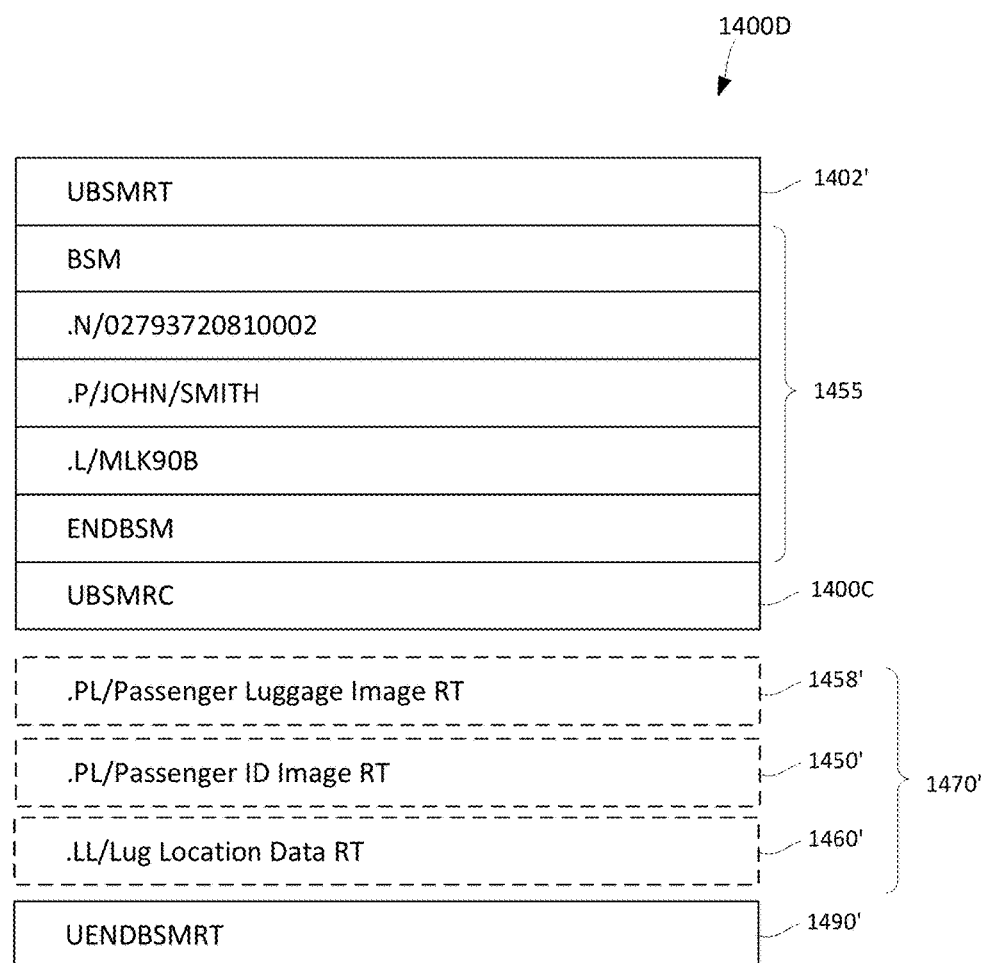
FIG. 14D illustrates an expanded (universal) B-Type message for a return flight in accordance with an embodiment.
Figure 14E:
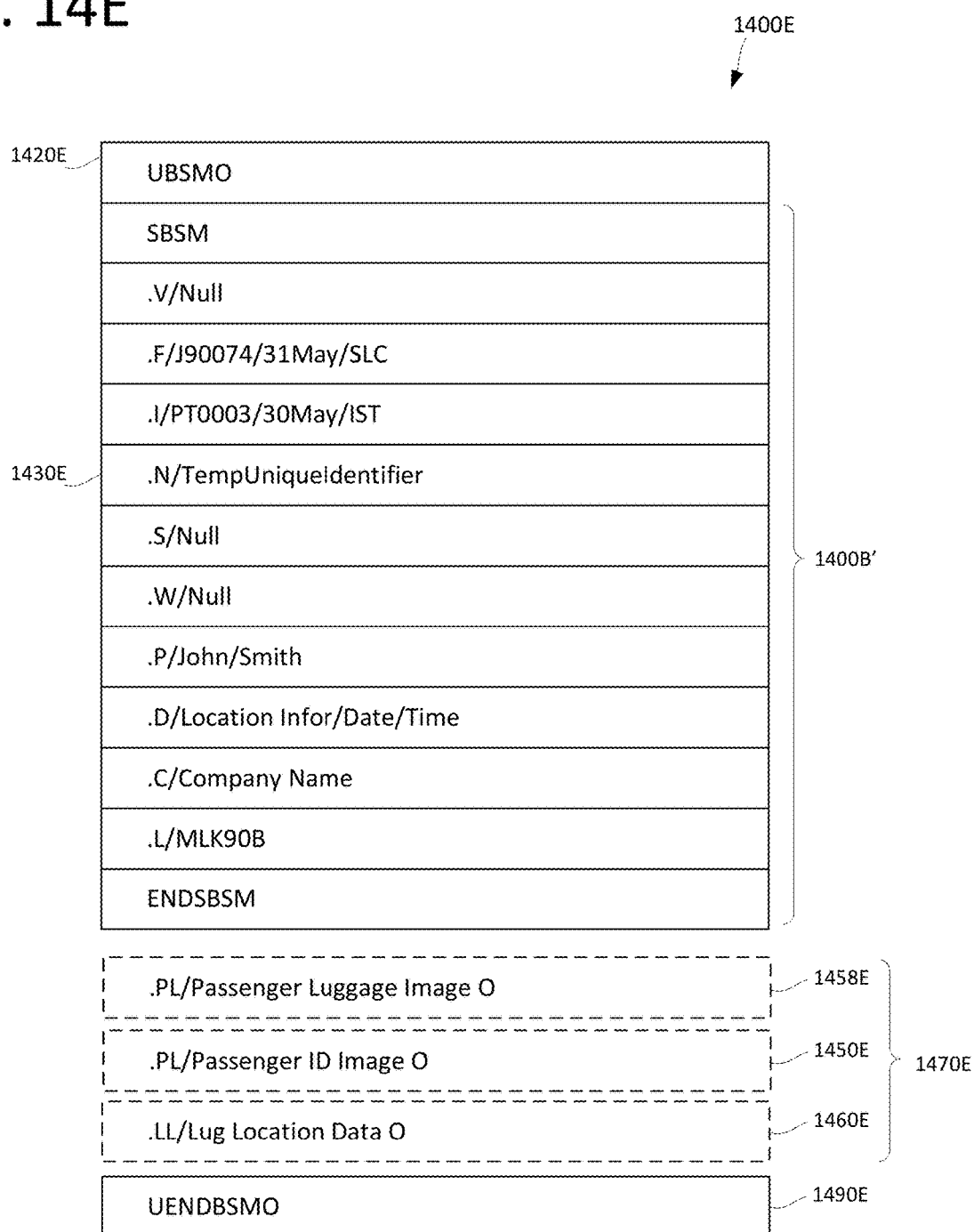
FIG. 14E illustrates an expanded (universal) B-Type message for multi-mode travel and lodging of an originating flight in accordance with an embodiment.

Additionally, the SSIA 190 may update the expanded B-Type message described in relation to FIGS. 14C-14E. The security clearance status of the luggage item may be updated in the expanded B-Type message.

The security screening procedures in railway systems (i.e., SMTS 1680B) vary widely depending on the country and the specific rail service. The SMTS 1680D may include one or more servers or computer system 1675C. The SMTS 1680B may include an ISSS 1670B (i.e., ISSS 2670 FIG. 26A) that employs some form of security screening for both passengers boarding trains and their luggage. In some cases, ISSS 1670B might involve random checks where security personnel select bags for screening using handheld metal detectors or portable X-ray devices. In other cases, all bags might be screened by the ISSS 1670B using stationary X-ray machines like those used in airports and cruise terminals. In high-security situations or for international train services, more thorough screening procedures may be employed. The ISSS 1670B may use explosive detection systems, sniffer dogs, or even CT scanners. Additionally, passengers may also be screened using metal detectors or body scanners.

The security screening procedures in a bus carrier system (i.e., SMTS 1680C) vary widely and governed by the TSA in the United States. The SMTS 1680C may include an IS SS 1670C that employs some form of security screening for both passengers boarding a bus and their luggage. The SMTS 1680C may include one or more servers or computer system 1675C.

The security screening procedures in a lodging entity (i.e., SMTS 1680D) vary widely and may be defined by self-governance and/or governmental regulations. In one or more embodiments, lodging entities may provide a self-screening security process that may include a third-party screening entity, local police authorities, and hired security guards, for example. The SMTS 1680D may include an ISSS 1670D that employs some form of security screening for both passengers entering a lodging entity and their luggage. In some instances, a passenger and their luggage enter a hotel connected to an airport governed by TSA or other government agency. In some instances, such as the STAR WARS Hotel, at DISNEY, Orlando, Florida, the hotel's guests have direct access to the theme park from the hotel. The SMTS 1680D may include one or more servers or computer system 1675D.

The SSIA system 190 may include one or more display devices 1660 or computing device. For example, in one or more embodiments, a human in the loop may assist in obtaining files and sending those files to the respective ISSS. The display devices 1660 may be a standalone display device or a display device that is integrated into a computing device 700, as described in relation to FIG. 7. In another embodiment, the computing devices with display devices 1660 may automate the process for obtaining and sending the follow-along security image and data files to a designated workstation (i.e., SS computer station 2672A). By way of a non-limiting example, the follow-along security image and data files may be sent to an artificial intelligence (AI) engine to process the image and data files for regulations associated with cruise ships, trains, hotels, buses, resorts, or any combination. The AI engine (i.e., SS computer station 2672A) would auto-generate a signal representative of the results.

The SSIA system 190 may include one or more servers or computer system 1650 and memory devices 1655 that may be communicatively coupled wired or wirelessly to the display devices 1660. The one or more servers or computer system 1650 is described in more detail in relation to FIG. 7.

The SSIA system 190 may include an enterprise messaging system (EMS) 1557 to send short message service (SMS) messages on the status and location of luggage items to designated luggage handler's computing devices.

The SSIA system 190 may receive information from a computing device 1602 associated a trigger associated with a registered passenger having a luggage handling service. The registration information may include flight information, such as an airline carrier company, flight information, country, originating airport, itinerary confirmation number or passenger name record (PNR) number and passenger's name, for example. Other registration information that may be entered by the passenger may include information related to the second vehicle of travel. The second vehicle of travel may be for a cruise ship reservation, a train reservation, a bus reservation, or a lodging entity reservation. The information may be collected before the day of travel with the first mode of travel.

The registration information may be used by the SSIA system 190 to generate routing information from a manifest. In one or more embodiments, the manifest may be for a single second vehicle of travel or multi-carrier second vehicle of travel. In one embodiment, the analysis cannot start until after the FSSMS 40 has completed the security screening imaging process or the air carrier 20 or 22 has taken off with the luggage item and passenger. In other embodiments, the analysis is triggered by the terminating B-Type message described in FIG. 1A.

In one or more embodiments, SSIA system 190 may screen luggage items of passengers arriving at a hotel or resort using a flight by an air carrier with or without baggage handling by system 100. SSIA system 190 may alert the SMTS 1680D of any prohibited objects or materials or combination of materials if combined may be hazardous.

In one or more embodiments, SSIA system 190 may be part of SMTS 1680A and perform analysis for cruise ships of one or more cruise ship companies only.

In one or more embodiments, SSIA system 190 may be part of SMTS 1680B and perform analysis for trains of one or more railway systems only.

In one or more embodiments, SSIA system 190 may be part of SMTS 1680C and perform analysis for buses of one or more bus carrier companies only.

In one or more embodiments, SSIA system 190 may be part of SMTS 1680D and perform analysis for a lodging entity/resort of one or more companies only.

In one or more embodiments, SSIA system 190 may be part of FMTS 10.

In one or more embodiments, SSIA system 190 may be a third-party vendor.

The examples described herein are for illustrative and descriptive purposes and should not be limiting in any manner. As should be understood from the description herein, to describe each and every rule and regulation for all modes of transportation or travel around the world is prohibitive.

Figure 17A:
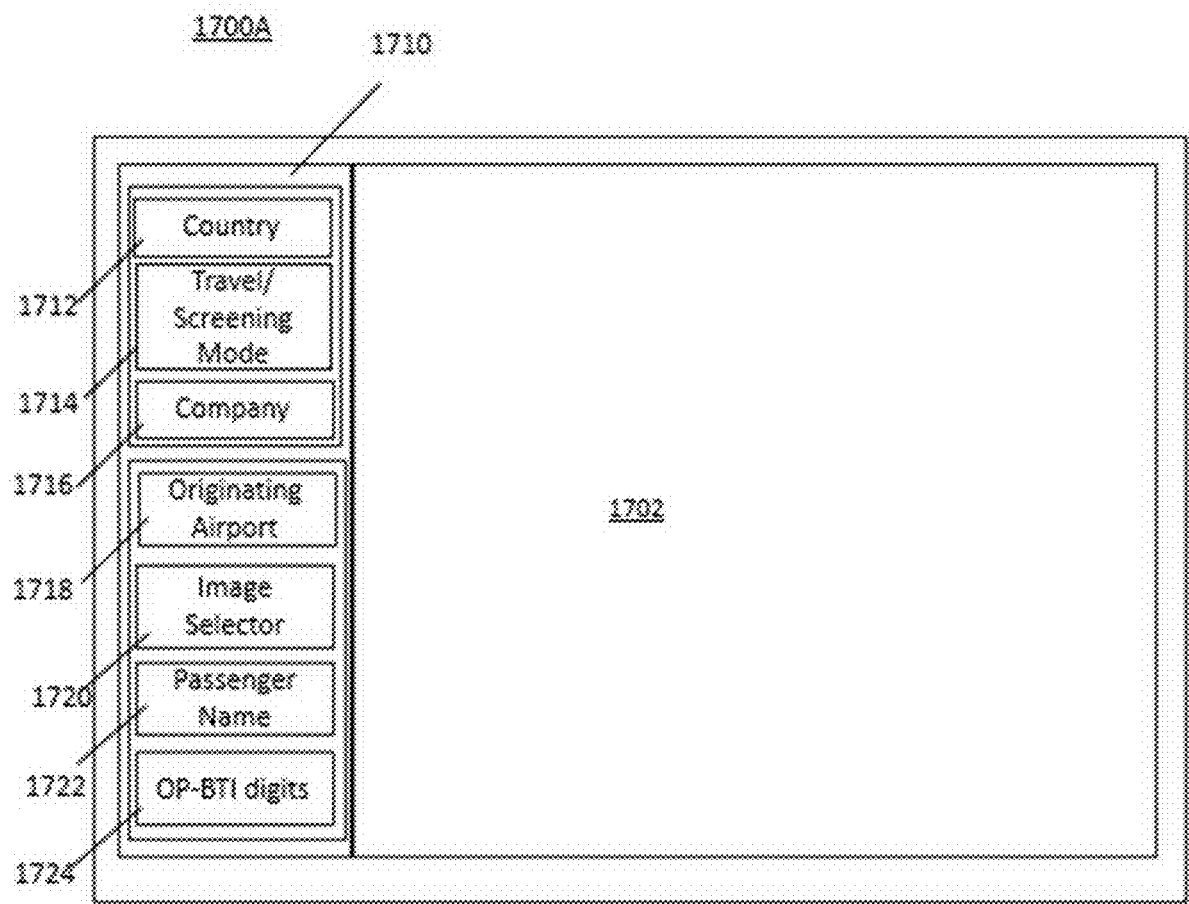
FIG. 17A illustrates a graphical user interface (GUI) for retrieving at least one security screening image in accordance with an embodiment.

FIG. 17A illustrates a GUI 1700A for retrieving at least one security screening image in accordance with an embodiment. The GUI 1700A may include a display window 1702 and data entry tabs or buttons 1710 for navigation and control. GUI 1700A may include a country tab or button 1712 and a travel/screening mode tab or button 1714. For example, the GUI 1700A may receive the country from which the second mode of travel may originate. Selecting the country tab or button 1712 may cause a drop-down menu or list of countries to be automatically displayed. Selection of a country with a mouse or other user interface enters the country into the system. The travel/screening mode tab or button 1714 may list any of the second modes of travel, including lodging entities or resorts, or second modes of transportation identified herein.

The GUI 1700A may receive the type of second mode of travel so that the training data for the regulations can be retrieved for the designated jurisdiction (i.e., country). If there are any states, county, city, provinces, etc., this information may be added. This allows the system to access regulations for all the regulating governing agencies. As described above, training data for a list of prohibited items for the second mode of travel is retrieved according to the country and the government agency.

Since CBP and/or the Coast Guard, for example, allow cruise ships to have additional rules, the GUI 1700A may receive a cruise ship company name via company tab or button 1716. This allows the one or more servers or computer system 1650 to retrieve training data associated with the rules associated with the company for analyzing the screening of the luggage items. The GUI 1700A may receive information related to the originating airport in the originating airport tab or button 1718. Selecting the tab or button 1718 may provide a drop-down list of airports that can be selected. The GUI 1700A may include an image selector tab or button 1720. A drop-down list of available images may be listed. Any one image may be selected. The GUI 1700A may include a passenger name tab or button 1722. When the manifest is loaded in the GUI, selecting the passenger's name tab or button 1722 may provide a list of passenger's names in the manifest that need their luggage items analyzed for a different mode of travel or different country, for example. The user may select using a mouse or other user interface, a passenger's name. After the passenger's name is selected, either the unique identifier (i.e., OP-BTI digits) is entered in field 1724 or caused to be retrieved such as from a luggage manifest or field in a stored B-Type message.

Figure 17B:
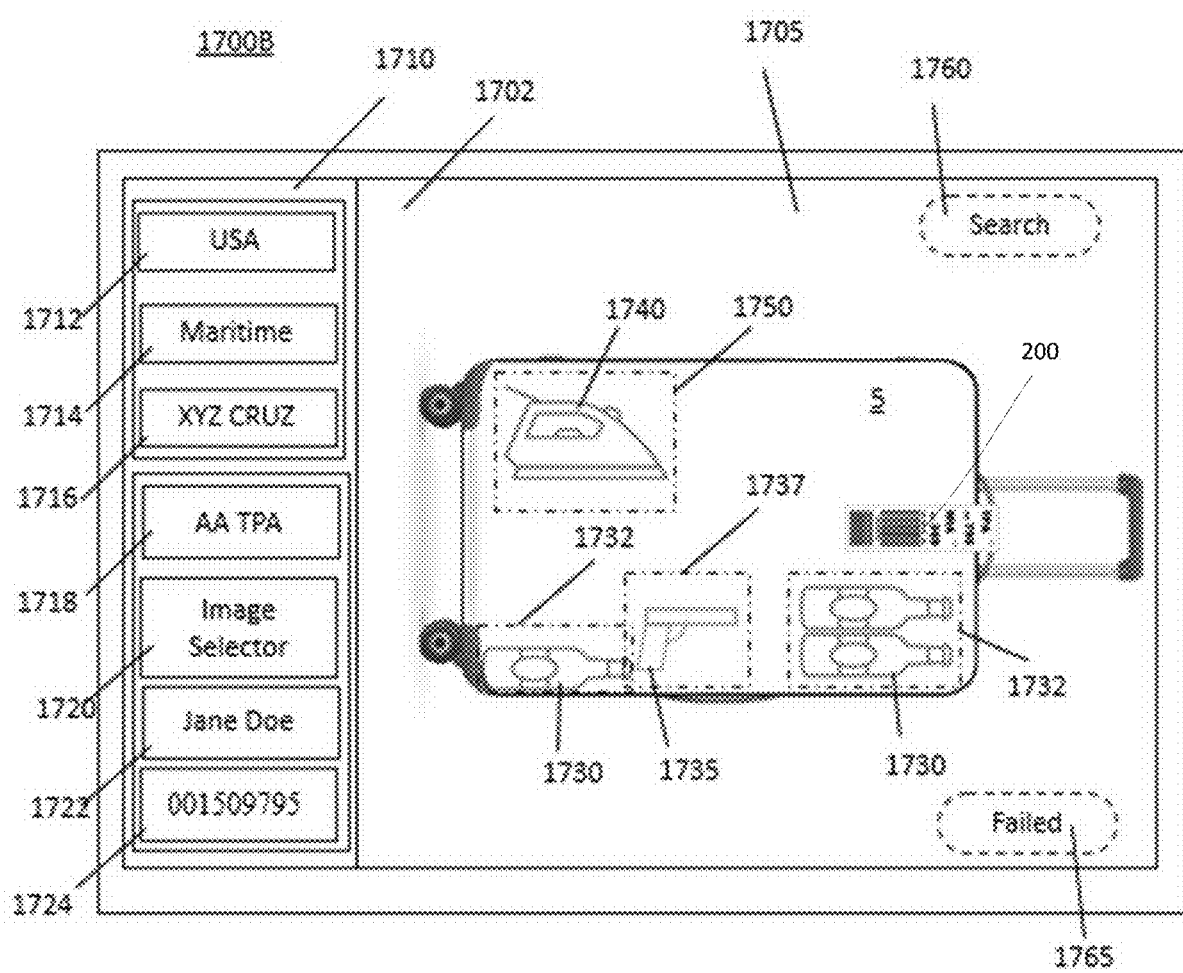
FIG. 17B illustrates the GUI of FIG. 17A screening at least one security screening image in accordance with an embodiment.

FIG. 17B illustrates the GUI 1700B of FIG. 17A screening at least one security screening image in accordance with an embodiment. According to one or more embodiments, the possible prohibited object includes weapons, bottles alcohol, irons, and electrical power strips, among other things. FIG. 17B is essentially the same as FIG. 17A so only the differences will be described.

In FIG. 17B, a selected image 1705 that was selected from the memory devices of FSSMS 40 is shown. The image 1705 shows luggage item 5 with a printed bag tag (i.e., bag tag 200). The image 1705 shows an X-ray representation of objects 1730, 1735 and 1740, for example. In the example, the object 1730 is annotated with box 1732 to denote that it is a prohibited object, such as alcohol. The object 1735 is annotated with box 1737 to denote that it is a prohibited or hazardous object, such as a weapon. The object 1740 is annotated with box 1750 to denote that it is a prohibited, such as an iron. The boxes 1732, 1737, and 1750, for example, may be annotated by image processing/machine learning autonomously or by a screening.

As for prohibited substances, the information may be obtained using the mass/density calculations by the machine learning process.

According to one or more embodiments, the first mode of travel or first mode of screening may provide a list of hazardous materials identified in their screening. Therefore, when the security screening images are retrieved, a file of detected hazardous material or a materials list may be obtained. For example, some weapons are made by three-dimensional printing. However, bullets that contain gun powder may be present. Accordingly, a list of bullets, gun powder or a combination thereof may be identified.

According to one or more embodiments, the first mode of travel or first mode of screening may provide a list of material or chemicals, which individually are non-hazardous. However, when one or more of certain non-hazardous material or chemical are combined, the resultant solution can become hazardous or explosive, for example.

According to one or more embodiments, the GUI 1700B may include a control button 1760 to initiate a search of prohibited objects and materials using a machine learning detection algorithm including machine learning object detection. In one or more embodiments, the screener performs the screening themselves by looking at the images on the screen and comparing the images to prohibited images, for example, as will be described in detail in relation to FIG. 17C.

According to one or more embodiments, the GUI 1700B may include an analysis results indicator 1765. In one or more embodiments, the indicator 1765 may allow a user to enter a mark in the manifest of the analysis result representative of one of a security compliance of the luggage item for travel on the second mode of transportation, travel or screening and a non-security compliance of the luggage item for travel on the second mode of transportation, travel, or screening. Accordingly, this information may be communicated to a trusted handler of those luggage items marked as having the security compliance of the second mode of transportation, travel, or screening to bypass subsequent security screening by a second security screening machine system of the second mode of transportation, second mode of travel, or second mode of screening.

In one or more embodiments, those luggage items that pass security screening and are entering from another country to transfer mode of travel, may bypass security screening at the second mode of travel.

Additionally, the passenger may save time in Custom's lines using the Global Entry Mobile application, by U.S. Customs and Border Protection (CBP) available on GOOGLE Play Store, APPLE Store or other authorized software sellers for mobile devices. The application requires a traveler to be an active member in the Global Entry Program by CBP. The traveler entering the United States, for example, at one of the ports, will take a selfie which is verified. The user is provided a code to expedite their process through CBP using the code on the application. The same code may be used to also release the luggage item that passed the transfer mode analysis to bypass security on the next travel vehicle. In this instance, the luggage item remains in trusted custody until it is passed to the next travel vehicle.

Figure 17C:
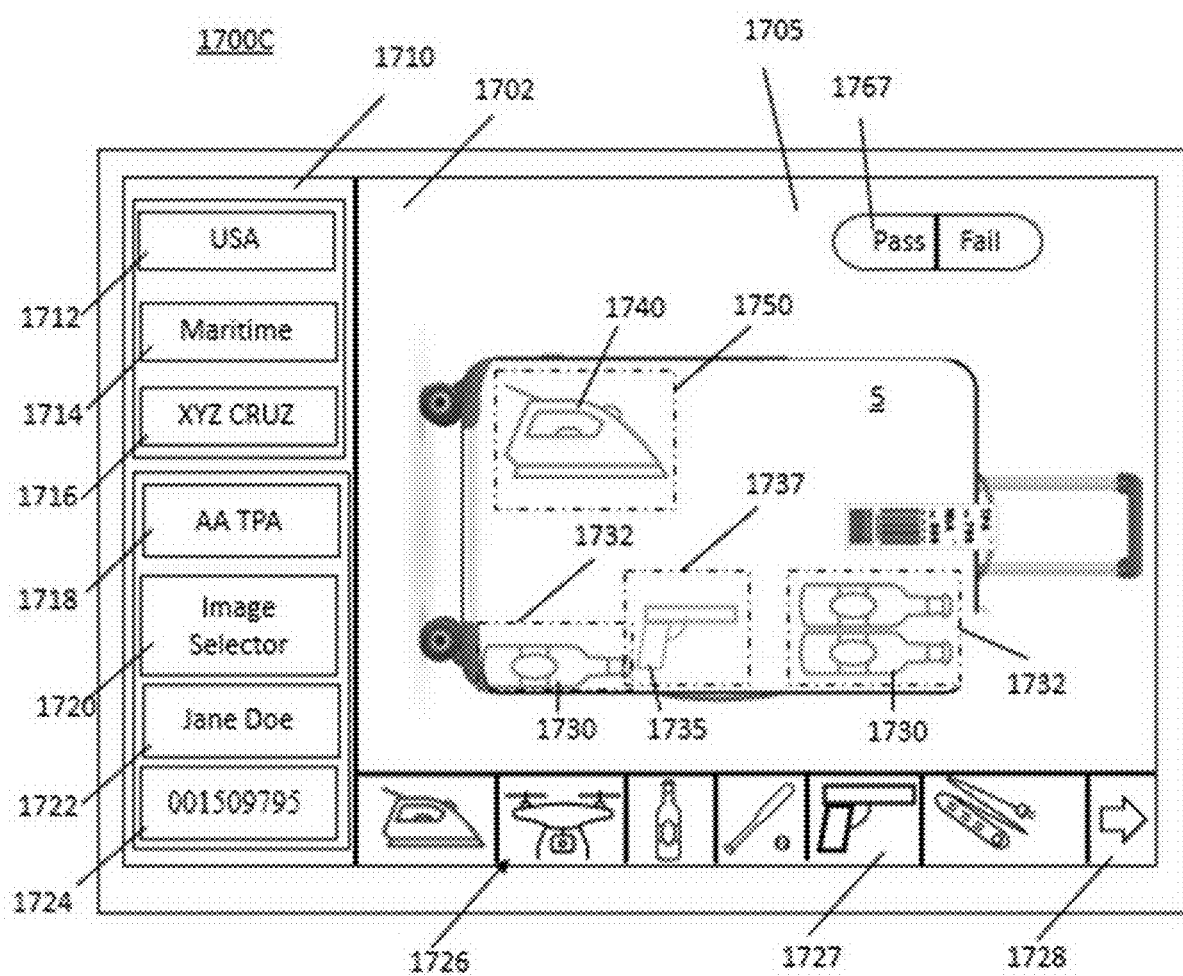
FIG. 17C illustrates the GUI of FIG. 17A screening at least one security screening image by a screener in accordance with an embodiment.

FIG. 17C illustrates the GUI 1700C of FIG. 17A screening at least one security screening image by a screener in accordance with an embodiment. GUI 1700C is similar to GUI 1700B so only the differences will be described. In this example, the scanner may have placed the boxes 1732, 1737, and 1750, for example, around the possible prohibited objects using a mouse, finger, or other implement to annotate the image. Other annotations may be added using a touch screen display device.

The GUI 1700C may include, at least one row 1726, a plurality of prohibited objects or substances 1727. The prohibited objects or substances 1727 may be in the form of an icon or an image. Clicking on any one icon or image in the row 1726 may provide a drop-down list of other shapes and styles of prohibited objects or substances. The GUI 1700C may include arrow 1728 in row 1726. The arrow 1728, when selected, may cause scrolling of the images out of view to show additional images or icons that are prohibited.

The GUI 1700C may include security analysis results indicator selector 1767. In one or more embodiments, the indicator selector 1767 may allow a user to enter a mark in the manifest of the security analysis result representative of one of a security compliance, such as selecting pass, of the luggage item for travel on the second mode of transportation, travel or screening and a non-security compliance, such as selecting fail, of the luggage item for travel on the second mode of transportation, travel, or screening.

Figure 18A:
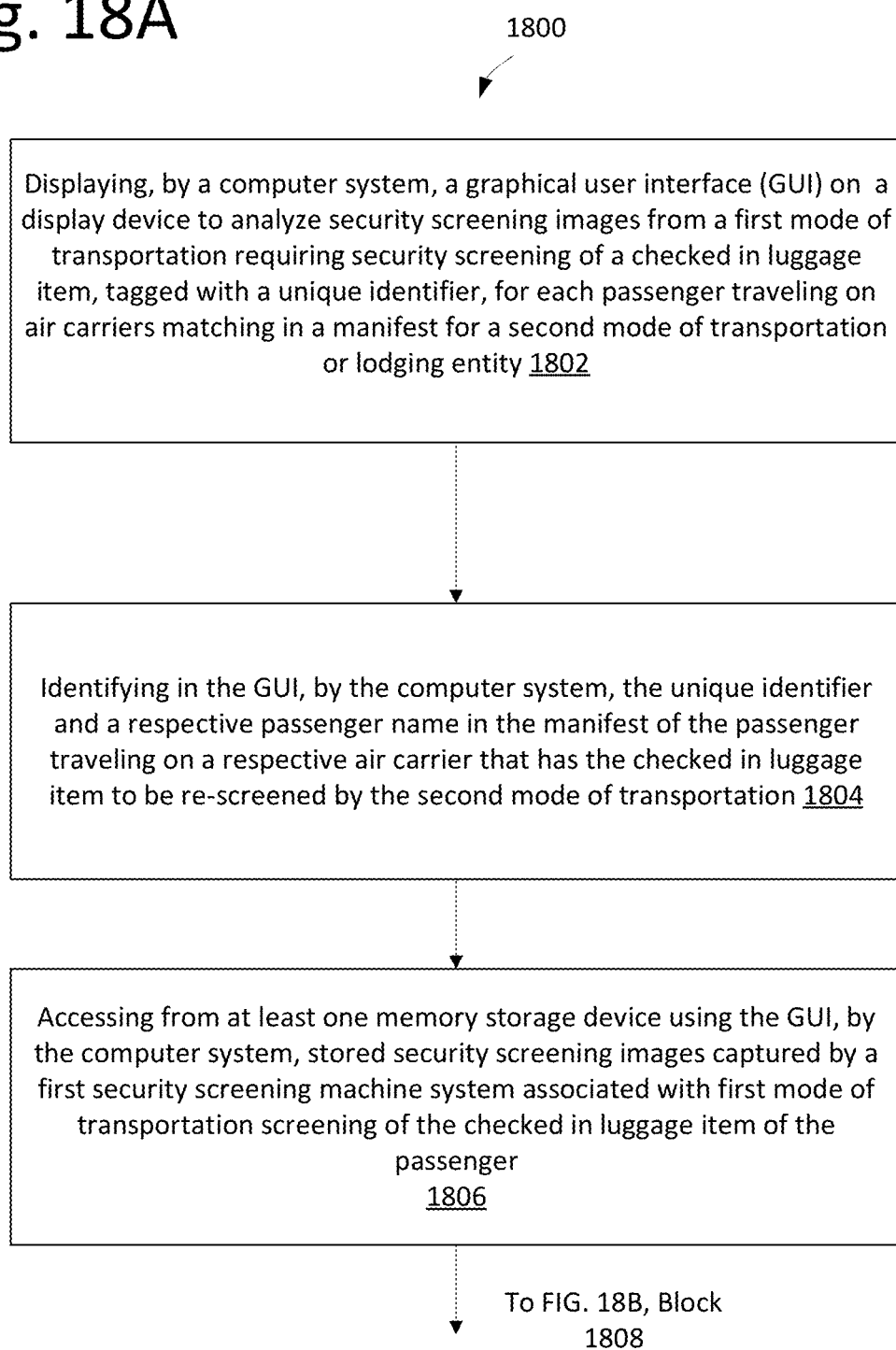

FIGS. 18A-18B illustrate a flowchart of a method 1800 for the second mode of travel screening in accordance with an embodiment.

According to one or more embodiments, the method 1800 may include, at block 1802, displaying, by a computer system 1650, a graphical user interface (GUI) 1700A, 1700B, and 1700C on a display device 1660 to analyze security screening images from a first mode of transportation requiring security screening of a checked-in luggage item, tagged with a unique identifier, for each passenger traveling on air carriers matching in a manifest for a second mode of travel.

According to one or more embodiments, the method 1800 may include, at block 1804, identifying in the GUI 1700A, 1700B, and/or 1700C by the computer system or server 1650 of system 190, the unique identifier and a respective passenger's name in the manifest of the passenger traveling on a respective air carrier that has the checked-in luggage item to be re-screened by the second mode of transportation, a second mode of travel or a second mode of screening. The second mode of screening may be independent of the mode of travel or transportation in one or more embodiments.

According to one or more embodiments, the method 1800 may include, at block 1806, accessing from at least one memory storage device using the GUI 1700A, 1700B, and/or 1700C by the computer system 1650, stored security screening images captured by a first security screening machine system associated with first mode of transportation screening, first mode of travel screening or a first mode of screening of the checked-in luggage item of the passenger.

According to one or more embodiments, the method 1800 may include, at block 1808, displaying in the GUI 1700A, 1700B, and/or 1700C by the computer system or server of system 190, at least one of the stored screening images of the luggage item of the passenger on at least one display device 1660 to analyze the accessed at least one stored screening image according to rules and regulations associated with the second mode of travel or screening. In one or more embodiments, the at least one of the stored screening images of contents of the luggage item includes a three-dimensional dimensional representation of objects within the luggage item.

According to one or more embodiments, the method 1800 may include, at block 1810, receiving via the GUI 1700A, 1700B, and/or 1700C by the computer system or server of system 190, a mark in the manifest of a analysis result representative of one of a security compliance of the luggage item for travel on the second mode of transportation, travel or screening and a non-security compliance of the luggage item for travel on the second mode of transportation, travel or screening so that trusted handling of those luggage items marked as having the security compliance of the second mode of transportation, travel or screening will bypass subsequent security screening by a second security screening machine system of the second mode of transportation, travel or screening.

According to one or more embodiments, the method 1800 may include updating, by the computer system, the manifest with the IATA license plate or unique identifier.

According to one or more embodiments, the method 1800 may include accessing, by the computer system, an originating printed bag tag identification (OP-BTI) associated with the checked-in luggage item from one of a computer system associated with the respective airline or a computer system associated with the stored security screening images; and updating, by the computer system, the manifest with the OP-BTI. The OP-BTI may be the IATA license plate, for example.

According to one or more embodiments, the method 1800 may include receiving, by a second computer system associated with the second mode of transportation or travel, updated reservation information associated with a second mode of transportation or travel for the respective passenger.

According to one or more embodiments, the method 1800 may include updating, by the second computer system associated with the second mode of transportation or travel, the manifest with the updated reservation information for the second mode of transportation for the passenger.

According to one or more embodiments, the method 1800 may include, in response to acquiring the IATA license plate, by an acquiring device, triggering a communication from the second computing system to the acquiring device with the updated reservation information of the second mode of transportation or travel.

According to one or more embodiments, the method 1800 may include displaying, on a display device of the acquiring device, the updated reservation information of the second mode of transportation or travel.

According to one or more embodiments, the method 1800 may include receiving annotations using the GUI, by the computer system, to highlight at least one object that caused a negative compliance result.

According to one or more embodiments, the method 1800 may include electronically sending a message to the owner of the baggage of a positive or negative compliance result for the second mode of transportation or travel. This may be accomplished by the EMS 1657.

Figure 21:
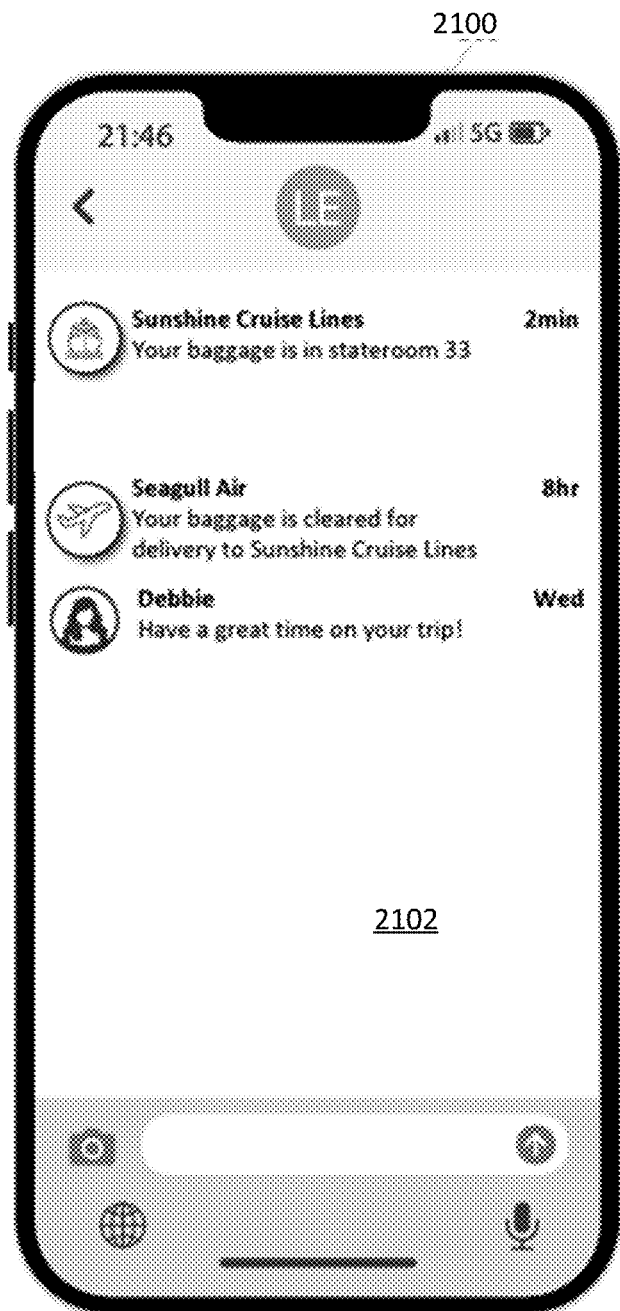
FIG. 21 illustrates a conceptual messaging graphic user interface on a mobile phone conveying the movement process of a passenger's baggage.

According to one or more embodiments, the method 1800 may include including by the computer system 1650, an explanation selected from an array of standardized explanations in the message to the owner of the baggage regarding the negative compliance result. Example messages are shown in FIG. 21.

According to one or more embodiments, the method 1800 may include advancing an annotated image of the object that caused the negative compliance result to a security screening entity at the second mode of travel. For example, the screener at display device 1660 may take a screen shot and communicate the screen shot via the one or more computing systems or servers 1650 or EMS 1657 or by email. The display device 1660 may be a touch-sensitive display device or the applications allow the user the interface with the display device with a mouse or other instrument to draw an annotation on the image.

The FSSMS 40 during the security screening process may scan the IATA license plate or otherwise obtain the baggage unique identifier using RFID or NFC technology. This can provide an index to the stored images for retrieval by system 190.

According to one or more embodiments, the bag tag number or IATA license plate is set as a unique identifier and added to the manifest. In one or more embodiments, the unique identifier is the IATA license plate or bag tag number from the B-Type message.

Figure 19:
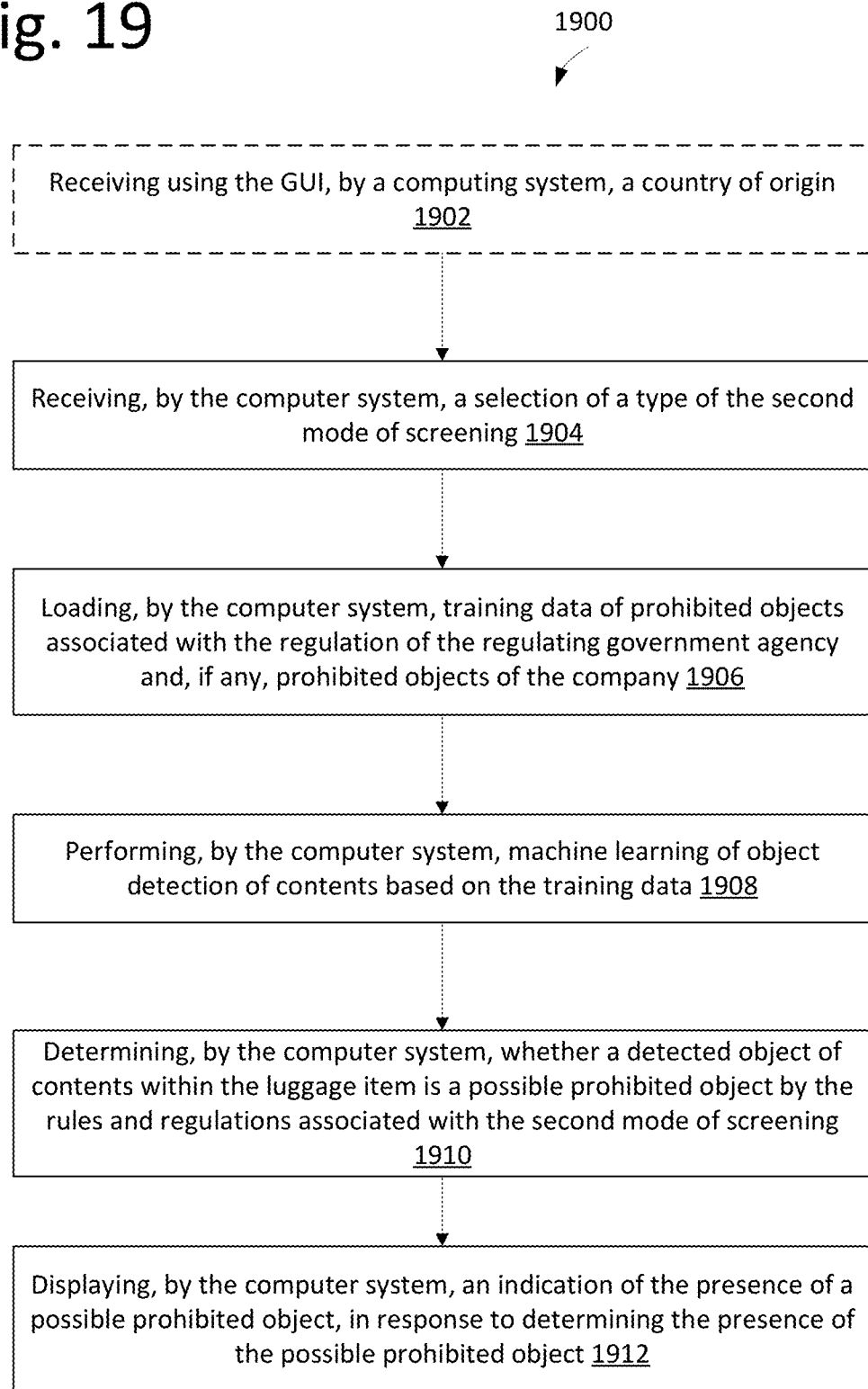
FIG. 19 illustrates a flowchart of a method for detecting the presence of a possible prohibited object in accordance with an embodiment.

FIG. 19 illustrates a flowchart of a method 1900 for detecting the presence of a possible prohibited object in accordance with an embodiment. According to one or more embodiments, the method 1900 may include, at block 1902, receiving using the 1700A, 1700B, and 1700C GUIS (FIGS. 17A-17C), by the computing system 1650, a country of origin. According to one or more embodiments, the method 1900 may include, at block 1904, receiving, by the computer system 1650, a selection of a type of the second mode of screening and loading training data of objects.

In one or more embodiments, the training data may include a list of objects that are prohibited for the second mode of travel. The screener would inspect the displayed image using the 1700A, 1700B, and 1700C GUIS (FIGS. 17A-17C) to see if any of the prohibited objects are seen. In one or more embodiments, the 1700A, 1700B, and 1700C GUI (FIGS. 17A-17C) may display a list of prohibited objects along a border of the 1700A, 1700B, and 1700C GUIS (FIGS. 17A-17C), such as a top border, a bottom border, a right border, or any combination thereof.

According to one or more embodiments, the method 1900 may include, at block 1906, loading training data of prohibited objects associated with the regulation of the regulating government agency and, if any, training data of prohibited objects of the second mode of travel company.

By way of non-limiting examples, the training data may include training images of prohibited objects of the regulating government agency and training images of the company of the vehicle of travel.

By way of non-limiting examples, the training data may include mass and density values of prohibited objects by the regulating government agency and mass/density values of prohibited objects by the company of the vehicle of travel.

The imaging machines 45 or 50 (FIG. 16) may record the resulting data. The CT scanner (i.e., imaging machines 45 or 50) may use this data to create a detailed tomogram of the luggage item and calculate the mass and a density of individual objects in the luggage item based on this tomogram. Hazardous and/or prohibited objects will have their own mass and density. So, if a particular object has mass and/or density that denotes a hazardous or prohibited material or object, the CT scanner warns the operator of this object. However, some objects that are not hazardous on an aircraft because a passenger does not have direct access to it in the cargo hold, are hazardous or prohibited on a cruise ship.

According to one or more embodiments, the method 1900 may include, at block 1908, performing machine learning of object detection of contents based on the training data of objects. The machine learning algorithm may include, by way of a non-limiting example, convolutional neural network (CNN) algorithms. For example, the CNN algorithms may include region-based CNN (i.e., R-CNN), masked R-CNN, faster R-CNN, and others. Other types of algorithms may include YOLO type algorithms (you only look once), for example.

In one or more embodiments, the machine learning algorithm may be performed in 2D images. In other embodiments, the image data is converted to 3D images to perform mass and density calculations of the tomogram (slice). The calculation may be compared to a range of the mass and density to determine if the values calculated are within the range indicating a possible prohibited object. In one or more embodiments, a prohibited object may be a hazardous object.

According to one or more embodiments, the method 1900 may include, at block 1910, determining whether a detected object of contents within the luggage item is a possible prohibited object by the rules and regulations associated with the second mode of screening of the second mode of travel.

According to one or more embodiments, the method 1900 may include, at block 1912, displaying an indication of the presence of a possible prohibited object, in response to determining the presence of the possible prohibited object. The GUIS 1700A, 1700B, and 1700C (FIGS. 17A-17C) may display an indication of a possible prohibited object such as with a color-coded annotated box, a text alert overlaid on the object in the screen or other visual alarm.

FIG. 20 illustrates a block diagram of programming modules 2000 for analyzing security screening images according to an embodiment. The programming modules 2000 may be stored in the one or more memory devices 1655 to be executed by the one or more computing devices or servers 1650.

The one or more programming modules 2000 may include software, hardware, firmware, or a combination of software, hardware, and firmware. The computing devices and/or servers 1650 may include at least one processor and/or hardware to execute instructions of the programming modules 2000.

According to one or more embodiments, the programming modules 2000 may include a registration module 2002, manifest generator module 2004, unique identifier retriever module 2006, GUI module 2008 (FIGS. 17A-17C), image selector module 2010, analysis module 2012 (FIG. 19), and an analysis results communication module 2022.

The registration module 2002 may include a graphical user interface that allows the passenger to enter the registration data described above. The registration module 2002 may allow the passenger to login and create an account.

The security screening analysis results communication module 2022 may include network interfaces 720, such as a network interface card to connect (wired or wireless) to a network or other communication conduits 722 described in FIG. 7 to communicate with systems of the second mode of travel. The security screening analysis results communication module 2022 may use the EMS 1657 to communicate with the passenger.

The analysis module 2012 may include one or more of object detector modules 2014 such as using machine learning algorithms, an annotation module 2016, a 3D generator module 2018, a mass and density calculator module 2020, and pass/fail marker module 2020. As shown in FIG. 17B, the annotation module may allow the user to write on the screen with a stylus, finger, mouse, or other implement using a touch sensitive display screen of display device 1660.

FIG. 21 illustrates a user interface 2102 on a passenger's mobile device 2100 conveying information on the status of their luggage items. In this embodiment, an EMS 1657 (FIG. 16) sends SMS (short message service) messages to passengers on the status and location of their baggage. In this thread of messages, analysis screening occurred while the passenger was in-flight on an air carrier 20 (FIG. 16). The analysis indicated the baggage passed all screening criteria for the cruise line. Therefore, rather than having the passenger pick up their baggage at the destination airport, and then carry them to the cruise terminal (where they are screened a second time), they simply go to their state room on the cruise ship and their bags are already delivered into their room.

This process can provide more efficiency to the cruise employees because the baggage handling team may be a separate entity, which can confirm any changes to the cabin room before delivering the luggage item to the room. This can further provide a beneficial travel experience for the passenger to not worry about lugging luggage to the wrong room or standing in long lines to have their baggage checked in.

The system is programmed to provide an explanation selected from an array of standardized explanations in the message to the owner of the baggage regarding the negative compliance result. This is shown by the example messages of FIG. 21.

The embodiments herein may include a method and system for modal analysis of security screening images of a first mode of travel. The method includes accessing, by a computer system, a unique identifier associated with a checked-in luggage item from a computer system associated with the first mode of travel. The method includes displaying, by the computer system, a graphical user interface (GUI) on a display device to analyze security screening images from a first mode of travel requiring security screening of a checked-in luggage item, tagged with a unique identifier, for each passenger traveling on air carriers matching in a manifest for a second mode of travel.

The method may include identifying in the GUI, by the computer system, the unique identifier and a respective passenger's name in the manifest of the passenger traveling on a respective air carrier that has the checked-in luggage item to be re-screened by the second mode of travel. The method includes accessing from at least one memory storage device using the GUI, by the computer system, stored security screening images captured by a first security screening machine system associated with first mode of travel screening of the checked-in luggage item of the passenger.

The method may include displaying in the GUI, by the computer system, at least one of the stored screening images of the luggage item of the passenger on at least one display device to analyze the accessed at least one stored security screening image according to at least one of regulations and rules associated with the second mode of travel.

The system may include at least one processor and a memory storing instructions that, when executed by the at least one processor, configured to cause the at least one processor to: access a unique identifier associated with a checked-in luggage item from a computer system associated with the first mode of travel. The processor may display a graphical user interface (GUI) on a display device to analyze security screening images from a first mode of travel requiring security screening of a checked-in luggage item. These screening images may be tagged with the unique identifier, for each passenger traveling on air carriers matching in a manifest for a second mode of travel.

The processor may also identify in the GUI the unique identifier and a respective passenger's name in the manifest of the passenger traveling on a respective air carrier that has the checked-in luggage item to be re-screened by the second mode of travel. The processor may access from at least one memory storage device, using the GUI, stored security screening images captured by a first security screening machine system associated with first mode of travel screening of the checked-in luggage item of the passenger. The processor may display in the GUI 2102 at least one of the stored screening images of the luggage item of the passenger on at least one display device to analyze the accessed at least one stored security screening image according to at least one of regulations and rules associated with the second mode of travel.

Figure 22:
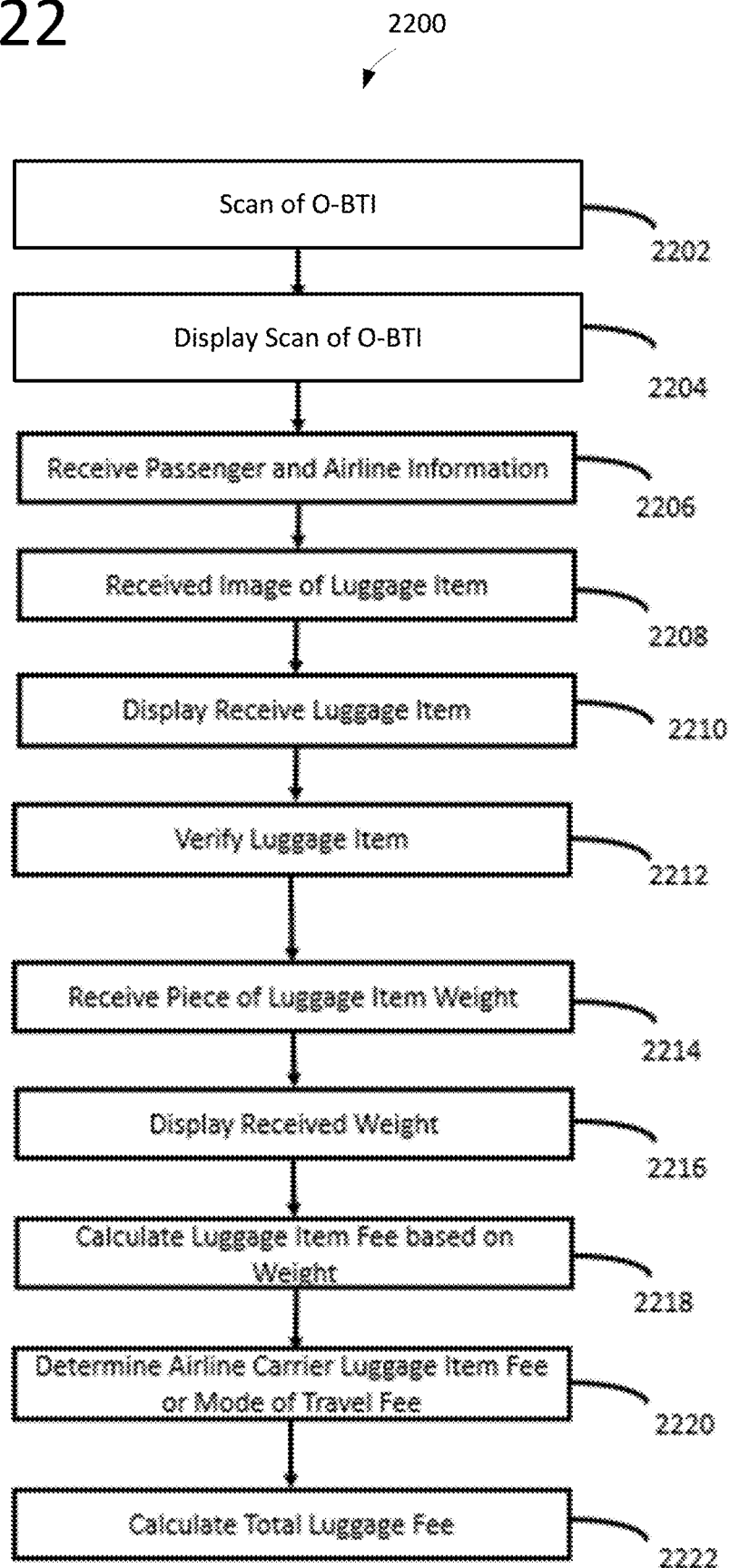
FIG. 22 illustrates a flowchart of a method for calculating bag fees in accordance with an embodiment.

FIG. 22 illustrates a flowchart of a method 2200 for calculating bag fees in accordance with an embodiment. This method 2200 may be performed at any time. However, the method 2200 may be performed as part of a check-in process for a luggage item. The method 2200 may include, at block 2202, scanning, by a scanning device, the O-BTI or the IATA license plate, marker 212 or MK 136.

The method 2200 may include, at block 2204, displaying the O-BTI on a display device associated with the scanning device or a computing device 122; and at block 2206, receiving passenger and airline information from the passenger manifest record associated with the O-BTI or the luggage manifest record associated with the O-BTI. By way of a non-limiting example, the information may include the airline name and/or airline code. The airline information may include the baggage fees for checked in luggage items. In one or more embodiments, the luggage manifest record may indicate a baggage fee or a baggage fee waiver. For example, a passenger manifest record may indicate a frequent flyer number, which waives the passenger's fees for checking in a luggage item on a flight with the air carrier associated with the frequent flyer number. In one or more embodiments, the first luggage item may have a $0 baggage fee. However, each additional luggage item may have an additional checked baggage fee in addition to additional fees for over the weight limit amount associated with an air carrier. Each air carrier has different rates. Furthermore, a passenger may be given a preferred baggage fee.

The method 2200 may include, at block 2208, receiving an image of the luggage item. For example, using the scanning device or an imaging device, an image of the luggage item to be checked in for a flight may be captured; and may, at block 2210, be displayed on a display screen of the scanning device, imaging device or computing device 122.

The method 2200 may include, at block 2212, verifying the luggage item such as by comparing the passenger's name on the IATA bag tag 200, marker 212 or MK 136 with the passenger's name in the luggage manifest record. The method 2200 may also verify the luggage item by comparing the image of the luggage item described, in FIG. 1B, with the image of the luggage item for check-in. This process may use the originating hardcopy bag tag 200, marker 212 or MK 136 for check-in for the return flight. For integrity, the verification of the luggage item for the return flight may use for identification the originating hardcopy bag tag 200, marker 212 or MK 136 combined with the visual confirmation using an image of the luggage item. This may limit or prevent swapping of originating IATA bag tag or marker from another luggage item for use on someone else's luggage item.

Since each air carrier has discretion on certain fields entered on the IATA bag tag 200 and marker 212, if a passenger's name is not present, additional passenger's identity validation may be required. Still further, if at the time of check out the IATA bag tag, marker 212 and/or MK 136 are missing or damaged such that verification data cannot be accessed, then an alternate validation process may be used to access the luggage item manifest record for return flight data or other return travel data.

The method 2200 may include, at block 2214, receiving the weight of a piece of luggage item. By way of a non-limiting example, a weighing device may communicate with the scanning device and/or computing device 122 to receive the weight of the luggage item to be checked in. Once the weight is received, the weight may be displayed, at block 2216. In one or more embodiments, the scanning device or computing device 122 may include a graphical user interface with a data entry field to enter the weight of the luggage item.

The method 2200 may include, at block 2218, calculating, by a processor of the computing device 122, a luggage item fee based on the weight. The method 2200 may include, at block 2220, determining an airline carrier luggage item fee or mode of travel fee for the luggage item. There may be other fees that need to be determined based on country.

The method 2200 may include, at block 2222, calculating, by a processor of the computing device 122, a total luggage fee.

The fees may be paid by the passenger in a variety of ways. For example, the fees may be charged to the room and paid by the passenger at checkout.

In one or more embodiments, trained personnel may come to a passenger's cabin to start the check-in process, such as weighing the luggage item, verifying the luggage item and taking payment for the baggage fees.

In one or more embodiments, the baggage fees may be charged to the passenger's account associated with a baggage delivery and handling service.

Although the acts described in FIG. 22 may be performed by a scanning device or computing device 122, one or more of the blocks may be performed by server 148.

Figure 23:
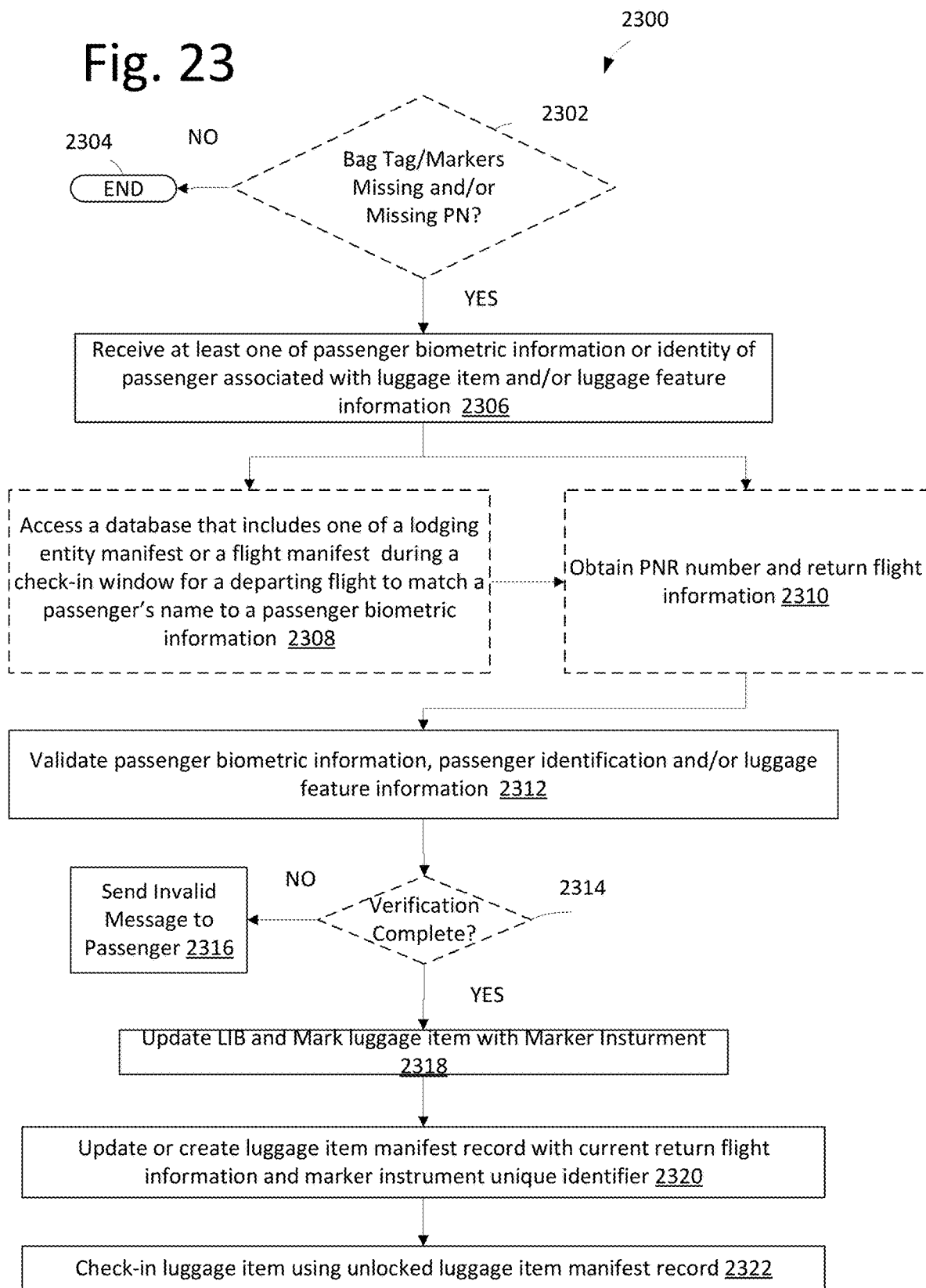
FIG. 23 illustrates a flowchart of a method for checking in a luggage item when the bag tag and/or marker are missing in accordance with an embodiment.

FIG. 23 illustrates a flowchart of a method 2300 for checking in a luggage item when the IATA bag tag 200 and/or marker 212 are missing in accordance with an embodiment. Furthermore, the passenger's name may be missing on the bag tag or the marker.

The method 2300 may include determining whether the originating hardcopy bag tag 200 and/or marker 212' is missing, at block 2302. If the determination, at block 2302, is "NO," the method 2300 ends, at block 2304. If the determination, at block 2302, is "YES," the method 2300 may proceed to block 2306. The luggage item's feature information (i.e., features in an image) may be received to reconcile the luggage with the passenger in the absence of bag tags or markers.

The method 2300 may include receiving, by the computing device 122 or server 148, one of the passenger biometric information or an identification of the passenger associated with luggage item, at block 2306. The passenger may present a valid driver's license, passport, or real ID. Before any passenger can check-in for their flight, their identity must be verified. The Real ID Act of 2005 enacted by Congress will require passengers to have a license issued by a state to be compatible with the requirements thereof. For example, a license or identification card compatible with the Act of 2005 can include a star in the upper right-hand corner.

The driver's license may be scanned to validate the driver's license. Another validation method to authenticate the instruments may be used to authenticate a person's identity.

The method may use the passenger's valid picture identification (i.e., driver's license, passport, or other valid identification instrument) to initiate the check-in process of the luggage item with a trusted custody handler. The passenger identification may be verified using verification process 3180, for example, and as described in relation to FIG. 31, or other verification processes.

The method 2300 may include, at block 2308, accessing a database, by the computing device 122 or server 148, that includes one of a lodging entity manifest or a flight manifest during a check-in window for a departing flight to match a passenger's name to the passenger biometric information. By way of a non-limiting example, a passenger may check-in themselves during a check-in window. In other instances, the passenger may not check themselves in for a return flight. In FIG. 1D, the flight manifest 151 may be searched for a match of the passenger's name to verify they have a return flight, for example. In another embodiment, the return flight information may be in a lodging entity manifest or other manifest, for example.

The method 2300 may include, at block 2310, obtaining a PNR number to access a passenger return flight information. In some instance, a passenger may have a PNR number texted or provided to a trusted custody handler or luggage handling personnel for pickup and delivery of the luggage item to a designated air travel carrier. By way of a non-limiting example, a PNR number on an itinerary, e-ticket or boarding pass may be entered manually into an application by the trusty custody handler or luggage handling personnel. Alternately, the text of the PNR number may be converted into machine-encoded text from an image of the itinerary, e-ticket or boarding pass, for example. The PNR number may be used to access return flight information, if not already available.

The method 2300 may include validating, by the computing device 122 or server 148, the passenger biometric information, at block 2312. When a ticket for a return flight is found, the passenger biometric information can be completed by the verification process, at block 2314. The system 100 confirms that the passenger has a reservation for a return flight. The search for the match may be narrowed by receiving information from the passenger or a lodging entity manifest, such as a cruise ship manifest. For example, the passenger may indicate the air carrier for the return flight.

If the determination, at block 2314, is "NO," the method 2300 may include sending, by the computing device 122 or server 148, an invalid message to a mobile communication device of the passenger, at block 2316. If the determination, at block 2314, is "YES," the method 2300 may include marking the LIB 2450 and the luggage item with a marker instrument, at block 2318. The marker instrument may be a pre-printed unique identifier that may be affixed to the luggage item and the unique identifier logged into the LIB. The pre-printed unique identifier may be a barcode that can be scanned by a scanning device or acquiring device. In this instance, the check-in of the luggage item can take place anytime within the 24-hour window by scanning the unique identifier to access the return flight data.

The marking instrument may be a tracker such as an AIRTAG by APPLE Inc. The tracker may be a Global Positioning System (GPS) tracker, a GSM tracker or another tracker. The tracker may be programmed with a unique identifier of the passenger or the luggage item that can be pinged when the luggage item needs to be checked into a return flight in the 24-hour window, for example.

The method 2300 may include updating or creating, by the computing device 122 or server 148, the luggage item manifest record with the current return flight information and the marker instrument unique identifier, at block 2320.

The method 2300 may include checking in, by the computing device 122 or server 148, luggage item using return flight data in the unlocked luggage item manifest record, at block 2322. The unique identifier may be used to unlock the return flight data.

In one or more embodiments, the luggage item manifest record may be unlocked by one of 1) scanning the IATA barcode of the license plate in the originating hardcopy bag tag; 2) scanning the IATA barcode of the license plate of the marker 212'; or 3) scanning a MK 136 with the IATA barcode of the license plate of the originating hardcopy bag tag, provided that the IATA bag tag, the marker or the MK do not appear to have been tampered with.

In one or more embodiments, the luggage item manifest record may be unlocked by the passenger biometric information and one of 1) scanning the IATA barcode of the license plate of the originating hardcopy bag tag; 2) scanning the IATA barcode of the license plate of the marker 212'; or 3) scanning a MK 136 with the IATA barcode of the license plate of the originating hardcopy bag tag, provided that the IATA bag tag, the marker or the MK do not appear to have been tampered with.

In one or more embodiments, the passenger's biometric data may include fingerprint data, retina scan data, and/or facial recognition data.

The passenger's biometric data may be linked to PII data such as a passenger driver's license data, passport data and other personal identifiable information that can be used to validate the passenger's identity.

Luggage Item Brain (LIB)

Figure 24:
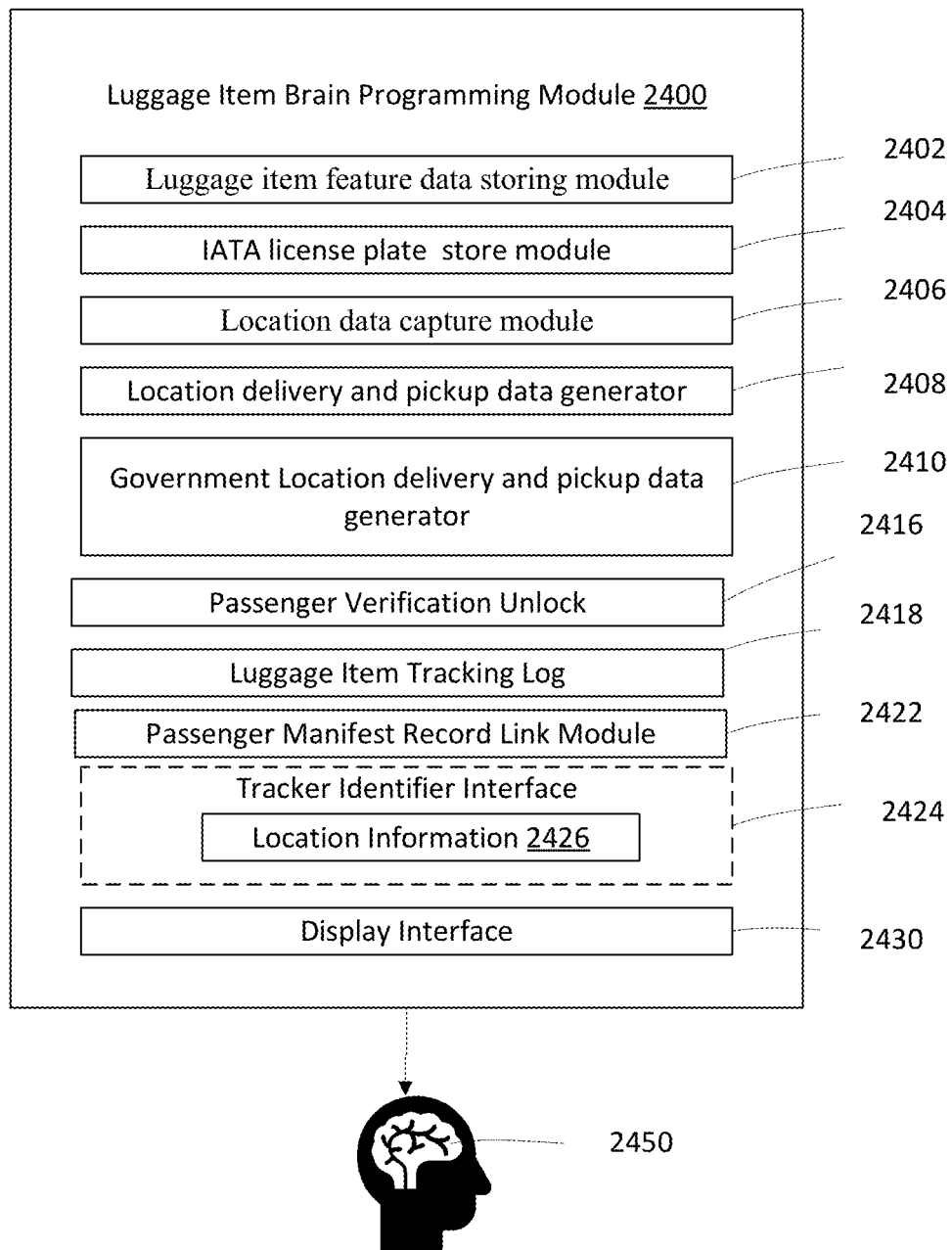
FIG. 24 illustrates a block diagram of luggage item brain (LIB) programming modules in accordance with an embodiment.

FIG. 24 illustrates a block diagram of LIB programming modules 2400 in accordance with an embodiment. The LIB 2400 may be accessed through the key fob generated by the system 100 from the paper originating hardcopy bag tag, printed instrument having at least a portion of the hardcopy bag tag information printed thereon and/or a MK 136, wherein the MK 136 may be created from the LIB 2450. In one or more embodiments, the printed bag tag may be e-printed using an RFID device that is IATA compatible.

The LIB 2450 is a universal luggage item brain that can be used outside of the airport computing infrastructure but includes an air carrier or an IATA compatible linking index key, for example, for use inside of the airport computing infrastructure. The LIB 2450 may include the same information as the universal or expanded B-Type message but uses a different coding schema than the expanded B-Type message. Information from the LIB 2450 may be provided to create fields of the expanded B-Type message for communications using wired or wireless communication protocols including one or more of mobile communication, cellular communication, satellite communications, near field communications, long range wireless communications, Ethernet communications or Internet Protocols.

The LIB 2450 may link to information as described in relation to FIGS. 14C-14E and FIGS. 29-30.

The LIB programming modules 2400 may include luggage item feature data storing module 2402, which when executed causes luggage item feature data to be stored in memory and associated with the luggage item record. Luggage item feature data may be captured by an imaging device as described in FIG. 1B or a mobile communication device 15 and added as part of the luggage item feature data or a passenger's (owner) profile. The luggage item feature data may use image recognition technology to identify a luggage item. This may be used for example, if the bag tag or marker becomes missing or damaged at any point of the luggage items travel journey or for other reasons. In one or more embodiments, if the IATA bag tag, marker, or MK 136 appear to have been tampered with, the feature data (image data) in the LIB 2450 may be used to detect tampering with the IATA bag tag 200, marker 212 or MK 136 where the expected IATA license plate or other unique identifier does not match the luggage item image.

The LIB programming modules 2400 may include IATA license plate store module 2404, which when executed causes the 10-digit IATA license plate to be stored. The IATA license plate may be captured by any processes described herein and subsequently reconciled as the luggage item terminates the airport. By way of a non-limiting example, the IATA license plate may be acquired from a data field of a communication signal representative of the terminating BSM. The IATA license plate may be acquired by image data that is converted to machine-encoded text. The IATA license plate may be acquired from scanned data of an IATA barcode encoding the IATA license plate. The IATA license plate number may be acquired by a radio-frequency identification (RFID) reader or a near field communication (NFC) identification reader, as described in more detail in relation to FIG. 1B.

The LIB programming modules 2400 may include a location data capture module 2406, which when executed causes location data from meta data shared by the scanning or acquiring device, each time the luggage item is scanned to be captured and stored. The system 100 may include acquiring devices, which when acquiring the IATA license plate such as by scanning the barcode, may provide a signal of a scan trigger to capture the location data by the LIB 2450.

The LIB programming modules 2400 may include location delivery and pickup data generator 2408, which when executed causes delivery and pickup locations to which the luggage item is to be picked up and delivered as part of its travel experience to be generated based on at least one of the terminating BSM, manifest of a next travel vehicle, lodging entity, or travel data associated with travel data of the PNR 112. The travel data of the PNR 112 may be accessible by accessing the BSM associated with the originating hardcopy bag tag in response to acquiring the IATA license plate as described in FIG. 1B. The delivery locations may be developed in two stages. The first stage may be from the manifest MX and terminating BSM. The second stage may be upon activation of the acquiring IATA license plate number using the IATA barcode, for example, to activate the electronic LIB 2450. The delivery pickup and drop off may be developed in stages, such as for each leg of travel. Some stages may overlap.

The LIB programming modules 2400 may include machine learning (ML) algorithms or artificial intelligence (AI) to create the delivery, pickup, and handling instructions. By way of a non-limiting example, the ML algorithms may include decision tree models. The decision tree models may be based on terminating BSM data, non-terminating BSM data, manifest data, next vehicle of travel, flight origination, country of origination, destination of arrival, government regulations, and more.

The LIB programming modules 2400 may include government location delivery and/or pickup data generator 2410, which when executed causes generation of delivery and/or pickup locations to which the luggage item is to be picked up and/or delivered government required security screening check locations to as part of its travel experience. The government locations may include Coast Guard locations and/or Customs and Border Protection locations. The government location delivery and/or pickup data generator 2410 may be used for those registered passengers that may use the security screening integrated assistant service. In other embodiments, the government location delivery and/or pickup data generator 2410 may be used for internal processing by system 100.

In one or more embodiments, a terminating airport may be the first customs airport a passenger and their luggage item will encounter. In such an embodiment, the data from the terminating BSM may indicate the origination airport to be an international flight. Alternately, the machine-encoded text of the image data from the passenger may indicate that the flight originated out of the country. This data may be analyzed by the government location delivery and/or pickup data generator 2410 to determine the origin of the originating flight to be an international flight. In this instance, the government location delivery and/or pickup data generator 2410 would determine the Customs and Border Protection locations and/or security procedures for clearing the luggage item, based on country of entry and/or country origin and/or mode of travel.

In one or more embodiments, the government location delivery and/or pickup data generator 2410 may include a trusted custody handler picking up and handling the luggage item for check-in for the return flight on a designated air travel carrier or other travel carrier.

Alternatively, in one or more embodiments, the trusted custody handler may receive instruction independently of the LIB. As described in relation to FIGS. 26A-26B.

The location delivery and/or pickup data generator 2408, when executed may also communicate with a lodging entity or a next vehicle of travel to determine whether a room or cabin is available for delivery of the luggage item. In other words, location delivery and/or pickup data generator 2400 may communicate with the reservations system of the lodging entity or a next vehicle of travel to determine whether the room or cabin is available, for example. In other example, the reservations system for the next vehicle of travel may indicate a bus terminal or train station, etc.

By way of a non-limiting example, if a luggage item can bypass security screening by a cruise ship, then the luggage item may remain in the trusted custody of a trusted custody handler or vendor until the room to which the luggage item is to be delivered is ready. In other examples, the luggage item that cannot bypass security screening by the next mode of travel may be delivered to the next mode of travel security screening location, screened for security and then delivered to the room or cabin by the trusted custody handler.

Certain data fields may be independently locked, such as return flight information and the passenger's personal identifiable information (PII). The luggage item brain programming modules 2400 may include a luggage item validator 2416, which when executed causes one or more of the locked data fields to be unlocked. By way of a non-limiting example, the luggage item brain may be configured to unlock the return flight information based on the luggage item feature data and/or verification of its owner's identity. For example, the return flight information is unlocked by scanning or acquiring the IATA license plate during a check-in window by a trusted custody handler.

By way of a non-limiting example, the scanning or acquiring may be accomplished by a designated machine with a registered serial number, media access control (MAC) address, or other unique identifier registered to a trusted custody handler and/or system 100. However, if the paper IATA bag tag or paper markers are missing or the passenger's name is not printed on these paper instruments, then the luggage item may need to be validated by verifying the passenger's identity, for example.

The luggage item brain programming modules 2400 may include a luggage item tracking module 2418, which when executed causes the captured location data and pickup data to be logged. When the bag tag 142 is scanned or acquired, a log of the locations traveled by the luggage item whether for pickup or delivery may be displayed by the display interface 2430 on a display device.

The luggage item brain programming modules 2400 may include a passenger manifest record link module 2422, which when executed accesses a passenger's personal identifiable information to validate/verify the identity of the passenger as the owner of the luggage item. The PII may be provided directly from the passenger in some instances or stored in a manifest of or accessible by system 100. Once the passenger is validated/verified, the IATA license plate or other unique identifier may be used to access the return flight data to check-in the luggage item in a secure manner.

The luggage item brain programming modules 2400 may include a tracker identifier interface 2424, which when executed interfaces with a wireless tracking device 175 (FIG. 1B) affixed to the luggage item to receive communications with location data from the wireless tracking device 175 or a network device within the system 100. In one or more embodiments, the wireless tracking device 175 may communicate over cellular, GSM or other long range wireless communication systems using compatible communication protocols. In one or more embodiments, the wireless tracking device 175 may communicate over short range communication protocols.

The tracker identifier interface 2424 may include programming instructions, which when executed causes the capture and storage of received location information 2426 from the designed tracking device to determine or estimate a general location of the luggage item based on the received location information.

The luggage item with no prior bag tags attached generally cannot be checked-in. For a luggage item to be checked-in, the passenger may need to be validated/verified. Proof of the purchase of a return flight needs to be determined. Additionally, locked fields of the luggage item's LIB may need to be unlocked.

By way of a non-limiting example, the passenger may arrive without checked in luggage items or need to start the check-in process for a new luggage item entering the travel journey process for the next leg of travel or the return home. In this instance, a new LIB may be generated starting with verifying the identity of the passenger.

The luggage item brain programming modules 2400 may include a display interface 2430, which when executed includes a graphical user interface to display information stored in the LIB on a display device connected to or integrated with a scanning device, acquiring device, computing device 122 or server 148. In one or more embodiments, the mobile communication device 15 or other personal communication device of the passenger may include a graphical user interface to receive (luggage) tracking log information and/or luggage feature data.

Integrated Security Screening Process

FIG. 26A illustrates a method 2600A for file handling for an integrated security screening process of luggage items that need to be processed through a security screening station in accordance with an embodiment. The Integrated Security Screening Station (IS SS) 2670 may include CBP, Coast Guard, TSA, Custom government entities at a border crossing, such as airports, trains, buses, or dockside, private security screening entities for cruise ships, and private security screening entities for hotels, for example.

The processes described herein may allow security images and data to be transferred between government-to-government entities, business-to-business entities, and government-to-business entities without passing PII data by using, for example, a B-Type message, an IATA license plate and/or PNR number.

The method 2600A may include receiving, by a processor, a trigger, at 2602. The trigger may be based on information from an airline flight manifest for passengers exiting an air travel carrier. This is an example, for an international flight, where all passengers may be required to be processed by the ISSS 2670, such as CBP, for example. The trigger may be based on information from a cruise ship manifest for passengers disembarking a cruise ship travel carrier. The trigger may be based on a travel carrier crossing a border and the designated border control government agency requires a security screening of the luggage items to cross the border. The passenger may be on a train and the luggage item checked in under security protocols entering a different country. An example system that different uses security protocols is described in U.S. Pat. No. 10,366,293, titled "COMPUTER SYSTEM AND METHOD FOR IMPROVING SECURITY SCREENING," to Applicant Synapse Technology Corporation.

The trigger may be based on information from a cruise ship manifest for passengers exiting an air travel carrier and transferring to a cruise ship as the next vehicle of travel. The trigger may be based on information from a train manifest for passengers exiting an air travel carrier and transferring to a train as the next vehicle of travel. The trigger may be based on information from a bus manifest for passengers exiting an air travel carrier and transferring to a bus as the next vehicle of travel. The trigger may be based on information from a hotel or resort (i.e., lodging entity) manifest for passengers exiting an air travel carrier and transferring to a lodging entity as the next vehicle of travel.

The trigger may be based on a manifest maintained by system 100 for passengers registered by a luggage pickup and delivery service for delivery home or another address.

The file handling for an integrated security screening process of luggage items may rely on the security screening images taken of a luggage item when the first-mode of travel uses an air travel carrier. The image(s) and related data by advanced scanning technologies like CT (Computed Tomography) scanners (i.e., CT imaging machine 114) can provide a more detailed, 3D image(s) of the bag's (i.e., luggage item) contents. These images and related data may be used for other next vehicles of travel when the custody of the luggage item remains in compliance for maintaining security protocols so that the luggage item may be handed off from one vehicle of travel to the next vehicle to travel by analyzing the shared images for designated prohibited items for the next vehicle of travel. Additionally, different countries use different regulations on the amount of currency or other items being brought into a country. These are but a few examples and to describe each and every regulation between the United States and any other country is prohibitive.

A luggage item remaining inside of an airport infrastructure is considered to maintain it security status if handled by the trusted airport custody procedures. For example, the luggage item was not routed to the carousel and/or left unattended. However, luggage items leaving a terminating airport for the purposes of transferring to another vehicle of travel, for example, can be transferred to a trusted custody luggage handler to maintain the luggage item secure so that the luggage item can be processed using an ISSS 2670, described in more detail below.

At block 2606, the method 2600A may include obtaining, by a processor, a security screening image using the IATA license plate, passenger's name and/or PNR number match obtained from a B-Type message, an airflight manifest, service manifest, and/or other next vehicle of travel manifest (i.e., cruise ship manifest, train manifest, bus manifest, or lodging entity manifest). The service manifest may be a manifest created and maintained by system 100 for baggage delivery and handling to a home address, office address, or other designated address from a terminating airport, for a registered passenger. The method 2600A may include assembling, by a processor, a communication with a security screening image for a luggage item using B-Type message, IATA license plate, passenger's name, PNR number without additional PII, or any combination thereof, at block 2608.

The method 2600A may include, at block 2612, communicating, by a processor, the assembled message to an ISSS 2670. The message may be communicated over an Intranet or Internet using wired or wireless communication protocols. The message may be transported over a public utility communication system, satellite communication system or cellular communication system. The ISSS 2670 may receive the message and perform the security screening according to the government agency regulations for the border and vehicle of travel. In some instances, the ISSS 2670 may be controlled by a private business entity such as a hotel chain or resort. Blocks 2606, 2608 and 2612 may be performed by system 190, described in relation to FIG. 16, in one or more embodiments.

By way of a non-limiting example, the communication of the assembled message may be received by a Security Screening (SS) computer station 2672A of the ISSS 2670. The image and data in the assembled message may be a follow-along security image and data. The first screening may include screening a follow-along security image and/or data of the assembled message. If the first screening is not passed, the luggage item may be re-screened using a security screening device 2672B and using securing screening regulation associated with the location of security screening device 2672B.

For the passenger and the luggage item to proceed, the luggage item needs to be cleared. The image and related data used to clear the luggage item through IS SS 2670 may be a follow-along security image and/or data.

This same image and data tagged with the IATA license plate, passenger's name and/or PNR number may follow the luggage item through its travel journey for other ISSS 2670 or until trusted custody is broken. However, for a next vehicle travel, if the current follow-along security image and/or data does not clear the ISSS 2670 according to the rules or regulation for the next vehicle, the luggage item is rescreened by the security screening device 2672B of the ISSS 2670. However, the follow-along security image and/or data may be available until the security custody is completed such as the luggage item is delivered to a cabin in a cruise ship or a room in a lodging entity; and/or delivered to a train station or bus station and placed on board the next vehicle of travel.

In FIG. 26A, the SS computer station 2672A and security screening device 2672B are shown side by side. However, these two entities may be at different locations. In such an embodiment, a trusted handler may receive those luggage items marked as not cleared or not passed and deliver them to another location where the security screening device 2672B is housed.

The marker may include the 10-digit IATA license plate of the originating bag tag and other BSM information such as the passenger's name. In one or more embodiments, the 10-digit IATA license plate of the originating bag tag may be a primary key to access return flight information, the LIB or the universal bag tag, described herein.

The method 2600A may include receiving, by a processor, one of clearance or not cleared indications from the SS computer station 2672A or the security screening device 2672B, at block 2624. The method 2600A may include updating, by a processor, the handler devices and/or scanning devices with routing information associated with the IATA bag tag or marker to identify where the luggage item should go next, at block 2626. The updating performed, at block 2626, may be performed by system 190, by a computer system associated with a baggage handling system in the airport infrastructure, other vendor assigned the task to update messaging in the airport infrastructure, a computer associated with other travel carriers for sending clearing luggage items, or other vendor assigned the task to update messaging outside of the airport infrastructure. The luggage item, if not cleared, may not be able to enter the baggage handling system, be transported to the next leg of travel, out of the airport or out of the ISSS, for example. The scanner and baggage handler devices may scan for the IATA license plate or bingo tag for baggage handling instructions. The baggage handling instructions may be embedded in B-Type messages.

In the scenario where the luggage items of an entire air carrier are checked, some passengers and luggage items that are cleared will leave the airport, wherein the airport code was designated as a terminating airport code. Furthermore, the luggage item when leaving the airport may be handled by system 100 and status information may be stored in the LIB of the luggage item.

In another scenario, a passenger and their luggage item may board another plane to a destination point. In one or more embodiments, the luggage item terminating the airport from screening by the ISSS 2670 may be transferred using trusted custody to a cruise ship, train, or bus, according to the sorted terminating B-Type messages.

From block 2624, the method 2600A may proceed to FIG. 26B, block 2630.

FIG. 26B illustrates a method 2600B for luggage item status reporting and handing for the integrated security screening process of luggage items, after being processed through an ISSS, in accordance with an embodiment.

The method 2600B may include determining, by a processor, at block 2630, whether a trusted custody handler scans the bag tag or bingo marker on the luggage item by acquiring the originating IATA license plate or other unique identifier. If the determination, by a processor, at block 2630, is "NO," the method 2600B may loop back to the beginning of block 2630 to wait for the scan. In one or more embodiments, the scan acquires data of the originating hardcopy of the bag tag or marker. The acquired (scan) data is converted into a digital BTI. If the scan is image data, the image data is converted to machine-encoded text.

If the determination, by a processor, at block 2630, is "YES," the method 2600B may cause, by a processor, a clearance handling marker of clearance status to be generated or displayed on the scanning device associated with the IATA license plate, at block 2632. An example clearance handling marker (i.e., MK 136) is shown in FIG. 15. The SSIA system 190 may receive indication of pass/cleared or fail/not cleared. The indication may trigger the SSIA system 190 to cause the programming of the handling devices and/or scanning devices with pass/cleared or fail/not cleared and/or next routing information. The routing information may be based on various information including B-Type messages, PNR travel information accessed by the PNR number, manifest information, or any combination thereof.

The clearance handling marker may include delivery location data from the LIB, room or cabin data, or other instructions for secure handling of the luggage item from the terminating airport to the next vehicle of travel. However, in other examples, the MK 136 may include a unique identifier and a symbol or icon representative of pass/cleared or fail/not cleared security indicator.

Other markers may be used. For example, if the luggage item is being delivered home for a registered passenger, a home icon may be displayed with a check mark indicating clearance followed by a home address or building address representative of the delivery address.

The method 2600B may include determining, by a processor, whether the contents of the luggage item passed the ISSS, at block 2634. If the determination, at block 2634, is "YES," the method 2600B may include performing a luggage handling process to bypass the security screening device 2672B of the ISSS 2760. In other words, the luggage item requires no further security screening for the mode of travel. The follow-along security image and/or data analyzed by the SS computer station 2672A cleared the luggage item for departure from the ISSS 2670. When the luggage item is cleared, the luggage item may be sorted based on additional routing information. For example, the cleared luggage item may be terminating a travel carrier or an airport without further service. In this example, the programmed additional routing information may indicate the routing of the luggage item to a carousel or other terminating station for luggage items to be picked up by their owners at a designated location.

In another example, the cleared luggage item may be terminating a travel carrier or an airport with further service. In this example, the programmed additional routing information may indicate the routing of the luggage item to a designated area in an airport or travel carrier infrastructure for luggage items to be picked up by luggage handlers associated with system 100 and delivered to another location according to service instructions. The service instruction may be delivery to a home address, an office address, or other designated address.

In another example, the cleared luggage item may be transferring travel carriers, such as from one airplane to the next airplane. In this instance, the programmed additional routing information may indicate this type of information. In this instance, the luggage item may travel independently from ISSS 2670 to the next airplane marked as cleared.

In another example, the cleared luggage item may be transferring from one vehicle of travel to the next vehicle of travel where the vehicles of travels are different vehicles of travel. For example, from an air carrier to a cruise ship, train, bus, or lodging entity. In this instance, the programmed additional routing information may indicate this type of information including a location address for drop off. In the case of a cruise ship or lodging entity, additional routing information may include a room number or cabin number.

If the determination, at block 2634, is "NO," the method 2600B may include, at block 2638, performing a luggage handling process to transfer the luggage item to the security screening device 2672B of the ISSS 2760 for further security screening and processing according to the mode of travel associated with the ISSS 2760.

At block 2640, the method 2600B may include determining, by a processor, whether the luggage item is for a listed, such as for a registered passenger associated with a passenger manifest of a next vehicle of travel or associated with a manifest for delivery to a home address, office address, or other designated address. If the determination, at block 2640, is "NO," the method 2600B may end, at block 2644. This may be the case when system 190 processes the entire plane. If the determination, at block 2640, is "YES," the method 2600B may include updating the LIB with the current status and location of the luggage item, at block 2642, and activate the LIB for continued luggage item handling and delivery.

Returning again to the marker in FIG. 15, the luggage item may be handled by a trusted custody handler. When the luggage item arrives from the airport using the trusted custody handler to the ISSS 2670, for example, the luggage item may be processed by the SS computer station 2672A with the most current follow-along security image and data associated with the IATA license plate, passenger's name and/or PNR number without the need to provide any other PII.

Figure 25:
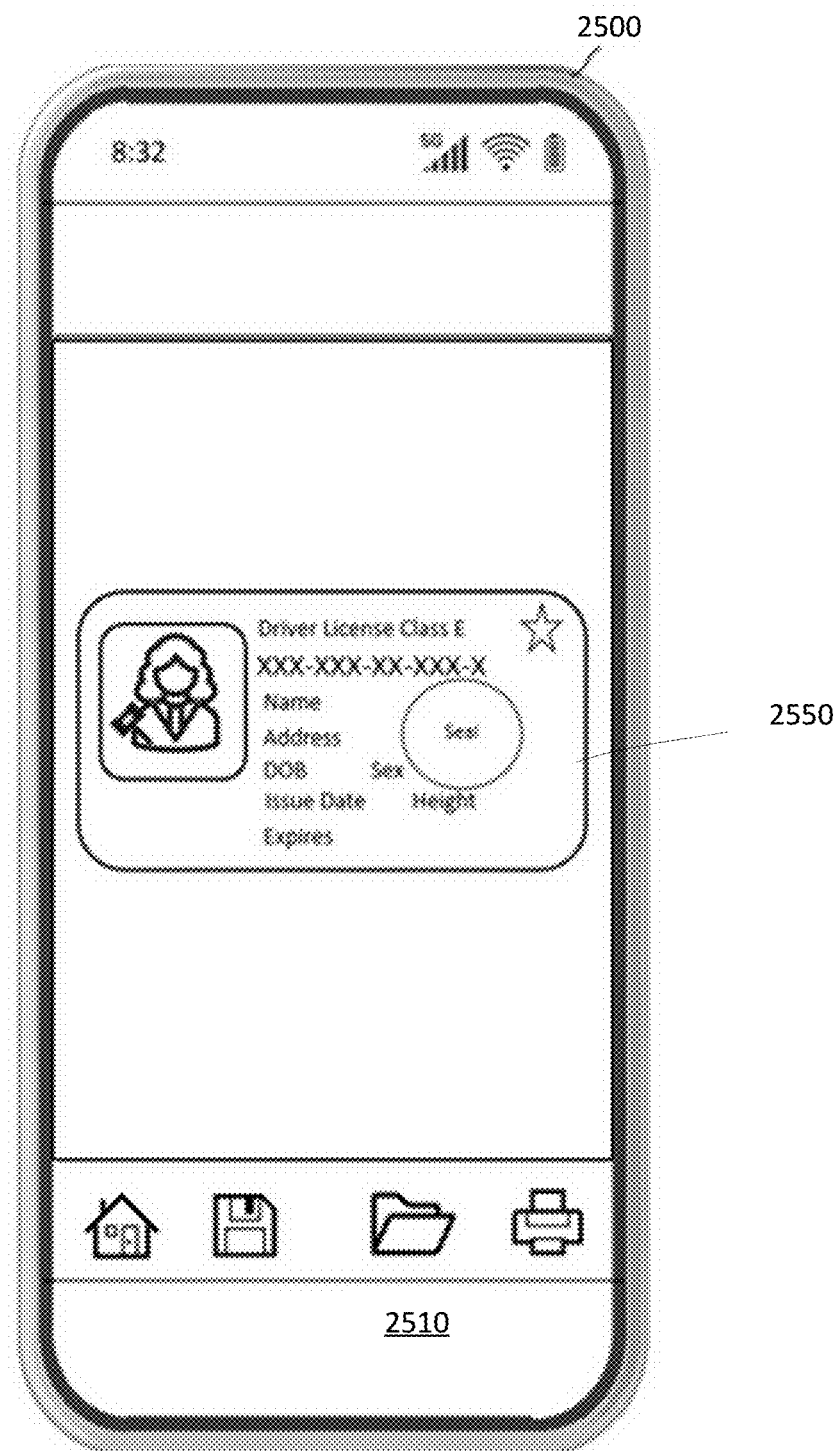
FIG. 25 illustrates a graphical user interface on a mobile communication device capturing a passenger identification in accordance with an embodiment.

FIG. 25 illustrates graphical user interface 2510 on a mobile communication device 2500 capturing a passenger identification 2550 (i.e., identification instrument 3120) in accordance with an embodiment. After the image of the passenger identification 2550 is captured, the image may be sent to a verification process 3180. An example, verification process 3180 is described in more detail in relation to FIG. 31.

The verification process may include the passenger taking a selfie and sending the selfie using an approved application to receive a verification code. An example verification process using a selfie as provided for by Global Entry Mobile. In other embodiments, the verification process may include other facial recognition services that can verify the passenger's identity using a camera-enabled or video-enable computing device to capture a screen shot of the passenger's face and process the face through facial recognition approved algorithms. In other embodiments, the verification process may use an identification scanner such as used by TSA to scan and validate driver's licenses or identification cards to precheck those passenger approved for TSA Pre-Check®.

Smart Baggage Travel System

B-Type messages are customized by airline carriers based on requirements provided the B-Type messages are compatible with IATA rules, SITA procedures or another B-Type message communicator.

The inventor has determined that an expanded B-Type message may be generated with the return flight information and the lodging entity information as well as other modes of travel. The lodging entity information may include a building name or number, an address, and/or a room number. In one or more embodiments, the lodging entity information may include a stateroom, a cabin number, and/or a floor, for example.

The airline's B-Type messages are used by a baggage handling system at airports to track baggage routed and screened through various airports. The baggage handling system includes machine readers to read the printed bag tag as it journeys though the airports. This in essence tracks and locates the baggage while in possession of the airports or airport infrastructure.

However, for travelers that use multiple modes of travel, there are no universal B-Type messages to track and locate or determine where a baggage has been or will go. The inventor has determined that other modes of travel do not have the same ability to track and locate luggage items as passengers travel along a journey using a secure instrument tied to a luggage item and a passenger.

While not wishing to be bound by theory, the machine-readable OP-BTI created for airline travel and facial recognition at a train loading station and/or bus loading station may be used to ensure the passenger has boarded a train or bus with their luggage item in some instances. In other instances, a passenger and luggage item may travel on different trains, for example, or different transport vehicles. For example, a passenger may travel by train, while the luggage travels by truck or van.

The inventor has determined that an airline's B-Type message can be expanded and updated in near real-time outside of the airline and airport facilities so that the expanded B-Type message can be converted and used as a universal B-Type message. The expanded B-Type message may be expanded to include at least one mode of travel and lodging reservations linked by a machine-readable OP-BTI. In one or more embodiments, the expanded B-Type message may be expanded to include and link multi-mode travel reservations and/or lodging reservations of a passenger for a trip.

In one or more embodiments, the universal B-Type message is stored in a database to serve as a near real-time digital reservation and baggage tracking and handling coordinator for multi-mode travel and lodging. Upon scanning the original printed bag tag, at any time during the travel outside of the airport, up to date travel information and lodging information may be retrieved and displayed on a display device associated with a computing device, a scanning device, or a mobile computing device, for example.

In one or more embodiments, the inventor has determined that the once garbage printed bag tag with an OP-BTI at the end of a flight can be used as a primary key or unique identifier that is machine readable to access near-real time reservations for multiple modes of travel and/or lodging reservations to provide environmental savings, reduction in human resources, and increased security and logistics planning.

FIG. 27 illustrates a smart baggage travel system 2700 for multi-mode travel and lodging in accordance with an embodiment. The information stored in database 2708 may be stored in LIB 2450. The smart baggage travel system 2700 may include a server 2710 and a database 2708 for tracking, locating, and facilitating check-in of luggage items of a passenger independent of the passenger or passenger check-in processes. The database 2708 is an expanded B-Type message database or universal B-Type message database or LIB database. For example, the expanded B-Type message database may include an expanded BSM 2711 with a retrieved original BSM from an air carrier and a created lodging data or a link to lodging data may be appended to the original BSM in an expanded or universal B-Type message. The expanded message includes an expanded or universal beginning header, and the end of the expanded message includes an end of message identifier code, as shown and described in FIG. 14C. The terms "expanded B-Type message" and "universal B-Type message" may be used interchangeably herein. The terms "expanded BSM" and "universal BSM" may be used interchangeably herein. The terms "expanded B-Type message" and "universal B-Type message" and LIB are similar terms but different coding schemes. The LIB may not be configured in an IATA compatible formatting structure.

The server 2710 or server 148 may access reservation information associated with other modes of transportation such as a manifest file 2716, which may be associated with a ferry reservation system or any other mode of travel. The server 2710 or server 148 may access a railway reservation system 2718. The server 2710 or server 148 may access a bus reservation system 2720. The server 2710 or server 148 may access a lodging entity reservation system 2722.

The server 2710 or server 148 may retrieve airline reservation information associated with an originating flight 2702 from an airline manifest, a B-Type message, an airline reservation system, or a passenger. The server 2710 or server 148 may retrieve an intermediate travel reservation 2704 from a railway reservation system 2718 or the passenger, for example.

The server 2710 or server 148 may retrieve lodging entity reservation information 2706 from the lodging entity reservation system 2722 or the passenger. The server 2710 or server 148 may retrieve intermediate travel reservations 2704 from the bus reservation system 2720 or the passenger.

At least one or more of the airline reservations of an originating flight 2702, the intermediate travel reservations 2704, the lodging entity reservations 2706, the airline return flight 2712 are stored in and/or linked to the universal travel passenger itinerary 2714. The universal travel passenger itinerary 2714 may include inbound travel information to the destination point and return path travel information back to home 102. The database 2708 may store the universal travel passenger itinerary 2714 separately or as part of the expanded (universal) B-Type message or the LIB for baggage check-in, and/or baggage handling and delivery for one or more legs of travel.

Initiating Expanded B-Type Message

Figure 9C:
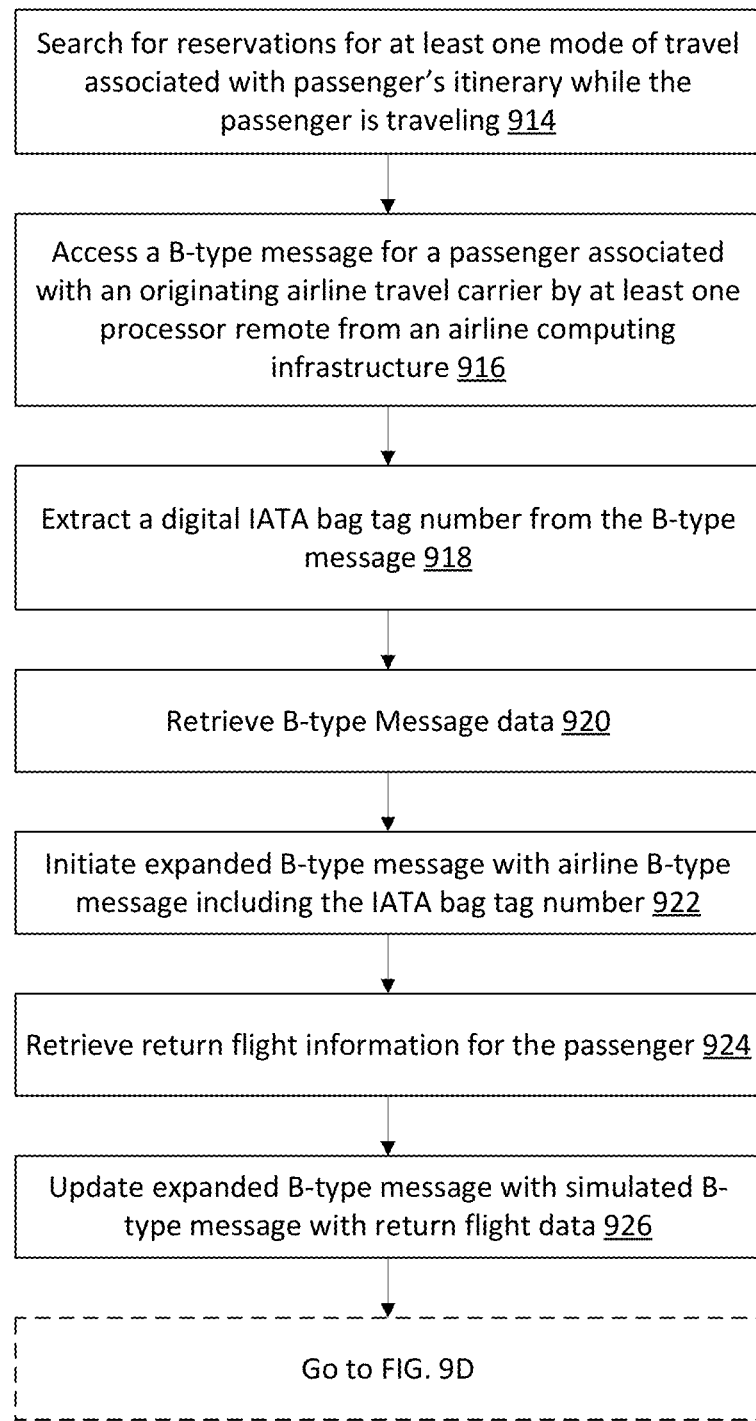
FIG. 9C illustrates a flowchart of a method for initiating an expanded B-Type message in accordance with an embodiment.

FIG. 9C illustrates a flowchart of a method 950 for initiating an expanded B-Type message in accordance with an embodiment. The method 950 will be described in combination with FIG. 27. Although the description is related to the expanded (universal) B-Type message generation, the same process applies to the creation of the LIB.

According to some examples, the method 950 may include searching for reservations for at least one mode of travel associated with the passenger's itinerary while the passenger is travelling, at block 914. While the passenger is travelling such as on a plane, one or more B-Type messages may have been generated. For example, the airline host computing system may generate a BSM such as when the luggage item is checked in at the airport or with the air carrier. In one or more embodiments, the luggage item may be checked in at home, a train station, or a port such as a port associated with a cruise ship. In these instances, the IATA B-Type messages may have additional codes to designate the type of remote check-in. The BSM will include the additional codes and may be stored on or communicated to the airline host computer system or other associated computer system. In general, to ensure proper routing in the airline infrastructure, the airline host computer system or other associated computer system will communicate B-Type messages to one or more of baggage handling systems, sortation systems, reconciliation systems and industry tracing systems. This tracks the location of the luggage items in the airport infrastructure. However, shortly after a passenger arrives at a destination, the B-Type messages may be deleted.

Therefore, in one or more embodiments, the system 100 may access a B-Type message to retrieve a bag tag number while a passenger is in flight.

According to some examples, the method 950 may include accessing a B-Type message for a passenger associated with an originating airline travel carrier by at least one processor, the at least one processor being outside of an airline computing infrastructure, at block 916. The at least one processor may be part of system 100 or system 2700, for example. The system 2700 may include a messaging system 2790 in communication with the server 2710 to communicate travel information in response to a trigger caused by scanning or acquiring the OP-BTI of the recycled and non-discarded originating printed IATA bag tag.

According to some examples, the method 950 may include extracting a digital IATA bag tag number from the B-Type message, at block 918. As will be seen in FIG. 14A, the digital IATA bag tag number is represented by some of the digits in the field that starts with ".N/".

According to some examples, the method 950 may include retrieving the airline's B-Type message such as from the airline host computer system or other associated computer system, at block 920.

According to some examples, the method 950 may include initiating the creation of an expanded B-Type message with the airline's B-Type message (FIG. 14A) including the IATA bag tag number, at block 922, associated with the originating printed bag tag. In FIG. 14C, the collection of fields in bracket labeled 1400A' may represent a lite version of an airline's B-Type message format compatible with IATA B-Type messages (FIG. 14A).

According to some examples, the method 950 may include retrieving return flight information for the passenger, at block 924.

According to some examples, the method 950 may include updating the expanded B-Type message with a simulated B-Type message, shown in FIG. 14B, with return flight data, at block 926, or the LIB 2450. FIG. 14B illustrates a simulated B-Type message. The return flight data may be queued in the expanded B-Type message, the LIB, or in a designated separate simulated B-Type message until the passenger is ready to depart the lodging entity or other mode of travel. Because of overcrowding of the figures, the simulated B-Type message is not shown in FIG. 14C. The simulated B-Type message may be generated by the simulated B-Type message generator 431 in FIG. 4C.

Figure 9D:
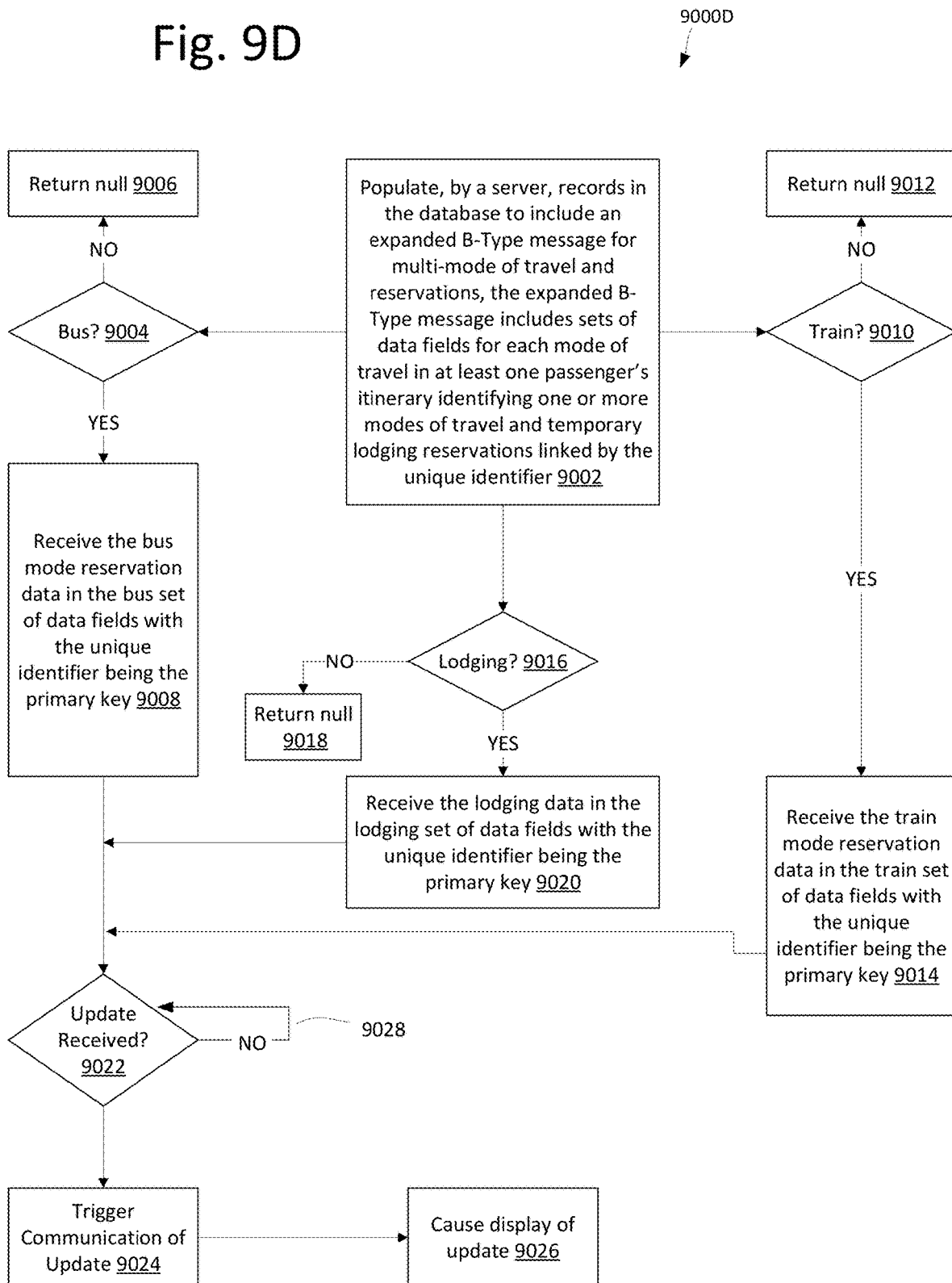
FIG. 9D illustrates a method for generating a universal B-Type message for a return path of a passenger in accordance with an embodiment.

According to some examples, the method 950 may include going to FIG. 9D, at block 928, for additional modes of travel.

FIG. 9D illustrates a method 9000 for generating an expanded (universal) B-Type message for a return path of a passenger in accordance with an embodiment. Although the description is related to the expanded (universal) B-Type message generation, the same process applies to the creation of the LIB.

According to some examples, the method 9000 may include populating, by a server (i.e., server 2710) or processor, records in the database 2708 to include expanded (universal) B-Type message for multi-mode of travel and lodging reservations. The expanded (universal) B-Type message includes sets of data fields for each mode of travel in at least one passenger's itinerary identifying one or more modes of travel and temporary lodging reservations linked by the unique identifier, at block 9002.

In one or more embodiments, the passenger may enter their passenger's itinerary using a website portal which may be part of system 100, 2700, 3100, or otherwise accessible by system 100. The passenger may enter other information such as other modes of travel and lodging reservations. In other embodiments, the passenger may enter a PNR number or itinerary confirmation number using a website portal which may be part of system 100, 2700 or 3100 otherwise accessible by the systems.

In one or more embodiments, the website portal may be part of the lodging entity, such as without limitation, a resort or cruise ship.

According to some examples, the method 9000 may include determining, at block 9004, whether the passenger is traveling by bus. If the determination is "NO," a value of "NULL" 9006 will be returned to the server. If the determination, at block 9004, is "YES," then the server receives, at block 9008, the bus mode reservation data from the bus reservation system 2720 of FIG. 27 in the bus set of data fields with the unique identifier being the primary key.

According to some examples, the method 9000 may include determining, at block 9010, whether the passenger is traveling by train. If the determination is "NO," a value of "NULL" 9012 will be returned to the server. If the determination, at block 9010, is "YES," then the server receives, at block 9014, the train mode reservation data from the railway reservation system 2718 of FIG. 27 in the train set of data fields with the unique identifier being the primary key.

According to some examples, the method 9000 may include determining, at block 9016, whether the passenger has lodging. If the determination is "NO," a value of "NULL" 9018 will be returned to the server. If the determination, at block 9016, is "YES," then the server receives, at block 9020, the lodging data in the lodging set of data fields from a lodging entity reservation system 2722 of FIG. 27 in the lodging set of data fields with the unique identifier being the primary key. Blocks 9008, 9014 and 9020 may flow to block 9022.

According to some examples, the method 9000 may include, at block 9022, a determination of whether there is an update to any of the modes of travel and lodging. If the determination, at block 9022, is "NO," the method waits for an update represented by looping on line 9028. If the determination, at block 9022, is "YES," the method 9000 may trigger a communication update, at block 9024, and cause a display of the update, at block 9026. In one or more embodiments, the communication does not happen until the server is triggered by a communication representative of received image data from an acquiring device.

The server 2701 may update a corresponding passenger itinerary linked to the universal B-Type message in the database 2708.

The operations of FIGS. 9A-9D may be performed for creating the luggage manifest using a LIB or an expanded B-Type message scheme. In one or more embodiments, the luggage item may travel independently from and parallel to the passenger. Furthermore, a passenger manifest may be different from the luggage manifest, but the passenger data record and the luggage data records may be otherwise electronically linked together so that as changes occur, the records are updated and synchronized.

Figure 28:
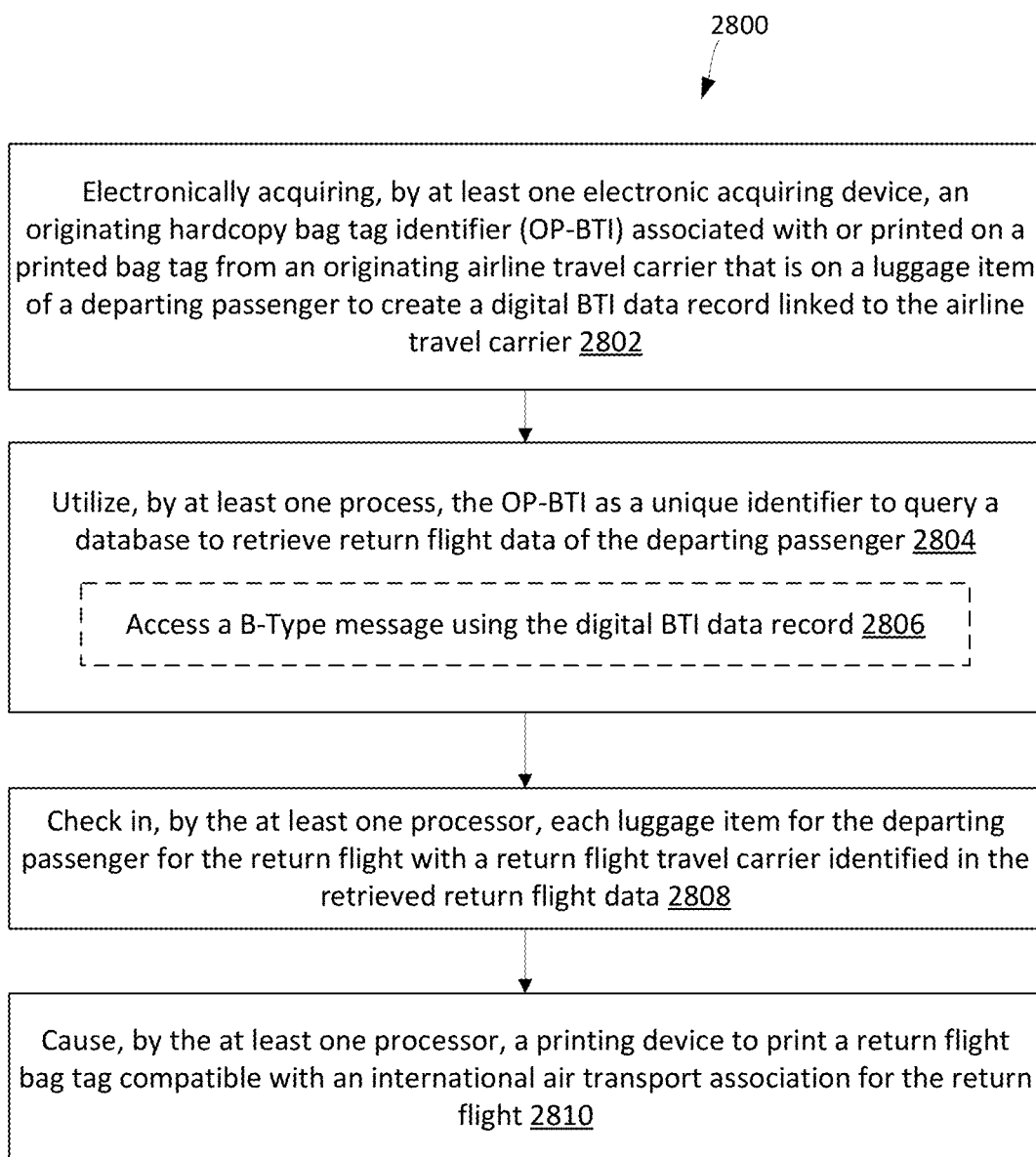
FIG. 28 illustrates a flowchart of a method for checking in baggage of a passenger in accordance with an embodiment.

FIG. 28 illustrates a flowchart of a method 2800 for checking in baggage (luggage item) of a passenger in accordance with an embodiment. The method can be used using the LIB or the expanded B-Type message scheme, as both schemes provide access to the return flight data in response to OP-BTI, for example or DPI data record. In lieu of the OP-BTI, the DPI data record may be used as a substitute.

In block 2802, method 2800 may include electronically acquiring, by at least one electronic acquiring device, an originating hardcopy bag tag identifier (OP-BTI) associated with or printed on a printed bag tag from an originating airline travel carrier that is on a luggage item of a passenger to create a digital data record linked to the airline travel carrier.

In block 2804, method 2800 may include utilizing, by at least one processor, the OP-BTI as a unique identifier to query a database to retrieve return flight data of the passenger. In some examples, block 2804 may include accessing, by the at least one processor, an airline's B-Type message using the digital BTI data record, at block 2806. In another example, the database is a manifest having the digital BTI data record.

In block 2808, method 2800 may include checking in, by the at least one processor, each luggage item for the passenger for the return flight with a return flight travel carrier identified in the retrieved return flight data. In one or more embodiments, the passenger is departing a lodging entity.

The lodging entity includes one of a hotel, resort, a cruise ship, short term rental homestay, long term rental homestay, residential dwelling, and building.

In one or more embodiments, in block 2810, method 2800 may include causing, by the at least one processor, a printing device 2740 (FIG. 27) to print a return flight bag tag 142' (FIG. 27) compatible with an International Air Transport Association for the return flight.

In one or more embodiments, the passenger may be traveling by multiple modes of travel and/or a temporary lodging entity during their return journey home or to a point of origination.

Universal Bag Tag

The inventor has identified that there is a substantial need for solving the disconnect with baggage handling throughout the passenger travel system. Using the originating flight airline bag tag (previously garbage) can be used to resolve the current passenger's experience issues and substantially reduce the enormous system costs for moving and identifying baggage through multi modes of travel and lodging. Using the original flight bag tag allows for the luggage to have an identifier that has important information and also allows access to a message system that will allow the bag to have a smart bag travel experience. This will allow the baggage to have a seamless travel experience much like the passenger while removing the baggage burden from the traveling passenger. Allowing the baggage to become smart with the identifier and messaging across all modes of travel and lodging will allow for a cost effective and seamless travel experience like never before due to the enhanced systems associated with recycling the original (originating) airline bag tag and provisioning the OP-BTI for off-airport location use.

FIG. 14C illustrates an expanded (universal) B-Type message 1400C for multi-mode travel and lodging and recycling the originating bag tag in accordance with an embodiment. FIG. 14D illustrates an expanded (universal) B-Type message 1400D for a return flight in accordance with an embodiment.

For the sake of illustration and description, the expanded (universal) B-Type message, may be a universal BSM. The expanded B-Type message 1400C may include the BSM 1400A described above in relation to FIG. 14A. According to one or more embodiments, the BSM 1400A' is a lite airline BSM version of BSM 1400A of FIG. 14A. In general, the fields 1402, 1410, 1412, 1418 and 1420 are preserved. In one or more embodiments, all fields may be preserved. In one or more embodiments, a different BSM construction may be generated. Furthermore, the expanded B-Type message 1400C may use other coding formats.

In this example, the lite airline B-Type message 1400A' may be immediately followed by a simulated B-Type message 1400B described in FIG. 14B. The header of the expanded B-Type message 1400C may use, for example, the code "UBSMRC" as shown in FIG. 14C, reference numeral 1401. The "U" denotes that the message is universal and usable at off-airport locations. The "BSM" indicates the type of B-Type message format. The "RC" denotes that the format of the universal message is for recycling of the originating IATA printed bag tag.

After the ending designation "ENDSBSM," one or more fields or lines 1454, 1456, 1458, 1450, and 1460 may be appended. The expanded B-Type message 1400C may have an end of message identifier "UENDBSMRC" in field 1490. The code term "RC" represents recycling. The code term "RT" represents return.

For the sake of illustration and description, the preface ".L/" in field 1454 may include a link to a lodging PNR # such as found in the universal travel passenger itinerary 2714 (FIG. 27). However, the lodging data could be entered including a lodging address and room number or cabin number, by way of a non-limiting example. Also, the preface may use a different coding schema.

The preface ".L/" on line 1456 may include a link to an intermediate travel PNR number or alternately, data representative of alternate travel data.

The preface ".PL/" in field 1458 may represent the code to a link for a passenger's luggage image. The preface ".PL/" in field 1450 may represent the code to a link for a passenger's ID image. The preface ".LL/" in field 1460 may represent the code to a link for a log of luggage location data. These example codes are for illustrative purposes only and not meant to be limiting in any sense.

Once the return flight bag tag of a checked-in baggage replaces the originating printed bag tag, the return flight bag tag may become a machine-readable instrument to continue the tracking, locating, and checking in of the luggage item with multiple modes of travel and lodging along multiple legs of travel for a journey home.

Regarding the simulated B-Type message 1400B, it can be varied based on whether the baggage is checked in at a remote location, airport location, and airline. For example, there are recommended BSM formats for remotely checked in the luggage item from home, a train station, and a cruise ship at a port. By way of a non-limiting example, the field or code ".D/" may be used to enter the check in location information. When the luggage item is checked in at a train station, the train station, date, and time may be added to the field ".D" and separated by the symbol "/". When the luggage item is checked in at a port, the port, port identification, date and time may be added to the field ".D/" and separated by the symbol "/". This is shown in the simulated BSM because, in the examples, the baggage may be checked in from a cruise ship. Other location data may be used for other approved remote check-in locations.

The IATA messages may have .M and .Z symbols unused. However, this may change in time. So, other code combinations may be used to distinguish different fields in the expanded/universal B-Type messages.

The description herein references coding schema of IATA B-Type messages for descriptive purposes. However, other coding schema may be used in the expanded B-Type message outside of the airline or airport computing infrastructure.

FIG. 14D illustrates an expanded (universal) B-Type message 1400D for a return flight in accordance with an embodiment. The field 1402' is the header and may include the code "UBSMRT" such that "U" denotes universal, BSM denotes the type of B-Type message, and "RT" denotes return. The bracketed fields 1455 represent a lite airline BSM as described previously regarding bracket labeled 1400A'. In this instance, the field ".N/" may be updated with the IATA bag tag number for the printed bag tag for the return flight and is different from the ".N/" number in the lite airline BSM 1400A'. In this instance, the lite airline BSM 1455 may be followed by the universal B-Type message 1400C.

In one or more embodiments, the UBSMRC 1400C may be followed by fields 1458', 1450', 1460' as previously described (collectively 1470'). However, the data in these fields can be for the return path of the journey. The expanded (universal) B-Type message 1400D may include an end of message designator 1490', which may be "UENDBSMRT."

FIG. 14E illustrates an expanded (universal) B-Type message for multi-mode travel and lodging of an originating flight in accordance with one embodiment. The B-Type message 1400E (i.e., UBSMO) may include a header "UBSMO" in field 1420E. Field 1420E may be followed by simulated BSM or other B-Type message 1400B, described in FIG. 14B. In simulated B-type message 1400B' the field 1430E may have a temporary unique identifier as a placeholder until an IATA bag tag number (i.e., IATA license plate number) is created. The simulated BSM 1400B' may be followed by the fields 1458E, 1450E and 1460E (collectively 1470E), which may include links to the passenger luggage image data on the originating leg of the journey, the passenger ID image on the originating leg of the journey, and the location data on the originating leg, respectively. The expanded B-Type message 1400E may include an end of message identifier such as "UENDBSMO" 1490E.

When the luggage item is ready to be checked in, the simulated message 1400B' is merged with an airline's BSM, for example, to obtain the IATA bag tag identifier and other remaining information. Embodiments of the IATA bag tag identifier used by system 3100 are as described below.

Figure 29:
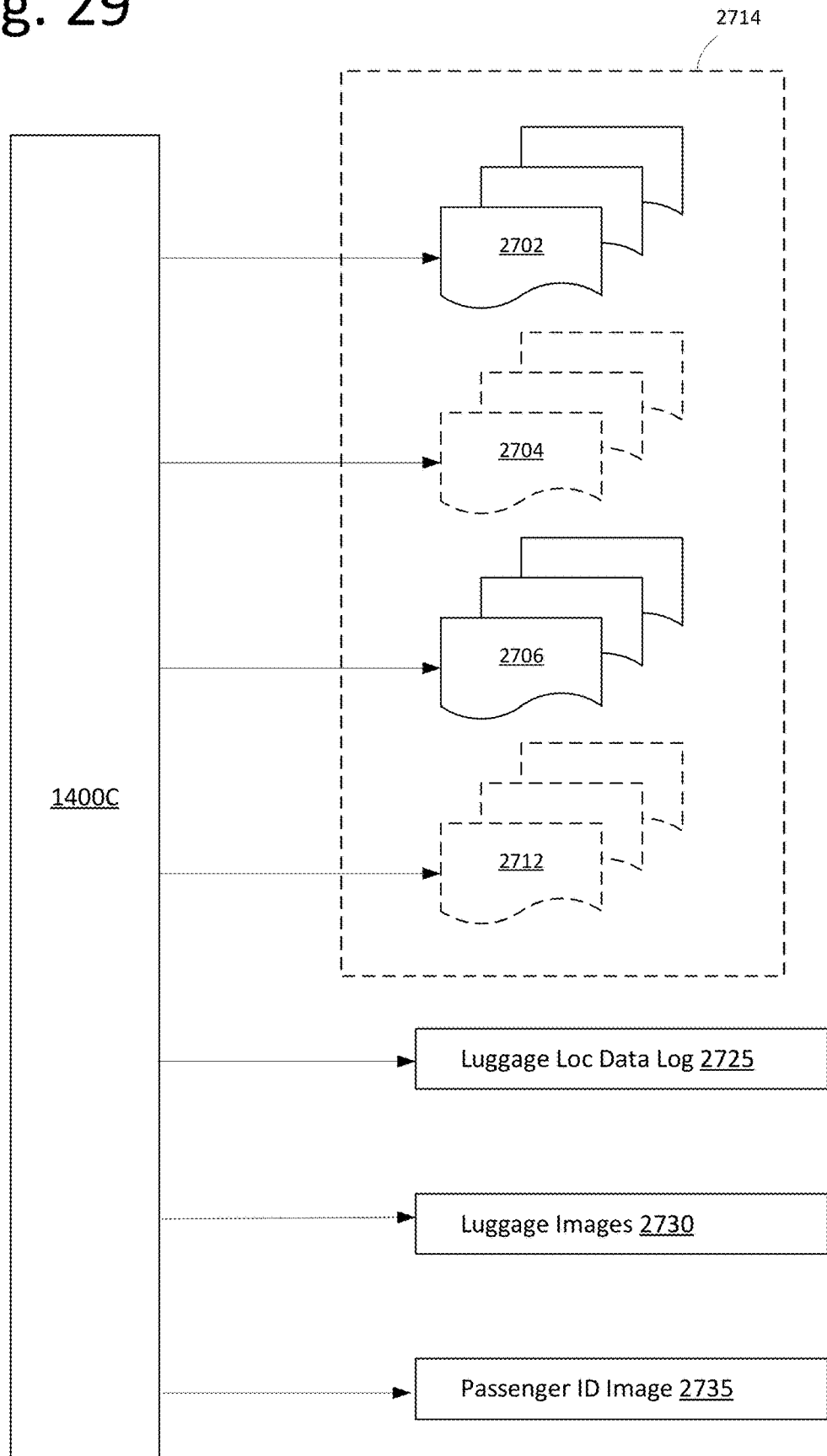
FIG. 29 illustrates a block diagram of links to expanded data of multi-mode travel and lodging data in accordance with an embodiment.

FIG. 29 illustrates a block diagram of links to expanded data of multi-mode travel and lodging data in accordance with one embodiment. The expanded B-Type message 1400C may access or have links to airline reservations of an originating flight 2702, the intermediate travel reservations 2704, the lodging entity reservations 2706, the airline return flight 2712 that are stored in a universal travel passenger itinerary 2714. The expanded B-Type message 1400C may access or have links to the luggage location data log 2725 in database 2708, the luggage image 2730 in database 2708 and the passenger ID image 2735 database 2708.

Figure 30:
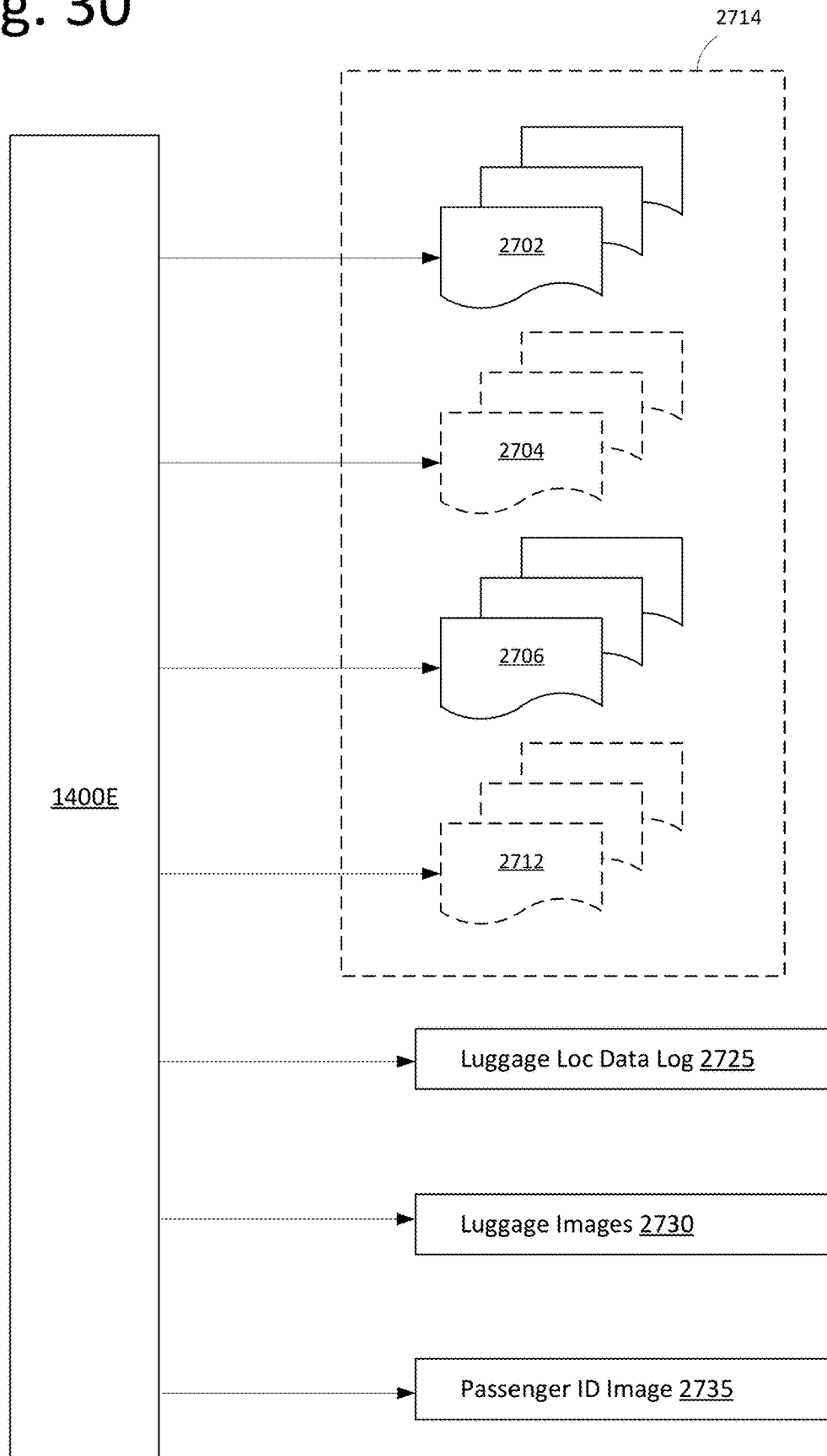
FIG. 30 illustrates a block diagram of links to expanded data of multi-mode travel and lodging data of an originating flight in accordance with an embodiment.

FIG. 30 illustrates a block diagram of links to expanded data of multi-mode travel and lodging data of an originating flight in accordance with one embodiment. The B-Type message 1400E (i.e., UBSMO) may access or have links to airline reservations of an originating flight 2702, the intermediate travel reservations 2704, the lodging entity reservations 2706, the airline return flight 2712 are stored in a universal travel passenger itinerary 2714. The B-Type message 1400E may access or have links to the luggage location data log 2725, the luggage images 2730 and the passenger ID image 2735.

While FIGS. 29-30 discuss links to in the expanded B-Type message scheme described herein, the same or similar links apply to the LIB 2540 described herein.

Originating Baggage Check-In

Remote check in at the home began approximately back in 2001 and has taken on multiple forms over the years but has struggled to operate due to enormous costs for technology at the remote site, or logistic issues with trying to pre-print any documents such as a valet tag or a bag tag, for example. The valet tag is discarded and replaced with a permanent IATA bag tag, which causes environmental waste. While a single valet tag does not seem to cause a significant issue, compounding the discarded paper, ink, and equipment for printing millions of valet tags over years can cause environmental waste that contributes to long term climate change.

The challenge with a remote check-in in some environments also includes a strict time constraint, such as a 24-hour check-in window, which creates a very difficult task of managing the process and having any opportunity for financial viability. The embodiments herein can address these concerns and offer an on-demand lite technology that is environmentally friendly and expands the airline check-in window externally by using a simulated BSM and/or assignable IATA bag tag codes combined with ID check and verification, location verification, itinerary verification, ticket purchase verification, capturing an image of the luggage and/or attaching a temporary wireless luggage tracker to allow for the baggage check-in to occur seamlessly with the airline's B type message triggering the printing of the bag tag.

The one or more blocks of the methods of FIGS. 31, 33, 34 and 35 may be performed by programming instructions stored on tangible, non-transitory computer readable medium, which when executed by one or more processors or servers may cause the one or more processor or servers to perform the operations of the blocks described herein below.

Figure 31:
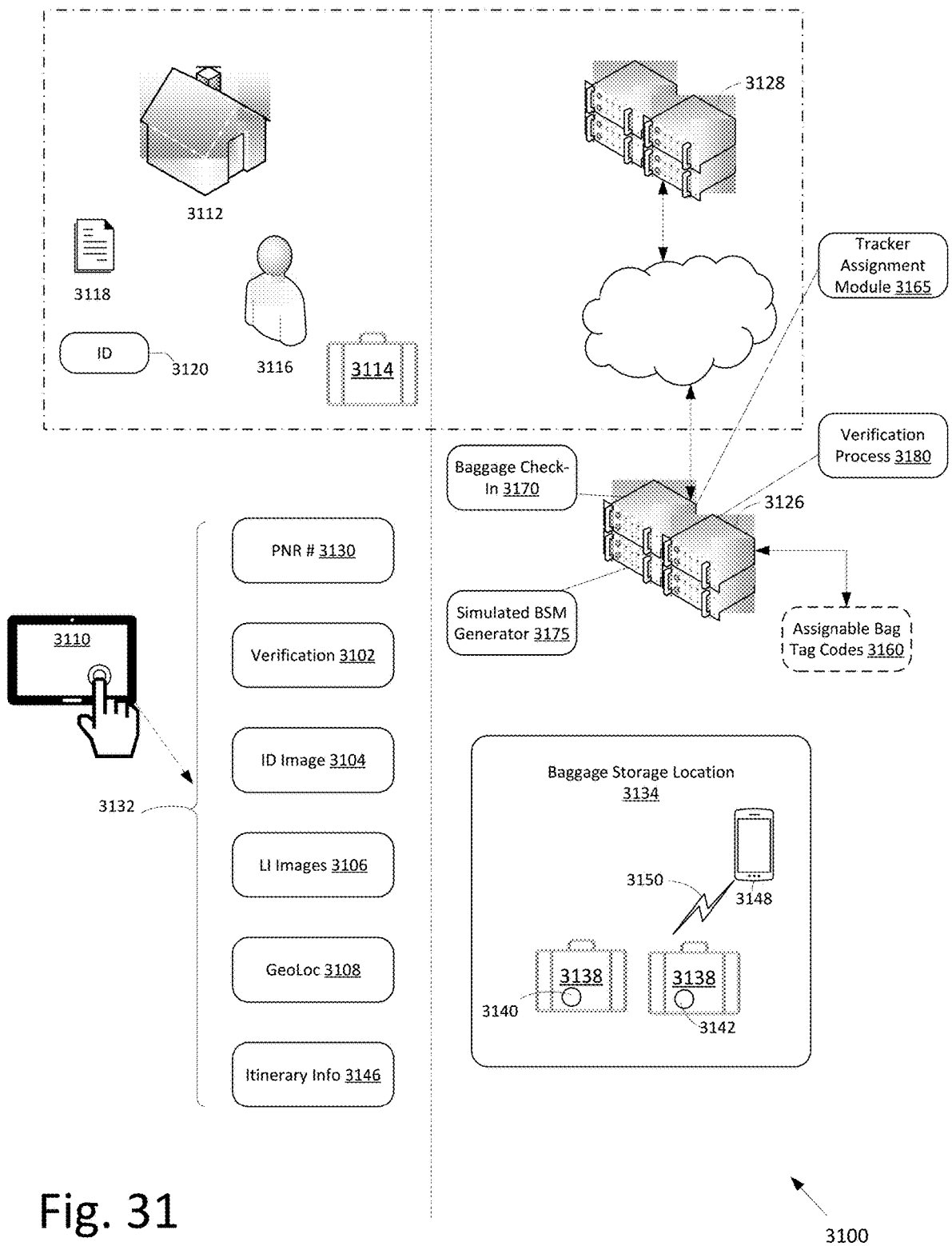
FIG. 31 illustrates a system for digitizing luggage custody and luggage check-in in accordance with an embodiment.

FIG. 31 illustrates a system 3100 for digitizing luggage custody and luggage check-in in accordance with one embodiment. The system 3100 may be part of system 100 and/or 2700, in one or more embodiments. In one or more embodiments, the disclosure provides a unified system for combining the operations of system 100, 2700 and 3100 to enhance the travel experience of the luggage item 3114 and passenger 3116 while eliminating environmental waste.

The system 3100 may include at least one first processor 3110 and at least one second processor 3126 in wired or wireless communications with each other. The system 3100 does not include those items in the box denoted by dash dot lines. The system 3100 may include at least one baggage storage location 3134 to temporarily store luggage items. The system 3100 may include other computing devices 3148 to acquire bag tag identifiers or other information affixed to the luggage item as will be described later.

In one or more embodiments, the system 3100 may include a baggage check-in module 3170 and a simulated BSM generator 3175. A simulated BSM generator has been previously described, so no further discussion is necessary.

In one or more embodiments, the system 3100 may include a module for assignable bag tag codes 3160. The module for assignable bag tag codes 3160 may bypass the IATA bag tag code generated by the DCS of the airline carrier and assign an IATA bag tag code by system 3100. The assigned IATA bag tag code is populated into the simulated BSM and further merged with the missing airline BSM data to form a unified BSM. A unified BSM is a merger of a simulated BSM with information from an airline's BSM. The unified BSM is used to create an expanded BSM. The same process to create a unified BSM may be used to create a unified B-Type message.

It should be noted that system 3100 can be used at a lodging entity checking in a luggage item or a passenger and their luggage item for a leg of travel. Furthermore, as shown in FIG. 1B, path L1 in one or more embodiments, may be provided by system 3100 wherein the luggage 138 may be retrieved at home 102 and checked-in prior to delivery to the first-mode travel carrier 104 such that bag tag 142 is created by system 3100 using the methods described herein.

In one or more embodiments, the first processor 3110 may receive a PNR number 3130 or other identifier from a confirmed itinerary 3118 for a flight with at least one airline carrier. The first processor 3110 may receive information that confirms an identify of the passenger 3116 associated with the PNR number 3130 from the confirmed itinerary 3118 to pick up and transport luggage associated with the PNR number to a baggage storage location 3134 from a passenger location 3112. The confirmed itinerary 3118 (FIG. 32) may be created by a computer system 3128 associated with an air carrier.

For example, the verification process 3180 may have policies and procedures for verifying the identification of the passenger depending on the state from which the identification is issued and the type of identification, such as a driver's license or passport. Communication procedures for contacting the databases of the Department of Motor Vehicles (DMV) may be stored for subsequent looked up in the module of the verification process 3180. The verification process 3180 may complete the verification process and communicate a signal representative of a verification received from a DMV, for example, to the first processor 3110 which is then displayed on the display device.

In one or more embodiments, the first processor 3110 may receive a data entry representative of a verification of the passenger by a user of the first processor 3110. For example, the user may receive the identification instrument 3120 and visually match the passenger's name in the confirmation itinerary with the name on the identification instrument 3120. In one or more embodiments, the first processor 3110 may be configured to extract an individual's name in the identification instrument 3120 using optical character recognition (OCR) or other software applications such as to convert text from a PDF or JPEG file to a DOCX (MICROSOFT WORD) file, for example.

In one or more embodiments, the imaging device of the first processor 3110 may capture an image of the confirmed itinerary 3118, an image of a bar code, or a QR code. Information associated with the confirmed itinerary 3118 can be received, such as, without limitation, the names of other passengers associated with the confirmed itinerary 3118, the airline of the originating airline carrier, the destination airline carrier, date and time of departure, and time of arrival at the destination, the PNR number or itinerary confirmation number may be provided to system 3100 via the first processor 3110. The first processor 3110 may perform optical character recognition (OCR) on an image of the paper copy of the confirmed itinerary 3118 as a methodology to receive the itinerary information and the PNR number or other artificial intelligence (AI) software may be used to convert hardcopy text to digital data. The first processor 3110 may receive itinerary information and the PNR by accessing the same information from a web portal linked to a passenger's account, for example.

In one or more embodiments, the passenger record may include at least one of the PNR number of a confirmed itinerary 3118, an image of each luggage item being picked up, and a copy of the identification instrument 3120.

The first processor 3110 may communicate with the second processor 3126 the PNR number 3130, the verification 3102, the ID image 3104, the luggage item (LI) images 3106, geo location information 3108 and itinerary information 3146, collectively in bracket 3132. By way of a non-limiting example, the smart phone or other mobile computing device may include a Global Positioning receiver to receive signals from a Global Positioning System (GPS) to identify the location of the first processor 3110. The digitized information in 3132 is used to eliminate the need for a printed valet tag for tagging the luggage item.

In one or more embodiments, the second processor 3126 may generate a simulated baggage source message (BSM), as shown FIG. 14B, with the received PNR number 3130. The second processor is independent from the air carrier and computer system 3128. The BSM is compatible with an International Air Transport Association (IATA) B-Type messages.

The second processor 3126 may cause the creation of an IATA license plate for each luggage item associated with the PNR number 3130 and related itinerary information.

In one or more embodiments, the second processor 3126 may update the simulated BSM with the created IATA license plate and communicate, to the computer system 3128 associated with the air carrier, the updated BSM.

The trackers 3140, 3142 may be affixed to luggage 3138. The tracker may be an AIRTAG tracker by APPLE Inc. The tracker 3140, 3142 may be a Global Positioning System (GPS) tracker, a GSM tracker or other tracker. This step may be performed at any time including when the luggage item is brought into the baggage storage location 3134.

Figure 36:
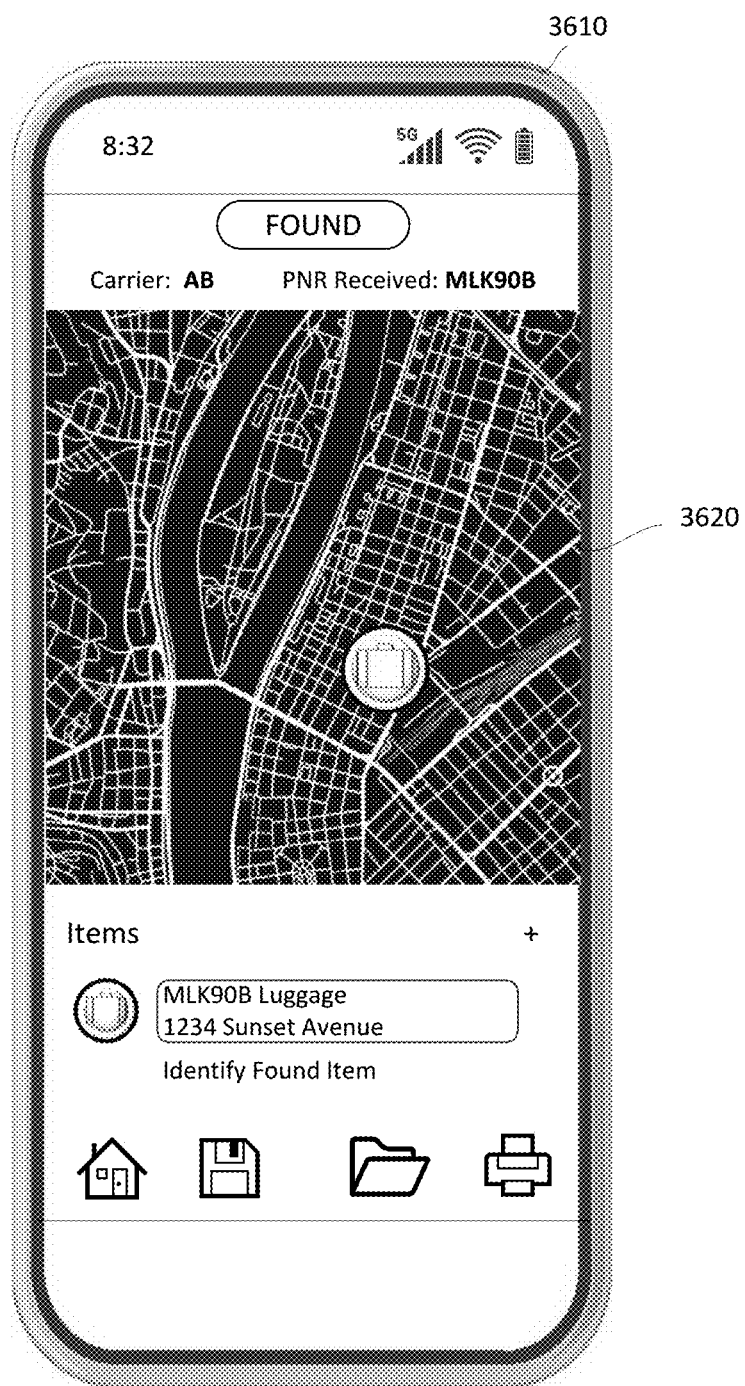
FIG. 36 illustrates a mobile communication device displaying a FIND MY application in accordance with an embodiment.

The AIRTAG tracker has a mobile application called FIND MY 3620 as shown in FIG. 36 that is displayed on a display of a mobile communication device 3610. Other types of trackers may be programmed to transmit data to a computing device in response to a ping signal.

Luggage items may be tagged with a bag tag that conforms to the International Air Transport Association (IATA) bag tag code and/or other standardized formatting of the carrier. For example, an airline bag tag may include an IATA code that includes a three-character alpha numerical geocode designating airports and metropolitan areas. The IATA code is also known as an IATA location identifier. The IATA also publishes industry standard rules for creation of bag tags for the airline industry. The printed bag tag may include a 10-digit license plate and corresponding bar code. The printed bag tag may include information to create the IATA geocode, the original airline flight information, the 10-digit license plate, and other bag tag information printed on an originating hardcopy printed bag tag.

FIG. 32 illustrates an example confirmed itinerary 3118 for an air flight in accordance with one embodiment. The confirmed itinerary 3118 includes at least one of a passenger name record (PNR) number 3130, a passenger's name, flight reservation information, and a purchased ticket number.

In one or more embodiments, the system 3100 may include a tracker assignment module 3165, which includes an application that allows the wireless tracker to be named or provided with information that is associated with a unique code such as a PNR number or other identifier. This process is described later in FIG. 35.

In one or more embodiments, the system 3100 includes an imaging device in communication with the first processor 3110. The imaging device and first processor 3110 may be integrated into a single device, such as a smart phone, mobile communication device, Tablet, Notebook, or other camera-enabled portable computing device. The imaging device, as shown in FIGS. 1A-1D, may capture an image of each luggage item (LI) 3114 (hereinafter referred to as "LI images 3106") associated with the PNR number 3130, prior to departing the passenger location 3112.

In one or more embodiments, the imaging device may capture an image of an identification instrument 3120 (hereinafter referred to as "ID image 3104") issued to the passenger or other designated person. The user of the first processor 3110 and imaging device may verify the identification of the passenger to reconcile with the PNR number in the confirmed itinerary 3118. The PNR number may be associated with at least one person. However, at the time of pickup of at least one luggage item 3114, only one individual in the PNR number may need to be verified. In one or more embodiments, all the passengers need to be present, and all identifications of adult passengers need to be verified.

Figure 33:
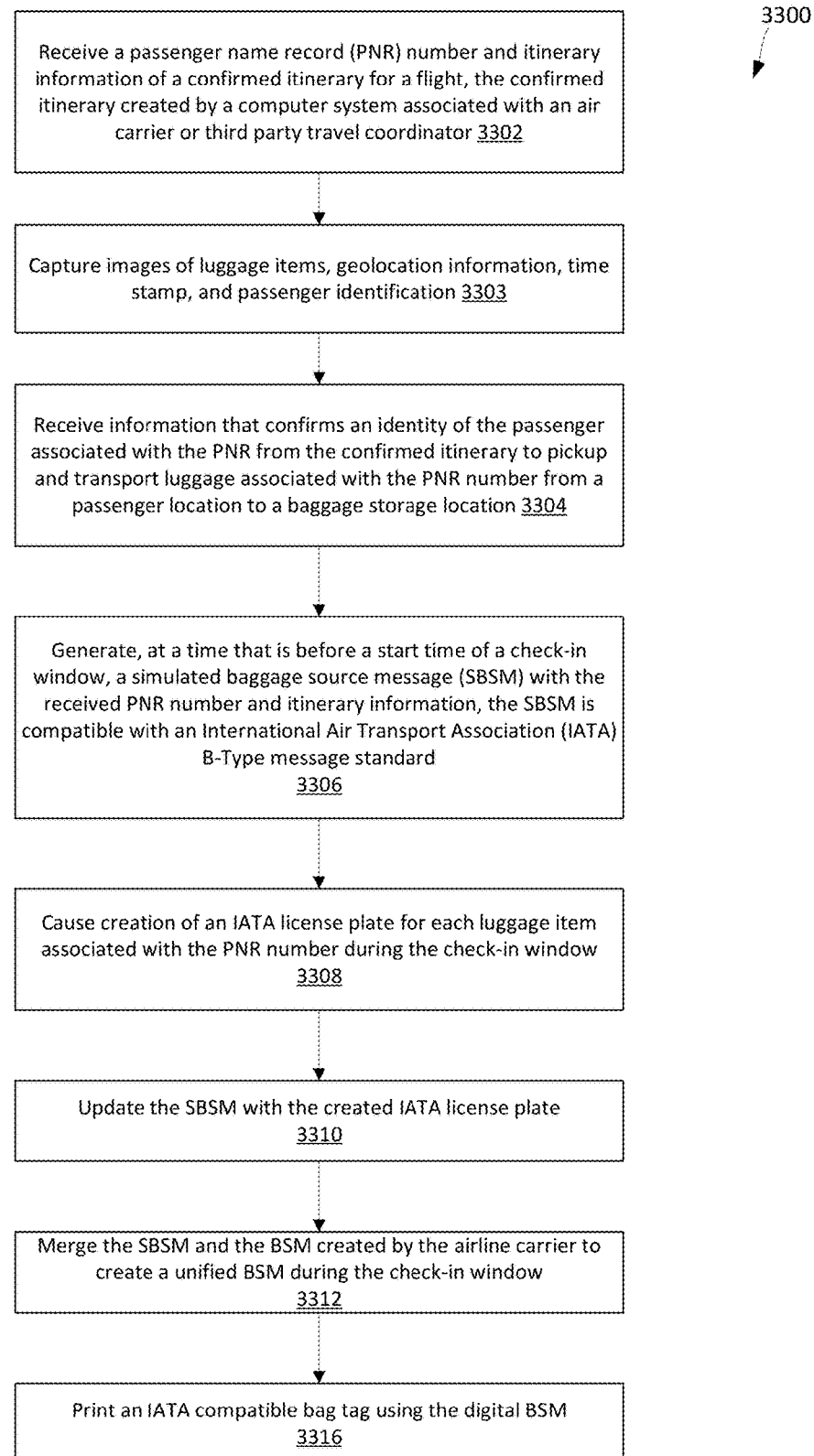
FIG. 33 illustrates a flowchart of a method for generating a simulated baggage source message in accordance with an embodiment.

FIG. 33 illustrates a flowchart of a method 3300 for generating a simulated baggage source message in accordance with an embodiment.

According to some examples, the method 3300 may include receiving a passenger name record (PNR) number and itinerary information of a confirmed itinerary for a flight. The confirmed itinerary may be created by a computer system associated with an air carrier or a third-party travel coordinator (e.g., travel agency or other independent entity from the air carrier), at block 3302. The process of block 3302 is described in more detail in relation to FIG. 34 below.

According to some examples, the method 3300 may include capturing images of a luggage items, geolocation information, time stamp, and passenger identification, at block 3303.

According to some examples, the method 3300 may include receiving information that confirms an identify of the passenger associated with the PNR number from the confirmed itinerary to pick up and transport luggage associated with the PNR number from a passenger location to a baggage storage location, at block 3304.

According to some examples, the method 3300 may include generating, at a time that may be before a start time of a check-in window, a simulated baggage source message with the received PNR number and itinerary information. The simulated baggage source message may be compatible with an International Air Transport Association (IATA) B-Type Messages, at block 3306. The itinerary information may include flight times, flight date, inbound airport, and outbound airport, for example.

According to some examples, the method 3300 may include causing creation of an IATA license plate for each luggage item associated with the PNR number during the check-in window, at block 3308.

According to some examples, the method 3300 may include updating the SBSM with the created IATA license plate, at block 3310.

According to some examples, the method 3300 may include merging the SBSM and the BSM created by the airline carrier to create a unified BSM during the check-in window, at block 3312. One or more of the blocks 3308, 3310 and 3312 may be part of a baggage check-in process where the luggage is picked up from the passenger at home.

According to some examples, the method 3300 may include printing an IATA compatible bag tag using the digital unified or expanded BSM, at block 3316.

While the description here in describes an example for picking up luggage from a home and verifying passengers at a home location, this process may be performed at any remote location that is outside of an airport infrastructure.

Figure 34:
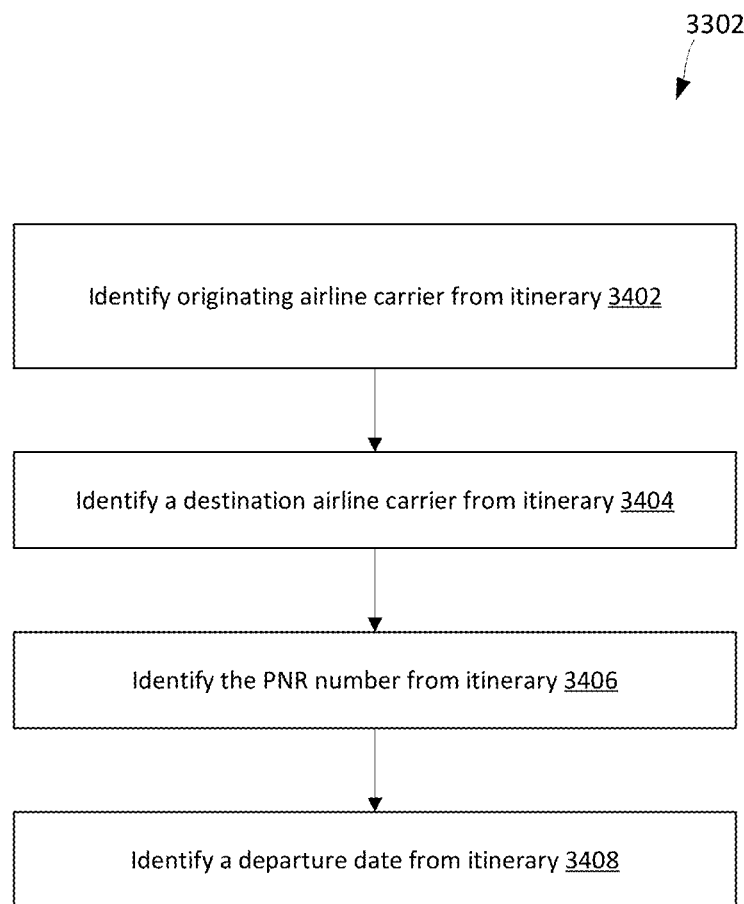
FIG. 34 illustrates a method to record a passenger itinerary in accordance with an embodiment.

FIG. 34 illustrates a method 3400 to record passenger's itinerary 3118 (FIG. 31) in accordance with an embodiment, in one or more embodiments, the method 3400 may include identifying an originating airline carrier from the passenger's itinerary 3118, at block 3402. In one or more embodiments, the method 3400 may include identifying destination airline carrier from itinerary, at block 3404. In one or more embodiments, the method 3400 may include identifying the PNR number from the itinerary 3118, at block 3406. In one or more embodiments, the method 3400 may include identifying departure date from itinerary 3118, at block 3408.

The itinerary's information may be recorded or captured using optical character recognition algorithms.

Figure 35:
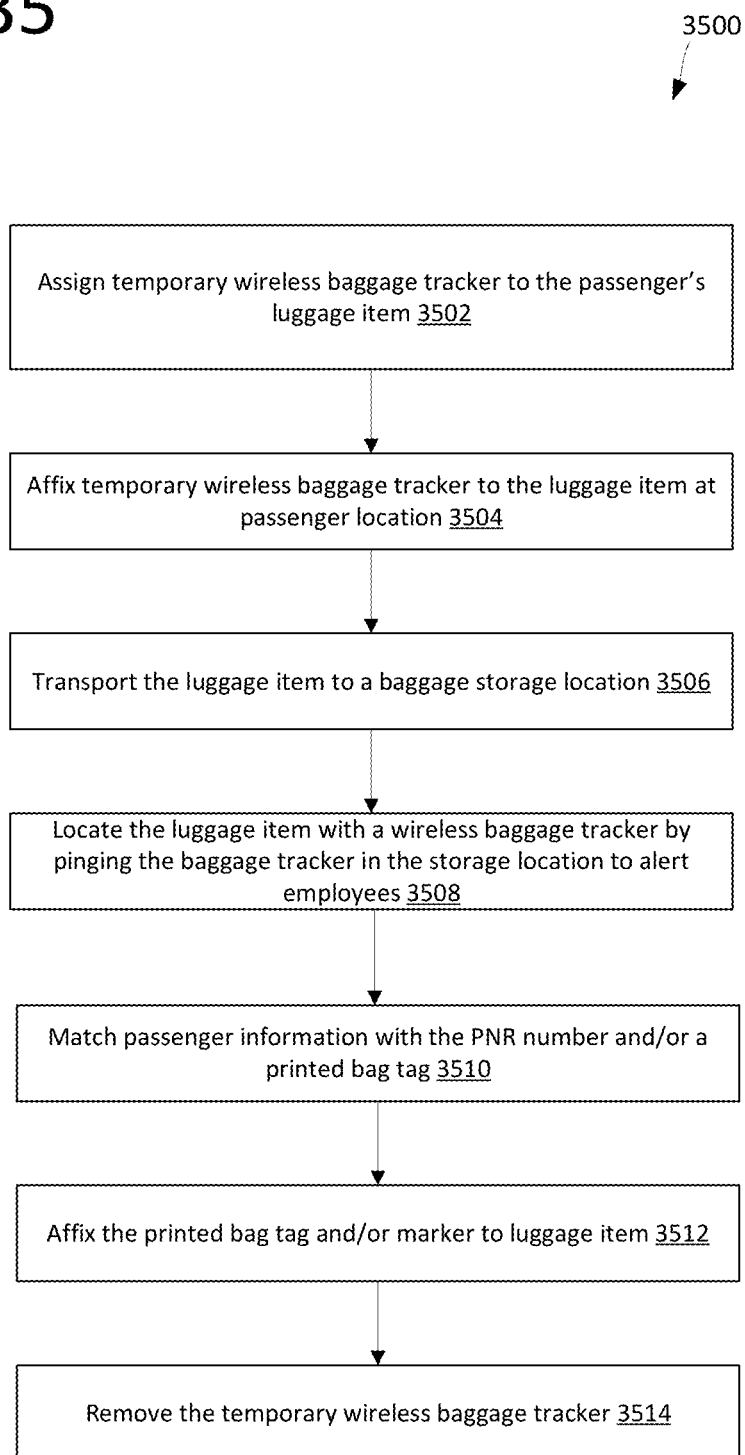
FIG. 35 illustrates a flowchart of a process for tracking a luggage item prior to loading the luggage item on an aircraft in accordance with an embodiment.

FIG. 35 illustrates a flowchart of a method 3500 for tracking a luggage item prior to affixing a bag tag on the luggage item in accordance with an embodiment. FIG. 36 illustrates a mobile communication device displaying a FIND MY application by APPLE, Inc. in accordance with an embodiment. While the FIND MY application is an example tracker, other trackers may be used and the description should not be limited in any way to only the AIRTAG by APPLE, Inc.

According to one or more embodiments, the method 3500 may include assigning a temporary wireless baggage tracker 3140 or 3142 to a passenger's luggage item, at block 3502.

By way of a non-limiting example, the collected PNR number and date and time of travel, described in FIG. 34, may be saved in a manifest or other file used to alert employees of a check-in window for the luggage item. The assigning of the temporary wireless baggage tracker to a passenger's luggage item may include naming the temporary wireless tracker 3140 with the PNR number of the passenger, for example.

According to some examples, the method 3500 may include affixing the temporary wireless baggage tracker (i.e., tracker 3140 or 3142) to the luggage item 3114, at block 3504.

According to some examples, the method 3500 may include transporting the luggage item to a baggage storage location, at block 3506.

According to some examples, the method 3500 may include pinging via signal 3150 the baggage tracker in the storage location to alert the employees of the location of the luggage item for the passenger, at block 3508. For example, the AIRTAG can be controlled to play a sound.

According to some examples, the method 3500 may include matching passenger information with the PNR number and/or the printed bag tag in a communication device linked to the tracker, at block 3510, once the luggage item is located.

According to some examples, the method 3500 may include affixing the printed bag tag and/or the marker to the luggage item, at block 3512, matching the passenger information. The bag tag information may be communicated to the passenger.

According to some examples, the method 3500 may include removing 3514 the temporary wireless baggage tracker. The temporary wireless baggage tracker may be reused for other luggage items.

This process may eliminate the need for a printed valet tag. Instead, the temporary wireless tracker may be used to replace the valet tag.

In one or more embodiments, the digital images of the luggage items in combination with the digital geolocation data and passenger's name data on the passenger identification linked to the PNR number may be used to replace the use of a printed valet tag.

In one or more embodiments, processes herein allow the process for checking in a luggage item to begin prior to a regulated check-in window.

In view of the foregoing, the embodiments herein provide, a method that includes receiving, by a first processor, a passenger name record (PNR) number from a confirmed itinerary for a flight, the confirmed itinerary created by a computer system associated with an air carrier, receiving, by the first processor, information that confirms an identify of the passenger associated with the PNR number from the confirmed itinerary to pick up and transport luggage associated with the PNR number to a location from a passenger location, and generating, by a second processor in communication with the first processor, a simulated baggage source message (BSM) with the received PNR number, the second processor being independent from the air carrier and the BSM being compatible with an International Air Transport Association (IATA) B-Type message.

For the sake of discussion and illustration, a BSM message is described. However, any B-Type message may be used that includes relevant passenger information that is accessible using the IATA bag tag number.

In view of the foregoing, the embodiments provide a system 3100 and method for checking in the luggage item that may include a first processor for receiving a passenger name record (PNR) number of a confirmed itinerary for a flight. The confirmed itinerary is created by a computer system associated with an air carrier, for example. The first processor may receive information that confirms an identify of the passenger associated with the PNR number from the confirmed itinerary to pick up and transport luggage associated with the PNR number to a processing location (i.e., baggage storage location) from a passenger location. The system 3100 and method may employ a second processor in communication with the first processor to generate a simulated baggage source message (SBSM) using a temporary unique identifier 1430e. The second processor is independent from the computer system of the air carrier. The simulated BSM is compatible with an International Air Transport Association (IATA) B-Type messages.

The system 3100 and method may employ the second processor to cause the creation of an originating IATA license plate for each luggage item associated with the PNR number.

The system 3100 and method may employ the second processor to update the simulated BSM with the created IATA license plate. The second processor may communicate to a computer system associated with the air carrier the updated BSM.

The system 3100 and method may employ the first processor to receive the information that confirms the identity of the passenger. This may include the use of an imaging device in communication with the first processor to capture an image of an identification instrument issued to the passenger.

The system 3100 and method may employ the imaging device in communication with the first processor to capture an image of each luggage item associated with the PNR number, prior to departing from the passenger location.

The simulated BSM may include information associated with inbound and outbound airports and dates.

The system 3100 and method may include a server or processor to check in a luggage item of the passenger and merge an airline's BSM with the simulated BSM.

The system 3100 and method may include a printing device to print an originating IATA bag tag. The system and method may employ a communication device to communicate a 10-digit IATA bag tag number to a mobile communication device of the passenger.

The system 3100 and method may provision the 10-digit IATA bag tag number to be a universal bag tag number. The IATA bag tag is recycled for off-airport locations.

The system 3100 and method may include a temporary and re-assignable luggage tracker that can be temporarily associated with the luggage item so that when a check-in window opens for printing the IATA for a flight, the luggage tracker may be pinged to locate the luggage. After printing the originating IATA bag tag and locating the luggage, the luggage tracker can be removed and subsequently reassigned for use by another luggage item.

While the description herein describes the creation of an expanded BSM, this description also applies to the creation of any of the other B-Type messages such as baggage transfer message (BTM), baggage source message (BSM), baggage processed message (BPM), baggage unload message (BUM), baggage not seen message (BNS), baggage control message (BCM), baggage manifest message (BMM) and baggage request (BRQ) used outside of the airline or airport computing infrastructure and their baggage handling system. The bag tag number may be part of the baggage messages.

For example, when a delivery service is expecting to pick up baggage at a destination location and the baggage location is not there, a computing device may be able to access an expanded B-Type message and create a BUM, for example, such as when a luggage item is missing from a train station or a bus station.

In one or more embodiments, the method may include electronically receiving at least one passenger's itinerary for at least one of lodging reservation data associated with a lodging entity, and at least one mode of travel that includes an air travel mode with an originating airline travel carrier. The method may include generating, by a server 2710, a universal baggage source message (BSM) for multi-mode of travel, the universal BSM including sets of data fields for an airline mode of travel and lodging reservations linked by a digital unique identifier representative of an originating hardcopy bag tag identifier (OP-BTI) associated with or printed on a printed bag tag that is on a passenger's luggage item from the originating airline travel carrier. The method may include recycling the printed bag tag and OP-BTI using the universal BSM to check-in a luggage item of a passenger for a return flight associated with the at least one passenger's itinerary.

The method may include provisioning the recycled printed bag tag as a luggage locator at off-airport locations in response to the recycled printed bag tag being acquired by an acquiring device until a new printed bag tag is created for the return flight. This is accomplished for example by the creation of the database 2708 to allow the OP-BTI to live on after the originating flight. The machine-readability of the OP-BTI allows the OP-BTI to be scanned or read over and over to track, locate, or to only retrieve updated information by those needing to retrieve updated travel information, such as lodging information or other modes of transportation.

According to one or more embodiments, the generating of the database 2708 to include the universal BSM, as shown in FIGS. 14C-14E and 29-30, may include acquiring a digital data record representative of the OP-BTI by accessing an airline's BSM 1400A, shown in FIG. 14A, of the originating airline travel carrier while the passenger is in flight. This may allow expanding the airline's BSM having the OP-BTI very quickly which can be helpful when thousands of passengers are soon arriving for a voyage on a cruise ship or resort. The sooner the expansion process can occur for some passengers, overloading employees with processing down-stream passengers can be minimized. The expanded airline BSM includes sets of data fields for linking a messaging system 2790 and updated lodging reservation data. The server 2710 stores the expanded BSM as a universal multi-travel and lodging BSM in the database 2708.

While the description herein discloses an expanded BSM, the disclosure also relates to expanded B-Type messages that include information that is unique to the passenger and their luggage item.

In view of the foregoing, the airline's BSM 1400A (FIG. 14A) may include a plurality of sets of data fields. The fields include a bag tag data field (i.e., field 1412) with a sequence of numbers that represent at least the OP-BTI. The sequence of numbers may include the number of luggage items checked in. The fields may include a passenger's name data field that includes a passenger's name and a passenger name record (PNR) number data field (i.e., field 1418).

In one or more embodiments, the expanding of the airline's BSM may include creating a lite airline BSM 1400A' (FIG. 14C) by recycling the OP-BTI data field (i.e., field 1412), the passenger's name data field, and the PNR number data field (i.e., field 1418) of the plurality of sets of data fields. The fields of the lite airline BSM are added to the expanded BSM. In one or more embodiments, all fields of the original airline's BSM may be preserved and added to the expanded BSM.

In one or more embodiments, when expanding of the airline's BSM, the method may include appending to the lite airline BSM 1400A', by the server 2710, a link to the lodging reservation data in a field 1454 of the lodging entity associated with the passenger. However, in one or more embodiments, in lieu of a link to data, the data field 1454 may include data representative of an assigned room, or a cabin number. The data field 1454 may include at least one data field. For example, the lodging data field may include geolocation data or an address of the lodging entity.

In one or more embodiments, when expanding of the airline's BSM, the method may include appending to the lite airline BSM, by the server 2710, a link to a travel mode reservation data of a second mode of travel different from the air travel mode that is in a field 1456. However, in one or more embodiments, in lieu of a link to data, the data field 1420 may include data representative of a train station or gate, date, time of departure. The data field 1420 may include at least one data field. For example, the mode of travel data field may include geolocation data or an address of the station.

In one or more embodiments, when expanding of the airline's BSM, the method may include at least one of: a) linking data to at least one stored image of the luggage item, such as in luggage image database 2730, to the lite airline BSM in field 1458; b) linking data to location data of the luggage item in response to the OP-BTI being acquired by an acquiring device in field 1460; and c) linking data to an image of a passenger's identification, such as in database for the passenger ID image 2735 (FIG. 27) to the lite airline BSM in field 1450. The luggage location data log 2725 may be stored in database 2708.

The messaging system 2790 may be used to generate a message to the acquiring device in response to the acquiring device acquiring the OP-BTI. The acquiring device would send the image of the OP-BTI so that the digital BTI data record is created to query the database 2708 for information. The messaging system may provide any updated information to the acquiring device for directing the luggage item to the next location in the travel experience.

As shown in FIG. 14B and FIG. 14C, the method may further include creating a simulated BSM 1400B and checking in the luggage item using the simulated BSM to create the OP-BTI. The method may include printing, by printing device 2740, the printed bag tag 142' with the new OP-BTI for the return flight.

The method may include accessing, by the server 2710, an airline's BSM 1400A using the PNR prior to the passenger arriving at a destination. The method may include acquiring, by the server 2710, the OP-BTI associated with the PNR in the airline's BSM 1400A and retrieving, by the server 2710, the return flight data linked to the PNR and/or OP-BTI.

The method may include creating, by the server 2710, a lite airline BSM 1400A' and generating, by the server 2710, a simulated BSM with the return flight data. The method may include generating, by the server 2710, a universal BSM (i.e., universal B-Type message 1400C) with the lite airline BSM 1400A' and the simulated BSM 1400B appended together.

The method may include electronically acquiring, by an acquiring device, the OP-BTI on the recycled printed bag tag; logging an instance and a location associated with the OP-BTI affixed to the luggage item that is read by the acquiring device, in the luggage location data log 2725; and appending a link to information representative of the logged instance and location to the universal BSM 1400A.

The method may include linking the lodging reservation data to the universal BSM 1400A, receiving updated assigned lodging reservation data; and communicating, by the messaging system 2790, the updated assigned lodging reservation data to at least one of: a mobile communication device, computing device, or a scanning device, in response to an acquiring device reading the recycled printed bag tag at an off-airport location.

The method may include electronically acquiring, by an acquiring device, the originating hardcopy bag tag identifier (OP-BTI) on the recycled printed bag tag affixed to the luggage item; querying, by the server 2710, the database (i.e., universal travel passenger itinerary 2714) for an assigned room associated with the digital data record of the OP-BTI in the universal BSM, in response to receiving the acquired OP-BTI; and causing display on a display device of the acquiring device information associated with the assigned room, in response to the query, as shown in FIG. 3E.

The method may include utilizing, by the at least one processor, the OP-BTI as a machine-readable unique identifier to query the database 2708 or system 108 to retrieve return flight data of a departing passenger from the lodging entity; and checking in, by the at least one processor, each luggage item for the departing passenger for the return flight with a return flight travel carrier identified in the retrieved return flight data.

The method may include causing, by the at least one processor, creation of a new OP-BTI with the return flight data, passenger's name and passenger name record; and printing, by a printing device 2740, a new bag tag 2750 with the new OP-BTI for the return flight.

The method may include generating, by the server 2710, an outbound simulated BSM 1400B with the return flight data, passenger's name and passenger name record; assigning a new OP-BTI to the luggage item for the return flight; and populating a new digital BTI record representative of the assigned OP-BTI in the simulated BSM.

The system 2700 or 3100 may include a remote simulated Departure Control System (DCS) in communication with server 2710 or 3126 that assigns IATA compatible bag tags for a non-flying airline carrier with its own IATA assigned airline code that can be processed through traditional airline baggage handling systems. The assigned OP-BTI is assigned by a remote server 3126 in communication with the simulating DCS. The universal B-Type message may be created for all IATA B-Type messages.

The "step-by-step process" for performing the claimed functions herein is a specific algorithm, and may be shown as a mathematical formula, in the text of the specification as prose, and/or in a flowchart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general-purpose computer, but rather the special purpose computer programmed to perform the disclosed algorithm.

A general-purpose computer, or microprocessor, may be programmed to carry out the algorithm/steps for creating a new machine. The general-purpose computer becomes a special purpose computer once it is programmed to perform particular functions pursuant to instructions from program software of the embodiments described herein. The instructions of the software program that carry out the algorithm/steps electrically change the general-purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

"Communication media" typically comprise computer readable instructions, data structures, program modules, or other data in a modulated data signal, such as carrier wave or other transport mechanism. The communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, infrared, and other wireless media. Combinations of any of the above are also included within the scope of computer readable medium.

Alternatively, or in addition, any of the functions and programming modules described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products, System-on-a-chip systems, Complex Programmable Logic Devices, and the like.

Terms such as "unit", "module", "member", "block" and "component" as used herein generally represent software, firmware, hardware, or combinations thereof. In the case of a software implementation, the module or component represents program code that performs specified tasks when executed on a processor. The program code may be stored in one or more computer readable memory devices, otherwise known as non-transitory devices. The features of the embodiments described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, wearable device, an Internet-of-Things (IoT) device, and the like). According to embodiments, a plurality of "unit", "module", "member", "block" and "component" may be implemented as a single component or a single "unit", "module", "member", "block" and "component" may include a plurality of components.

It will be understood that when an element is referred to as being "connected" with or to another element, it can be directly or indirectly connected to the other element, wherein the indirect connection includes "connection via a wireless communication network".

Throughout the description, when a member is "on" another member, this includes not only when the member is in contact with the other member, but also when there is another member between the two members.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms "first", "second", etc., do not denote any order or importance, but rather the terms "first", "second", etc., are used to distinguish one element from another. Likewise, identification codes or reference numbers are used for the convenience of the description but are not intended to illustrate the order of each step or block. Each step or block may be implemented in an order different from the illustrated order unless the context clearly indicates otherwise.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

Computer and Software Technology

One or more embodiments of the present disclosure may be embodied on various platforms. The following provides an antecedent basis for the information technology that may be utilized to enable the disclosure.

Embodiments of the present disclosure may be implemented in hardware, firmware, software, or any combination thereof. Embodiments of the present disclosure may also be implemented as instructions stored on a machine-readable medium, which may be read and executed by one or more processors. A machine-readable medium may include any mechanism for storing or transmitting information in a form that is readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present disclosure may be written in any combination of one or more programming languages, including an object-oriented programming language such as Java, C #, C++, Visual Basic or the like and conventional procedural programming languages, such as the "C" programming language or similar programming languages. Additional languages may include scripting languages such as PYTHON, LUA and PERL.

Aspects of the present disclosure are described below with reference to flowchart illustrations and/or block diagrams of methods, apparatus (systems) and computer program products according one or more embodiments of the disclosure. It will be understood that each block of the flowchart illustrations and/or block diagrams, and combinations of blocks in the flowchart illustrations and/or block diagrams, can be implemented by machine-readable program instructions.

Glossary of Claim Terms

Airport Computing Infrastructure refers a distributed network of computing systems with controlled access to baggage handling systems that track and handle luggage items, systems that track passengers and systems that control flight reservations and more. The airport computing infrastructure is shared by airlines to deliver airplanes to gates for disembarking passengers and luggage items to carousels, for example. In some instances, an airline computing infrastructure and airport infrastructure may be used interchangeably.

Airline Computing Infrastructure refers a distributed network of computing systems with controlled access for booking reservations and checking in passengers and their luggage items. The airline computing infrastructure interfaces with the baggage handling systems that track luggage items and systems that track passengers. The airline computing infrastructure includes the Departure Control System (DCS) and a travel reservation booking system.

BTI means "bag tag identifier." A bag tag identifier, also known as a baggage tag or baggage label, is a small tag or label attached to a passenger's luggage that contains identifying information about the passenger and their flight. It is used by airlines to track and handle the passenger's checked baggage. The tag usually includes the passenger's name, flight information (flight number, departure and destination airports, and date of travel), and a unique identifier, such as a bag tag number or barcode. The bag tag identifier number is unique for each luggage, and it's used as reference for the airlines to track the luggage through the baggage handling system, matching the luggage to the passenger's flight and route, and also to identify the owner of the luggage in case of misplaced, lost or delayed luggage. The bag tag identifier is usually issued at check-in, and the passenger may attach it to their luggage before they drop it off at the baggage drop-off counter.

Database means an organized collection of data stored, updated and accessed electronically. Databases are typically designed to hold data, support efficient query and data manipulation, and manage the way that data is stored and retrieved.

First-mode travel carrier (FMTC) means the initial carrier that affixes a tangible, machine-scannable indicium to a passenger's luggage which according to the present disclosure is used to retrieve the passenger PNR and then construct a passenger manifest for one or more return trips without having to manually reenter data.

International Air Transport Association (IATA) refers to the world-wide trade association of airlines (for both freight and passenger carriers) that regulates the aviation industry by promulgating standards, procedures, and practices.

License Plate means the ten-digit numeric code on a bag tag issued by a carrier to agent during check-in for a travel journey. The term "license plate" in this context is the official term used by IATA. The license plate is encoded in a machine-scannable bar code but also presented in human-readable form where it will have either a two-character or a three-digit IATA carrier code. For example, it may be either "CZ728359" or "784728359." "CZ" would be the two-character IATA code for China Southern Airlines, and "784" would be the three-digit IATA carrier code. For American Airlines®, the IATA Designator would be "AA" and the IATA code "001."

Lodging Entity means a business or operation providing residential hospitality services such as a hotel, resort or cruise ship as non-limiting examples. A lodging entity may be a mode of travel or a vehicle of travel.

Multi-Mode Travel means functionally using a B-Type message and using an IATA message, and expanding their use all the way to the lodging entity or other mode of travel. The IATA license plate, the PNR number, and the piece of paper becomes a bag tag for the entire trip and for any mode of travel.

Originating Hardcopy Bag Tag Identifier (OP-BTI) means a unique identifier associated with or printed on a luggage bag tag from the originating airline travel carrier. In general, every piece of luggage in airline travel is tagged with a unique identifier for tracking purposes. It is typically attached to the luggage at check-in and scanned at various points throughout the journey to ensure the luggage makes it to the correct destination.

Passenger/Airline Information on the originating hardcopy bag tag refers to information that links a passenger and an airline to specific IATA compatible passenger information. This information may include the PNR number for a passenger's itinerary, the IATA license plate printed on an originating hardcopy bag tag that is associated with a flight in the passenger's itinerary and/or the originating airline of the passenger's flight or associated with the itinerary. This information may include a passenger's name and the airline code or airline name. This information may include any information that when combined can be used to access the passenger's PNR data stored in a computer readable memory device coupled to a computing device associated with the airline carrier. The term "passenger/airline information" is sometimes referred to as "printed passenger information associated with an airline travel carrier" that is on an originating hardcopy bag tag.

Luggage Item Brain (LIB) refers to stored data and programming instructions in a central or distributed location, which create delivery, pickup, and handling instructions of the luggage item parallel to its owner's travel journey or itinerary. The LIB may include information for the checking in of the luggage item for its return home or for a return leg of travel. The LIB may include reservation information for travel on multiple modes of travel. The LIB may include up-to-date information about the luggage item's clearance status through a government Customs station or ISSS. The LIB may include up-to-date information about available reservation status. The LIB may include a primary key or linking key that is compatible with an IATA unique identifier and/or a PNR number tracking the luggage item using a printed bag tag or bingo marker originating by an airline carrier. The LIB may include the fields of the universal or expanded BSM as described herein and be communicated using Internet Protocols over the Internet or web-based networks. The LIB may include application programming interfaces (APIs) to interface with machines to receive information about and display or communicate information to humans through the machines regarding the contents of the LIB.

Luggage Manifest means a digital record containing an array of data including data for pick-up of a luggage item departing a destination point, such as a terminating airport, and delivery to a lodging entity or another travel carrier and return flight check-in based on a digitized IATA license plate, passenger name record (PNR) number and/or text, all of which can be from an originating hardcopy bag tag of the originating first leg of travel. The luggage manifest may include a delivery location, which may include a home address, a government security screening location, temporary holding location, passenger delivery instructions, cabin room, lodging entity address, any intermediate travel carrier location, destination point, rental car location, first-mode travel carrier location, designated return flight air carrier location, and/or designated return travel carrier location. Since the luggage item has an independent travel experience, its location at a destination point, such as DP 107 may be at a different location then the passenger at the same DP 107. For example, if the luggage item is screened for the next mode of travel, the luggage item can be transferred to a trusted custody handler.

Mode of Transportation: Transportation by an air carrier, motor vehicle, locomotive, and maritime vessel. A maritime vessel may include a ferry or a cruise ship. In one or more embodiments, a mode of transportation may be a rental vehicle including rental cars and recreational vehicles, for example.

Passenger Manifest means a record containing an array of data including data for check-in of a return leg of travel of a passenger with a designated return travel carrier. A passenger manifest may be a flight manifest. A passenger manifest may be a manifest of expected passenger for arrival for travel or a stay with a mode of travel.

PNR stands for "Passenger Name Record" and is a known term in the travel industry. It can be a record in the database of an airline or a travel agency that contains all the details of a passenger's itinerary and trip information. This information includes the passenger's name, contact information, flight details, seat preferences, and any special requests. PNR also may contain information about the booking, such as the booking date, fare, and ticketing status. It is used by the airlines and travel agencies to manage and keep track of the passenger's itinerary and travel plans. PNR number may be unique for each passenger, or a group of passengers and it's used as reference for the passengers, airlines and travel agencies. PNR is also used to check-in, check flight status, and make any changes to the reservation. The PNR number itself is typically 6 characters, often a combination of letters and numbers. While regulatory bodies like IATA (see above) do not dictate a universal format for PNRs, each PNR has five (5) mandatory fields including: (1) the phone for traveler or agent; (2) the last person who made changes in the PNR; (3) the itinerary which must include at least one segment of the journey; (4) the name of the passenger or passengers including full first and last names; and (5) specifying how and when a ticket is to be issued. Although the PNR number for airlines is currently 6 characters, the PNR number may increase in characters and should not be limited to the number of characters but to the current guidelines of the airline industry now and in the future. In other industries or travel carriers, the PNR number uses a different number sequence. Some systems may use a super PNR number that combines PNR numbers of a plurality of travel carriers and lodging entities, including rental cars, hotels, etc.

Printed Instrument means a physical substrate imprinted with specific information related to the passenger and the airline carrier compatible with IATA guidelines. Such an instrument may take various forms, ranging from a self-printed bag tag generated through a domestic printing device to a conventional airline bag tag marker conforming to standardized designs as delineated in schematic illustrations like FIG. 2B. Beyond the scope of baggage identification, the printed instrument may also encompass a multitude of alternative documents bearing relevant passenger and airline data. A function of this instrument resides in its capacity to serve as either a direct or indirect conduit for extracting a Passenger Name Record (PNR) number. In certain embodiments, this extraction can be facilitated through image capture via a mobile communication device, whereby the instrument itself or associated memory accessible by an operative computer system can divulge the PNR. It should be noted that the airline carrier typically presides over the text and layout attributes of both the originating hardcopy bag tag and any derivative printed instruments, which may contain congruent textual elements.

Radio-frequency identification (RFID) means a technology that uses electromagnetic fields to automatically identify, and track tags attached to objects.

Regulations refer to regulatory rules from a government agency commissioned by law to regulate the mode of travel or transportation provides regulations for screening luggage items to board an aircraft, mass transit of land-mode of travel or transportation and maritime vessel security.

Return travel carrier (RTC) means the carrier (e.g., airline) a takes at the conclusion of a stay at a lodging entity or other mode of travel. The RTC in the present disclosure is extracted in a process using the license plate printed by the FMTC to access the PNR of the passenger to build a passenger manifest for the return journey. Among other benefits, this reduces or eliminates data entry, particularly for the lodging entity checking in the passenger for the RTC.

Travel Data refers to data that can be extracted from an airline's B-Type message, a passenger's itinerary, and/or the data in a PNR database.

Type B (or B-Type) messages refer to a specific format of communication that airlines and other entities in the air travel industry use to transmit and receive critical operational data. These messages are standardized and utilized for a wide range of applications, including flight planning, passenger booking and check-in, luggage tracking, weather updates, and other crucial air transport operations. The Type B messaging standard is overseen by the International Air Transport Association (IATA). Compared to more modern data types and formats like XML (extensible markup language) and JSON (JavaScript Object Notation), which carry message payloads, Type B messages employ a stringent structure. Type B messages operate on a "store-and-forward" mechanism, whereby a message sender sends data via their service provider, which is then stored for a contracted period, often seven (7) days. The data is delivered directly to a chosen recipient or via a gateway provider if they exist on a different network. Should delivery fail, contractual agreements allow the data to be re-sent, a contingency reflected in the PDM (Possible Duplicate Message) header.

Rules refer to guidelines required by a company or entity owning the vehicle of travel, which may have additional rules for objects to be brought into or on board a vehicle of travel in a luggage item. The rules may be self-governance rules.

Rules and Regulations refer to the combined regulations and rules for both the government agency and the company or entity owning the vehicle of travel regarding types of objects and materials that can be brought into or on board a vehicle of travel in a luggage item.

Super PNR (Passenger Name Record) serves as an aggregated meta-record that encapsulates multiple discrete PNRs, thereby providing a unified identifier for complex travel itineraries. Characterized by its capacity for data aggregation, a Super PNR may incorporate flight information from multiple carriers—potentially cross-referencing partner airlines in code-share or alliance configurations—as well as multimodal transportation options such as rail or bus services. This amalgamated data structure facilitates streamlined itinerary management by offering a singular reference point, thereby ensuring data integrity through synchronized updates across all constituent records. Additionally, a Super PNR can encapsulate enriched data elements, including but not limited to, consolidated baggage information and special service requests, thus augmenting both customer experience and operational efficiency for service providers.

Trusted Custody Handler means persons allowed to transfer secure luggage, baggage, and packages from an air carrier cargo hold or other vehicles of travel without exposing the baggage that would require additional physical security scanning by a governing entity, such as CBP and the Coast Guard, or a private entity to enter a next vehicle of travel or country of travel.

Vehicle of Travel: A vehicle of travel includes a medium of travel. The medium of travel may include mass transit motor vehicles, locomotives, and maritime vessels. A maritime vessel may include a ferry or a cruise ship. The medium of travel may include a stationary building such as a lodging entity or resort. Ferries, cruise ships, and trains like lodging entities may have lodging accommodations as part of the passenger's reservations. Some modes of transportation may include lodging accommodations such as recreational vehicles.

The advantages set forth above, and those made apparent from the foregoing description, are efficiently attained. Since certain changes may be made in the above construction without departing from the scope of the disclosure, it is intended that all matters contained in the foregoing description or shown in the accompanying drawings shall be interpreted as illustrative and not in a limiting sense.

What is claimed is:

1. A method comprising:
   a) identifying, by at least one of at least one processor, a terminating baggage source message (BSM) associated with an arrival of a luggage item of a passenger, wherein the terminating BSM comprises an airport code associated with an airport and travel data of a first mode of travel carrier of the luggage item, and wherein the travel data comprises at least one of flight information, airline information, a name of the passenger, a passenger name record (PNR) number, and an International Air Transport Association (IATA) license plate number;
   b) matching, by at least one of the at least one processor, any of the travel data in the terminating BSM with travel data in a manifest for a second mode of travel different from the first mode of travel, wherein the second mode of travel is local to the airport code;
   c) based on matching any of the travel data in the terminating BSM with the travel data in the manifest for the second mode of travel, extracting, by at least one of the at least one processor, the IATA license plate number from the terminating BSM; and
   d) creating, by at least one of the at least one processor, a luggage item manifest record for the luggage item, wherein the luggage item manifest record comprises the IATA license plate number, and wherein the luggage item manifest record is accessible by predetermined electronic acquiring devices configured to scan an originating hardcopy bag tag identifier (OH-BTI) associated with or printed on an originating hardcopy bag tag from the first mode of travel carrier that is attached to the luggage item.

2. The method of claim 1,
wherein the travel data comprises the flight information and airline information,
wherein the flight information comprises a flight number and an airline,
wherein the method further comprises:
   before b), sorting, by at least one of the at least one processor, a plurality of BSMs based on a baggage source indicator that indicates the BSM is the terminating BSM;
wherein b) further comprises matching, by at least one of the at least one processor, the flight number and the airline in the terminating BSM with the travel data in the manifest for the second mode of travel,
wherein c) further comprises, based on matching the flight number and the airline in the terminating BSM with the travel data in the manifest for the second mode of travel, extracting, by at least one of the at least one processor, the flight number and the airline from the terminating BSM, and
wherein d) further comprises including the flight number and the airline in the luggage item manifest record.

3. The method of claim 1,
wherein the travel data comprises the name of the passenger,
wherein the method further comprises:
   before b), sorting, by at least one of the at least one processor, a plurality of BSMs based on a baggage source indicator that indicates the BSM is the terminating BSM,
wherein c) further comprises, based on matching the name of the passenger in the terminating BSM with the travel data in the manifest for the second mode of travel, extracting, by at least one of the at least one processor, the name of the passenger from the terminating BSM, and
wherein d) further comprises including the name of the passenger in the luggage item manifest record.

4. The method of claim 1,
wherein the travel data comprises the PNR number,
wherein the method further comprises:
   before b), sorting, by at least one of the at least one processor, a plurality of BSMs based on a baggage source indicator that indicates the BSM is the terminating BSM,
wherein c) further comprises, based on matching the PNR number in the terminating BSM with the travel data in the manifest for the second mode of travel, extracting, by at least one of the at least one processor, the PNR number from the terminating BSM, and
wherein d) further comprises including the PNR number in the luggage item manifest record.

5. The method of claim 1, wherein the second mode of travel is one of: a cruise ship, a train, a bus, a ferry, an air carrier, or a lodging entity.

6. The method of claim 1, further comprising:
after d), receiving, by at least one of the at least one processor, a trigger to activate an electronic luggage item brain associated with the luggage item manifest record, wherein the trigger is representative of a scan of the originating hardcopy bag tag having an IATA license plate barcode or a scan of a printed instrument with a portion of printed text of the originating hardcopy bag tag.

7. The method of claim 6, further comprising electronically linking the electronic luggage item brain to a passenger manifest associated with the manifest for the second mode of travel.

8. The method of claim 1,
wherein the travel data comprises the PNR number,
wherein the method further comprises:
   e) extracting, by at least one of the at least one processor, the (PNR) number from the terminating BSM, and
wherein d) further comprises:
   including, by at least one of the at least one processor, the PNR number in the luggage item manifest record.

9. The method of claim 8, further comprising:
f) acquiring, by an electronic acquiring device from among the predetermined electronic acquiring devices, the OH-BTI to create a digital bag tag identifier (BTI) data record linked to the first mode of travel carrier;
g) extracting, by at least one of the at least one processor, the IATA license plate number from the digital BTI data record;
h) accessing, by at least one of the at least one processor, a passenger name record (PNR) from a computer system of the first mode of travel carrier, based on the PNR number;
i) autonomously updating, by at least one of the at least one processor, the luggage item manifest record with data for check-in of a return leg of travel of the passenger with a designated return travel carrier; and
j) repeating a)-i) for a plurality of passengers beginning a stay associated with a lodging entity to autonomously form a luggage manifest file, wherein the luggage manifest file comprises a conduit for check-in of the plurality of luggage items with the designated return travel carrier.

10. The method of claim 9, wherein the acquiring, by the electronic acquiring device from among the predetermined electronic acquiring devices, includes one of:
scanning, by a barcode scanner, the OH-BTI on the originating hardcopy bag tag from the first mode of travel carrier;
scanning, by the barcode scanner, the OH-BTI on a printed marker from the first mode of travel carrier that is attached to the luggage item; or
reading, by a radio frequency identifier (RFID) reader, RFID information associated with the OH-BTI.

11. The method of claim 9, further comprising:
performing, by at least one of the at least one processor, a remote check-in process for the luggage item for the return leg of travel;
during the remote check-in process, obtaining, by at least one of the at least one processor, airline bag tag information for the return leg of travel for checked in luggage items for the passenger; and printing, by a printer, a new bag tag for the return leg of travel that is compatible with an International Air Transport Association (IATA) license plate for each checked in luggage item of the passenger.

12. The method of claim 11, further comprising:
replacing the originating hardcopy bag tag from the first mode of travel carrier with the new bag tag for the return leg of travel; and
updating, by at least one of the at least one processor, an electronic luggage item brain of the luggage item manifest record with the IATA license plate number for the return leg of travel.

13. The method of claim 1, further comprising, prior to a):
e) obtaining, by at least one of the at least one processor, a plurality of BSMs associated with an arrival of luggage items; and
f) matching, by at least one of the at least one processor, the name of the passenger in the terminating BSM with a name in a flight manifest.

14. The method of claim 13, further comprising:
based on matching the name of the passenger in the terminating BSM with the name in the flight manifest:
   triggering, by at least one of the at least one processor, a security screening integration assistant (SSIA) process comprising assembling security screening image and related data related to the IATA license plate number captured during the first mode of travel security screen;
   communicating, by at least one of the at least one processor, the security screening image and related data to an integrated security screening station, while preserving confidentiality of personal identifiable information of the passenger linked to the security screening image and related data; and
   receiving, by at least one processor of the at least one processor, a response of a security analysis from the integrated security screening station.

15. The method of claim 14, further comprising:
causing, by at least one of the at least one processor, a printer device to print a marker configured to bypass security screening of at least one of the airport or the second mode of travel, wherein the marker comprises the results of the security analysis.

16. The method of claim 14, wherein the security screening images and related data comprise a three-dimensional dimensional representations of an object within the luggage item.

17. The method of claim 14, wherein the security screening images and related data comprises tomogram data of the luggage item including contents of the luggage item.

18. The method of claim 1, further comprising:
based on matching any of the travel data in the terminating BSM with the travel data in the manifest for a second mode of travel:
   triggering, by at least one of the at least one processor, a security screening integration assistant (SSIA) process comprising assembling security screening image and related data related to the IATA license plate number captured during the first mode of travel security screen, in response to the triggering;
   communicating, by at least one of the at least one processor, the security screening image and related data to an integrated security screening station while preserving confidentiality of personal identifiable information of the passenger linked to the security screening image and related data; and receiving, by at least one of the at least one processor, a response of a security analysis from the integrated security screening station.

19. The method of claim 18, wherein the security analysis comprises screening associated with the second mode of travel for a possible prohibited object, wherein the possible prohibited object comprises one or more of weapons, bottles alcohol, irons, and electrical power strips.

20. The method of claim 18, wherein the security screening images and related data comprises a three-dimensional dimensional representation of an object within the luggage item.

21. The method of claim 18, wherein the security screening images and related data comprises tomogram data of the luggage item including contents of the luggage item.

* * * * *